US009743357B2

(12) United States Patent
Tabe

(10) Patent No.: US 9,743,357 B2
(45) Date of Patent: Aug. 22, 2017

(54) ENERGY HARVESTING COMPUTER DEVICE IN ASSOCIATION WITH A COMMUNICATION DEVICE CONFIGURED WITH APPARATUS FOR BOOSTING SIGNAL RECEPTION

(76) Inventor: Joseph Akwo Tabe, Silver Spring, MD (US)

(*) Notice: Subject to any disclaimer, the term of this patent is extended or adjusted under 35 U.S.C. 154(b) by 781 days.

(21) Appl. No.: 13/328,383

(22) Filed: Dec. 16, 2011

(65) Prior Publication Data

US 2013/0157729 A1 Jun. 20, 2013

(51) Int. Cl.
*H04W 52/00* (2009.01)
*H04W 52/02* (2009.01)
*B82Y 30/00* (2011.01)

(52) U.S. Cl.
CPC ......... *H04W 52/0245* (2013.01); *B82Y 30/00* (2013.01); *Y02B 60/50* (2013.01)

(58) Field of Classification Search
CPC ..... H04W 52/0245; Y02B 60/50; B82Y 30/00
USPC .............................. 455/550.1, 566, 571–573
See application file for complete search history.

(56) References Cited

U.S. PATENT DOCUMENTS

2005/0149870 A1* 7/2005 Van Ee et al. ................. 715/700

* cited by examiner

*Primary Examiner* — Sam Bhattacharya

(57) ABSTRACT

Disclosed embodiments comprise an energy harvesting computer device in association with a communication device comprising interactive user interface operatively configured with CMOS multiple antennas on chip for boosting signal receptions and for providing faster data transmission speed. Disclosed embodiment encompasses three modes of communications—the Cell phone, wireless Internet applications, and Global communication and media information. Embodiments provide communication apparatus operable to enhance mobile communication efficiency with touch sensitive display comprising energy harvesting platform in communication with a charging circuit board configured with memories, processors, sensors, and modules. Embodiments further provide a gaming device, a wireless media device configured with touch pads comprising sensors being embedded in silicon substrate and fused in nano-fiber/microfiber material having excellent electrical characteristics. Certain embodiments provide communication apparatus configured for voice enabled applications comprising human voice auditory operable to convert text into voice auditory and/or voice auditory into text applications.

51 Claims, 55 Drawing Sheets

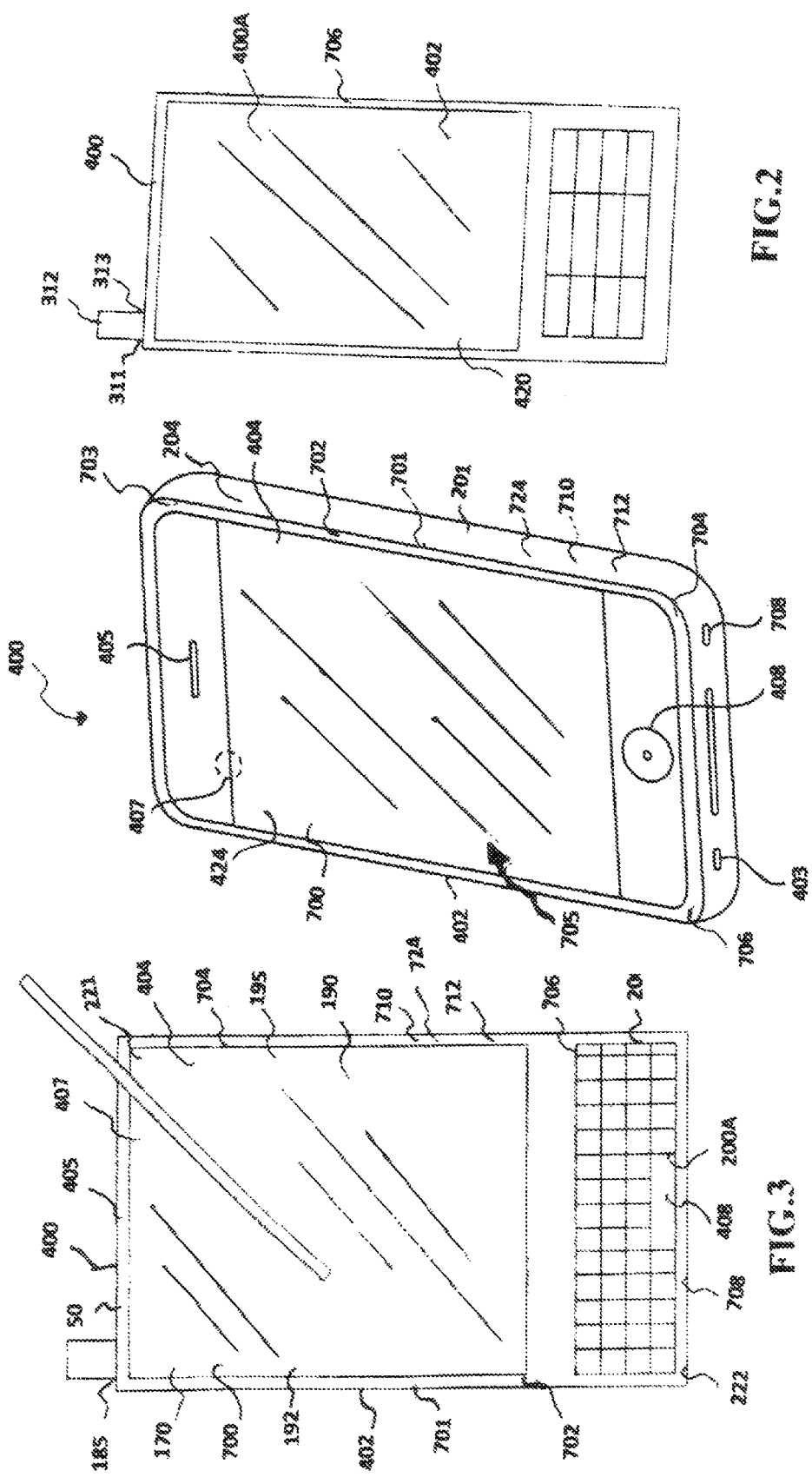

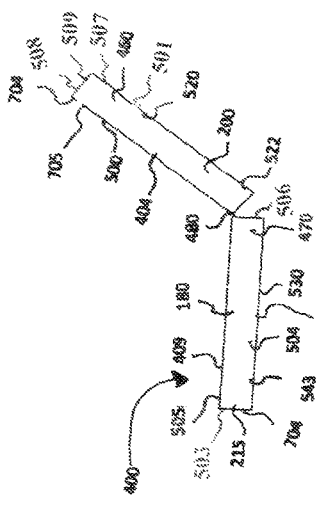
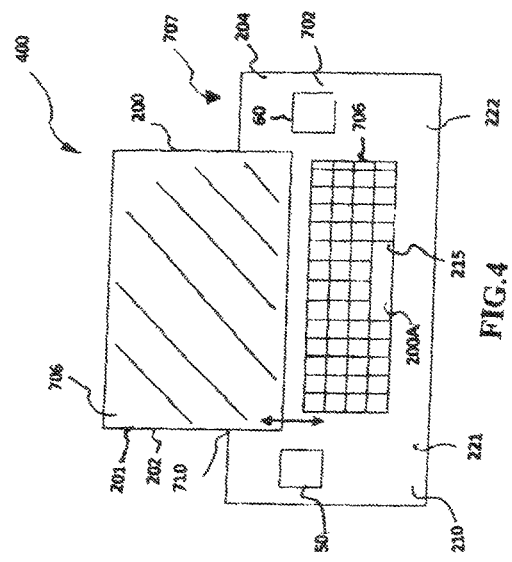
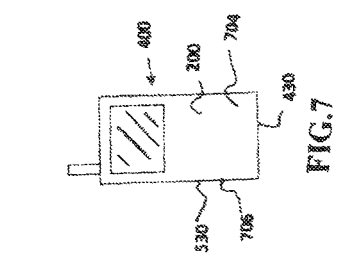
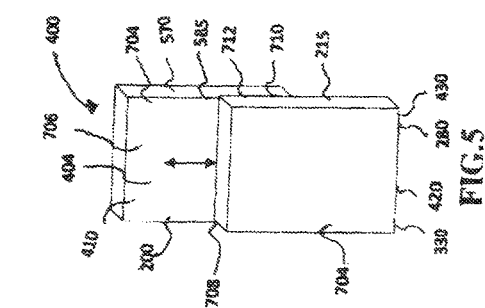

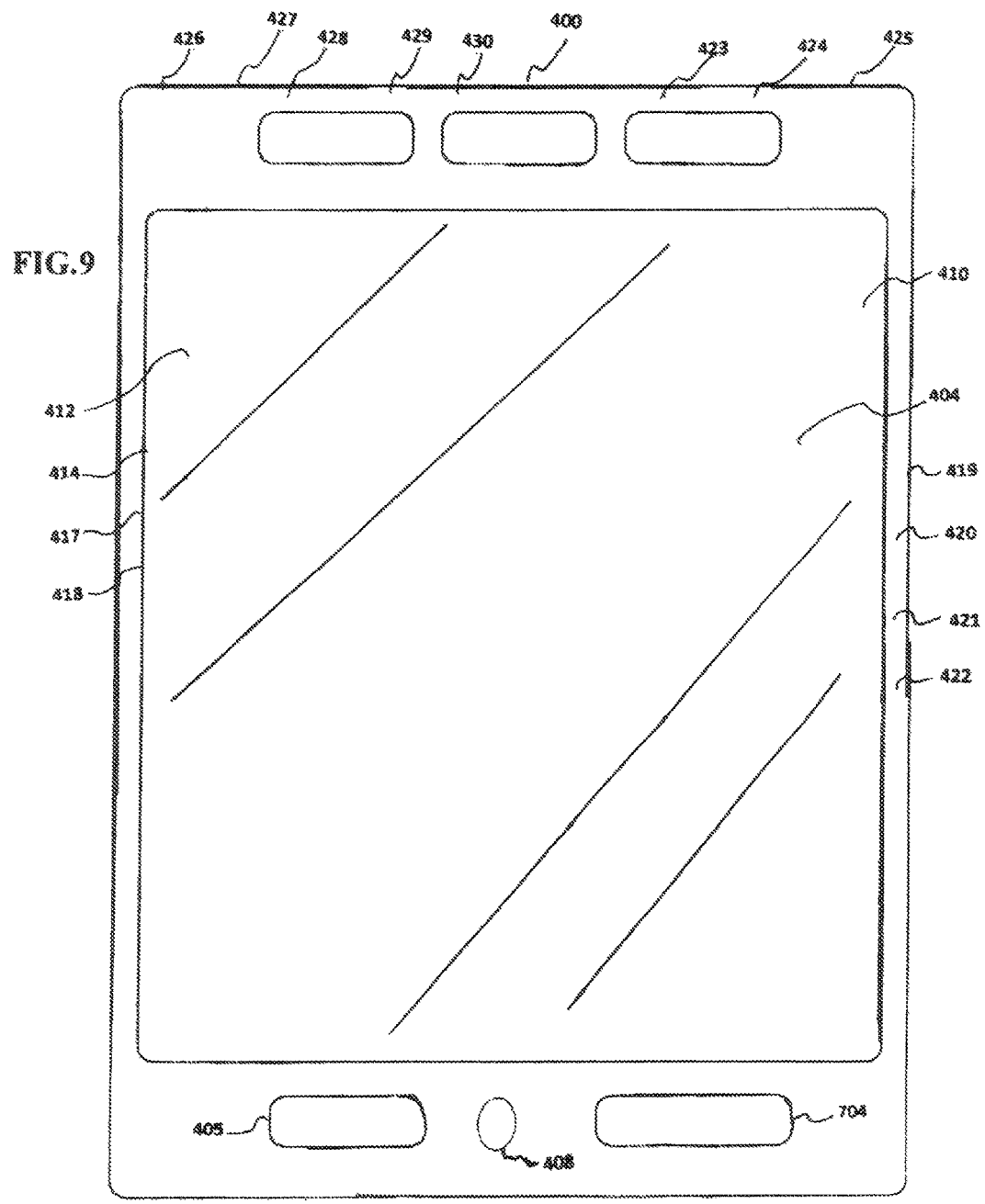

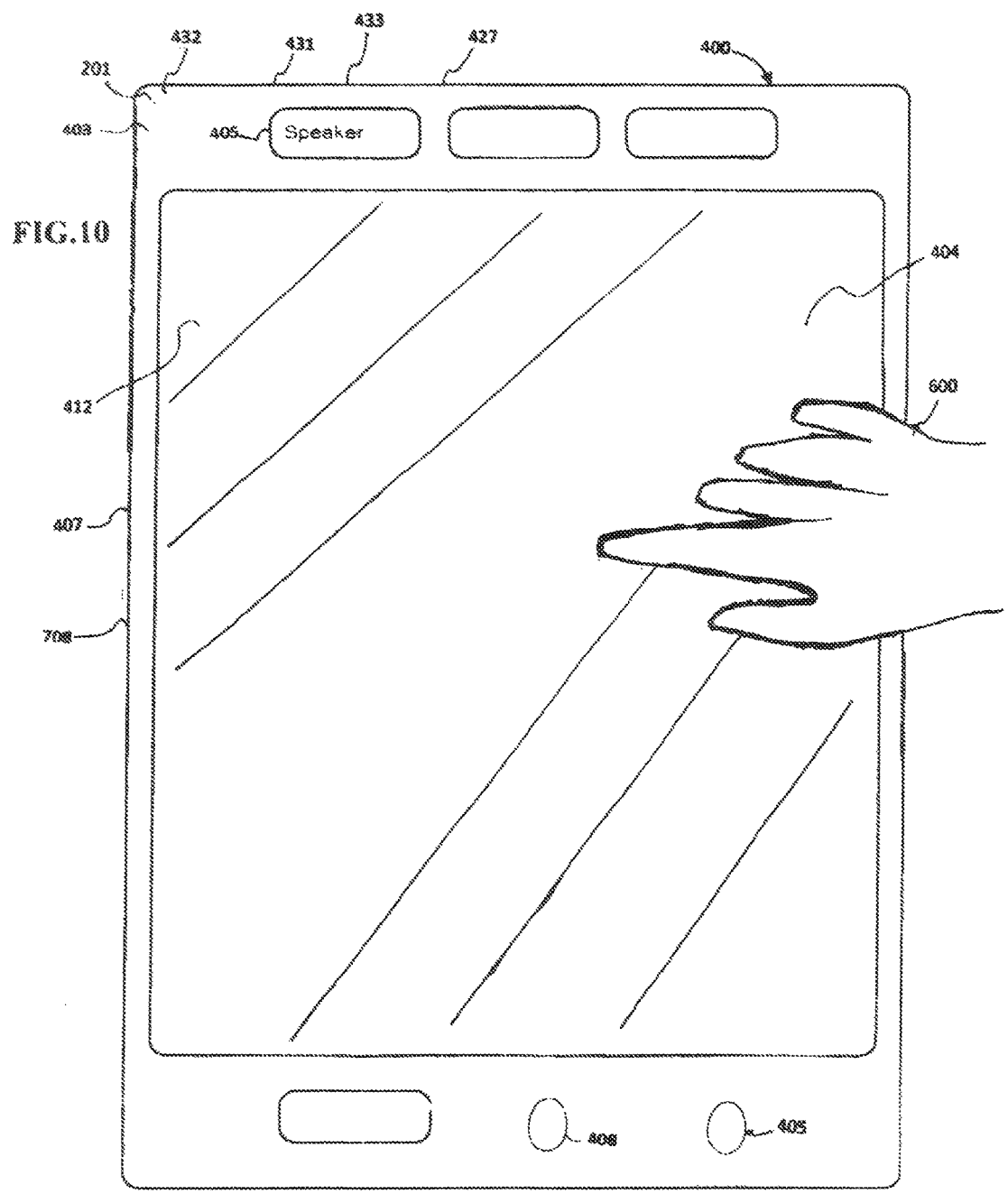

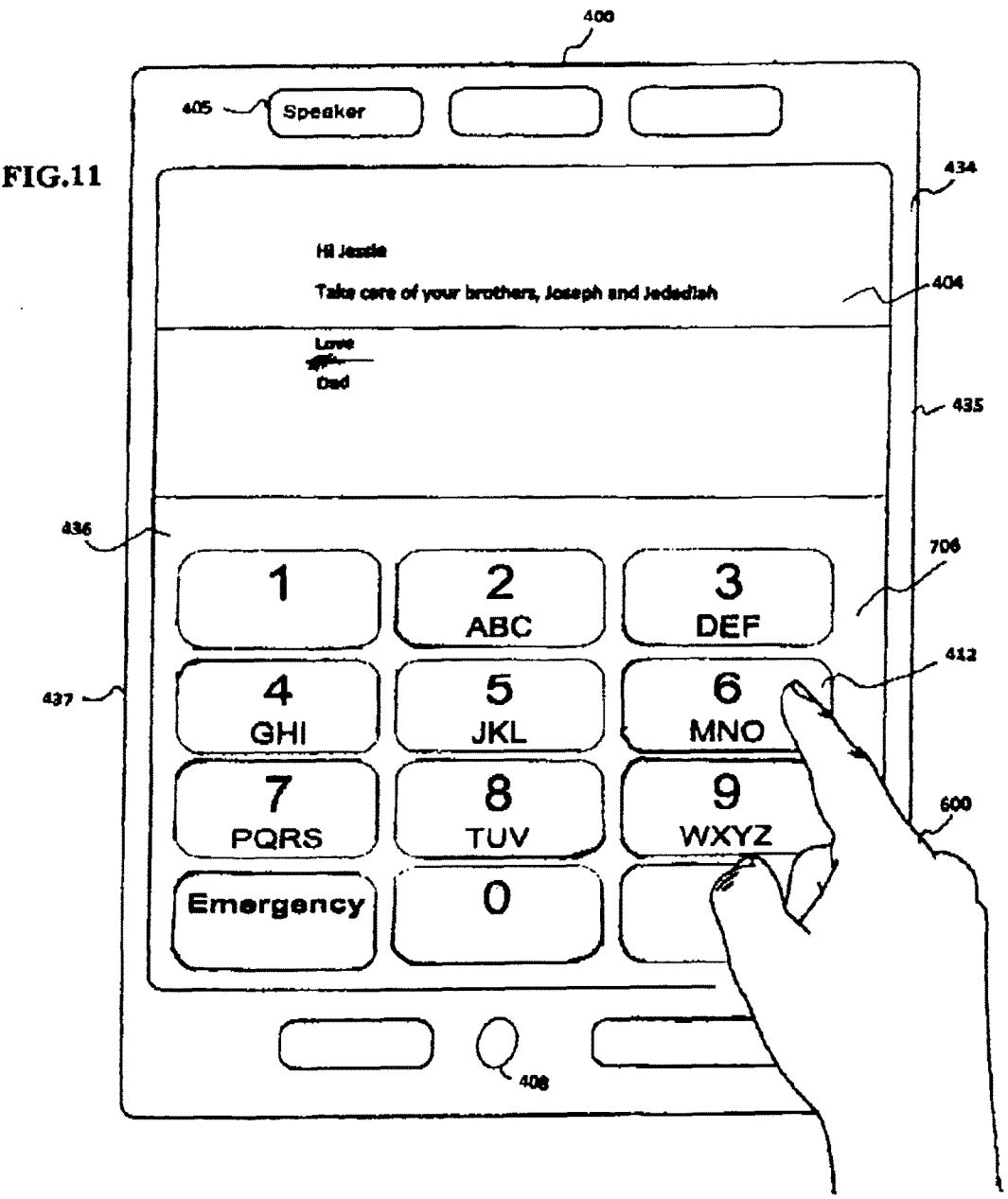

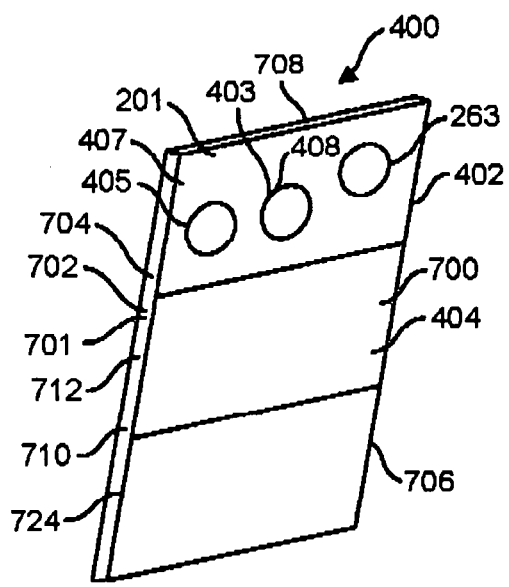
FIG. 12A
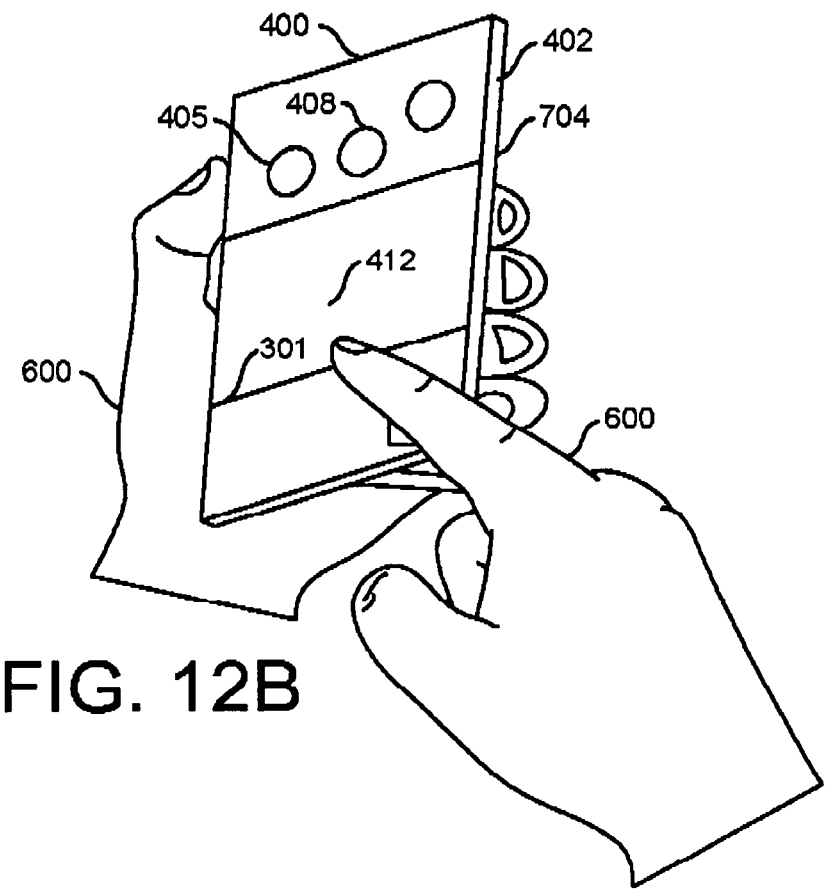
FIG. 12B
FIG. 12C

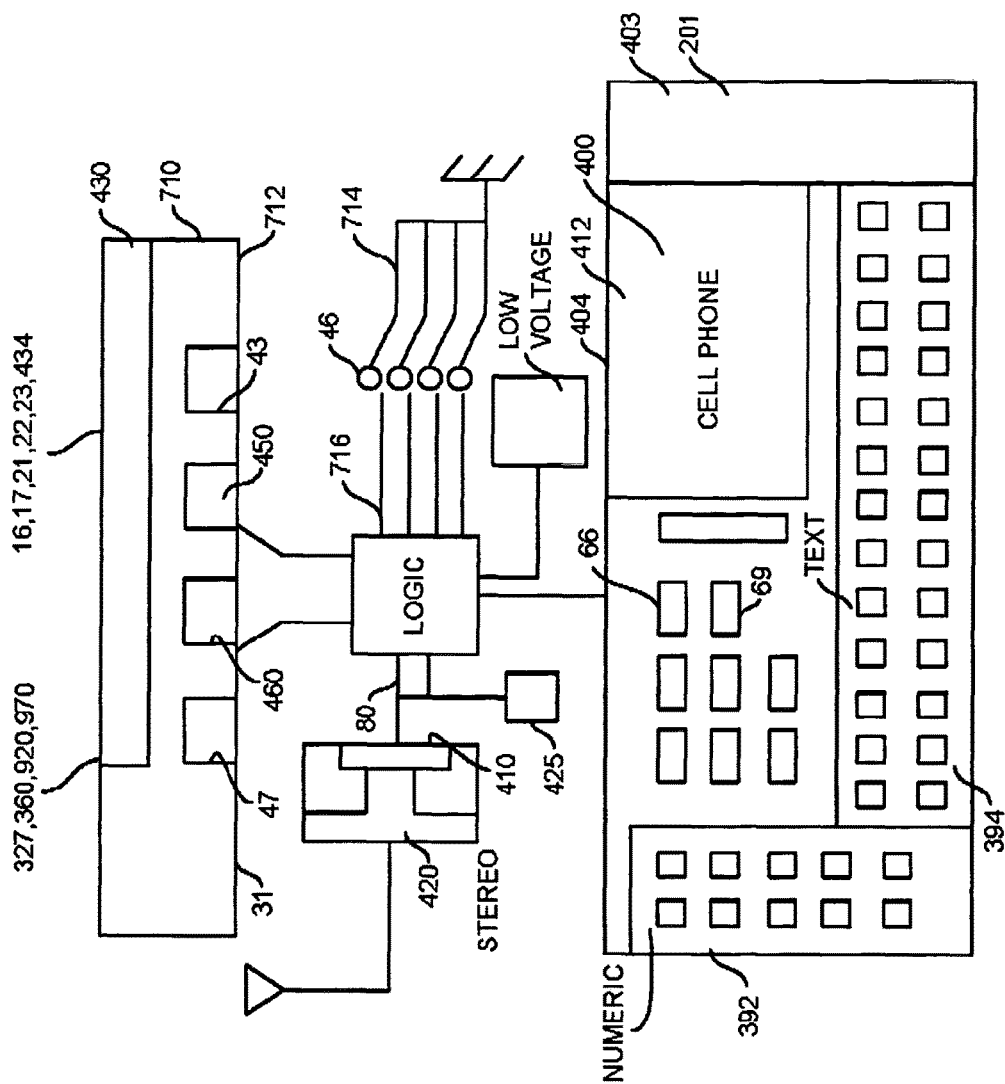

ENERGY HARVESTING COMPUTER DEVICE IN ASSOCIATION WITH A COMMUNICATION DEVICE CONFIGURED WITH APPARATUS FOR BOOSTING SIGNAL RECEPTION

I HEREBY CLAIM PRIORITY BENEFITS FROM APPLICATION Ser. No. 13/004,912, filed Jan. 12, 2011, which claims priority benefit from application Ser. No. 12/910,833, filed Oct. 24, 2011, which claims priority benefit from application Ser. No. 12/852,481, filed Aug. 7, 2010, which claims priority benefit from application Ser. No. 12/795,567, filed Jun. 7, 2010, currently allowed, which claims priority benefit from application Ser. No. 11/475,286, filed on Feb. 28, 2006, now U.S. Pat. No. 7,769,342, which is a continuation in part of Ser. No. 10/814,087, filed on Mar. 31, 2004, now U.S. Pat. No. 7,116,942, which is a continuation in part of Ser. No. 09/559,330, filed Apr. 12, 2000, now U.S. Pat. No. 6,782,240, which claims priority benefit from provisional application Ser. No. 60/131,134, filed Apr. 27, 1999. This application further claims priority benefit from application Ser. No. 11/821,776, filed Jun. 25, 2007, now U.S. Pat. No. 7,872,575, which is a continuation in part of application Ser. No. 10/660,473, filed Sep. 12, 2003, now U.S. Pat. No. 7,271,720, which claim priority benefit from provisional application Ser. No. 60/426,800, filed Nov. 18, 2002. Application Ser. No. 10/995,093, filed Nov. 24, 2004, now U.S. Pat. No. 7,839,273. Application Ser. No. 12/607,086, filed Oct. 28, 2009. Application Ser. No. 11/977,365, filed Oct. 24, 2007. Application Ser. No. 11/254,973, filed Nov. 12, 2005, which claims priority from provisional application serial number. This application is a continuation-In-Part, and claims priority benefit from application Ser. No. 13/004,912, filed Jan. 12, 2011, which claims priority benefit from application Ser. No. 12/910,833, filed Oct. 24, 2011, which claims priority benefit from application Ser. No. 12/852,481, filed Aug. 7, 2010, which claims priority benefit from application Ser. No. 12/795,567, filed Jun. 7, 2010, currently allowed, which claims priority benefit from application Ser. No. 11/475,286, filed on Feb. 28, 2006, now U.S. Pat. No. 7,769,342, which is a continuation in part of Ser. No. 10/814,087, filed on Mar. 31, 2004, now U.S. Pat. No. 7,116,942, which is a continuation in part of Ser. No. 09/559,330, filed Apr. 12, 2000, now U.S. Pat. No. 6,782,240, which claims priority benefit from provisional application Ser. No. 60/131,134, filed Apr. 27, 1999. This application further claims priority benefit from application Ser. No. 11/821,776, filed Jun. 25, 2007, now U.S. Pat. No. 7,872,575, which is a continuation in part of application Ser. No. 10/660,473, filed Sep. 12, 2003, now U.S. Pat. No. 7,271,720, which claim priority benefit from provisional application Ser. No. 60/426,800, filed Nov. 18, 2002. Application Ser. No. 10/995,093, filed Nov. 24, 2004, now U.S. Pat. No. 7,839,273. Application Ser. No. 12/607,086, filed Oct. 28, 2009. Application Ser. No. 11/977,365, filed Oct. 24, 2007. Application Ser. No. 11/254,973, filed Nov. 12, 2005, which claims priority from provisional application serial number. All of these applications are incorporated by reference herein in their entirety.

TECHNICAL FIELD

Disclosed embodiments provide communication apparatus operatively configured to prevent cancerous diseases and to convert sound waves, vibrations, solar energy, and pressure force into electrical energy communicable to a battery cell. Disclosed embodiment encompasses three modes of communications—the Cell phone, wireless Internet applications, and Global communication and information. Disclosed embodiments provide communication apparatus operable to improve quality of life and enhance mobile communication efficiency. Some embodiments provide wired and wireless communication apparatus, broadcasting device, entertainment device, remote control device, medical diagnostics device, emergency communications and alarm apparatus, interactive touch screen device, object controlled communication device, control systems for single and/or multimode communications, tele-informatics device, telemetry device, advanced vehicular computing and media applications for in-vehicle interactive communications, and wireless Internet applications. Embodiments further provide visor screen configured with touch screen comprising sensors being embedded in silicon substrate and fused in micro fiber material having excellent electrical characteristics. Certain embodiments provide communication apparatus for voice enabled applications comprising human voice auditory, signal amplification, better data and graphical transmission. Embodiments provide a media device configured for various telecommunications and Internet applications. Certain embodiment provide sensory platform on a screen apparatus comprising a display device configured with touch screen methods comprising graphical user interface operable for determining commands.

BACKGROUND OF THE INVENTION

Until recently, cell phone usage has become increasingly useful to businesses, individuals and most of all, automobile users. Today, more people use cell phones for business transactions and/or to reach love ones. Yet cell phone usage has been blamed for about 70% of fatal accidents occurring on our roads. Many states have instituted and are enforcing no-cell-phone usage while driving in order to save lives. Disclosed embodiments provide advanced method for entertainment, computing, and communications and would improve emailing applications with human voice auditory response to mails, GPS communications, and traffic communications by more than 90 percent. The increase in cellular telephones has dramatically reach world applications. People around the world are relying exclusively on cell phones, and are abandoning their traditional land line telephone services in favor of the convenience of cell phone mobility. There is a need for cell phone reliance, reliability, and amplified signal strength.

Cell phones emit radiofrequency (RF) energy called radio wave. The amount of RF energy produced by cell phones is too low and causes significant tissue heating and/or increase in body temperature. The amount of RF energy may pose cancer risk to cell phone users in a long run because cell phones emit radiofrequency (RF) energy at low signal strength (radio waves), which is a form of radiation. Constant loss in power may cause battery loss and may cause the production of harmful radiations which may cause brain cancer in future. Disclosed embodiments further provide a booster and/or a repeater comprising a chip being embedded in a circuit in communication with antenna apparatus. The antenna apparatus is affixed in proximity with the battery compartment and communicatively connected internally to the cell phone. Disclosed embodiment is operable for providing high signal strength for speedy data transmission. Disclosed embodiments are operable on at least one of: dual band, tri band or digital. Prior art devices can cause many problems to human body including brain cancer. Additionally, weak signal often result in signal radiations and dropped calls which can be annoying to consumers and expensive for the wireless service providers. Dropped calls are as a result of lost signals between a cell phone and a base station. This may occur for a number of reasons, such as interference due to buildings or mountains, increase in distance between the cell phone and the base station. There is a particular need to increase the reliability of cell phones near large buildings and to eliminate signal radiation causing brain tumor, including neurological effects such as sleep disruption, headaches, and dizziness.

Parent applications incorporated by reference herein in their entirety teaches means to increase the reliability of cell phones through signal boosters. Disclosed embodiments provide communication apparatus configured for signal amplification. Certain embodiments provide a communication apparatus comprising of a cellular network amplifiers being configured to receive the cellular signal sent from a base station, and operable to amplify and retransmit the signal to one or more cell phones. Some embodiments provide the cellular network amplifier being operable to receive the signals from one or more cell phones and being configured to amplify and retransmit the signals to the base station.

Although cellular network amplifiers are typically placed in relatively close proximity to one or more cell phones, these amplifiers are configured to increase the level of the signals being transmitted to and from the cell phones to enable cell phones to communicate with base stations that are out of range. Some of the amplifiers are configured to be integrated with the cell phone and/or cell phone cradle. Other amplifiers are configured to be disposed away from the cell phone location, in a vehicle, and/or in a poor reception area.

Though conventional cell phone signal boosters are externally connected to apply constant gain levels to the signal passing through the amplifier, these external signal boosters typically are expensive devices. Internal signal boosters would produce maximum regulatory allowable power and would eliminate signal radiation and roaming. Disclosed embodiment provide internally disposed signal booster to further advance distance communication signals and also eliminate signal interference due to close proximity to a base station overload, preventing unwanted oscillation. Cell phone signal boosters that are mounted externally can cause interference that would create significant problems for wireless service providers by causing degradation to the overall signal and service quality.

The many problems being solved by the application of disclosed embodiments include:

Reduce exposure to electromagnetic radiation. This radiation is invisible and the danger may not be easily noted.
Reduce effects on the human body, particularly the brain.
Reduce the link between mobile phone signals and brain cancer.
Reduce brain tumor incidence rates caused by cell phone harmful radiations.

It has been anticipated that these dangers have far broader public health ramifications than smoking, and directly concerns all of us, particularly younger generation. Disclosed embodiment reduces public health ramifications to radiation exposure, and this exposure is far broader with prior at devices than smoking.

Disclosed embodiments provide signal amplification method comprising a platform for empowering cell phones and radio antenna apparatus. The platform is operable to enable stronger signals and protects the cell phone from radiation. The platform comprises nanotechnology application configured with sensors embedded in silicon substrate and fused/etched in a micro fiber material for generating electrical energy.

The antenna apparatus comprises CMOS" digital circuitry design, and include microprocessors operable on integrated circuits (chips). Certain embodiments provide antenna method with CMOS circuitry being operable to dissipate less power when static. Embodiments provide antenna apparatus with CMOS processes and variants. Disclosed embodiments provide CMOS circuit that allows the implementation logic gates through p-type and n-type metal oxide semiconductor field effect transistors to create paths to the output from either the voltage source or ground. When a path to output is created from the voltage source, the circuit is pulled up. The other circuit state occurs when a path to output is created from ground and the output pulled down to the ground potential.

Furthermore, slow data speeds are caused by weak cellular signals. These signals can be amplified with advanced technologies. Though there are devices that boost communication signals, these devices are external signal booster devices with limited applications. Mega telecommunication and information system is operable to increase cellular signal strength with an internal antenna apparatus being configured with a chip operable on a logic circuit. The chip is operatively configured to boost communication signals through the cell phone antenna to improve sound quality and reduce dropped calls. The chip is operable on a logic circuit being communicatively connected with the cell phone circuit board and in communication with the antenna. Disclosed embodiments provide software in communication with the logic circuit being configured for analyzing signal strength and data speed. The amplification of the signals would improve cellular data card "IC card and SIM card" reception, providing faster data transfer speeds. The chip is further operable to move the wireless signal away from consumer's head to reduce exposure to cellular radio signals, which may cause health issues. The chip is a solution which depends on cell phone antenna configuration operable on CDMA, TDMB, Digital/Analog/GSM, and location area network. The rationale behind the present embodiments therefore is to provide a comprehensive solution to some of the shortcomings inherent in the existing prior arts. Further disclosure of the preferred embodiments provides a technology that is developed to advance cell phone and Internet usage in vehicles. Certain embodiments of the disclosure further comprise hands free communications while driving.

In some embodiments of the disclosure, first a problem is being identified and analyzed. In other embodiments, the problem is being solved, and/or coded to address each problem variation. These codes could be text, signals, and symbols used to transmit messages around our work places, communities, businesses, and traffic. Certain embodiments of the disclosure include electrical impulses, sound waves, and light signals comprising at least a method of coding transportation and environmental information messages. Embodiments provide a computer, telephone and radio device operatively configured to rely on these impulses to receive and transmit signals. These impulses could be changed into sounds and signals being used to transfer, emit, communicate, and absorb the coded information to and from different distant destinations. The source or sender information is first encoded and translated into the source message. The receiver information is then decoded for the information circuitry to be completed. Certain embodiments of the disclosure provide apparatus for environmental and transportation safeties. Available statistics reveal that cell phones or mobile phones have been the root cause of many fatal accidents in the United States. Yet, most drivers have no other options than turning to their cell phones to get help, when the need arises.

Studies reveal that when we drive and speak over the cell phone at the same time, especially with one hand grabbing the steering wheel and the other hand holding the cell phone hand set held close to the ear; our ability to concentrate and safely maneuver the steering wheel diminishes especially as the conversation becomes much more animated. This predisposes the driver to an accident because at the later stage his control over the car is greatly impaired due to the phone conversation. In all, cell phones have orchestrated many deaths on our highway. It is also true that in emergency cases, cellular phones have been more than helpful. Is there any thing that can be done in order to improve on the cellular phone communications to eliminate signal radiation that is causing brain tumor? Disclosed embodiments further provide communication apparatus being configured with a chip for signal amplification for advanced communications.

Disclosed embodiments provide a communication apparatus comprising a communication platform consisting of sensors being embedded on silicon substrate. Certain embodiments provide the silicon substrate being fused/etched in a micro fiber material being composed of excellent electrical characteristics. Some embodiments of the disclosure provide the communication platform being operable for signal amplification. Other embodiments of the disclosure provide the communication platform being configured for generating electrical energy. Disclosed embodiments provide the communication platform being configured to protect against cancerous brain tumor and other radiant enabled diseases. The communication apparatus further provide configurations to enable drivers to safely use cell phones for communications while maintaining control over the steering wheel.

Disclosed embodiments provide a communication apparatus operable for better communication clarity, data transmission, downloadable data, and to electronically send mails, eliminating the need to pick up the phone to receive or make a calls or to request data content. Certain embodiments of the disclosure provides at least a logic mode, which is turned on/off, all a driver needs to do is push the accept button to establish communication with the sender. In some embodiments, dialing a number comprises pushing and releasing the send button, which establishes communication with a correspondent. In case of emergency, dialing the tag number of closest vehicle would initiate communications for some help. The disclosed embodiments further provide dialing the tag number plus a family code to initiate communications to a loved one on the highway. The application of the later disclosure may result in immediate emergency response. Disclosed embodiments provide at least a communication apparatus being configured to convert text data into voice auditory communications. Certain embodiments provide at least a communication apparatus being configured for converting voice auditory message into text data. Some embodiments provide a communication apparatus being configured to read text messages sent by emails in voice auditory message. Other embodiments further provide a communication apparatus being configured to write text message from voice auditory messages and/or commands.

Further disclosure of the embodiments provides directional software being configured for city streets networks or 411 network services. Certain disclosure of the network services include occurrences where one gets lost in a city uses the 411 button to automatically enable communications with the information network for that city. Disclosed embodiments further provide embedded random-access memory (RAM) operatively configured with (CMOS) and communicatively configured with the media comprising microprocessor intelligence to diligently resolve cellular phone problems. Disclosed embodiments further include a self-test chip device embedded in the media device and being operatively connected to a cellular phone control board to constantly monitor the performance of the media, the cell phone, and the bypass mode; and to further insure routine checking of all other communication devices. The bypass mode further allows the full operations of the cell phone when detached from the media device, including all operational features of the disclosed embodiments. The transmitters are designed to transmit to all destinations with the aid of the select mode button being configured to select different options. At least a mode is responsive to incoming signal and being configured to disable all the active functions of the media system temporarily to allow the receiver to receive incoming cell phone codes and other non-media signals. Until all the signals are transmitted, the media will stay disabled. At the end of the cellular/cell phone signal transmission, the media will return to the preset mode automatically and enable the continuous entertainment mode.

Certain embodiments further provide information technologies to assist communication clarity and control of larger industrial and commercial companies. Embodiments further provide features that can surpass the two-way radios. In addition to the two-way radios, the drivers in any vehicle still have to pick up the microphone to talk. This of course will have some degree of interference with their control of the steering wheel. Drivers still have to hold the microphone with the two-way phone which causes interference with the ability to safely control their vehicle. Two-way radios can only go past a certain zone. Sometimes, where there are high-rise buildings, the two-way radios will not transmit signals. Companies are constantly spending money trying to get their businesses going without knowledge of the safety aspect of the advanced technology. Disclosed embodiments provide improved technologies to facilitate means of communications, and to give customers a better service with very limited time lost, while satisfying the company's goals. Embodiments further provide a microprocessor operable to register the tag number of a vehicle as the acceptance number. When that tag number is dialed from home or from another vehicle equipped with disclosed embodiments, the microprocessor will power the device to pick up the radio or microwave signal and communication is established. In accordance, companies would be able to reach any of their drivers or employees at any time, to pass on further assigned duties that need to be performed without distracting the driver's attention. The megatel communication system is a unique system by which cars, trucks, heavy trucks, and planes can curtail communication barriers.

Disclosed embodiments provide apparatus for recognizing incoming and outgoing communication signals. Embodiments provide code responsive communication apparatus for communications with plurality family cars. Certain embodiments provide apparatus to initiate a family line conversation to ensure the safety of family members. Some embodiments provide methods for advancing communications for the super high way and reduce the estimated cost to the society. Every call made using disclosed embodiments would be locally billed. For example, if one is driving from one state to another and decides to make an out-of-state phone call the call will connect local receivers and transmitters within the sender's state and be billed as local call.

Embodiments provide tag number plus ID-code dialing. For instance, a driver driving down town or on a highway in the middle of the night and realizes that there is another car following his would use the communication apparatus to push a 911 button and transmit the danger signal to the nearest police station. It thus establishes communication between the driver and the police station without interfering with the driver's ability to safely maneuver the steering wheel. The car chasing the driver will be unaware of the driver's communication with the police. The driver will discretely give the police a complete description of the car chasing him without noticeable body language. If the driver knows the tag number of the car chasing him, then a 911 button plus the tag number will give the police a clear description of the person or car chasing him. With this advanced technology in place, the crime rate will drop and the cost to the society for repairing the aftermath will drop. School principals, teachers, and parents will be able to use the school bus numbers, school bus tags, or a combination of both numbers to keep track of their students. They will also be able to use disclosed embodiments to verify if all the children on the bus reached home safely without interference with the driver's control of the bus. Disclosed embodiments provide solutions to reduce communication problems and crimes around cities. Any subscriber will be able to reach any other subscriber from another company and the subscriber's provider will mail all the bills. For instance, when a driver uses disclosed embodiments to dial, for each dialing location, if the number is a local number for that location, and the driver is within that location, disclosed embodiments is operatively configured to select the nearest phone network station. The microprocessors and the fiber optics are operable to enhance communications.

Embodiments provide computerized station detector operable to search the nearest station and transmit all the coding signals to various destinations. The station will dial the number as a local number, provided that the sender and the receiver are within the local zone. If the receiver is out of the local zone were the sender is calling from, the call could become a distance. Disclosed embodiments would search among huge array of existing MVA-DMA stations, picking the dialing tag numbers for any car and dial the car directly. The computerized station detector will prepare all itemized bills through the Internet services with telephone companies and send to the subscribers. The tag card is configured to carry programmed information in communication with the computerized phone station detectors. The tag card, the communication apparatus, and the computerized station detector are made up of various kinds of transmission media sensors configured for interactions between devices. These systems would pick the stations and assign the stations to carry voice and data signals from place to place, and switching the systems that connect the circuits that link together two parties.

Disclosed embodiments further provide interactive signal detection and switching medium with voice enabled applications. Disclosed embodiments provide a communication apparatus being operable to reduce cost and increase safety. The microprocessor is designed and programmed to identify numbers and to speak to other microprocessors. These microprocessors serve as the main information exchange center by absorbing and emitting radiant energies through waves and can demodulate the absorbed energy or modulate the emitted energy. The energy signals are modulated or demodulated from the coded information. The communication apparatus further provides microprocessors being operable to allow other networks and businesses to advertise by programming plurality of microprocessors, said processors being interactive, to emit the advertisement codes.

Disclosed embodiments provide means for converting sounds, vibrations, pressure force, and external data into electrical energy. Certain embodiments further provide means for modulating the radiant energy emitted by radiant energy sources, according to the output codes assigned to each of the microprocessors. Other embodiments provide the codes being demodulated to demodulate the absorbed radiant energy. Some embodiments provide the microprocessor being configured to absorb the radiant energy signals when calls are transmitted and also exchange coded information; enabling the powered antenna motor to serve as a wave-guide power supply that receives and transmits signals. Disclosed embodiments provide an antenna apparatus being operable with signal amplification chip in communication with a logic circuit. Certain embodiments provide microprocessors being programmed for communications with ambulances, fire trucks, police, other emergency vehicles, construction areas and equipment.

Embodiments comprise of fiber optics/silicon micro fiber to transmit and receive wave signals from radio waves and microwaves, and to determine the amount of light traveling down the fiber. Embodiments use fiber optics to measure the amount of light coupling from one fiber to another in optical radiation. The fiber optic receivers are high-performance and linear fiber optic module that are configured to extend the range of radioactive frequency (RF) signals in hard-to-reach areas such as tall buildings, underground railroads, submarines, and tunnels. Some embodiments provide a fiber optic modem chip operable at full or half duplex over fiber optic cables or waves to allow faster communication signal transmissions. Disclosed embodiments provide apparatus to promote safety while simplifying its usage. Certain embodiments provide a hold in slot for the cellular phone. The cellular phone has a coded metal base end that, when inserted into the hold in slot will recharge the phone and also permit cellular communication through the media microphone and the media speakers of at least a vehicle. When the vehicle is packed, the cellular phone is pulled out of the slot and used like a regular cellular or wireless communication device for non-driving purposes. In other words, the MEGA-TEL device is used as a hands-off communication device for drivers like a regular cellular phone if taken out of the slot. The microphone is used to talk party-to-party without actually holding it. This will allow the driver to have total control of the steering wheel with both hands while talking on the phone.

In other embodiments of the disclosure, the microphone could be mounted on the ceiling of a vehicle for a headset, or embedded in the sun visor, the steering wheel, or the dashboard. The headset or speakers are powered by the built-in amplifier and is connected through modular connectors. The main media volume control also controls the phone volume. Disclosed embodiments further provide apparatus for taking messages for later transmission and include Internet ready transmission. Some embodiments of the disclosure further provide at least a screen covered with electronic control protective shield that is opened when the Internet or communication service is enabled. The Internet service is disabled when the vehicle's speed exceeds the preset limit, thereby allowing the Internet service to depend on the speed of the vehicle, to further prevent future accident caused by the driver's lack of focus.

Certain embodiments provide a communication apparatus operable on different frequencies including giga range frequencies for better communication clarity. The signals are separated into more frequencies to make conversation interference very impossible. The headset is attached to the cellular phone to be powered by the amplifier configured to directly receive(s) all incoming calls. The communication apparatus could also be inserted into the slot of the media device to receive all transmissions and codes through the metal base being provided to power all signals through the microphone and the antenna. Disclosed embodiments provide microprocessors designed to continually monitor all communication devices and automatically transmitting and receiving different coding signals to and from different destinations. The megatel is a media-phone with Internet ready access mode, powered by the media amplifier and further include screen viewed from the sun-visor that has a protective cover shield to further prolong the life of the screen. Other embodiments provide communication devices operatively configured with microprocessor chips operable to transmit and receive different signals through radio waves and microwaves frequencies.

Disclosed embodiments further provide communications and entertainment station configured for processing instructions. Certain embodiments provide a communication-processing module comprising a microprocessor configured for signal communications and information handling. Some embodiments provide a microphone, including a cordless headset mounted in the vehicle for privacy usage if there is a third party in the vehicle. The cordless microphone is configured to improve on noise cancellation and to transmit communication signals with better clarity. Handling a cellular phone with one hand and driving at the same time can create hard flexion on the shoulder, headache, and neck pain, which can influence accidents. On the contrary, driving and talking through the headset is very relaxing and will help reduce the many accidents that normally occur. It is the object of the disclosed embodiments to provide communication apparatus that is configured with a chip for amplifying signal communications.

Certain embodiments provide a built in amplifier that amplifies the microphone. The cordless microphone is adjustable to accommodate different drivers. Some embodiments further provide a mode button that has many features including deactivating incoming calls if the driver does not want to be bordered. Disclosed embodiments provide the mode button which could be switched from phone mode to media mode to listen to music through the headset. Certain embodiments further provide an interface unit being operable through a circuit board operatively configured with control functions in communications with the memories to control functions of the microprocessor through the network software. Some disclosed embodiments provide a fiber optic modem chip operable through a manual or an automatic switching circuit or through corresponding pin interface operable to activate the fiber optic modem. Switching may be achieved through transmitting time of the following sources; internal oscillation, external clock from the communication apparatus, loop-back clock derived from the receive signal.

Disclosed embodiments further provide a transmission modem that is synchronous. This means, the transmission time is selected for internal, external, or loop-back clock. Transmission signals are converted internally to synchronize the format in compliance with other standards. All other formats are switch selected. Disclosed embodiments further provide a modem chip, which could be a card operable for transmitting and receiving signals to and from automobiles and other transportation equipment or industries. With this device or with the incorporation of a pressure sensor on the seat surfaces of airplane seats, electronically knowing how many passengers are seated and also communicating to individual passengers in the plane will be much easier. Certain embodiments provide a linear fiber optic transmission links operatively configured for satellite earth stations to communicate signals at the same frequencies as the links. With this linear fiber optics, distance limitations between antennas for the communication apparatus or other broadcasting media operation centers will virtually be eliminated. The linear fiber optic earth satellite station and the delivering signals are communicable without any automatic gain control.

Disclosed embodiments provide apparatus that allow communication between many personal computer systems, space communications, communication between movie producers and actors, without physically holding the phone system to talk. Certain embodiments further provide apparatus operable on a push a button and release to talk while driving or while performing other duties in the work area. Communication between actors and producers will be easily transmitted, received and controlled by a single device with the disclosed embodiments. Just push the receive button to receive incoming calls and talk while driving. All signals are digital and analogs via radio and microwave frequency communication signals through the fiber optic cables.

Certain embodiments provide apparatus operable to communicate to any driver while both cars are in motion. Some disclosed embodiments provide apparatus operatively configured to improve daily live communications and entertainments. The process of exchanging information from vehicles to vehicles, or from homes, offices, businesses to vehicles is called communication and human senses depend on more advanced technologies to make this simpler.

Disclosed embodiments further provide a media device being configured with interactive screen input/output and/or for communications. The key to solving problems includes the technical processes of exchanging information. This information is in the form of communicating, and communication technology is the process of transmitting information from a source to a destination, using codes and storage signals. Machine to machine, machine to human, and human to machine communication are the most common forms of communication being embodied in the disclosure, including hands free communications. The human to machine communication will allow the driver to transmit information to the other vehicle with an extended capability. The machine to human communication system will allow the driver of any of the other vehicle know that some one is trying to reach to the driver or the occupants. Certain embodiments further provide apparatus being operable for communication interface.

Disclosed embodiments further provide an improved automotive communication system that reduces accidental injuries caused by lack of concentration on the steering wheel. Certain embodiments provide a microchip or microprocessor operable to turn receivers on and off when a call is made. Some embodiments of the disclosure provide a communication system that receives and transmits signals from one vehicle to the other. The microprocessor is further operable to increase transmittal speed responsive to 911 codes when a collision is detected. Disclosed embodiments further provide a communication apparatus functionally programmed for communications without interfering with the steering wheel control. Certain embodiments provide automatic switchboards, radio waves and microwave transmitters, satellite, and optic fibers operable for transmitting/receiving phone signals around traffic and the world. Other embodiments provide communication apparatus operable for transmitting Information from a source to a destination through codes and signals. The transfer of information includes designing, coding, transmitting, receiving, and storing of data in a system.

Disclosed embodiments further provide apparatus that implement actions to increase traffic communication and reduce traffic accidents caused by automotive phone system. Some embodiments provide a messaging system that informs, persuades, instructs and entertains drivers and other businesses around the world. The information system is operable with a receiver to inform and provide the transmitted message. The general message that instructs all drivers also provide directions or knowledge about the future or upcoming events and road situations through coded instruction in the highway boards and other road construction areas. The message that persuades will convince drivers to take caution on different situations and events around the cities and the highways.

Disclosed embodiments further provide advertisement messages communicable to alert the public and drivers alike of some sales and other upcoming events without distracting their attention. Certain embodiments provide billboards along major highways being equipped with programmed microprocessors communicatively configured to ensure smooth transmission of vital information including ad messages to on-coming cars approaching the billboard. Disclosed embodiments further provide communication apparatus that communicate with all highway signs and advertisement boards. Certain embodiments provide compatible chip communicatively configured with programmed processors. Other embodiments provide the microprocessors operable to communicate with other processors wirelessly. Disclosed embodiments further entertain by providing some form of amusement to users and drivers while driving. Certain embodiments provide a communication apparatus in wireless communication with car media devices, further responsive to phone and Internet device applications. When there is a message, a phone call, or e-mail, the media system will be bypassed and the phone system will automatically be activated. The media amplifier, through the media speakers, is configured to amplify the receiving and transmitting messages. Certain embodiments provide a microphone located on the steering wheel, sun-visor edges, ceiling, or dashboard operable to absorb and transmit the messages.

Disclosed embodiments provide a sun-visor being operable with electronic screen for receiving electronic and Internet messages. The sun-visor has automatic foldable cover for the screen. Certain embodiments provide the screen operable to output electronic messaging and Internet communications. Some embodiments provide a communication device being configured for radio programs, cellular transmissions, and TV broadcasting to assigned locations. Receiving and transmitting communications is the process of acquiring and decoding messages. Disclosed embodiments provide a receiver being operable to decode or interpret messages from any of the sources.

Certain embodiments provide cellular and/or media receivers operable to convert the radio waves into pleasant sounds that one can hear and understand. Successful communication is often the result of feedback provided to the sender. This feedback is usually returned information to the sender to confirm that the message was received. The feedback is a communication process that responds to the completed communication signal and coded signs. Another point of concern that is affecting current hand-held cell phones is the interference. Interference is the distortion of signals intended to the receiver. This interference is caused by the reception of undesired signals. The interference can be the called noise or distractions that interfere with the communication process. Disclosed embodiments further provide amplified signal communication device. Certain embodiments provide communication apparatus that generates electrical energy Embodiments further provide the media device operable with a rechargeable means.

Disclosed embodiments further provide a chip operable on a circuit being configured with the antenna for signal transmission accuracy and destination free. The key to this advanced communication device is to allow friendly and safe conversation around the high way and inner city by increasing the level of communication signal clarity. The communicated information is being exchanged among people, machines, police, governments, businesses, schools, and industrial groups without interfering with environmental safety. In part, telecommunication is the transmitting of information or signals between distant points where the information would be received, understood, and used. The most common example is the telephone. The use of satellite to transmit radio signals around the globe is an excellent example of telecommunication system being utilized with the disclosed embodiments. Certain embodiments provide a communication apparatus being operable with a telecommunication satellite.

Embodiments provide communication apparatus being configured for communications, information, and electronic mailing. For example, a police chasing a car in the highway would be able to transmit certain verbal information through coding to all vehicles on the chasing lane. The chasing lane and the direction of the chase are instantly communicated to all the vehicles heading the direction in view of forestalling the occurrence of potential accidents. Embodiment is operable with human-to-human, human to machine, machine to human and machine-to-machine communication signals. Disclosed embodiments further provide quick means to exchange information over long and short distances at low cost.

Disclosed embodiments further transmit and receive information in electronic form. Major construction companies will be able to provide the following messages to approaching traffic miles away: "Road construction ahead, Road block, Traffic jam, Major accidents, Advertisement." A constant flow of more messages could be followed. Disclosed embodiments provide a communication apparatus being further operable for communications with large groups of people or individuals, as well as advertisement, traffic instructions, entertainment, persuasion and information. When calls are made, the calls will be sent through series of transistorized switches until the calls are connected with the other telephones at the addressed identified. Certain embodiments provide a communication apparatus that enhances the convenience of communicating quickly and easily, over any distance, without interfering with the driver's ability to safely maneuver the steering wheel. Some embodiments of the disclosure provide an interactive device for communications and safe driving. Other embodiments of the disclosure provide a wireless communication apparatus communicatively configured for networking and Internet communications. The designing process for disclosed embodiments is uncompelled and unlimited. When a message is sent, a feedback is returned to inform the sender about the status of the message. Disclosed embodiments further provide an automotive communication system that entails more options like; informing, instructing, persuading, entertaining, and advertising Disclosed embodiments provide communication apparatus operable for reduction of the pressure effect to improve the transmission and receiving of the transmitted information. The antenna is made up of cell foams and would allow the media device and the cell phone to operate on the same mast mounted antenna. The antenna is operable to receive and transmit coded information. The antenna is communicatively configured with the chip for eliminating acoustic interference signal radiation problems that exist in the wave traffic. The quality features of the antenna include stainless steel ferrule, high-gloss urethane finish over fiberglass, powerful brass internal elements, ferrite choke bead, and UV stable RG-8x marine cable with a factory-installed mini-connector. Embodiments provide antenna apparatus operable to reduce the whistling effects and also to damp the occurring wave due to vibration. Certain embodiments provide antenna apparatus communicatively connected to a chip in communication with a logic circuit. Other embodiments of the disclosure provide an antenna motor which is turned on when the ignition switch of a vehicle is turned on. When the ignition switch is turned on, the circuit for the antenna motor will be closed and the antenna motor will rotate on one direction, enabling the antenna to be raised up.

Disclosed embodiments provide antenna apparatus with a stronger link operable with wireless communication devices and/or with vehicle media device to oversee any weak signal and to improve communication clarity. The antenna could be embedded or be vertically mounted at ranges from 4" to 24" with ultimate signal pulling power. All internal elements are sealed with fiberglass rod coated with high-gloss urethane finish. The high-gloss urethane coating is to ensure lasting performance and more compatibility with the other high quality antenna products that could be used. Certain embodiments of the disclosure provide an antenna apparatus operatively connected to a chip operable at other frequencies. Disclosed embodiments provide improvement to acoustic reduction, better communication performance, and is operatively configured for transmitting, receiving, switching and transmitting, receiving and switching, receiving by combining ground to air to transmit and receive signals, and is not cancerous.

SUMMARY OF THE INVENTION

Embodiments provide a communication apparatus operatively configured to prevent cancerous diseases and to convert sound waves, vibrations, solar energy, and pressure force into electrical energy communicable to tend battery cell. Disclosed embodiments provide improved communication apparatus comprising media device, computer device, cell phone device, and hands-free cell phone and Internet usage while driving. Further disclosures provide embedded chip in communication with antenna apparatus for signal amplification. Disclosed embodiments provide a communication apparatus that is operatively configured to extend battery life. Disclosed embodiment encompasses three modes of communications—the Cell phone, wireless Internet System, and Global communication and information. Disclosed embodiments provide communication apparatus operable to improve quality of life and enhance mobile communication efficiency. Some embodiments provide advanced vehicular computing and media applications for in-vehicle interactive communications and wireless Internet applications. The amplification of signals would improve cellular data card "IC card and SIM card" reception, providing faster data transfer speeds. The chip is further operable to prevent wireless signal radiation, reducing exposure to cellular radio signals, which may cause health issues. The chip is a solution which depends on cell phone antenna configuration operable on CDMA, TDMB, Digital/Analog/GSM, and location area network. Disclosed embodiments further provide a method of the waves being used to guide the direction of information or codes. Disclosed embodiments provide chip being operable with an antenna apparatus in communication with the signals traveling through waves.

Disclosed embodiments provide communication apparatus that transmits and receives signals through radio waves and microwaves. Some of the advantages of the microwaves are that signals can be projected into a very small area through amplification. Which means the energy is being used efficiently. Disclosed embodiments further provide embedded antennas in circuit communication with a chip being configured to boost signals. Some of the disadvantages of the microwave signal are the effect of poor weather on microwaves. That is, since the wavelengths are so small, rain, snow, hail, or even a high wind may absorb the energy in the signals. However, the amplified spring-like behavior on the powered antenna compensates for the wind and other foreign factors. The communication apparatus further comprises a cellular phone, and uses radio waves to transmit information. Certain embodiments provide a device that uses both one way and two-way radio messaging methods to transmit information. Certain embodiments provide feedback method responsive to messages.

Some embodiments provide electronic pulse (number dialing) switching method for communication, including the network and the Internet communications. Certain embodiments provide a preferred electronic switching system (ESS), including computer programs being used for routine wireless operations and switching operable through transistorized switches and microprocessors. All the switching programs are stored in the microprocessor and the processor is operatively configured to differentiate a telephone signal from a media or radio signal and bypass the radio, so that the receiver could receive and transmit messages for wireless communications.

The quickest switching route is mapped out through the use of transistorized switches and microprocessors to complete calls. Disclosed embodiments further provide a method of using the transistorized switches and the microprocessors to collect coded electronic pulses. The computer is operatively configured to-review all the numbers and maps out the switching route to complete the calls. The switching system is further operable to make communications more efficient than electromechanical switching system. Embodiments provide a switching system that is quicker, less costly, smaller, and more reliable and uses less power.

Disclosed embodiments provide the computer device being operable with a software program to identify codes, complete all calls, and control the overall function of the communication apparatus. Disclosed embodiments are operable via a network, which is a system of interconnected subsystems. Certain disclosed embodiments provide a communication apparatus which permit networking and wireless Internet connections being operable through transmission links, terminals switching operations that work together for the Internet services. Disclosed embodiments further provide apparatus that necessitates calls completion and also sends worldwide information via vehicular media transmission through the Internet. The transmission links transmit calls and the network switching system is configured to complete the circuits. Disclosed embodiments provide a communication apparatus with embedded signal amplification chip in communication with an antenna apparatus. Other embodiments of the communication apparatus comprise a modem device being configured to enable Internet services and other searches.

The modem device is operable to communicate with other devices over the microwave to radio wave links through wireless communications, providing better wireless Internet services and satellite communications. Microwaves are able to cut through the earth's atmosphere easily. The microwave beams must be carefully aimed towards the proper ground station or satellite. The signals are sent and received using special antennas. However, the ground antenna and the satellite must be able to stay in constant communication contact in order to transmit these signals.

Vast amount of information can be transmitted through microwaves links. This is because microwaves are extremely short. Therefore, microwaves can be concentrated (focused) into a very small, narrow beam. These beams will allow powerful, efficient transmissions around the globe. Disclosed embodiments provide binary operations, which are series of 0s and 1s that represent phone numbers, tag numbers, letters, sound, or visual images. The codes, which are the vehicle for transmitting messages, are the language that the computers will use to communicate with one another. The American Standard Code (ASC11) may be used for information exchange. This code includes all the letters of the English alphabet, the number 0 through 9, and punctuation. Disclosed embodiments provide communication apparatus that provide easy communication method. The transmission methods could be parallel transmissions for short distances or serial transmissions for long distances. Disclosed embodiments provide hands-free communications while driving. Other embodiments provide wireless Internet communications. Disclosed embodiments provide IC card being used to store data specific to the communication apparatus. The advantage of disclosed embodiment would become apparent to the understanding of wireless communications, signal radiation, energy production, and safe driving.

Batteries are the biggest hurdles to expedite the development of consumer electronics to enable future environmental cleansing. Some manufacturers have tried using lithium-ion batteries with little success, but still current hybrid consumer electronics are experiencing some draw backs. Although lithium-ion batteries have succeeded nickel-metal batteries, lithium-ion batteries exhibit twice the energy density of nickel-metal batteries. Because of the different chemistry nature of lithium-ion batteries, the lithium ions have the tendency of moving around, though the electrode may be one or a combination of different materials. Additionally, the energy storage, operational power, and product safety are also very different. Cobalt dioxide batteries have experienced some runaway oxidation also, which put consumers on a stand still.

Current life expectancy for lithium-ion batteries are less then ten years, and the batteries densities have been the contributing factors. As the density of the battery declines, so would the cost per KWh also declined. However, the majority of the world's lithium is in China and Argentina, which again put U.S to depend on better foreign trade policies to satisfy their consumers. Although the biggest challenges facing batteries are the charge time, battery life, number of recharges to be done, and the discharge speed, the challenge at hand is to nano structure capacitors to improve consumer electronics and hybrid consumer electronics performance. Other consumer electronics applications may be required to take advantage of the market size for power storage and portable power devices, which is about $60 billion market. With the present economic stands, U.S would benefit from the many advantages of emerging ultra capacitor.

BRIEF DESCRIPTION OF THE DRAWINGS

FIG. 1 is a perspective view of a portable communication apparatus with GSM and CPU in accordance with disclosed embodiment;

FIG. 2 is a perspective view of a portable device in a first configuration of a mobile phone with a WAP browser in accordance with one embodiment of the present invention;

FIG. 3 is an exemplary embodiment of a mobile phone with integrated GPS and MP3 music capability;

FIG. 4 is an exemplary embodiment of a slide-able mobile phone with predictive text massaging platform and QWERTY keyboard;

FIG. 5 is an exemplary embodiment of a slide-able mobile phone with Bluetooth technology, infrared sensors, calendar, and FM radio;

FIG. 6 is an exemplary embodiment of a clamshell mobile phone with GPRS Internet services, comprises QWERTY keyboard and virtual keyboard on a touch screen configured with social network platform;

FIG. 7 is an exemplary embodiment of a mobile phone with LCD display screen, video recognition, phonebook, and dictionary;

FIG. 9 is an exemplary embodiment of a mobile phone configured with Internet connectivity operable for global roaming;

FIG. 10 is an exemplary embodiment of a mobile phone comprising a pocket PC, a PDA phone with dual processor;

FIG. 11 is an exemplary embodiment of a mobile phone with a touch screen panel operable for communications; interactive gaming; music applications; a slider operable for accessing multimedia buttons;

FIG. 12 is an exemplary embodiment of a mobile phone with numeric keypads operable to provide voice over texting applications; a slide out keyboard; and a resistive touch screen character recognition;

FIG. 33 is an exemplary embodiment of a circuit diagram of the logic interface configured for operation with the megatel, the cell phone and different components of the device;

Figre 64 is seen further exemplary embodiment of a cell platform.

Figure 65:
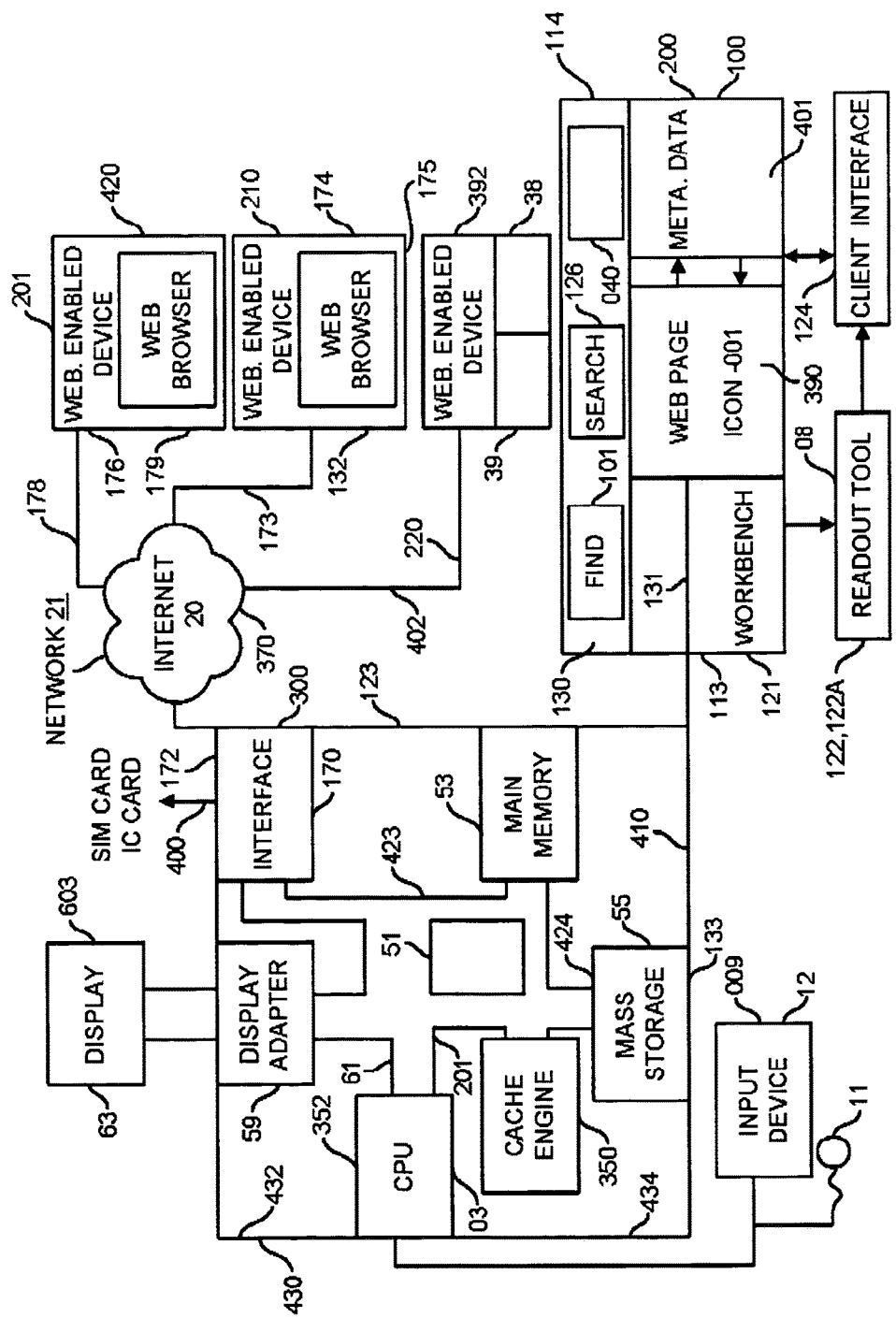

FIG. 65 is seen further exemplary embodiment of the energy harvesting network "ENETWORK" environment.

Figure 66:
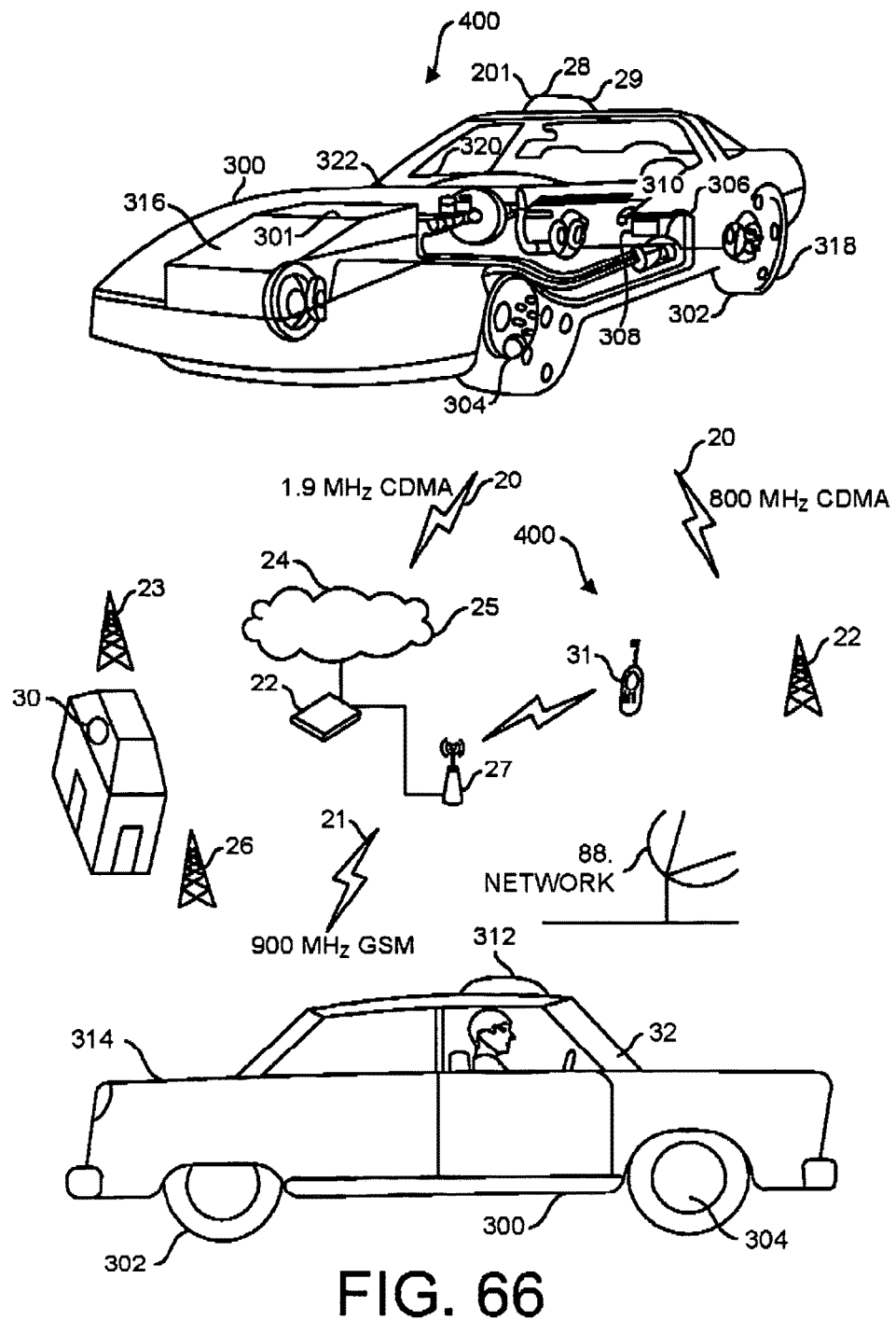

FIG. 66 is seen further exemplary embodiment of the ENETWORK environment.

DETAILED DESCRIPTION OF THE PREFERRED EMBODIMENT

The terminology used herein is for the purpose of describing particular embodiments only and is not intended to be limiting of embodiments. As used herein, the singular forms "a", "an", "at least", "each", "one of", and "the" are intended to include the plural forms as well, unless the context clearly indicates otherwise.

It would be further understood that the terms "include", "includes" and/or "including", where used in this specification, specify the presence of stated features, integers, steps, operations, elements, and/or components, but do not preclude the presence or addition of one or more other features, integers, steps, operations, elements, components, and/or groups thereof. In describing example embodiments as illustrated in the drawings, specific terminology is employed for the sake of clarity. However, the disclosure of this patent specification is not intended to be limited to the specific terminology so selected and it is to be understood that each specific element includes all technical equivalents that operate and/or function in a similar manner. It would be further noted that some embodiments of the enclosed communication apparatus is used concomitantly and/or not used concomitantly with megatel. In some embodiments, the communication apparatus comprises a platform array responsive to media communications. In some embodiments, the communication apparatus further comprises of a platform array responsive to signal radiation. Other embodiments herein describe apparatus configured for entertainment.

The foregoing and/or other objects and advantages would appear from the description to follow. Reference is made to the accompanying drawing, which forms a part hereof, and in which is shown by way of illustration specific embodiments in which the embodiments may be practiced. These embodiments being described in sufficient detail to enable those skilled in the art to practice the teachings, and it is to be understood that other embodiments may be utilized and that further structural changes may be made without departing from the scope of the teachings. The detailed description is not to be taken in a limiting capacity, and the scope of the present embodiments is best defined by the appended claims. Referencing the drawings, wherein reference numerals designate identical or corresponding parts throughout the several views, exemplary embodiments of the present patent application are hereafter described. The numbers refer to elements of some embodiments of the disclosure throughout. As used herein, the terms "and/or" and "at least one of" include any and all combinations of one or more of the associated listed items.

Referring to FIG. 1 is seen exemplary embodiment of a communication apparatus 400 with GSM, touch screen, and CPU in accordance with one embodiment of the invention. The communication apparatus 400 comprises a housing 402 comprising of a sensory platform 700 consisting of nano-technology application. The sensory platform further includes strain gauges 701 embedded in load cells 702.

Disclosed embodiment further provide nano technology applications comprising nano sensors 704 being embedded in silicon substrate 712 alloyed with meta-material structure cavity and fused/etched in microfiber material 710, providing a silicon microfiber 724. The sensory platform 700 being operable to provide a detection platform 706 being further operable for communications and/or for converting at least a form of energy into electrical energy. The detection platform 706 further comprises at least multiple CMOS antenna circuit consisting of on chip antenna operable for intra-chip network, further comprising at least a transformer module operable with at least a battery module. The transformer module further comprises electronic interface circuit operable to match the power need for the communication apparatus. The communication apparatus 400 further comprises a hand-held device operable for providing communication services. Certain embodiments provide the communication services comprising voice communications.

Some embodiments provide communication services comprising cellular phone functionalities, including symbol processing. At least the functionality may include an antenna apparatus being configured with a chip in communication with a radio module. The communication apparatus 400 is further disposed with hardware enclosing at least a control logic in communication with a software operable for providing the communication services and for performing symbol processing. The software comprises an operating system. In the embodiments further include radio functionalities operable for providing communication services. Certain embodiments provide the communication apparatus 400 comprising a computer device operable for providing the communication services. At least one communication service comprises Internet services. At least one switch device comprises application button being operable for controlling functions of the communication apparatus 400 and directions of the symbols. At least one symbol is associated with the display/input device 424, and further comprises a scroll-up and/or scroll-down button.

Disclosed embodiments further provide the sensory platform 700 further comprising a display/input device 404 being disposed with the housing 402. Certain embodiments provide the housing 402 further consisting of speakers 405, microphones 408 embedded antenna apparatus 201 in communication with at least a signal booster comprising a chip 403, in communication with a logic 407. The communication apparatus 400 further comprises mobile broadband device configured with the detection platform 706 comprising sensors 708 being operable for detecting objects proximity to at least the display/input 404. The communication apparatus 400 may comprise at least one of: cellular telephone, telephonic, media device, PDA device, cellular telephone, GPS device, entertainment device and/or an information device being operable for road and traffic communications, including road side advertisement. The media device further consists of input and output devices. Disclosed embodiments provide the communication apparatus 400 configured in the housing comprising of a cellular telephone, a game device, and a media player and a PDA. The communication apparatus 400 is portable and may fit within the hand of normal adult and grown children. In one embodiment, the display/input device 404 may include at least one of multi-point interactive touch input screen, an LCD display. In one embodiment, the multi-point interactive touch screen is a capacitive sensing medium configured to detect multiple touches, including blobs on the display from a user's face or multiple fingers touching or nearly touching the display.

The load cell 702 further comprises silicon load cell comprising of force sensor in communication with software 204. Disclosed embodiments provide force measurement apparatus being operable to perform measurement and to generate energy by compressing a meander-like strain gage 701. Certain embodiments provide a second strain gage, which is not loaded, operatively configured for temperature compensation and for compensation of bending and stretching stresses in the chip comprising energy platform 705, eliminating a zero-load resistor values on the communication apparatus 400. Some embodiments provide the communication apparatus 400 being configured with a bridge 703, whereby the output of the bridge 703 is at least a linear function of the total force and independent of the force distribution on the silicon chip comprising the energy platform 705. Disclosed embodiments further provide a communication apparatus 400 comprising load cell to MEMS system integration being operable with integrated systems' interface. The physical scales as well as the magnitude of signals of various integrated subsystems vary widely. The communication apparatus 400 provide a MEMS load cell system integration being further configured for high capacity load sensing, including a micro-machined sensing gauge, interface electronics and energy module for communication signal characterization. Disclosed embodiments further provide a communication apparatus 400 comprising silicon substrate-microfiber hybrid technologies. The subsystem further provides piezoelectric sensor comprising of piezo-resistive sensing being operable on CMOS processes. Embodiments provide the silicon substrate-microfiber further comprising a metal semiconductor being configured with the CMOS processes to provide nano-scale webcam and antenna apparatus 201 that could effectively couple light into a semiconductor light emitter. The configuration of the subsystem includes a sensing layer being configured to reduce the offset, temperature drift, and residual stress effects of the piezo-resistive sensor. Disclosed embodiments further provide CMOS multiple antennas configured with MEMS sensors. Certain embodiments provide a MEMS antenna configured for energy harvesting. Other embodiments provide the MEMS sensors disposed on at least energy recovery circuit comprising radio frequency CMOS circuitry configured for plurality frequencies.

The load cell 702 comprises of built-in electronics for signal conditioning, processing, and communication. Certain embodiments provide the CMOS comprising of multiple antennas configuration with at least a metal oxide semiconductor; providing multiple on chip antennas in communication with motherboard for communication apparatus 400. The multiple on chip antennas provide intra-chip antenna network for efficient wireless communications. The CMOS multiple antennas further comprises CMOS-MEMS-RESONATOR. Some embodiments provide the CMOS multiple antennas further comprises silicon wafer glass filtration membrane coupled to CMOS-MEMS on a circuit. The circuit further comprises an oscillator circuit for sensing resonance frequency shift and humidity. The CMOS multiple antennas comprises silicon wafer configured with reflective meta-material structured surface, providing a thin surface layer to improve circuit performance for faster data transport transceiver. Wireless data transmissions are applied on the multiple layers and between the chips, in communication with the communication circuit board. The silicon substrate microfiber material is alloyed with meta-material to provide excellent electrical characteristics and compensate for CMOS conductor loss. Disclosed embodiments provide CMOS multiple antennas comprising on chip dielectric substrate.

Referring to FIG. 2 is seen exemplary embodiment of a communication apparatus 400 in a first configuration of a mobile phone with a WAP browser in accordance with one embodiment of the present invention. The communication apparatus 400 further comprises a detection platform 706 being further operable for providing multiple communications environment and mobile broadband services. Disclosed embodiments further provide a communication apparatus 400 comprising single and/or multiple communication environments 400A. Certain embodiments provide at least a communication environment 400A including at least one of: position finder, Radio Frequency Identification Devices (RFID), emergency communication device, medical diagnostics, General Packet Radio Service (GPRS), transportation information highway (TIHW), at least a Modulation Format Selectable cellular device (MFSCD), mobile wireless apparatus, satellite device, land based device, Global Mobile communication device, mobile broadband device, Enhanced Digital GSM (EDGSM), SD card slot, HDMI/USB ports, and/or Code Division Multiple Access (CDMA).

Disclosed embodiments provide a communication apparatus 400 being further configured for multiple communications. The communication apparatus 400 further comprises at least one of: broadcast device, tracking device, location finder, position finder, processor in communication with at least one of: transmitter, receiver, transceiver, entertainment device, remote control device, educational device, gaming device, medical device, signal detection device, video and/or visual image signal detector, infrared device, Global Positioning System (GPS) receiver and/or an interface to a GPS receiver, temperature detection device, electrical signal detection device, mobile broadband device, webcam device, video camera device, and Radio Frequency Identification Device (RFID).

Some embodiments provide a communication environment 400A further comprises at least one of: Wideband Code Division Multiple Access (WCDMA), Time Division Multiple Access (TDMA), Infrared (IR), Wireless Fidelity (Wi-Fi), Orthogonal Frequency Division Multiplex (OFDM), and/or Bluetooth application. Disclosed embodiments provide a communication apparatus 400 further comprising a communication environment including at least one of: an interface device 402, a processor 420, a transmitter 311, a receiver 312, and/or a transceiver 313. Disclosed embodiments further provide the interface device 402 comprising content composed of user interface component objects operable for receiving contents. Certain embodiments provide the interface device 402 comprising user interface component objects operable for extracting exportable information. At least one of the exportable information is being exportable outside the content. Disclosed embodiments further provide the interface device configured for detecting at least one of action and providing a signal for transferring the exportable information to at least a target object.

Referring to FIG. 3 is an illustration of an exemplary embodiment of the communication apparatus 400 comprising a mobile phone with integrated GPS and MP3 music capability configured with sensors 704, 708 embedded in silicon substrate microfiber 724 for providing detection platform 706 with sensitivity and selectivity in accordance with the present invention. Embodiments provide nanotechnology application on a detection platform 706 comprising image and/or sound sensor device 170 operatively configured with RFID chip 200. The detection platform further comprises nano sensors being embedded in a silicon substrate 712 being alloyed with meta-material structure surface cavity and etched/fused in a microfiber material 710 to improve wireless communication efficiency and remove radiation pattern back lobe. Disclosed embodiments provide a communication apparatus configured with nano sensors, including image and/or sound sensor 170, load cell 702, RFID chip 200, strain gauge 701, and temperature sensor 200A. Some embodiments provide the detection platform 706 comprising nano sensors, including at least one of: load cells 702, strain gauge 701, membrane 195, resilient membrane 206, optical sensors 50, MEMS 192, detection means 190, and/or transducer 185. The detection platform 706 further comprises ferrous and/or non ferrous material 221, 222 being alloyed with the silicon substrate 712 and etched/fused in microfiber material 710. The communication apparatus 400 further comprises a housing 402, a display/input device 404, a speaker 405 device, a logic circuit 407, and a microphone 408. The substrate may further comprise optical elements suitable for electronic wafer module. The wafer module may comprise light shield film and/or UV curing resin configured with transparent support substrate.

The optical sensor 50 is further configured for optical video modulation. Disclosed embodiments provide the display device 404 comprising a display screen operable for displaying information. Certain embodiments provide the display device 404 comprising an input/output unit operable for receiving input of information and for sending output information. Other embodiments provide the display device 404 configured with a storage medium operable for storing data therein a plurality of executable and/or relation information, including object information operable for indicating an object is correlated with relationship information having a relationship with other objects. Yet, certain embodiments provide the display device operable for selecting object information and for apparatus for providing relationship information with an object. Disclosed embodiments provide the object further comprises a user of an electronic device. Certain embodiments provide the object further comprising switches and buttons embedded in a touch screen device. At least said one touch screen device comprises a control unit for causing the display device to display the selected information stored in the storage medium. Some embodiments provide the selected information being displayed in a display position of the touch screen. The display position further comprises a predetermined distance being displayed within the embodiment of a display device. At least one predetermined distance further comprises information normally displayed by a global positioning system (GPS) from selected information within a directory of a predetermined direction.

The transparent support substrate may comprise at least a glass plate. The wafer module further comprises energy management apparatus. Photon in sunlight passed through the silicon microfiber semiconducting materials, or reflects through the silicon microfiber semiconducting material, or absorbed by silicon microfiber semiconducting materials. Electron (negatively charged) is knocked loose from their atoms, allowing them to flow through the silicon microfiber material to produce electricity on a solar cell "Energy Platform" operable to extend battery life. Due to the special composition of solar cells, the electrons are only allowed to move in a single direction. The solar cells are configured to convert solar energy into a usable amount of electrical energy. The solar cells are further configured with light absorbing material within the cell structure to absorb photons and generate electrons via the photovoltaic effect. Tin film is further provided to reduce the amount of light absorbing material required for the solar cell. The absorbing material may include cadmium telluride. Embodiments further provide high-rate deposition of materials including at least one of: thin film, polymer, carbon, silicon, metals, metal oxides, and the like, onto at least a substrate. Disclosed embodiments provide communication apparatus 400 is further configured with silicon substrate microfiber 712. The silicon substrate microfiber 724 further comprises fiber mesh and/or synthetic fiber mesh to inhabit shrinkage cracking and to reduce settlement cracking. Some embodiments provide a communication apparatus 400 being configured with silicon substrate microfiber 724 to improve cohesion and reduce explosive spalling in high temperature or impact. Certain embodiments provide the communication apparatus 400 includes camera/video device being configured with the silicon substrate microfiber 724 to reduce water migration and permeability while providing a residual strength. Disclosed embodiments further provide a communication apparatus 400 being configured with silicon substrate microfiber 724 to generate electrical energy, improve communication clarity, resist shattering, resist fatigue, and boost communication signal.

Certain embodiments provide particles of the material being mixed with fluid and injected against at least a metal at high pressure and high velocity. Some embodiments provide the particles of the material forming a current collection surface of the metal. The metal further comprises cathode and/or anode combined with a separator to form at least an energy platform further comprising at least one of: fuel cell, metal-ceramic membranes, film composite metal-ceramic materials being configured with the communication apparatus. The silicon substrate may include carbon nanotube; single crystalline silicon; and polycrystalline silicon. The silicon substrate may further be disposed with an intrinsic layer comprising at least one of: silicon dioxide; silicon nitride; silicon-on-insulator substrate; silicon-substrate-fiber mesh; carbon fiber mesh substrate; diamond-like carbon fiber mesh; and silicon oxide, and may be formed on a substrate and or a continuous substrate. The silicon substrate is further configured with CMOS processes circuitry. The CMOS circuitry further comprises camera and webcam devices. Certain embodiments provide the communication apparatus 400 further comprising a display/input/output device being configured with laminated of a transparent substrate comprising synthetic fiber mesh being plated with metal alloy, providing an adequate shielding against electromagnetic waves from at least a plasma display. The diamond-like carbon mesh is attached to a silicon substrate configured for converting heat energy into electrical energy. The metal alloy comprises material with excellent electromagnetic shielding and having the ability to absorb near infrared rays. The silicon-substrate-fiber mesh further provides an apparatus for transferring data efficiently on and off of an integrated circuit in communication with a network node. Disclosed embodiments further provide a communication apparatus 400 configured with optical switch device. The communication apparatus 400 further comprises energy absorption device.

Referring to FIG. 4 is an illustration of an exemplary embodiment of the communication apparatus 400 comprising a slide-able mobile phone with predictive text massaging platform and QWERTY keyboard. The communication apparatus further comprising sensors embedded in silicon substrate microfiber to provide a sensory environment for the detection platform 706 in accordance with the present invention. The detection platform further comprises electronic wafer module being configured with sensors. The wafer module further comprises solar panel being configured for converting light photons to a photon generated electrical current. At least a heating module and a cooling module are provided with the wafer module. FIG. 4 further depicts the detection platform 706 further comprises a wearable outfit 707 being configured for housing the communication apparatus 400. The wearable outfit 707 further comprises a cell phone case configured for generating electrical energy. The communication apparatus is operable for communications and for generating electrical energy. Disclosed embodiments provide a communication apparatus being transformed into force responsive device operable for communications and for detecting logistics influential to communication signals, data transmissions, communications environment including touch screen display.

Disclosed embodiments further provide a communication apparatus being outfitted with the housing 707 configured for converting at least one of: solar energy, vibration, pressure force, and/or wind force into electrical energy. The communication apparatus further comprising sensors on silicon substrate 712. Certain embodiments provide the silicon substrate 712 being sensitized with microfiber material 710 configured with complementary metal oxide semiconductor; providing a selective and sensitive detection platform 706. The detection platform 706 further comprises antenna apparatus 201 in communication with at least a chip 202 comprising signal booster. The chip 202 further comprises logic configured with software 204 comprising an operating system in communication with the communication apparatus 400. The communication apparatus is further configured with sensors, including at least one of: cantilever sensors 210, load cells 702, multifunctional sensors 215, optical sensors 50, temperature sensors 200A, investigative agent 176, RFID chip 200, and/or electro optical sensors 60. Disclosed embodiments further provide the communication apparatus 400 being re-enforced with at least one of: ferrous material 221, and/or non ferrous material 222. Disclosed embodiments provide the chip 202 further comprises multiple antenna apparatus operable for intra-chip communication network. Embodiments provide on-chip antennas 202 operable for wireless communication interconnections. The on-chip antenna 202 comprises multiple CMOS antennas comprising on-chip signal communication network for wireless communications; comprising Multicast Protocol Label Switching Network "MPLSN." The MPLSN is operable on a contemporary layer of the communication circuit board; comprising a CMOS antenna network platform.

Referring to FIG. 5 is seen further embodiment of the communication apparatus 400 comprising mobile phone with Bluetooth technology, infrared sensors, calendar, FM radio and a sensory platform 704. The sensory platform further comprises cell environment 708 being operable for communications, for display/input, and for generating electrical energy. The sensory platform 704 comprises at least a silicon substrate 712. The silicon substrate 712 comprises of nanotechnology applications consisting of at least one of: nano sensors 200, multifunctional sensors 215, micro beam devices 280, sensory array 330, MEMS 420, thin film 430, including piezoelectric thin film AIN, being fused/etched in microfiber material 710 to provide detection platform 706 with efficient detection selectivity and efficient detection sensitivity. Disclosed embodiments further provide the nanotechnology application comprising of nano sensors. At least one nano sensor comprises an accelerometer. Certain embodiments provide the sensory environment 704 being configured with sensors, including surface acoustic wave line 570 being coated with paste and/or ink 585 comprising of passive glass film. MEMS 420 and multifunctional sensor 215 are configured with thin film 430, in communication with at least a microelectronic circuit 410 to further convert solar energy into electrical energy. The surface acoustic wave line 570, the paste 585, the MEMS 420, the thin film 430, and the multifunctional sensor array 330 are embedded in the silicon substrate 712 and etched/fused in a microfibered material 710 to provide a detection platform 706 further operable for generating electrical energy. The silicon substrate is micro-machined in a chemical and/or electromechanical etch technique.

Referring to FIG. 6 is seen further embodiments of the communication apparatus 400 comprising a clamshell mobile phone with GPRS Internet services, QWERTY keyboard and virtual keyboard on a touch screen configured with social network platform, and a sensory environment 704 consisting of energy platform 705 operable to extend battery life. Other embodiment of the sensory environment provide a silicon to silicon bonding 460 and/or silicon to ceramic wafer bonding 470 being configured for detection and for generating electrical energy. The silicon to ceramic wafer bonding is further responsive to solar energy for generating electrical energy. The silicon to ceramic wafer bonding may include at least silicon to glass bonding 480, forming single crystal silicon to improve the micro-acoustics and micro optics in the nanotechnology applications. Multifunctional sensor 215 are employed, further comprises surface acoustic wave resonators 500 responsive to frequency shift. The frequency shift may be influenced by mechanical, chemical, and electrical perturbation within the boundary of active interface with the sensory environment 704. The electrical perturbations may occur in at least metal films 543. The metal film 543 may have different conductive values deposited on the resonators 500 responsive to loading effects on the display/input device 404. Disclosed embodiments provide the communication apparatus comprising a changeable amplified output/input signal configured for altering any back gate voltage above predetermined sensor value to eliminate any potential radiation induced charges. The resonator 500 further comprises cavity resonator comprising of metal plates 501 and metal slab 503 being coupled with the meta-material structure surface being disposed with the antenna in communication with at least a capacitance 505 and/or inductance 506. Certain disclosed embodiments provide the CMOS multiple antennas comprising of parallel plate transmission lines 507 consisting of at least an opened end 508 and at least a shorted end 509. The configuration of the meta-material surface with the CMOS multiple antennas on chip structure further removes radiation pattern back lobe to protect consumers against signal radiation. Disclosed embodiments provide a monolithic integrated CMOS multiple antennas architecture comprising of intra-chip network.

The display/input device 404 consists of at least liquid and/or solid media 505. The metal film is further configured for generating electrical energy. Detection selectivity is further influenced by metal clusters 520. The metal clusters 520 are further configured to increase sensor selectivity caused by pressure absorption due to the coupling between sensing surface 409 and other properties 504. These other properties 504 may consist of metal oxide 530 being further configured for converting pressure force into electrical energy. The metal clusters 520 are operatively configured with sensors 180, 200 to increase selectivity. The metal clusters 520 further comprises semiconductor oxide substrate 560 configured with sensor sensitization to enable metal particles 522 to act as centers for surface pressure absorption. The addition of clusters 520 further provide electronic sensitization resulting from the oxide surface 540.

Referring to FIG. 7 is seen further embodiment of the communication apparatus 400 comprising a mobile phone with LCD display screen, video recognition, phonebook, dictionary, and a sensory environment 704. Disclosed embodiments further provide silicon-substrate-metal oxide 530, further comprising antimicrobial metal consisting of at least silver being laminated to at least a liquid absorbing nonwoven material being fused/etched in microfiber material to provide at least a detection environment on the detection platform 706. Certain embodiments provide the silicon-substrate-metal oxide-micro fiber 530 further comprising the nonwoven material consisting of metal coating including metal particles facing at least a liquid absorbing material to retain surface effect. Certain embodiments provide communication apparatus comprising sensors 200 being configured to retain antimicrobial effect. Some embodiments provide silicon-substrate-metal oxide 530 being configured with silicon-substrate-thin film 430, providing a detection platform 706 configured with plurality sensors 200 operable for detecting pre-use and post-use of communication apparatus 400. Certain embodiments provide the nonwoven material comprising at least a polyethylene mesh forming an antimicrobial composites comprising antimicrobial metal coating.

Figure 8:
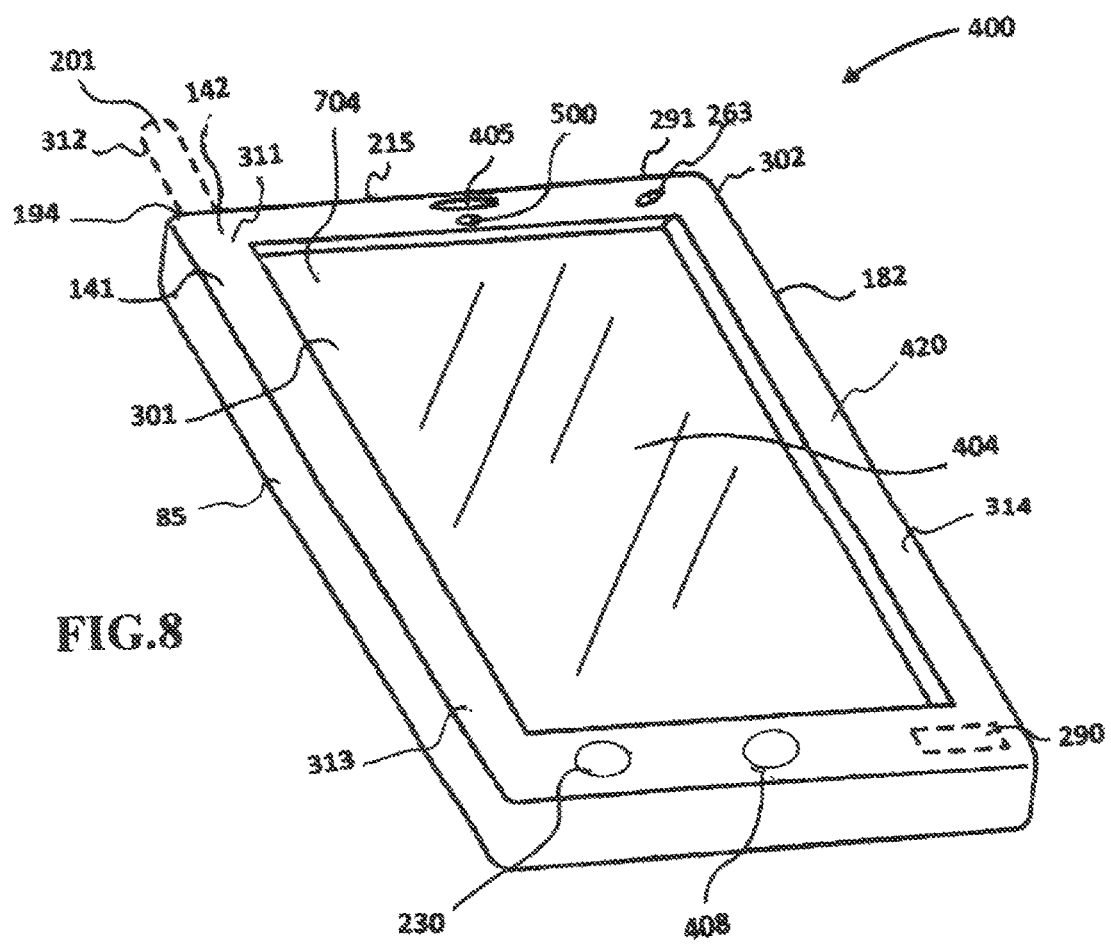
FIG. 8 is an exemplary embodiment of a mobile phone comprising a gaming apparatus configured with an interface device.

Referring to FIG. 8 is seen further embodiment of the communication apparatus 400 comprising a mobile phone comprising a gaming apparatus configured with an interface device and a sensory platform 704. The antenna 201 is operable to increase signal strength and may comprise internal antenna apparatus being configured with a chip operable on a logic circuit. The chip is operatively configured to boost communication signals through the antenna to improve sound quality and reduce dropped communications. The chip is operable on a logic circuit being communicatively connected to the circuit board for the communication apparatus 400 in communication with the antenna. Disclosed embodiments provide software in communication with the logic circuit being configured for analyzing signal strength and data speed. The amplification of the signals would improve wireless data transmissions, data card "IC card and SIM card" reception, providing faster data transfer speeds. The chip is further operable to move the wireless signal radiation away from the head to reduce exposure to cellular radio signals, which may cause health issues. The chip is a solution which depends on antenna configuration and may be operable on CDMA, TDMB, Digital/Analog/GSM, and location area network. At least a station interface 302 is operatively configured with the microprocessor electronics 85 and 182. At least a transducer 315 is operatively configured with sensor resonator 500 and multifunctional sensor 215 and communicatively connected to detection memory 291. The detection memory 291 is communicatively connected to station interface 302 and operatively configured with CPU 141. The CPU 141 and the CMOS 142 are communicatively connected to the communication apparatus 400 in communication with station interface device 302. The station interface 302 further comprising at least a transmission control 194 in communication with at least antenna apparatus 201. Receiver 312, transmitter 311, encoder 313 and decoder 314 are communicatively connected to interface device 302. The microprocessor electronics 85 and 182 are communicatively connected to MEMS 420, accelerator 230, and detector 290. Station interface 302 is operatively configured with interface device 301 in communication with display/input device 404. Disclosed embodiments further provide communication apparatus 400 being configured with speakers 405, microphones 408, camera 263, and display/input device 404.

Referring to FIG. 9 is seen exemplary embodiments of communication apparatus 400 comprising touch screen display/input 404 on a mobile phone configured with Internet connectivity operable for global roaming. Display/input device 404 further provides visual information to the user. Disclosed embodiment provide a display/input device 404 comprising liquid crystal display (LCD) 410, a touch screen display 412 or another type of display operable for providing information to a use. Certain embodiments provide a display/input device 404 being further operable for providing information regarding incoming or outgoing telephone calls and/or incoming or outgoing electronic mail (email), instant messages, short message services, multi-media message services, calendar application, text message application, the current time display, video games applications, downloaded content display, mobile broadband and media applications.

The communication apparatus 400 further includes a cellular radiotelephone, personal digital assistant (PDA) 416, pager 417, gaming device 418, data communications device 419, data processing device 420, web-based appliance 421, Web browser 422 and/or other application providing Internet/Intranet access and messaging application programs. The messaging program includes text messaging, multi-media messaging, instant messaging, e-mail, an organizer application program, a calendar application program, video application and/or a global positioning system (GPS) receiver 423, personal computer (PC) 424, laptop computer 425, palmtop receiver 426, remote control device 427, radio-telephone transceiver 428, data processing device 429, and/or data communication device 430. The communication apparatus is further configured with speakers 405, microphones 408, and nano sensors 704. Disclosed embodiments further provide the communication apparatus 400 comprising the personal computer (PC) 424. Certain embodiments provide the personal (PC) 424 comprising an information processing apparatus. Some embodiments provide the personal computer (PC) comprising a computing device configured with the input 404. The input device 404 further comprises an input module for receiving characters and user inputs. At least the input module configured for receiving user input further comprises a switch device being configured with the software and disposed with the hardware. Disclosed embodiments further provide the communication apparatus 400 configured with sensors operable for detecting relative movements on the display/input device 404. The display/input further comprises a keypad. The input device 404 further comprises camera and webcam.

The information processing apparatus comprises executors being operable for executing varieties of processes. Certain embodiments provide the personal computer (PC) 424 further comprising a controller operable for controlling operations of the executors, including information, authentication information authenticating each user. At least a user mapping storage medium is disposed with the personal computer (PC) 424 configured for storing correspondence information responsive to the executors. Some embodiments provide the personal computer (PC) 424 comprising the controller operable for identifying identifies corresponding user information in accordance with the correspondence stored information.

Referring to FIG. 10 is seen exemplary embodiments of communication apparatus 400 comprising touch screen display/input 404, being operable through sensational touch by at least an object, including a human hand 600. The communication apparatus 400 further comprises a mobile phone comprising a pocket PC, a PDA phone with dual processor. Disclosed embodiments provide communication apparatus 400 comprising a touch screen 412, display/input device 404, including a remote control device 427 operable for remotely controlling a television, a stereo, a video cassette recorder (VCR), a digital video disc (DVD) player, a compact disc (CD) player, and a video game device. The communication apparatus 400 further comprises a wired network device, 431, an optical network device 432, and/or wireless network device 433 operable for receiving and transmitting data, including voice and/or video signals, multimedia signals, electrical energy transmission, data signals and video signal transmission. Certain embodiments provide a network device comprising a switched telephone network, transmission towers operable for receiving wireless signals and for forwarding wireless signals to intended destination, packet switched networks, including Internet protocol (IP) based network, an intranet, a local area network (LAN), a wide area network (WAN), a personal area network (PAN), Internet, and data transmitting network. Embodiments further provide communication apparatus 400 configured with speakers 405, microphones 408, and antenna apparatus 201 in communication with signal booster 403 being operable with logic circuit 407. Certain embodiments provide the communication apparatus being configured with at least a sensor 708.

Referring to FIG. 11 is seen exemplary embodiments of communication apparatus 400 comprising a mobile phone with a touch screen panel operable for communications; interactive gaming; music applications; a virtual slider operable for accessing multimedia buttons. Disclosed embodiments provide communication apparatus 400 comprising at least one of: at least a variable gain modules 434, a mobile device, 435, internal peripheral devices 436, external peripheral devices 437. Certain embodiments provide communication apparatus 400 comprising at least one of: cell phones, smart phones, laptops, handheld communication devices, handheld computing devices, satellite radios, global positioning systems, and PDA. Some embodiments provide internal peripheral devices being disposed in the mobile device. Other embodiments provide communication apparatus 400 further comprising a Bluetooth radio, wireless local area network (WLAN) radio, a wireless wide area network (WWAN) radio. The external peripheral device further comprises camera, printer, card reader, scanner, radio connection, wireless device connection. Embodiments further provide communication apparatus 400 configured with speakers 405, microphones 408. Certain embodiments provide the communication apparatus further comprises a display/input device 404 being operated by at least a human hand 600. The display/input device 404 further comprises a touch screen 412 being further operable on a detection platform 706.

Referring to FIG. 12 is seen exemplary embodiment of a communication apparatus 400 comprising a mobile phone with numeric keypads operable to provide voice over texting applications; a slide out keyboard; and resistive touch screen character recognition in accordance with one embodiment of the invention. Referring to FIG. 12A, the communication apparatus 400 comprises a housing 402 comprising of a sensory platform 700 consisting of nanotechnology application. Some embodiments provide the housing 402 comprising of at least a cell phone housing and/or belt clip. The sensory platform further includes strain gauges 701 embedded in load cells 702. Disclosed embodiment further provide nano technology applications comprising nano sensors 704 being embedded in silicon substrate 712 and fused/etched in microfiber material 710, providing a silicon microfiber 724. The sensory platform 700 being operable to provide a detection platform 706 being further operable for communications and/or for converting at least a form of energy into electrical energy. Disclosed embodiments further provide the sensory platform 700 further comprising a display/input device 404 being disposed with the housing 402. Certain embodiments provide the housing 402 further consisting of speakers 405, microphones 408, embedded antenna apparatus 201, in communication with at least a signal booster comprising a chip 403, in communication with a logic circuit 407. The communication apparatus 400 further comprises the detection platform 706 comprising sensors 708 being operable for detecting objects proximity to at least the display/input 404. The communication apparatus 400 may comprise at least one of: cellular telephone, telephonic, media device, PDA device, cellular telephone, GPS device, entertainment device and/or an information device being operable for road and traffic communications, including road side advertisement. Embodiments further provide communication apparatus 400 configured with speakers 405, microphones 408. Certain embodiments provide the communication apparatus 400 further comprises a display/input device 404. The display/input device 404 further comprises a touch screen 412 being further operable on a detection platform 706. Disclosed embodiments provide a device being configured for input/output on a substrate comprising at least one piezoelectric sensor formed on the substrate. The device further comprises a display/input formed on the substrate. The piezoelectric sensor is formed on the substrate in communication with at least a processor being further operable to calculate applied force and activate a force response based on the calculated value. Disclosed embodiments provide communication apparatus comprising a device configured for monitoring resistance associated with one or more piezoelectric sensors to detect changes in a force applied to a display/input device. The display/input device is further configured for detecting change in resistance associated with the one or more piezoelectric sensors being further configured with electrical crystals operable for measuring force applied to the display/input device based on the detected change in resistance.

Referring to FIG. 12B is seen an exemplary embodiment of a human hand 600, holding communication apparatus 400. The communication apparatus is disposed in a housing 402 configured with nano sensors 704, a display/input device 404, a speaker 405, and a microphone 408. The display/input device 404 further comprises a touch screen 412 being further configured with an interface device 301. The communication apparatus 400 further comprises a media device further consists of input and output devices. Disclosed embodiments provide the communication apparatus 400 including at least a housing 402.

The communication apparatus 400 further comprises a cellular telephone, a game device, and a media player and a PDA. The communication apparatus 400 is portable and may fit within the hand of normal adult and grown children. In one embodiment, the display/input device 404 may include at least one of multi-point interactive touch screen input device 412, an LCD display. Disclosed embodiment provide a display/input device 404 comprising liquid crystal display (LCD), a touch screen display or another type of display operable for providing information to a use. Certain embodiments provide a display/input device being further operable for providing information regarding incoming or outgoing telephone calls and/or incoming or outgoing electronic mail (email), instant messages, short message services, multi-media message services, calendar application, text message application, the current time display, video games applications, downloaded content display, media applications. In one embodiment, the multi-point interactive touch screen is a capacitive sensing medium configured to detect multiple touches, including blobs on the display from a user's face or multiple fingers touching or nearly touching the display.

Referring to FIG. 12C is seen an exemplary embodiment of the disclosure comprising human hand interaction 600. Certain embodiments provide the communication apparatus 400 comprising a hand held device, further comprises a display/input device 404 as seen in further 12B, being operated by at least a human hand 600 as seen in FIG. 12C.

Figure 13:
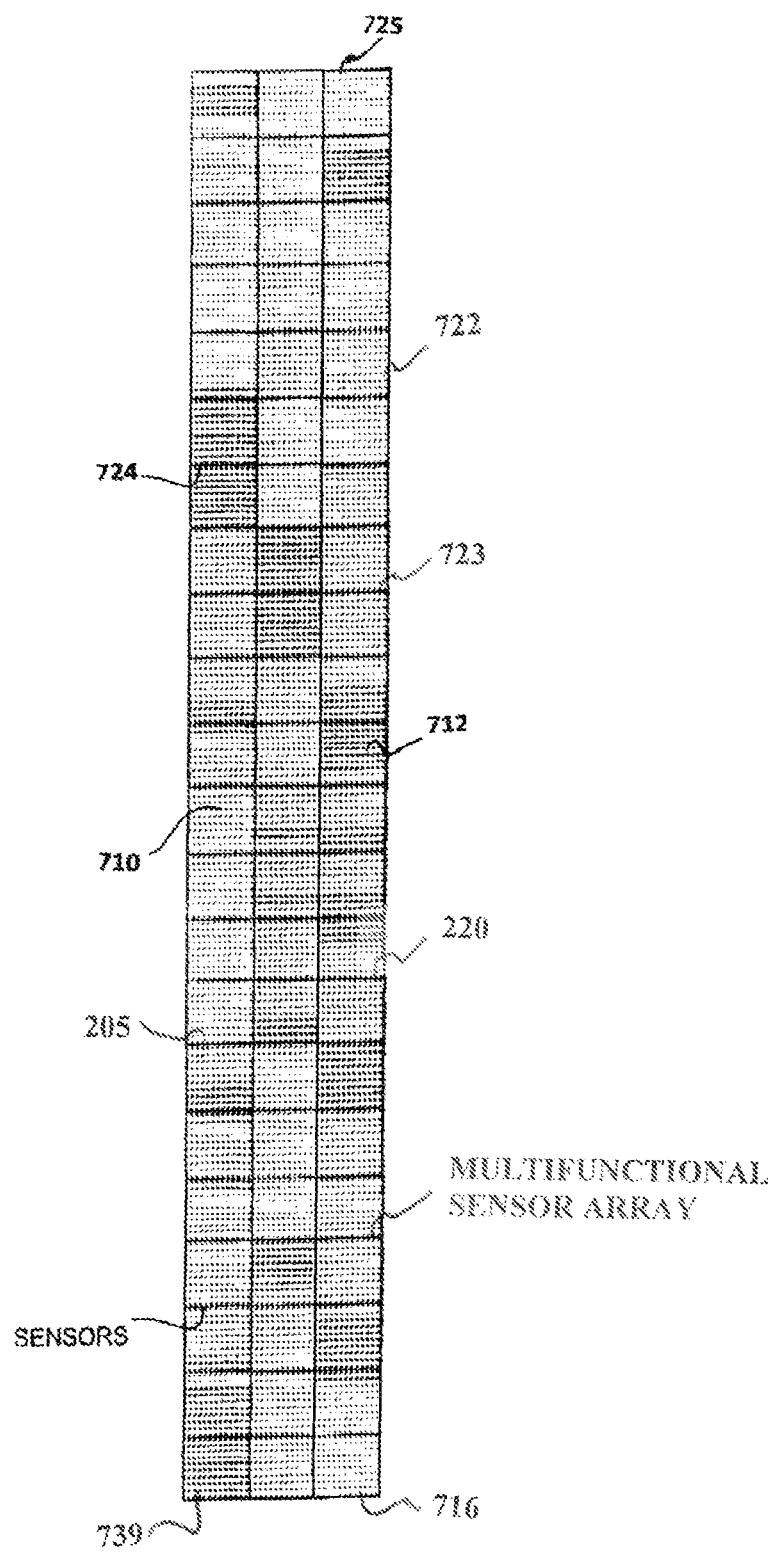
FIG. 13 is an exemplary embodiments of nanotechnology application of CMOS multiple antenna on a chip and nano-wires for transporting energy.

Referring to FIG. 13 is seen exemplary embodiments of nanotechnology application of CMOS multiple antenna on a chip to realize at least a 60 GHz frequency. The CMOS multiple antennas 724 comprise miniaturized alloyed material comprising meta-material structured surface cavity 722 embedded/coupled in silicon-substrate-microfiber platform 723. Disclosed embodiments provide the platform 722 comprising CMOS multiple antenna apparatus 724 configured for communication apparatus 400. The platform 722 further comprises methods and systems for generating electrical energy. The communication apparatus comprises microfiber material 710 further configured with sensors on silicon substrate 712. The sensor comprises electrode and/or temperature sensor 716. Certain embodiments provide the substrate-microfiber 724 comprise miniaturized non ferrous materials 734 being embedded in the silicon substrate 712. Some embodiments provide the substrate-microfiber 724 comprise energy platform 725. Certain embodiments provide the CMOS multiple antenna apparatus 724 coupled to the silicon substrate 712, further comprises at least glass 739 comprising a gallium nitride high electron mobility transistor (GaN-HEMT) to improve communication signal amplification, faster data transport speed, and reduce energy consumption for the communication apparatus 400. Some embodiments provide the communication apparatus being configured with a silicon to silicon bonding and/or silicon to ceramic wafer bonding to further provide a detection platform and for generating electrical energy. The silicon is further provided with ceramic wafer bonding responsive to solar energy. The silicon to ceramic wafer bonding may include at least silicon to glass bonding, forming single crystal silicon to improve the micro-acoustics and micro optics in the nanotechnology applications to further reduce energy consumption and produce electrical energy. Disclosed embodiments provide optical properties of thin films being operable for the advancement of the integrated circuit for converting solar energy into electrical energy. Certain embodiments provide optical properties of thin films being operable for the advancement of the integrated circuit for converting solar energy into electrical energy. Some embodiments provide energy platform consisting of at least surface acoustic wave line, paste, MEMS, thin film deposition, and multifunctional sensor array 205 embedded in the silicon substrate 712 and etched/fused in a micro-fibered material 220. The application of ceramic materials further provides many features, including high hardness, physical stability, extreme heat resistance and chemical inertness. Certain embodiments provide highly resistant material to aggressive chemicals, melting, bending, stretching, and corrosion.

Figure 14:
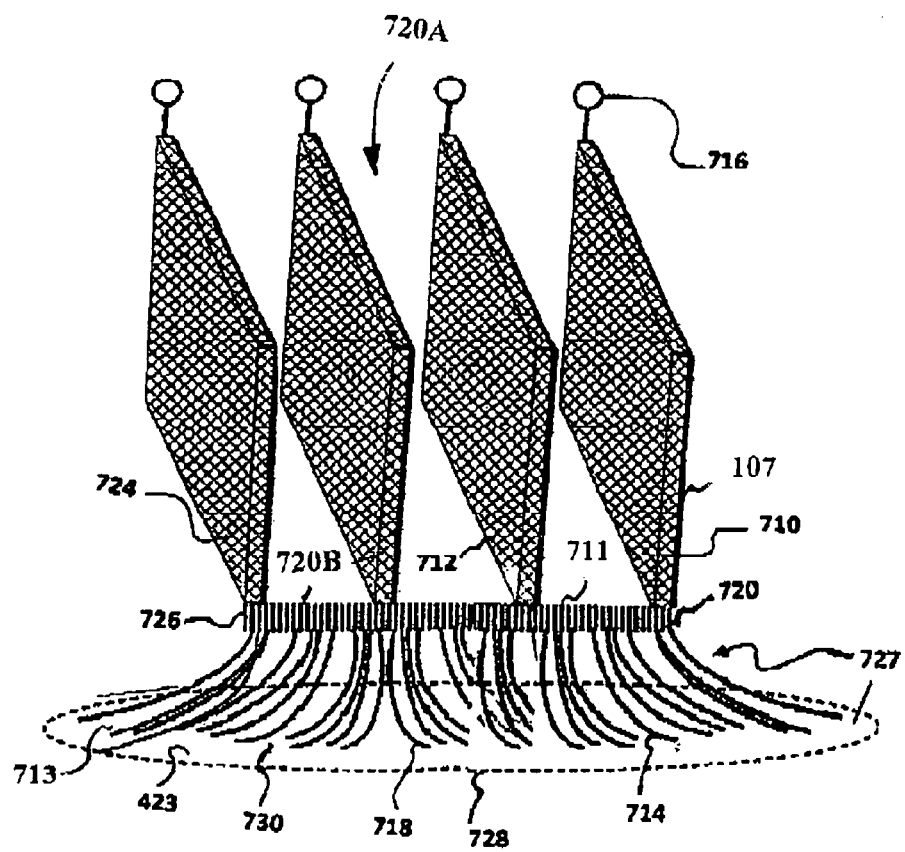
FIG. 14 is an exemplary embodiment of the antenna apparatus and the energy transport medium.

Referring to FIG. 14 is seen exemplary embodiments of the energy transport medium. Disclosed embodiments further provide communication apparatus comprising methods and systems for generating and storing electrical energy. Certain embodiments provide means for harvesting energy, comprises nano-materials 710 comprising nano-fiber/micro-fiber material. Disclosed embodiments further provide the nano-fiber/micro fiber material 710 comprising materials with excellent electrical properties being disposed with substrate 712 being alloyed with meta-material structure and etched/fused in a microfiber material to enable energy cell platform and remove radiation pattern back lobe. Certain embodiment provide the cell platform comprises an energy harvester that harvest energy from at least a network environment and/from within an environment with the natural occurrence of energies. At least one network environment comprises electromagnetic wave radiation. At least one natural occurrence of energies further comprises solar energy. The microfiber material 710 includes material components with nanometer dimensions in which at least one dimension is less than 100 nanometers. Some embodiments provide the microfiber materials being further configured with nano-wires/tubes 714. The nano-wires/tubes 714 being further embedded in the silicon substrate 712. Certain embodiments provide a communication apparatus comprising the substrate 712, being configured with electrodes 716 at the opened end of the CMOS multiple antennas network in communication with the nano-wires/tubes 714. Some embodiments provide nano-sensors on silicon microfiber comprising nano-fibers formed on the microfiber. Other embodiments provide the electrode 716 further comprising at least a temperature sensor. Disclosed embodiments provide a microfiber membrane configured to provide structural communication and data transmission integrity. Embodiment further provides the cell platform comprising a memory device.

Certain embodiments provide the nano-fibers being formed using electro-spray deposition. Other embodiments provide the nano-wires/tubes 714 comprising at least one component of: carbon char, carbon black, metal sulfides, metal oxides and other organic materials being alloyed with the microfiber material 712. Disclosed embodiments further provide communication apparatus being disposed with alloyed material comprising apparatus 718 being configured for exhibiting unique electrical and electrochemical properties to provide efficient transportation of energy properties. The apparatus 18, in some embodiments, comprises multiple CMOS antenna on a chip operable for intra-chip wireless communication network 727. Embodiment provide a combination of the silicon substrate and metal oxide and/or thin film or miniaturized metallic material in communication with signal booster chip, providing an energy platform comprising a battery cell for the communication apparatus. Disclosed embodiment further provide a communication apparatus consisting of a detection platform comprising touch screen display device configured with a processor means comprising a pattern recognition technique for producing "Sensing," a controlled data/communication signal and communicating sensed detection to a wireless modem or control module being operable to provide wireless communication. Certain embodiments provide the carbon char being configured with silicon substrate and microfiber material to further provide an energy platform. Embodiments described herein include multiple antenna apparatus fabricated on relatively low resistivity CMOS-grade silicon substrate microfiber with reasonable radiation efficiency. The communication apparatus is reconfigured with integrated sensor elements on at least a circuit board operable for energy harvesting. Disclosed embodiments provide the sensor elements comprising at least a sensing mode configured with nano sensors operable to measure environmental characteristic by generating electromagnetic charge and outputs a time-encoded signal indicative of the measurement, at least a platform comprising of energy harvesting mode to harvest energy from solar energy, wave energy, electromagnetic energy, and ambient energy source. Certain embodiments provide a switchable circuit board configured to switch from the sensing mode to the energy harvesting mode responsive to at least a predetermined threshold.

Disclosed embodiments further provide communication apparatus comprising methods and systems for producing energy properties from the presence of high surface areas and charge transport mechanism. Certain embodiments provide the charge transport mechanism being further derived from the flow of pressured fluid 423. Certain embodiments of the pressure fluid 423 comprise sound waves, solar energy, vibration, and wind. Disclosed embodiments further provide apparatus for thermal expansion of fluid in communication with the nano-wires/tubes 714. Embodiments provide silicon-microfibers and nano-wires/tubes 714 being further provided with methods for converting thermal energy into electrical energy. Certain embodiments of the thermal expansion of the fluid comprise sound waves, solar energy, vibration, and wind and/or material pyrolysis. Some embodiments provide energy medium, including apparatus 720 comprising means through which electron transfer occurs at the electrode 716, through the release of chemical energy to create a voltage through oxidation/reduction reactions 722. Certain embodiments further provide the apparatus 720 comprising at least energy cell platform. Some embodiments provide the apparatus 720 further comprising CMOS multiple antennas configured with meta-material surface cavity. Disclosed embodiments provide the apparatus 720 comprises CMOS multiple antennas platform comprising opened ends 720A and shorted ends 720B. The oxidation and reduction reactions 722 is being separated through the electron 716. The electrode 716 is being configured with CMOS substrate-microfiber 724 embedded with multiple antennas comprising intra-chip network re-enforcements to external electric circuit communication and data transmission efficiency. Certain embodiments provide at least a storage medium, comprising internal transport voltages at electrodes configured for providing useful energy transport stream to batteries 724 and/or capacitors 726. Disclosed embodiments provide silicon microfiber further comprising of Si-substrate consisting of a patterned isolation layer.

Certain embodiments provide the Si-substrate being etched/fused through openings of the patterned isolation layer to form a plurality of electric-conducting platform. At least the electric conducting platform further comprises electric-conducting wires and/or at least heat-conducting wires in communication with an opto-electronic device. The opto-electronic device further comprises opto-isolation apparatus being configured with at least a LED. Disclosed embodiment provide silicon microfiber, further comprising a remote sensor assembly comprising multiple antennas being configured with a plurality of micro electromechanical system (MEMS) embedded on the silicon substrate. The silicon substrate further comprises a wireless communication circuit being configured with a processing device operable to obtain data, such as measurement values from at least one of plurality of MEMS sensors. Certain embodiments provide the silicon substrate further configured to perform at least a filtering operation on at least one of: communication signals; data transmissions; measurement values. Disclosed embodiments further provide silicon microfiber further comprising apparatus for coupling light between input and output waveguides comprising structures having higher portions or lower portions being arranged at a fine pitch equal to or shorter than a wavelength of visible light on base surface responsive to plurality of arc track rows.

Disclosed embodiments provide the CMOS multiple antennas 724 further comprises at least a chip configured with integrated circuit comprising nano wires 714 embedded in silicon substrate microfiber 712, being alloyed with meta material structure comprising of surface cavity. The CMOS multiple antennas further comprises radio frequency applications operable to provide intra-chip antenna network, enabling GHz frequencies for Bluetooth, Wife wireless network, and mobile phones. In the disclosure, the chip is further configured with power amplifiers operable to provide communications and data transmissions over short range to longer ranges. At least a metal oxide semiconductor is configured with silicon substrate microfiber to provide better power efficiency, achieve better communication clarity, and achieve extended power life. The CMOS multiple antennas on chip with embedded amplifiers are operable to realize high operating frequencies to enable high data rate communications and to prevent atmospheric absorption. Nano wires 714 are operatively configured with the CMOS antennas 724, in some embodiments, to provide multicast protocol label switching network for wireless communication. The CMOS antennas 724 are operable to realize a wireless network region better than at least 60 GHz, for wireless communications, military application, high speed data transmission applications, and homeland security intelligence applications. Certain embodiments provide the nano wires 714 configured to provide a platform to protect against oxygen absorptions, avoid interference from other networks, and protect against human health concerns. Some embodiments provide a communication apparatus configured to provide desirable high definition television "HDTV" signals with high data rate communications being operable at the realized transmission frequencies.

Disclosed embodiments provide the realized transmission frequencies comprises providing better communications for wireless personal area network "WPAN," local area network "WLAN," and allowing communications for wireless Gigabit Ethernet, mobile devices synchronizations, wireless fire wire, and USB display. Embodiments further provide the high rate WPAN further includes point to point transport for bulk data transfer, multimedia streaming, and streaming HD multimedia contents. Some embodiments provide the CMOS multiple antennas operable on a chip comprising silicon substrate microfiber being alloyed with meta-material for integrated circuit. Other embodiments provide the integrated circuit being configured for low power consumption. Disclosed embodiments further provide the integrated circuit further comprising digital signal processing "DSP" for higher frequencies. Certain embodiments provide the chip comprising at least a single chip circuit or a module operable for converting digital signal into at least a 60 GHz modulated radio wave. Other embodiments provide the module further operable for converting radio wave signals into at least 60 GHz digital signals. Further embodiments provide the silicon substrate microfiber providing additional output power gain and long term data transmission reliability. Disclosed embodiments provide the meta-material further comprising die-electric materials operable to provide at least a metal gate electrode 716. Disclosed embodiments provide the antennas 724 further comprising a chip configured with at least a software program. The chip is further disposed on a logic circuit further configured with at least transistorized switches to provide at least on chip multiple antennas arrays that are programmable for boosting signal reception and/or for changing signal transmission directions. The CMOS multiple antennas 724 is opened at one end 716, and shorted at the other end 720. The shorted end 720 is integrated with power supply circuitry 726, 728, and 730 to further reduce/eliminate critical signal looses. Disclosed embodiments further provide the nano wires operatively configured for restraining internal noise and for providing stable communication operations.

Disclosed embodiments further provide the antenna apparatus 201, 418 comprising at least a field programmable gate array "FPGA." Certain embodiments provide the FPGA disposed with Meta material coupled to semiconductor substrate in communications with nano wires 714. The nano wires comprise signal interconnect lines in communication with the shorted end of the FPGA Meta material structured surface 712. The first antenna portion 201 is connected to the second antenna portion 418 at the shorted end 720. The shorted end further contains thin conductor layers portion characterized as having a plurality of thin, fine-pitch nano wires conductors 720. The nano wires are further configured to convert electromagnetic wave energy into electrical energy to provide further additional operating power platform for the communication apparatus 400. The opened end contains conductive material configured to absorb electromagnetic wave energy in communication with the shorted end 720, consisting of the FPGA Meta material structured surface. Plurality portions of three dimensional antennas are joined at the shorted end comprising a MEMS wafer leveled surfaces within flatness at the top and nano wires protruding at the bottom of the flat surface. The nano wire portions are fused and/or etched.

Disclosed embodiments provide a CMOS multiple antennas 201 and 418 disposed on a semiconductor chip 403. Certain embodiments provide the chip consisting of integrated transceiver. In the disclosed embodiments, the antennas 201 and 418 are further configured to transmit, and to receive, comprising of a transmitter and a receiver. The transceiver is formed on a semiconductor substrate comprising silicon substrate alloyed with Meta material 712. At least one semiconductor substrate is configured with microfiber material 710 to provide electrical connection between the transceiver 724 and the semiconductor substrate 712. The antenna is further formed with a dielectric layer 711 being connected to the transceiver 724. At least the Meta material structured surface 712 further comprises a reflective plate 713 connected to the substrate. The separation between the reflective plate 713 and the antennas 201 and 418 are about a quarter wavelengths of millimeter waves, which enhances radiation efficiency of the antennas. Some embodiments provide an array of silicon substrate microfiber 712 being formed and filled with the dielectric material 711 to reduce the effective dielectric constant of the material between the antennas 201 and 418 and the reflector plate 713, thereby reducing the wavelength of the millimeter wave and enhance the radiation efficiency. Other embodiments provide the antenna apparatus 201, 418 being fabricated on a low resistivity CMOS-grade silicon substrate microfiber. The antennas are configured to resonate at least at 6 GHz.

Embodiments relate generally to wireless communication systems that employ micro machined antennas 201 and 418 fabrication on at least a field programmable gate array, comprising a removal of silicon substrate underneath the antenna structure to increasing the overall radiation efficiency. Disclosed embodiments provide CMOS multiple embedded antennas that include a feeding portion, a radiating portion, a grounding portion, and a short portion. The feeding portion is operable to feed electromagnetic signals through an opened end 716. The radiating portion 724 is connected to the feeding portion 716, to radiate the electromagnetic signals. The radiating portion includes a first radiator 201 and a second radiator 418. The first radiator is "L" shape, with a first end electrically connected to the feeding portion. The second radiator is formed by a plurality of radiating sections connected one by one. The second end of the first radiator and the second end of the second radiator are connected to the radiator shorted end 720. The first end of the shorted portion 720 is connected to a common node 726 of the first radiator 201 and the second radiator 418, and a second end of the shorted portion 720 is connected to the grounding portion consisting of nano wires 714.

Disclosed embodiments provide CMOS multiple antennas in a chip and could include employing an antenna that resonates at least at 5.8 GHz. Another disclosed embodiment includes a differential feed operationally coupled to CMOS multiple antennas. In one disclosed embodiment, the antennas are fabricated on relatively low resistivity CMOS-grade silicon substrates. In one such exemplary non-limiting embodiment, CMOS multiple antennas and a photo-resist form an antenna approximately 400 um in thickness and is 12 mm long×2.8 mm wide. In another embodiment, at least one CMOS antenna is provided, the CMOS multiple antennas portion is separated from the CMOS antenna, and a photo-resist material connects the first and second CMOS portions. The antenna 201 includes at least one CMOS antenna 418 and the CMOS multiple antennas portion 724. A photo resist material 711 is coupled or connected to the CMOS portions 418 and 724. The antennas 201 and 418 can be fabricated on a silicon substrate microfiber with a thickness of at least 10 um and/or between 10 um and 700 um. Disclosed embodiments provide the communication apparatus 400 further comprising the COMS multiple antennas 201 and 418 being disposed on the chip 403 operable for digital signal processing "DSP." The chip 403 is further coupled to an application specific integrated circuit 107. Certain embodiments provide the antennas further comprising Meta material structured surface cavity for enabling high data transmission. Some embodiments provide the Meta material structured surface comprising at least a reflective element operable for wireless interconnections and for transmitting data wirelessly at a much faster speed.

Other embodiments further provide a silicon wafer comprising folded dipole antennas configured with meta material structured surface on at least a dielectric micro-fibered material to provide better conductor gain at a resistivity of at least 5 cm, and with a thickness of at least 10 um, and impedance of at least 100 being fed through at least the nano wires consisting of lengths of at least 1.5 mm. Disclosed embodiments are not limited to the dimensions herein. Certain embodiments further provide exemplary embodiments of the antenna being constructed of conducting nano wires 714 being coupled with a size of at least a 2.50 mm×4.3 mm at a height of at least 525 um. In the embodiments, the antenna further comprises at least silicon substrate microfiber disposed with the Meta material structured surface configured for low resistivity and better conductor gain to enable a broader bandwidth. The CMOS multiple antennas is further disposed on flat surfaces consisting of at least a vertical slot being narrowed with at least a wavelength of at least a quarter deep. The antenna 201 and 418 are further configured for surface wave propagation to at least the shorted end 720B. In some disclosed embodiments, impedance is higher at the opened end 720A. In other disclosed embodiments, at least a corrugated Meta slap is coupled to at least a vertical wall to modify radiation pattern to increase antenna gain. Disclosed embodiments provide the radiation pattern further includes a radiation pattern back lobe comprising nano wires being etched/fused at the shorted end 720B with the Meta material surface configured to provide higher gains.

The antenna 201 can be derived from a dipole antenna in one exemplary generalized non-limiting antenna embodiment. The antenna can be a differential-fed antenna and can be easily integrated into active circuits. Disclosed embodiments provide a complementary metal-oxide-semiconductor (CMOS) consisting of integrated multiple antennas circuits 724 being disposed in at least a chip, comprising at least one of: microprocessors, digital logic circuits, static RAM, and microcontrollers. Certain embodiments provide the multiple antennas 201 and 418 comprises CMOS configured with silicon substrate microfiber being alloyed with meta material structured surface 712 to provide wide variety of analog circuits such as image sensors, and data converters. Some embodiments provide highly integrated transceivers 724 configured for variety of communications, including military applications. Disclosed embodiments provide the CMOS further comprising complementary and symmetrical pairs of p-type and n-type metal-oxide-semiconductor field-effect transistors (MOSFETs) operable for logic functions. Certain embodiments provide the CMOS further comprising a structured material with relatively low resistivity and relatively inexpensive. Certain embodiments provide a CMOS multiple antennas apparatus comprising means for radiating or for receiving electromagnetic energy and operable to accepts power from a source and radiates the power into the shorted end. The received energy is radiated to the source, or dissipated it to a resistive load. The ratio of the power radiated into the ground nano wires to the power received from the source is the radiation. Radiation efficiency is defined as "the ratio of the total power radiated at the shorted end by the multiple antennas to the net power accepted by the antennas from the opened end" (Pradiated/Pinput=ηefficiency).

Figure 15:
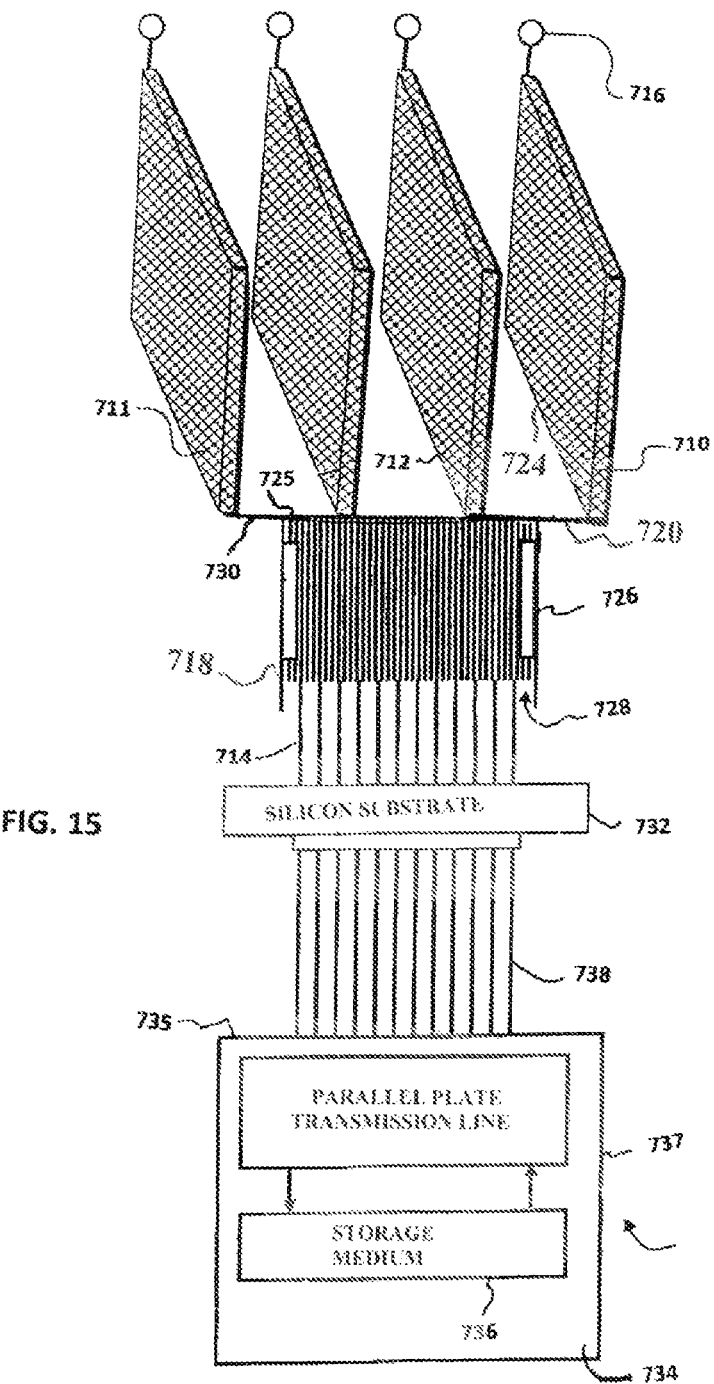
FIG. 15 is an exemplary embodiment of the CMOS multiple antennas on a chip comprising substrate microfiber embedded with meta-material.

Referring to FIG. 15 is seen further exemplary embodiments of the CMOS multiple antennas 724 on a chip comprising substrate microfiber embedded with meta-material for communications and for an energy medium. The CMOS multiple antennas 724 is opened on one end configured with electrode and temperature sensor 716, and shorted on the other end 720, being configured with nano wires for antenna network communications, in communication with the energy storage medium further comprising energy storage apparatus coupled to the shorted end 720. Disclosed embodiments provide methods and systems for realizing frequencies of at least 60 GHz and for generating electrical energy. Certain embodiments provide apparatus for generating electric energy from the energy released by at least a reaction, such as pressure, thermal transport, heat, force, motion, and vibration. Certain embodiments provide microfiber material 710 being configured silicon substrate for converting pressure, vibration, heat, thermal transport, wind, force into electrical energy. Some embodiments of the energy being generated comprise electrical energy 730. Other embodiments of the energy being converted comprise thermal energy 732. The thermal energy, in other embodiments, is being transported through the nano-wires/tubes 714 in communication with the silicon-microfiber material and/or the electrode. Certain embodiments provide the nano wires/tubes further configured to provide a platform for each shorted CMOS antenna to engage in antenna network to achieve at least a 60 GHz frequency. The microfiber material 710 further comprises plurality meta-material comprising textile fibers 711, being alloyed with zinc oxide (ZnO) nano-wires 734 to form at least a meta-material structured surface cavity. Disclosed embodiments provide the zinc oxide nano-wire 734 further configured with piezoelectric crystals for generating electrical energy 728 and at least a coil for communicating and/or transporting the electrical energy being generated to at least a capacitor. Disclosed embodiments further provide the piezoelectric further comprising an electromagnetic composite meta-material including an electromagnetic medium.

Certain embodiments of the piezoelectric comprising plurality of spaced electromechanical resonators disposed in the electromagnetic medium configured to control electromagnetic wave propagation properties in the electromagnetic composite meta-material. Certain embodiments provide a communication apparatus being configured with signal booster chip in communication with an antenna apparatus being operable to allow current flow 730 from plurality fiber pairs 736. Other embodiments provide the fiber pairs being configured for converting at least one of: vibration, pressure, blood flow, sound, waves, force, thermal energy, and other electrical properties into electrical energy 730. Some embodiments provide a device for generating pressure, thermal energy, and force and producing electrical energy 730. Certain embodiments of the device for producing electrical energy 730 further comprise radiation apparatus. Other embodiments of the radiation apparatus comprise a radiator device being configured with silicon substrate microfiber and at least an electrode.

Disclosed embodiments provide the radiator device comprising a device that emits radiant energy. Disclosed embodiments provide nanotechnology application comprising nano sensors and MEMS, being embedded on a silicon substrate and etched/fused in a micro fiber material, preferably fabricating together a unified process with supporting integrated circuit (IC) on the same semiconductor substrate comprising integrated silicon platform comprising a chip configured with CMOS multiple antennas 724. Certain embodiments provide the integrated silicon platform in at least a single chip to greatly reduce the size, weight and power consumption of the communication apparatus 400 and enhance the performance of all applications for the communication apparatus. Disclosed embodiments provide the energy platform comprising a cell platform 720 being further configured for medical devices applications. Other embodiments of the cell platform comprise CMOS multiple antennas configured for intra-chip antenna network for effective communication applications. Disclosed embodiments further provide the cell platform comprising at least a nickel-cadmium (NiCd) configured with nickel oxide hydroxide and metallic cadmium for energy capture. Disclosed embodiments provide the nickel oxide and metallic cadmium further consisting electrodes 716 being configured for deep discharge applications. Other embodiments provide methods and systems for storing electrical energy, comprising the cell platform 720. The cell platform includes battery cells and/or capacitor configured for withstanding higher number of charge/discharge cycles and faster charge and discharge rates. Certain embodiments of the cell platform further comprise an electrode device comprising at least electrically conductive nano wires/tubes 714 being coated with at least one electrically isolating layer. The nano wire/tubes further comprises silicon nano wire operable to display biological analysis results such as electrical responses to either pH changes or receptor-ligand interactions of at least one of: protein disease, viruses, and DNA hybridization in real-time.

Embodiments further provide communication apparatus comprising apparatus for generating pressure, thermal energy, and force, and for converting the pressure, thermal energy and force into electrical energy. Disclosed embodiments further provide methods and systems for converting wind force into electrical energy. Some embodiments provide microfiber material 710 comprising zinc oxide (ZnO) being configured for converting pressure and force into electrical energy 730. Some embodiments of the microfiber material 710 further comprise meta-material structured surface cavity comprising nanotechnology applications. Disclosed embodiments provide a method of selectively etching a solid sacrificial sensory layer, comprising wet etching and/or dry etching. Other embodiments provide methods and systems of generating renewable electrical energy through nanotechnology applications. The nanotechnology applications comprise at least a single layer microfiber 736. Other embodiments of the microfiber 710 further comprise miniaturized meta-material arrays comprising nano-wire 734 being configured for applications in hybrid communication applications to increase data transmission speed, including HDTV applications, further comprising generator assembly 738 in communication with the energy platform. Certain embodiments provide the generator assembly 738 comprising at least semiconductor properties consisting of non ferrous material arrays. The non ferrous material array comprises vertically-aligned zinc oxide (ZnO) nano-wires 734. The zinc oxide nano-wire 734 is being configured to exhibit flexible electrode 716. Certain embodiments provide the flexible electrode 716 comprising complementary metal oxide semiconductor. Some embodiments provide the flexible electrode further comprising conductive platinum tips 735 comprising of CMOS-MEMS. The CMOS MEMS further comprises probes switches operable to actuate down onto a specific programmable addressable location and deliver a current Phase change (PC). The CMOS MEMS is embedded within a reconfigurable circuitry to provide a low or high resistance state. When the reconfiguration is complete, the heaters in the probe are turned off and electrical and/or mechanical contacts are broken. The application provides the reconfiguration of radio-frequency circuits further configured for repeatable contact resistance.

Other embodiments provide the microfiber material 710 further comprising plurality fibers being operable for characterizing excellent electrical properties. The microfiber material is coupled with meta-material structured surface cavity and/or coated with polymer and/or with zinc oxide layer 734 to realize at least 60 GHz frequency and to provide energy transport platform 725. Certain embodiments provide the nano-wires 734 configured to provide antenna network platform 718. Some embodiments further provide the nano-wires 734 being coated with gold 737, and fused or etched on the energy transport platform 725. Other embodiments provide the nano-wires 714 further configured for harnessing energy from at least a medium, comprising at least one of: vibration, pressure, blood flow, sound, waves, thermal source, wind, motion and Force. Further embodiments provide the CMOS multiple antenna apparatus 724 further comprising zinc oxide (ZnO) 734 being embedded in a silicon substrate configured with at least polymer. Disclosed embodiment further provide a single crystal silicon to improve the fabrication of micro-acoustics and micro optics and to provide an energy platform for converting solar energy, sound wave, vibration, pressure force, and wind force into electrical energy.

Figure 16:
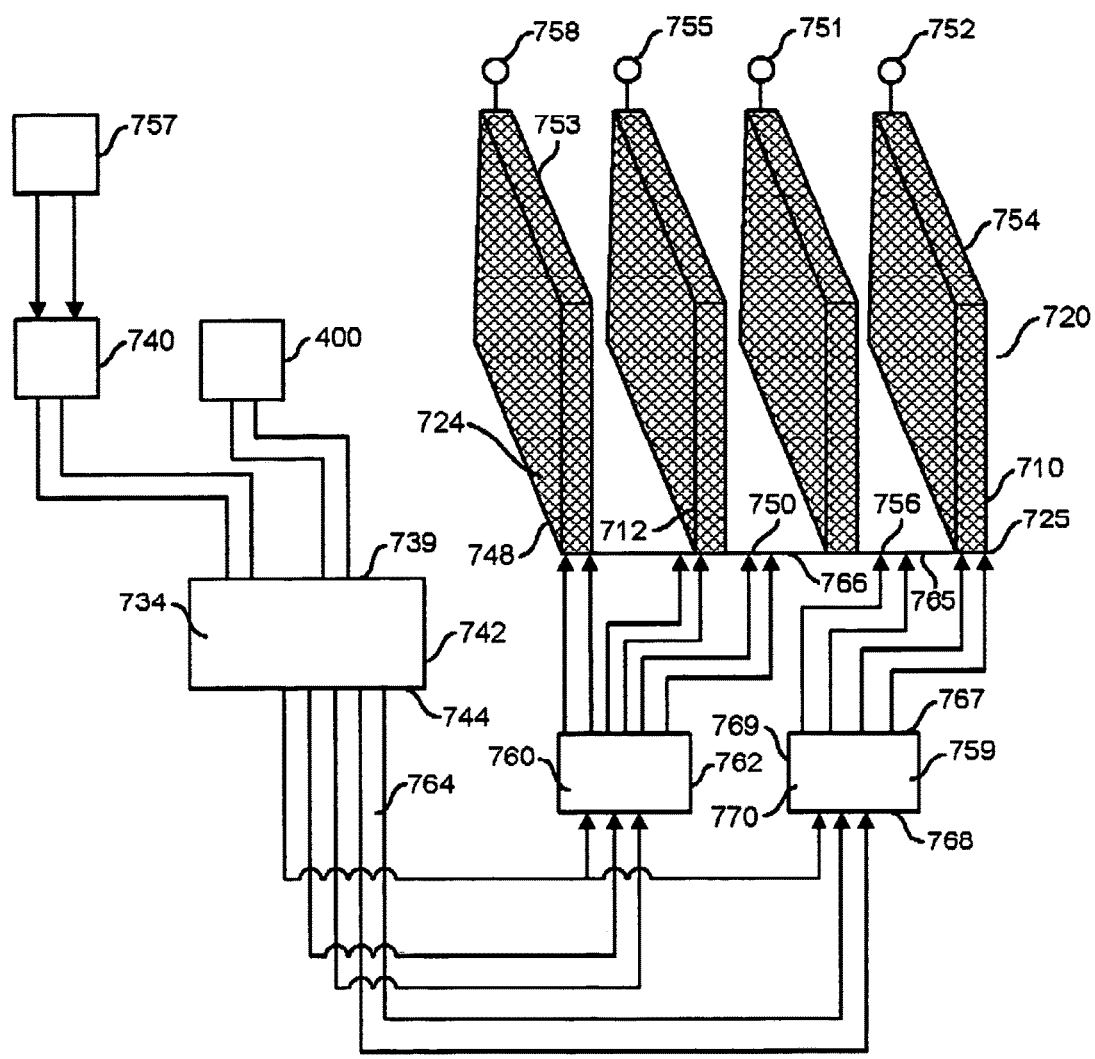
FIG. 16 is seen further exemplary embodiments of communication device comprising energy platform.

The micro-acoustics and micro-optics are further fabricated in a micro-electro-mechanical system and thin film technique to enable the integration of microelectronics circuit and multifunctional sensor into the detection platform for the communication apparatus. Wafer bonding in single crystal silicon is applicable to significantly lower acoustic losses and improve optical properties and energy production. Disclosed embodiments further provide silicon on insulator bonding method having a silicon layer formed on a silicon microfiber oxide film as an insulator film comprising parasitic capacitance being configured for high radiation-proof ability. At least a layer in the substrate surface layer portion comprise a region electrically isolated from the inside of the substrate via oxide film layer to eliminate effects such as a high speed/low power consumption operation and/or prevention of low signal transmission. The substrate further includes single-crystal silicon substrates comprising at least a single-crystal silicon substrate that becomes an SOI layer and/or a bond wafer. Certain embodiments provide the silicon substrate comprising a single-crystal silicon substrate that becomes a support substrate being configured with an oxide film on the surface of at least one silicon substrate microfiber. The single-crystal silicon substrates may be bonded to each other via the oxide film there-between and heat treated to increase bonding strength. Then, a film thickness of the bond wafer is reduced to obtain an SOI substrate Referring to FIG. 16 is seen further exemplary embodiments of communication device including energy medium comprising energy platform. Embodiments further provide silicon-substrate-microfiber comprising energy transmission/storage apparatus 720. Certain embodiments provide data being converted into electrical energy. The data may be derived from at least one of: vibration, pressure force, wind flow, sound waves, force, and electrical properties. The pressure may include pressure force from at least an object. The object may also include human hand being used to operate the communication apparatus 400. The operation of the communication apparatus include keyboards, touch screen, gaming, texting, programming, display/input, output, and normally utilized operations. Disclosed embodiments further provide the silicon-substrate-microfiber comprising charge couple apparatus 740 being configured with miniaturized conduit particles 734. Certain embodiments of the conduit particles 734 comprise of at least glass 739. Other embodiments of the conduit particle comprise of at least Zinc Oxide (ZnO) and/or gold. Some embodiments of the disclosed particles comprise of at least non-ferrous material being alloyed with at least a substrate-microfiber 724.

Disclosed embodiments further provide materials consisting of conduit properties comprising of at least glass fiber 739 being responsive to light data transmission. Further embodiments of the charge particle apparatus 740 comprise electron-silicon substrate-oxide 742 configured with materials being characterized with good optical properties for exhibiting effective sensitivity to electron range. Disclosed embodiments further provide the electron-silicon substrate-oxide 742 comprising coatings to prevent glass-glass interface 744. Certain embodiments comprise the silicon substrate 712, being at least the constituent of glass 739. Other embodiments provide the silicon substrate 712 being layered with fibers 710 to exhibit durability and better charged properties. Certain embodiments provide an energy platform comprising AlN thin film. Disclosed embodiments provide communication apparatus consisting of solar cell methods of generating electrical energy and silicon wafers process of producing a simpler and cheaper alternative green energy communication apparatus. Disclosed embodiments further provide a communication apparatus comprising of direct band-gap semiconductors cadmium telluride (CdTe), copper indium diselenide alloy (CuInSe2) and copper indium gallium diselenide alloy Cu(InGa)Se2, comprising materials with high optical absorption coefficients being applicable for the photo absorption layer in thin film photovoltaic (TFPV) cells for the energy platform.

The electrodes 716 further comprise of battery cells 748. Other embodiments provide the battery cells 748 further include electrolyte 750 comprising of cathodes 751 and anodes 752. The cathodes 751 comprising the oxidized form of the electrode metal and the oxidizations and reductions are controlled by the electrochemical potential being responsive to the thermal expansion, pressure, composition and concentration of the electrolyte 750. The electrical potential differential being produced is the sum of the electrochemical potential at the electrode 716. Disclosed embodiments further comprise of Zinc batteries and/or zinc fuel cells 754 being configured for electrochemical power applications through the oxidation of zinc with oxygen from the air. Embodiments provide a device for exhibiting high energy density. Certain embodiments comprise nano-materials 734 being embedded in the substrate 712 and etched/fused in the microfiber material 710 to provide advanced cell platform 756. Some embodiments of the cell platform 756 are being communicatively connected to the electrodes 716. Other embodiments of the cell platform 756 comprise a battery cell 753. Yet, other embodiments of the cell platform 756 comprise fuel cell 754. Still, other embodiment of the cell platform comprise energy storage medium. Disclosed embodiments further comprise a capacitor and/or a battery cell apparatus for electronic devices.

Yet, some embodiments provide CMOS multiple antenna platforms configured with at least an opened end 755, and at least a shorted end 766 in communication with conductive nano wires 764 forming at least antenna network environment.

Disclosed embodiments provide the cell platform 756 further configured for medical devices applications 757. Other embodiments of the cell platform 756 comprise communication applications 758. Disclosed embodiments further provide the cell platform 756 comprising nickel-cadmium batteries (NiCd) 758 configured with nickel oxide hydroxide and metallic cadmium 760. Disclosed embodiments provide the nickel oxide and metallic cadmium 760 further consisting electrodes 716 being configured for deep discharge applications. Other embodiments provide methods and systems for storing electrical energy, comprising the cell platform 756. The cell platform 756 includes battery and/or capacitor configurations for withstanding higher number of charge/discharge cycles and faster charge and discharge rates. Certain embodiments of the cell platform 756 further comprise an electrode device 762 comprising at least electrically conductive nano wires/tubes 764 being coated with at least one electrically isolating layer 765. Disclosed embodiments further provide nano-wires/tubes 714 764 comprising at least a substrate 712 being coated with at least one metallic layer 760 having a nano-metric pattern thereon, and being at least partially exposed at a tip of electrically conductive core 760. The cell platform 754 further comprises at least plurality nano-wires/tubes 714 764 being configured with flexible electrode devices 762 disposed in a guided re-enforced silicon substrate 712. Other embodiments further provide each electrode device 764 being configured with plurality of micro-wires 734 being connected to at least one nano-wires/tube. The nano-wires/tubes 714 762 further comprise flexible electrode devices 762 being configured to provide electrical communications, video recording, mobile broadband applications, camera/webcam, and television applications.

Disclosed embodiments further provide the cell platform 756 comprising particles of zinc mixed with an electrolyte consisting of at least potassium hydroxide solution. Certain embodiments provide a communication apparatus configured for converting sound waves, solar energy, vibration, and wind into electrical energy. Some embodiments provide oxygen from the air to enable reaction at the cathode 751. The reactions can form hydroxyls, which is being migrated into zinc paste and form zinc oxide hydroxide 734 configured for releasing electrons to the cathode 751. Disclosed embodiments further provide the reactions comprising zinc decaying into zinc oxide 734, the communication apparatus generating electrical energy from sound waves, solar energy, vibration, and wind, in communication with the cell platform 756. The cell platform 756 is being configured so that the sound waves, solar energy, vibration, and wind and hydroxyls from the anode 752 are being recycled for energy production at the cathode 751. The recycling would enable the sound waves, solar energy, heat, vibration, and wind to serve only as a catalyst to effectively produce maximum voltage. Embodiments provide a substrate 712 and microfiber material 710 for the design configuration of the cell platform 756. The cell platform further comprises electroactive material to enable better charge transport. The cell platform 756 further comprise of plurality nano-components consisting of nano-particles 767 forming conductive carbon-based nano-clusters 768 bound together by a conductive carbon-based cluster binder having high densities of mobile charge carriers such as electrons, electronic acceptors, and ionic species. The cell platform 756 further comprises at least a terminal 769, being electrically coupled to the nano-particles 768 for enabling a charge transport being operable for supplying electrons and electron acceptor sites. Other embodiments of the cell platform 756 further comprise charge transport 740, occurring by means of the electron traveling through the highly conductive and short path of the binders 770. Disclosed embodiments provide the binders in close proximity with the nano-clusters 768 for enhancing the energy and power densities. Disclosed embodiments further comprise battery cell and/or capacitor.

Disclosed embodiments provide a radiator apparatus comprising a renewable energy source. Certain embodiments provide communication apparatus comprising solar panels made of crystalline silicon wafers for converting solar energy into electrical energy. Some embodiments provide thinner wafers using laser processing to ablate the circuit board, providing more electrically efficient communication environment for signal amplification. Disclosed embodiments provide the radiator apparatus being further configured with substrate-microfiber and metallic materials to prevent any radioactive or chemical impact within the environment. Disclosed embodiments further provide the radiation apparatus being further configured for extracting energy from the opposing outside wind to be stored within the cell platform. Disclosed embodiments provide methods and systems that don't produce noise and pollution. More electricity could be generated at any time without physically plugging the communication apparatus into a wall socket for recharge, thereby extending the life of the battery.

Figure 17:
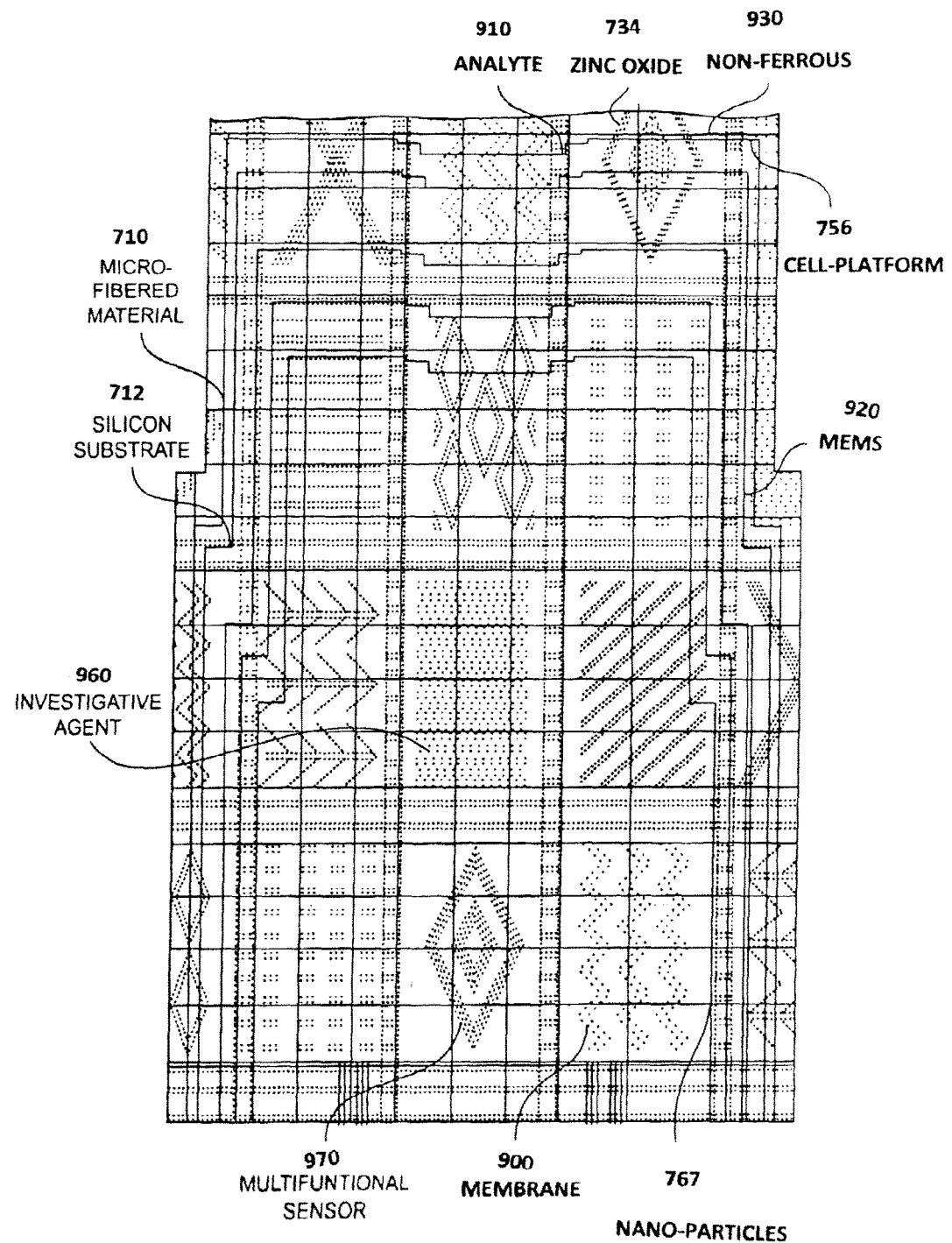
FIG. 17 is an exemplary embodiment of a charge transport comprising microfiber material being configured with silicon substrate.

Referring to FIG. 17 is seen exemplary embodiments of a charge transport comprising microfiber material 710 being configured with silicon substrate 712. The silicon microfiber comprises cell platform 756. The cell platform 756 comprises nonferrous material 930 embedded in the silicon substrate 712. Multifunctional sensors 970, nano-sensors 360, 327 and MEMS 920 are embedded in the silicon substrate for detection of charge characteristics. The cell platform 756 further comprises nano particles 767 being configured with membranes 900. Disclosed embodiments provide methods and systems for generating electrical energy and for transporting the energy into a storage medium. Some embodiments provide zinc oxide 734. Certain embodiments comprise an analyte 910. Other embodiments provide an investigative agent. Embodiments provide a MEMS 2-D scanning micro-mirror with miniature optics and flexible electronics for unrestricted probe movement. Embodiments provide communication apparatus being configured with flexible electronics for unrestricted freedom of movement due to pressure, vibration, and sound waves to generate energy through voltage-transformation circuitry in communication with the battery cells. The platform provides safety into MEMS system to protect consumers from dissipative radiant energy. Certain embodiments provide communication apparatus being operable on low power consumption. Certain embodiments provide highly efficient fiber amplifiers using ultrafast laser technique.

Figure 18:
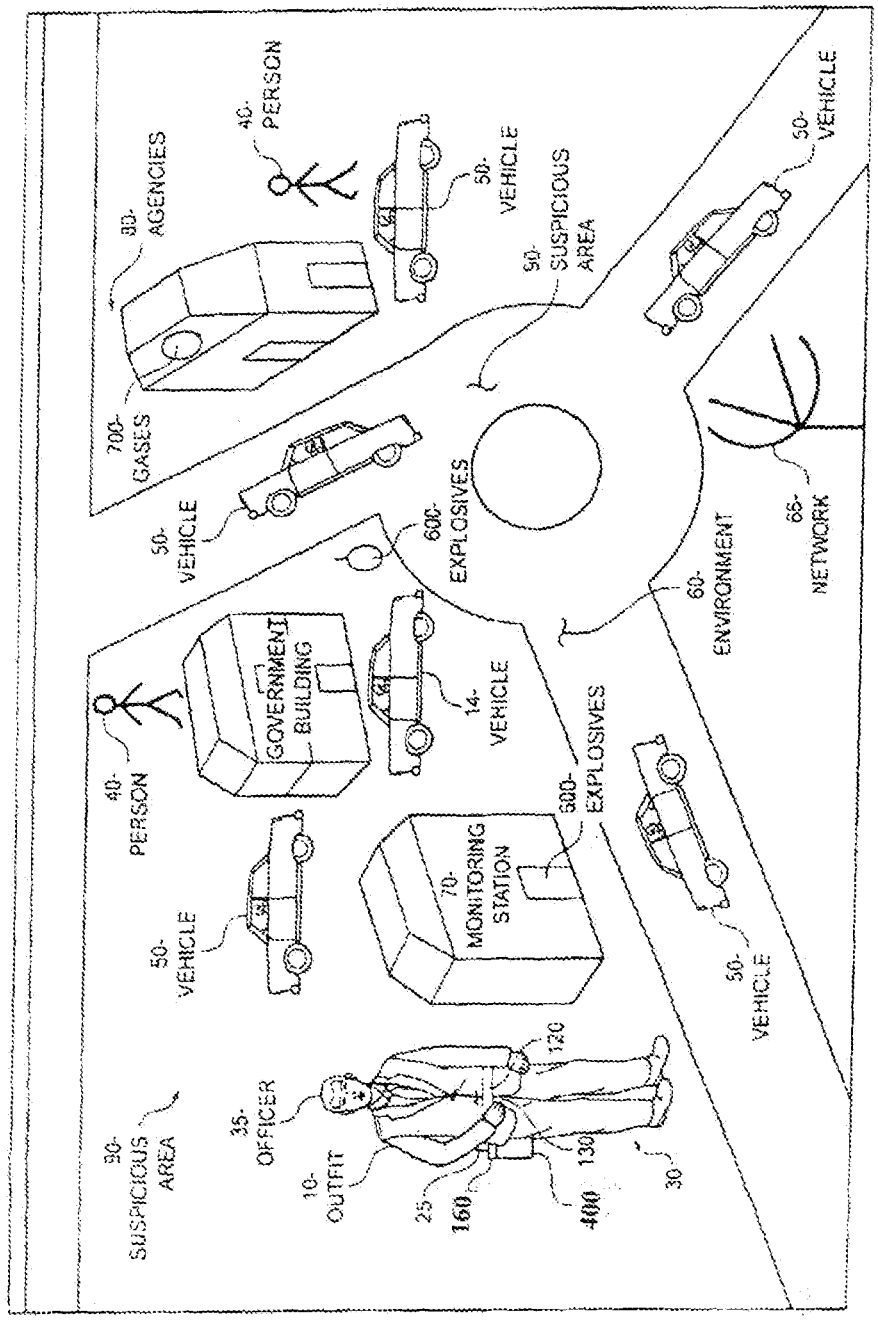
FIG. 18 is seen a communication environment comprising a monitoring station, agencies, and a government building.

Referring to FIG. 18, is seen communication environment 60, comprising a monitoring station 70, agencies 80 and a government building. Vehicles 14 and 50 and at least a person 40 are being watched by an Officer 35 monitoring a suspicious area 90. The Officer 35 is outfitted with certain embodiments of the disclosure, comprising outfit 10 on the officer 35, a communication apparatus 400, communication apparatus 400 being disposed in an outfit 160 operable for housing the communication apparatus, wearable outfit 30, waist belt 120, outfit 160 is firmly secured on the officer's waist by the waist belt 120, and connector 25 being disposed within the waist area 130. Officer 35 is seen to have identified a suspicious person 40 patrolling at least agencies 80. The outfits 10, 30, and 120 are seen to provide exemplary embodiments of detected explosives 600 and gases 700. The communication apparatus 110 is further configured to analyze detections and is in communication with a network 66.

Figure 19:
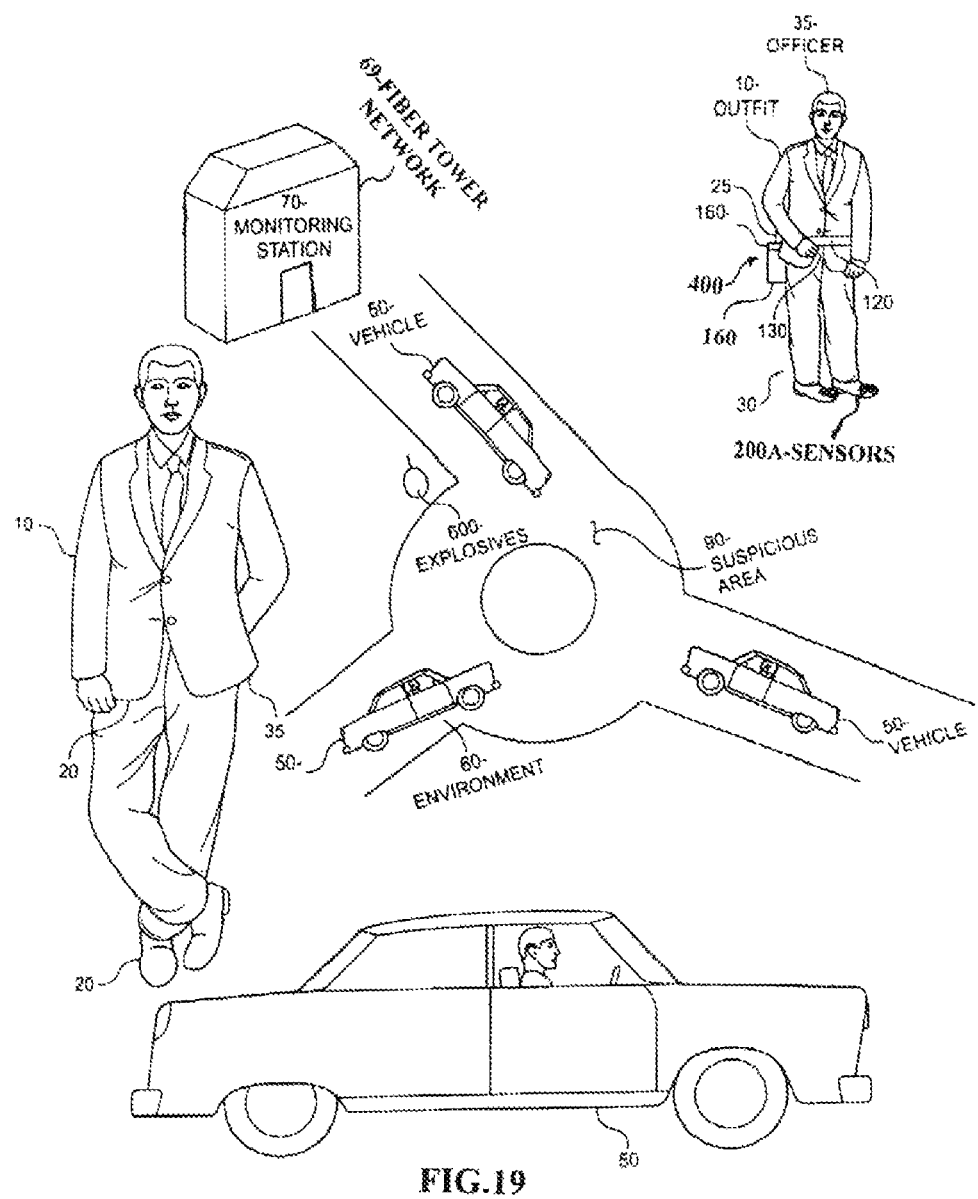
FIG. 19 is seen further embodiment of a monitoring station comprising a fiber tower; network.

Referring to FIG. 19 is seen further embodiment of a monitoring station 70 comprising a fiber tower network. A person 35 is seen wearing a detection outfit comprising of sensors embedded in silicon substrate and fused/etched in a microfiber material, a communication apparatus 400 is disposed in an outfit 160 comprising a housing being secured on the waist area 130 via a waist belt 120 by the person 35. The housing further comprises silicon substrate micro fiber being embedded with sensors operatively configured for generating electrical energy. The communication apparatus 400 is communicatively configured with signal booster operable to prevent cancerous disease and is responsive to network communications with the monitoring station 70 and/or fiber optic tower 69. The communication apparatus is further configured with battery cells responsive to energy being created and responsible for supplemental empowering of the detection platform for the display device. Further embodiment of a person 35 is being disposed with communications apparatus 400. Disclosed embodiments provide the respective person 35 wearing outfits 10, 20, 30, 120, 160 and 130, operable for detecting weapons of mass destructions. The person 35 is communicating with communication apparatus 400 disposed in a vehicle 50 being positioned within an environment 60. The communication apparatus 400 may be configured to detect suspicious area 90 containing explosive 600. A suspicious vehicle 50 is seen to have been detected with weapons of mass destructions.

Figure 20:
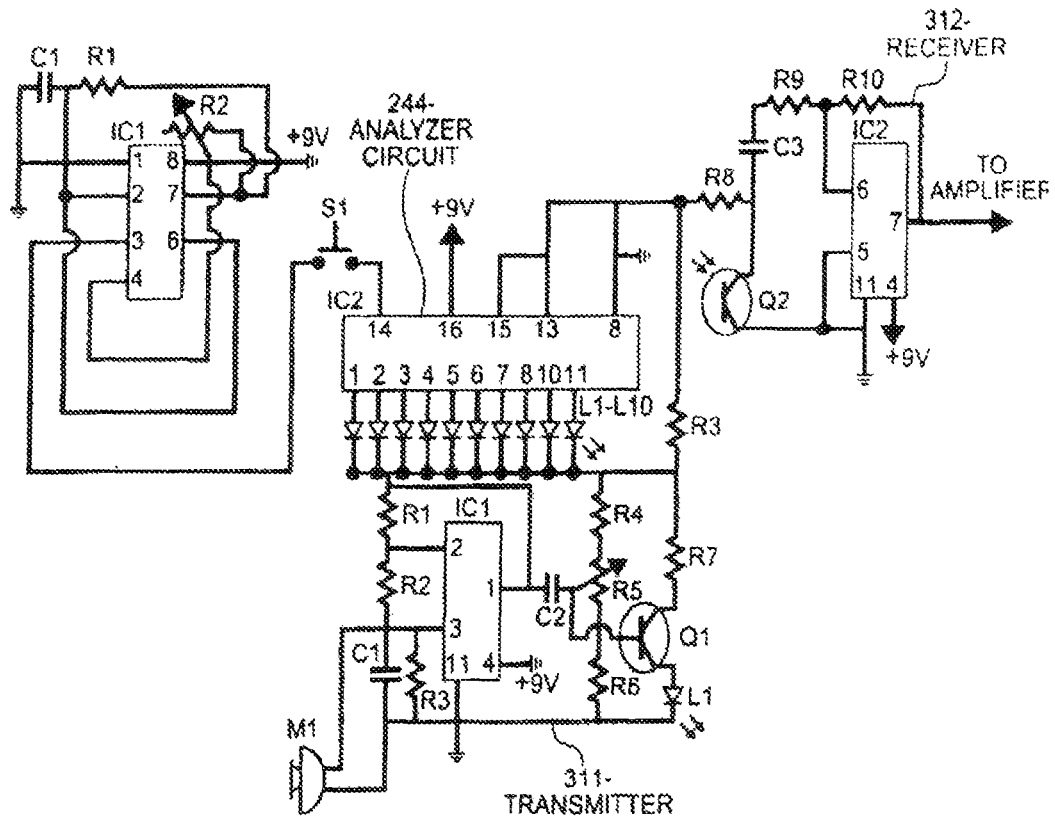
FIG. 20 is seen a transmitter being configured with energy apparatus comprising a battery cell which may be charged wirelessly.

Referring to FIG. 20, the transmitter 242 is configured with energy apparatus comprising a battery cell which may be charged wirelessly. An amplifier is configured with the communication apparatus for amplifying signal communications. Transmitter 311 and receiver 312 are communicatively connected. Transmitter 311 and receiver 312 are communicatively connected to analyzer circuit 244. The CMOS circuitry is operable to dissipate less power. Certain embodiments of the disclosure further provide a static logic configuration being operable on p-type and n-type metal-oxide-semiconductor field-effect-transistors "MOSFET's." being configured for implementing logic gates.

Figure 21:
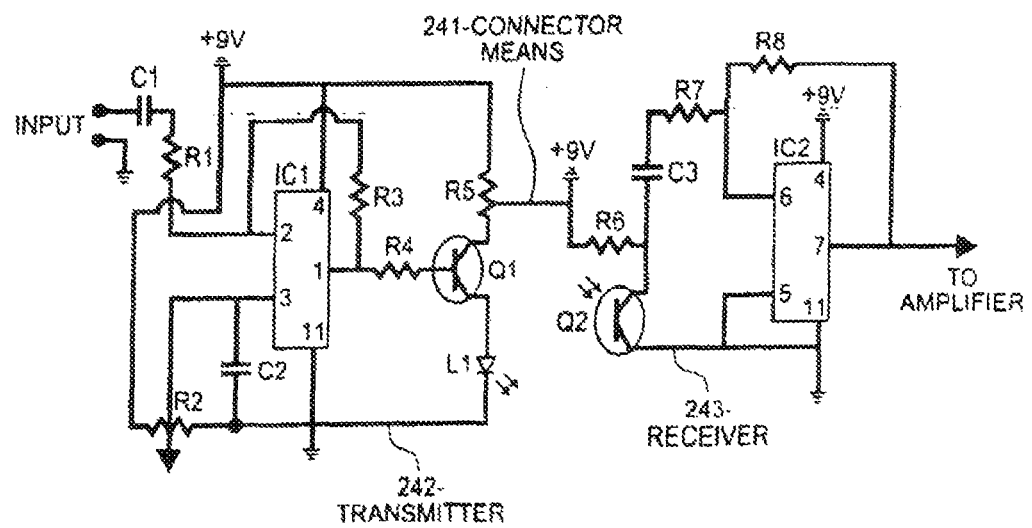
FIG. 21 is seen a transmitter and a receiver being configured with energy aaratus comprising a batten cell which may be charned wirelessly.

Referring to FIG. 21 is seen an exemplary embodiment of a transmitter 242 and 311, and a receiver 243 and 312. The amplifier is seen responsive to signal communications. Transmitter 242 is operatively configured with receiver 243 and communicatively connected to connector beam 244 responsive to communication network connections. The amplifier comprises a chip communicatively connected to receiver 243 and operatively configured with transmitter 242. The transmitter 242 and 311, and the receiver 243 and 312 comprise CMOS comprising of solar cells on n-type CZ silicon substrates, including Polycrystalline thin-film cells, lightly boron-doped CZ, or gallium-, indium-, and aluminum-doped CZ for converting solar energy, pressure force, sound wave, vibration, wind force into electrical energy. Disclosed embodiments further provide a thin-film comprising of thin layer of transparent conducting oxide, including tin oxide. Certain embodiments provide the oxides being highly transparent and configured to conduct electricity efficiently. Some embodiments provide antireflection coatings.

Other embodiments provide Polycrystalline thin-film cells comprising tiny crystalline grains of semiconductor materials operable for converting solar energy into electrical energy. At least a CPU-1C1 is provided in communication with RFID chip reader-1C2. L1 and L2 are LED. S1 is an automatic momentary single pole double throw switch operative for transmitting and for receiving signals. C1 is an electrolytic capacitor being disposed on an energy platform comprising C2 and C3, which are IMF capacitors. Q1 and Q2 are infrared LED emitter and M1 is a speaker microphone. R1 through R10 are resistors responsive to signals. Disclosed embodiments provide a digital signal processing system which allows reconfiguration of signal transmission to the environment and signal conditions. At least the antenna is developed for electrical operation, which can be reconfigured in terms of frequency and may also increase or decrease its directivity. The increase and/or decrease of signal directivity is a measure of the gain of the antenna in a particular direction. Disclosed embodiments provide the communication apparatus being configured with the antenna to operatively pick up faint signal by increasing its gain or overcome interference by creating a null point. Certain embodiments provide a smart communication apparatus being configured for any given network or environment. Some embodiments provide a miniaturized adaptive micro antenna in communication with at least a chip being configured for signal amplification and to minimize interference and maximize intended signal reception. Disclosed embodiments provide signal booster chip comprising of at least a MEMS, in communication with a logic circuit. The MEMS further comprises MEMS based phase shifters being configured on at least a single silicon substrate microfiber comprising communication control circuitry. The sensors are being coated with silicon substrate polymer and/or with zinc oxide layer to provide energy transport platform. Certain embodiments provide communication apparatus comprising silicon substrate microfiber configured with optical properties of thin films being operable for the advancement of the integrated circuit for converting solar energy into electrical energy. Disclosed embodiments further provide smaller feature sizes, faster switching speeds, and lower power consumption apparatus. Some embodiments provide basic wiring such as dielectric and photolithographic layers, providing a circuit for electrical energy production. This integrated circuit could employ copper/low-k interconnects, silicon-germanium and silicon on insulator-based transistor structures. Infrared spectroscopy is provided and offers metrology approach to sensing through the display/input device/outfit, complementary to UV-VIS techniques that provide excellent sensitivity to layer composition, including chemical bond densities and free carriers with the enhanced immunity to roughness induced scattering.

Figure 22:
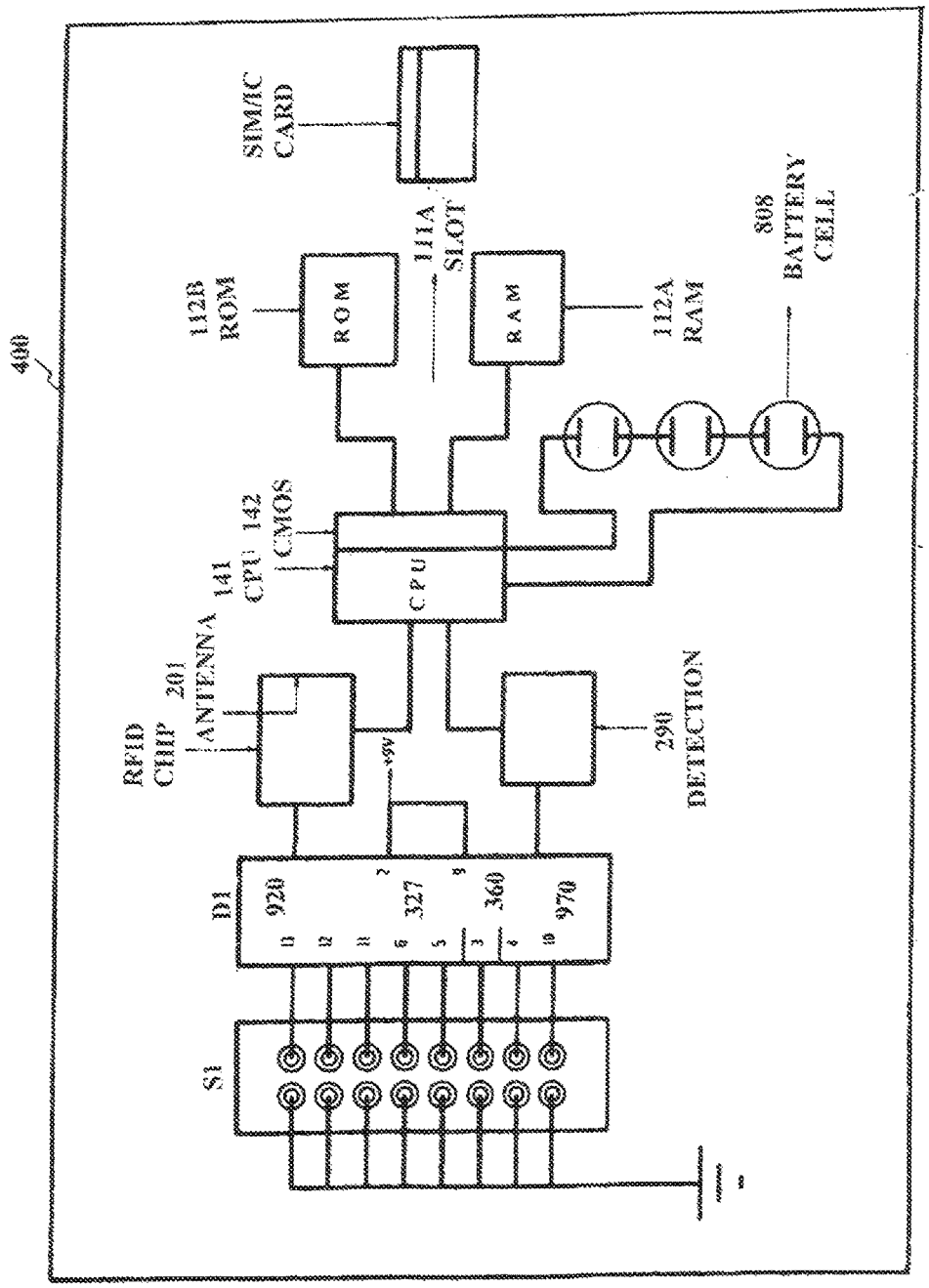
FIG. 22 is seen an embodiment comprising the circuit diagram of the communication apparatus, including a privacy indicator.

Referring to FIG. 22 is seen an embodiment of the circuit diagram of the communication apparatus comprising a privacy indicator. Switch (S1) is communicatively connected to RFID CHIP for signal amplification. Certain embodiments provide a common node display (D1) comprising touch screen operatively configured with multifunctional sensors 970. The display device is further operable for generating energy. RFID CHIP is operatively configured with antenna 201. A CPU 141 is operatively configured with detection device 290 communicatively connected to at least a CMOS 142. The detection device is responsive to detection signal communications and operatively connected to a battery cell 808. The communication apparatus 400 further comprises an IC and/or SIM card slot 111A comprising SD card slot and/or HDMI/USB ports. Embodiments further provide user identification card 112. The communication apparatus 400 comprises operating system consisting of software operatively configured with ROM 112B to read the ID card 112. The ROM 112B is communicatively configured to provide communications to the RAM 112A. The RAM 112A is responsive to communication database 113 where information may be stored or retrieved. A screen read-out 113A is provided configured with the communication apparatus. An 8-pin privacy indicator switch (S1) is operatively configured with the communication apparatus 400 and responsible for providing private communications. Switch (S1) comprises of display selections corresponding to cathode A, cathode G, and cathode D of at least a 7-segment common anode display settings (D1). Chip 200a comprises a detection tool responsible for providing communications to at least a network. The IC and/or SIM card 112 is further operable with the communication apparatus 400, comprising wireless communication applications in communication with a software program.

Figure 23:
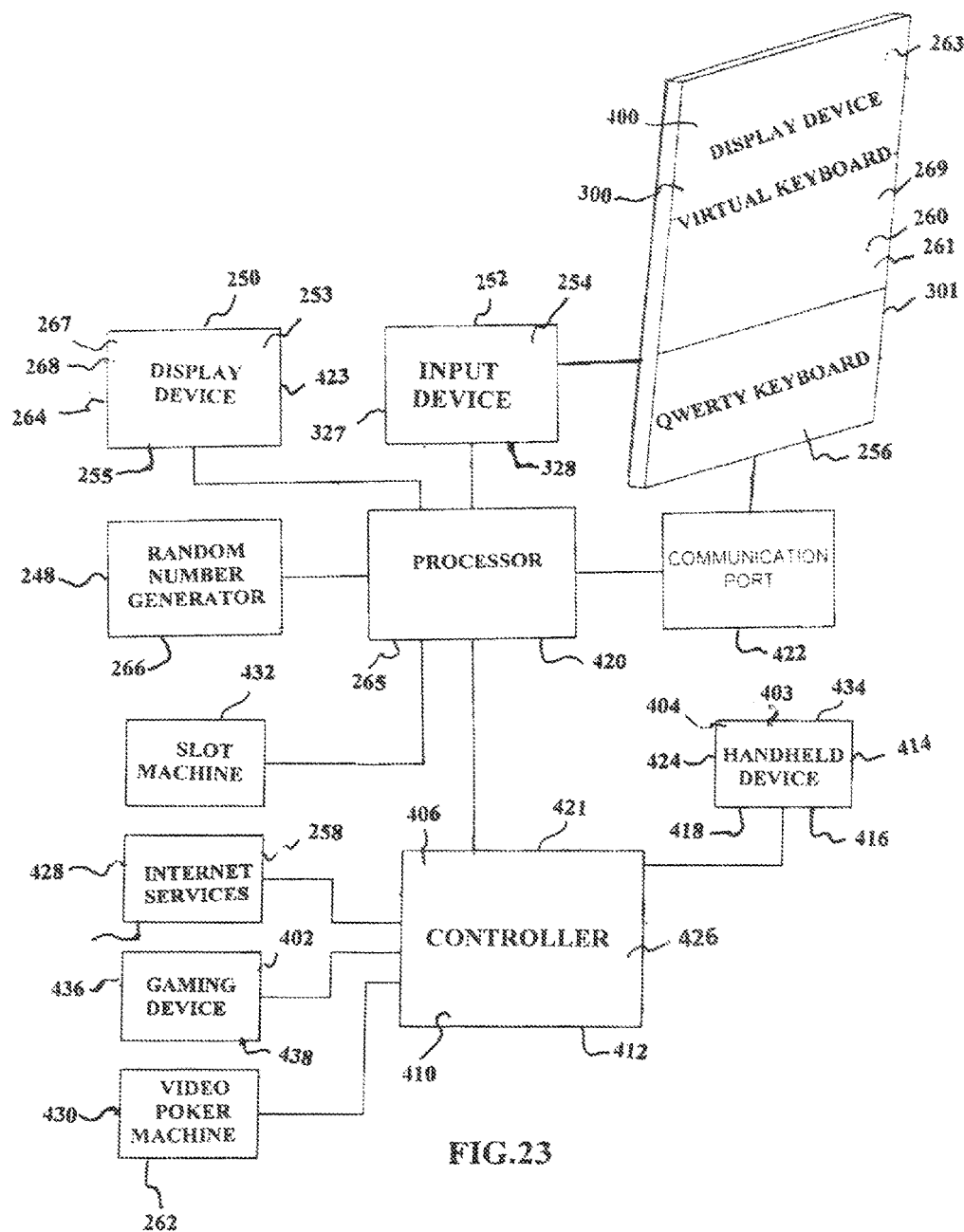
FIG. 23 is seen further exemplary embodiment of the communication apparatus comprising at least an input device, including a keyboard.

Referring to FIG. 23 is seen an exemplary embodiment of the communication apparatus. The communication apparatus 400 comprises at least an input device 252, including a keyboard 254. The keyboard 254 may consist of a virtual keyboard 255 and/or QWERTY keyboard 256 in further communication with a random number generator 248. At least a social network application 258 is configured with the keyboard and in communication with the processor 420. Disclosed embodiments further provide the keyboard being disposed on an LCD display screen 260 being configured with sensors 327 operable for object recognition. Certain embodiments provide the sensors 327 being configured for video recognition 262. Some embodiments provide the communication apparatus configured with a display device 260 operable with at least an activation button 264 configured for at least one of: phonebook 266, calendar 268, dictionary 267, calculator 265, and camera 263. Disclosed embodiments further provide the communication apparatus further comprising at least one of: a mobile communication device 400, a gaming device 402, a media device 403, and an interface device 404. Disclosed embodiments provide the interface device comprising at least an integrated phone/PDA 400 being configured with integrated connectivity apparatus 406 operable to provide global roaming. At least a communication port 422 is provided with the communication apparatus 400. Certain embodiments of the disclosure provide the communication apparatus comprising a GSM phone 400 being operable on plurality microprocessors 420. Certain embodiments provide the communication apparatus being operable to allow multiple inputs/outputs 252. Some embodiments provide the communication apparatus comprising a touch interface 261 operable on a touch screen 260 configured for at least one of: interactive communication, interactive gaming, music, video, and phone book.

Yet other embodiments provide the communication apparatus being configured with at least a slider 253 operable to access multimedia buttons and/or numeric keypads being configured with piezoelectric sensors 327. The piezoelectric sensors 327 further comprise crystals 328 configured to provide voice operations and/or voice over text applications. Disclosed embodiments provide the communication apparatus being configured with voice over text technology operable to provide hands free texting applications while driving. Still, other embodiments provide a communication apparatus comprising of carbon fiber 408 and/or silicon substrate microfiber consisting of resistive touch screen 260 and/or character recognition 269 and/or a communication board 300. Certain embodiments provide housing 301 for the communication apparatus 400 comprising a carbon fiber 408 and/or a silicon microfiber. Disclosed embodiments further provide a communication apparatus being configured with at least a WAP browser 410 and/or an integrated GPS device 412 and/or an MP3 music device 414 and/or a camera apparatus 416 and/or an internal antenna apparatus 418 being configured with a controller 421 in communication with a predictive text messaging applications 423. Certain embodiments provide the communication apparatus 400 being configured with at least one of: infrared sensor 326, calendar 268, FM radio 424, Bluetooth technology 426, and GPRS Internet services 428. Disclosed embodiments further provide the communication apparatus 400 comprising a video poker machine 430 and/or a slot machine 432, and/or a handheld device 434 and/or a gaming device 436 and/or a play station 438 in communication with communication port 422.

Figure 24:
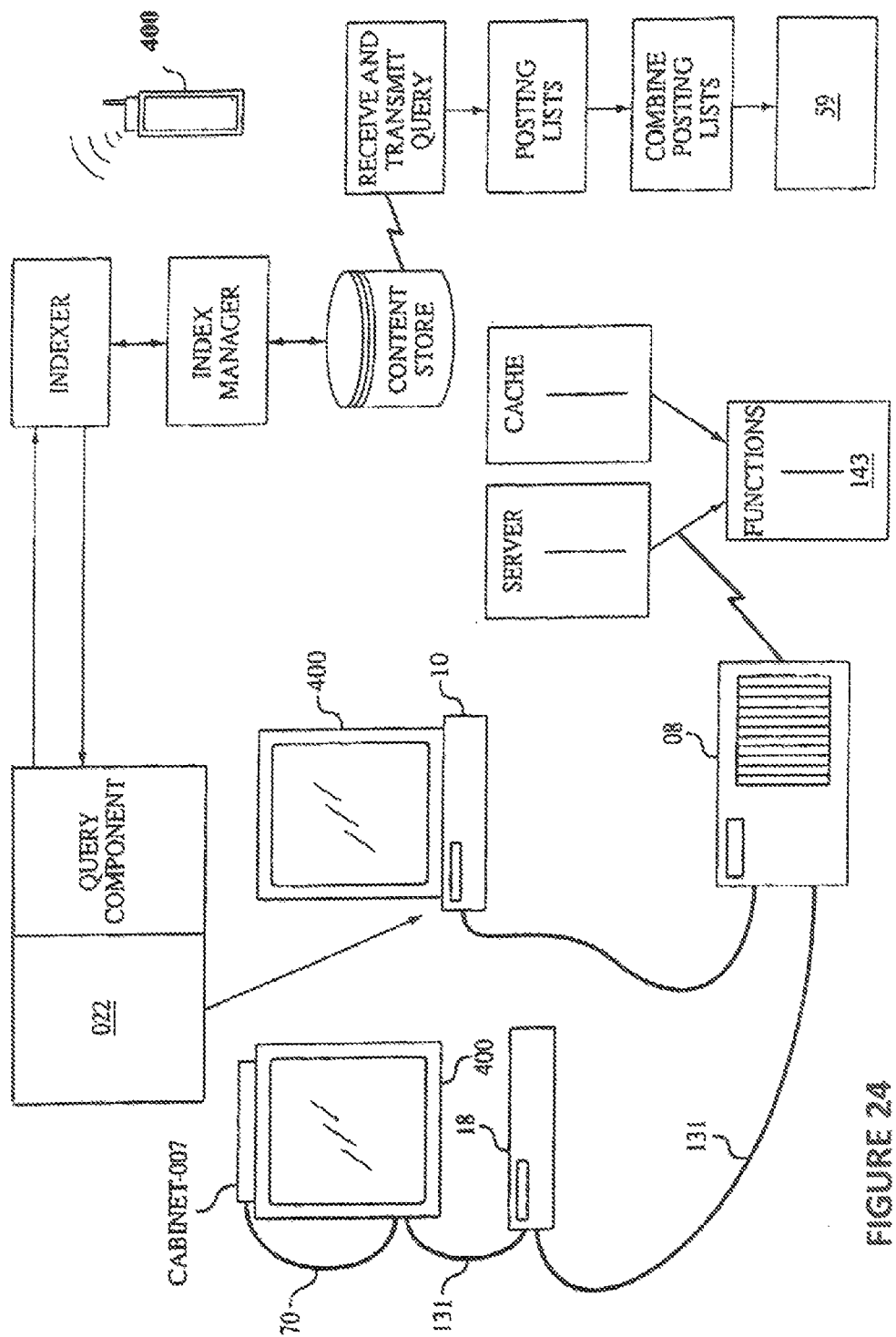
FIG. 24 is seen an exemplary embodiment of a network environment in association with the communication apparatus in communication with an output device.

Referring to FIG. 24 is seen an exemplary embodiment of a network environment, comprising a communication apparatus 400 in communication with an output device 70. The communication apparatus further comprise a computer system 10 being configured with a readout tool 008 in communication with an address book 131. A network terminal 022 is provided in communication with a query component. The query component is configured with an indexer in communication with an index manager. Embodiments further provide a network environment comprising a server and a cache engine in communication with functions 143. The functions 143 further include social network environment being operable to receive and transmit communications to at least one of: a memory, a cabinet 007, and/or a content store.

Certain embodiments provide the communication apparatus comprising a memory consisting of a content store in communication with an input device. The input device is further operable to receive and transmit query, and in communication with posting lists and/or combine posting lists. At least a display adaptor is communicatively connected to the posting lists.

Figure 25:
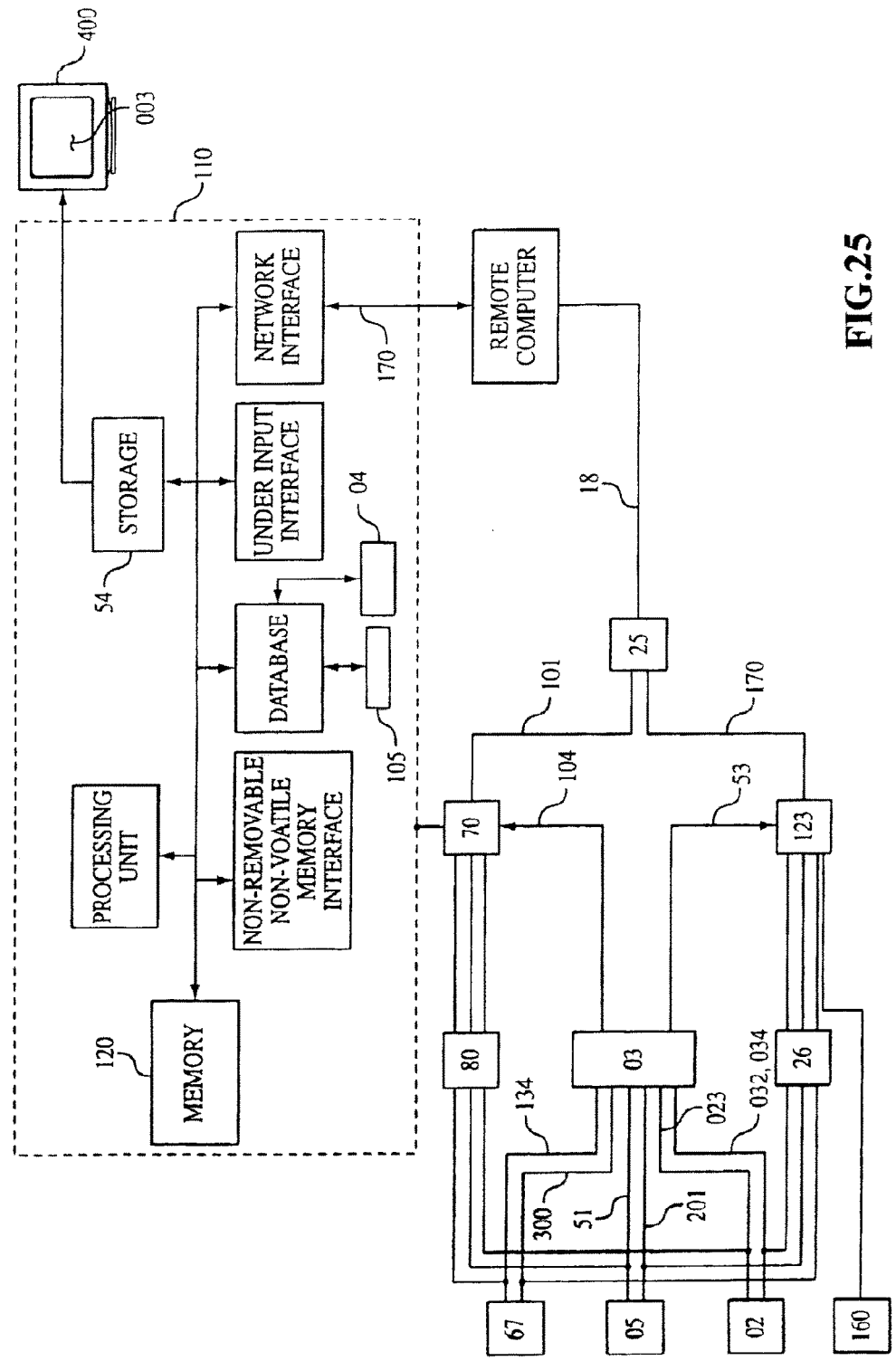
FIG.25 is seen further exemplary embodiments of the communication apparatus in a structured environment.

Referring to FIG. 25 is seen further exemplary embodiment of the communication apparatus 400 comprising, storage medium 54, a processing unit 122 in communication with a memory device 120. Disclosed embodiments further provide a non-removable non-volatile memory interface, a database, input interface and network interface 170. Certain embodiments provide a communication apparatus comprising hardware 105, a graspable hardware/browser 04, and a display device 003. Other embodiments provide a communication apparatus 400 comprising software 300, central processor 51, a RAM 05, a ROM 02, a network adaptor 160, and a media device 201. Disclosed embodiments further provide a communication apparatus 400 comprising at least an output device 70, a remote computer in communication with a connection key 25. The connection key is further in communication with industrial files 18, network files 110, decision engine 123, graphic user interface 101, sensors 104, and system memory 53. Certain embodiments provide a communication apparatus being further configured with system bus architecture 67 in communication with an input device 80. Some embodiments provide the output device 70 further comprises a report generator 134 in communication with an instruction program 26. At least a CPU 03 is provided, in communication with a java class 023, a clickn Vest Servlet class 032, and a Servletrunner application 034.

Figure 26:
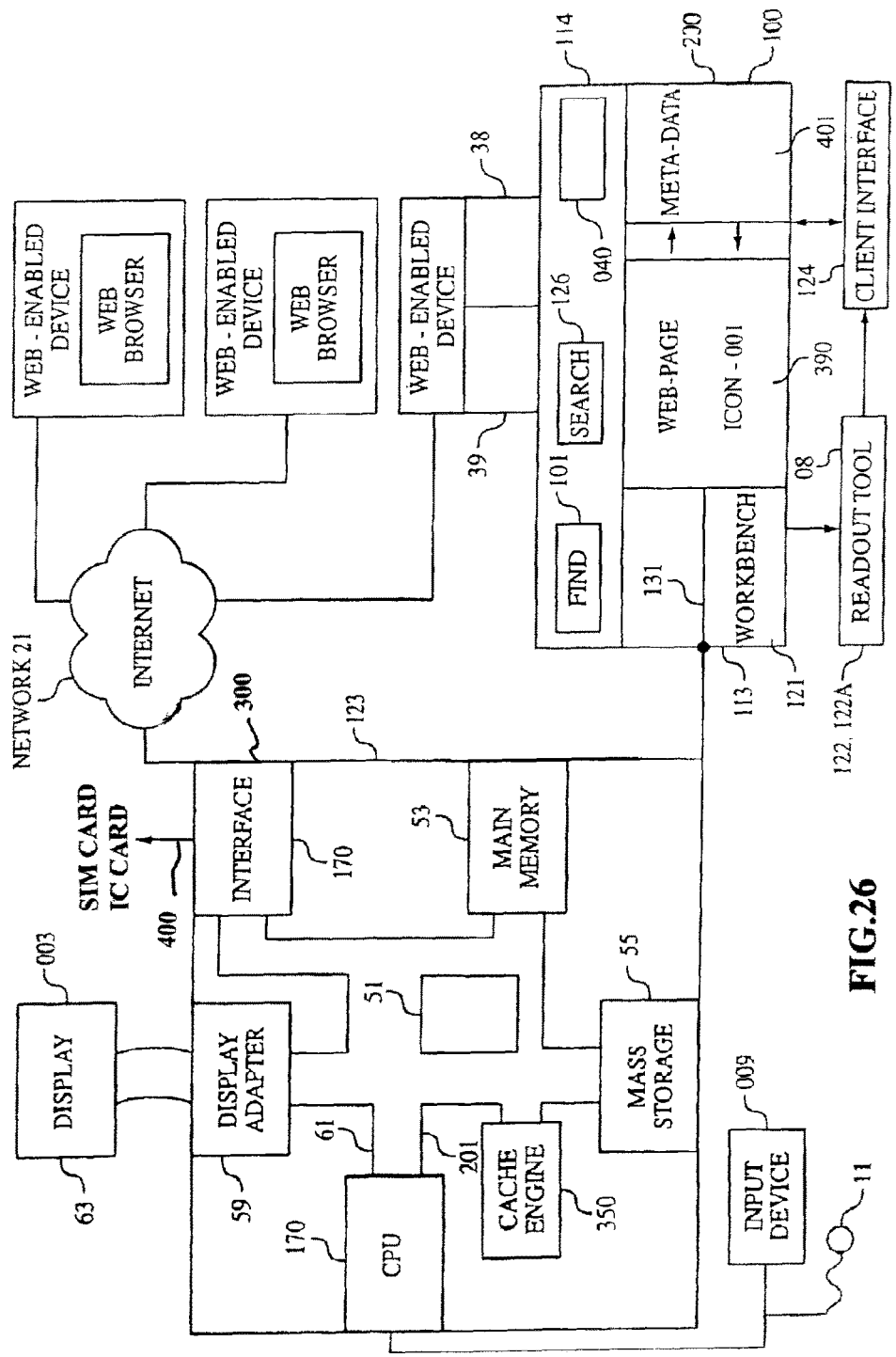
FIG. 26 illustrates further exemplary embodiment of the network comprising multiple computer system configured for Internet applications, further includes a decision engine, a wireless device and a server system for the network.

Referring to FIG. 26 is an illustration of a network environment comprising a communication apparatus 400 in communication with a computer system comprising a display device 003, a sound card 61, speakers 63, a cache engine, a network interface 170, a display adapter 59, intelligence logic 350, a media device 201, and a central processor 51. The communication apparatus further include an input device comprising at least a keyboard 009 and a mouse 11. The communication apparatus further include an IC card, SIM card, and interface. The CPU is operable with the intelligence logic to process commands and applications, in communication with memory 53, decision engine 123 and web-enabled devices. The network 21 is responsive to communications through the Internet. Certain embodiments provide a communication apparatus being configured with a browser, a server search report 39, and client search programs 38. Disclosed embodiments further provide a communication apparatus configured with graphic user interface 101, a search program manager 126, a browser 040, an ICON 001, and a storage medium comprising at least a meta-data 114. At least a web-page manager is provided comprising addresses 131, corporations 200, industries 100, schools and ware houses 121 and a workbench 113. The computer system further comprises an affinity analyzer 122, a data analyzer 122A, a readout tool 08, a web-page 390, a report generator 124, files 401, and client interface being operable with software application 300.

Figure 27:
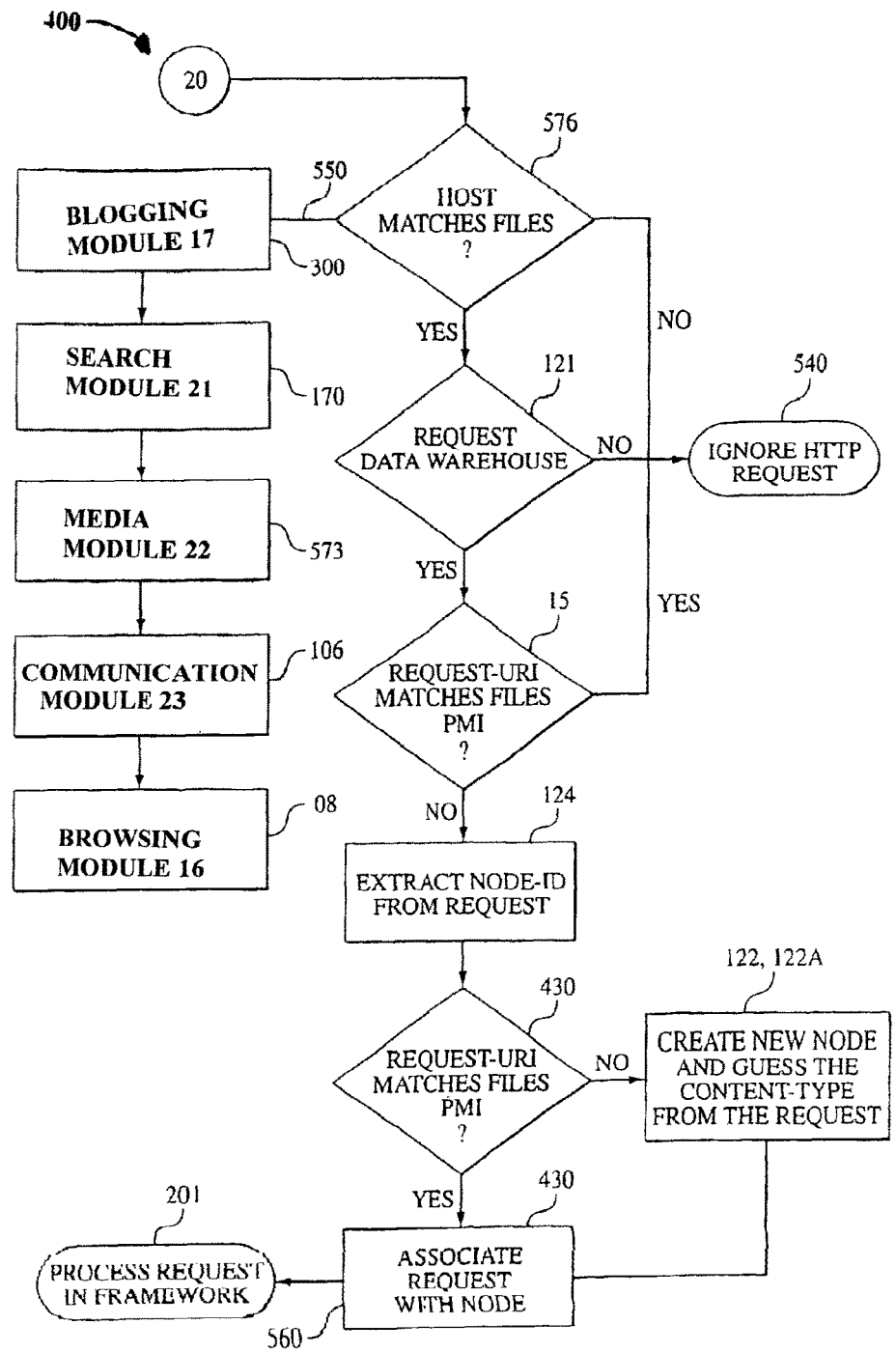
FIG. 27 is an exemplary embodiment of intelligence logic for the communication apparatus, comprising a blogging module configured with the session layer and software.

Referring to FIG. 27 is an illustration of the intelligence logic for the communication apparatus 400, comprising a blogging module 17 configured with the session layer 550 and software 300, a search module 21 in communication with network interface 170, a media module 22 configured with signal booster chip 573, a communication module 23 in communication with signal booster chip 573 and antenna circuit 106, and a browsing module 16 in communication with a readout tool 08. At least a file memory is provided in communication with the software 300. A data warehouse 121 is communicatively connected to the search module 21 being configured with a primary memory interface "PMI" in communication with primary programs 15. Disclosed embodiments further provide a communication apparatus configured with a client identification node "ID NODE" in communication with affinity analyzer 122 and data analyzer 122A. The media module is communicatively connected to the media device 201, and the search module is communicatively connected to HTTP report generator 124 in communication with presentation layer 540. Some embodiments provide a communication apparatus configured with a default gateway 430 in communication with a transport layer 560. Certain embodiments provide the communication apparatus being operable on an energy platform 576.

Figure 28:
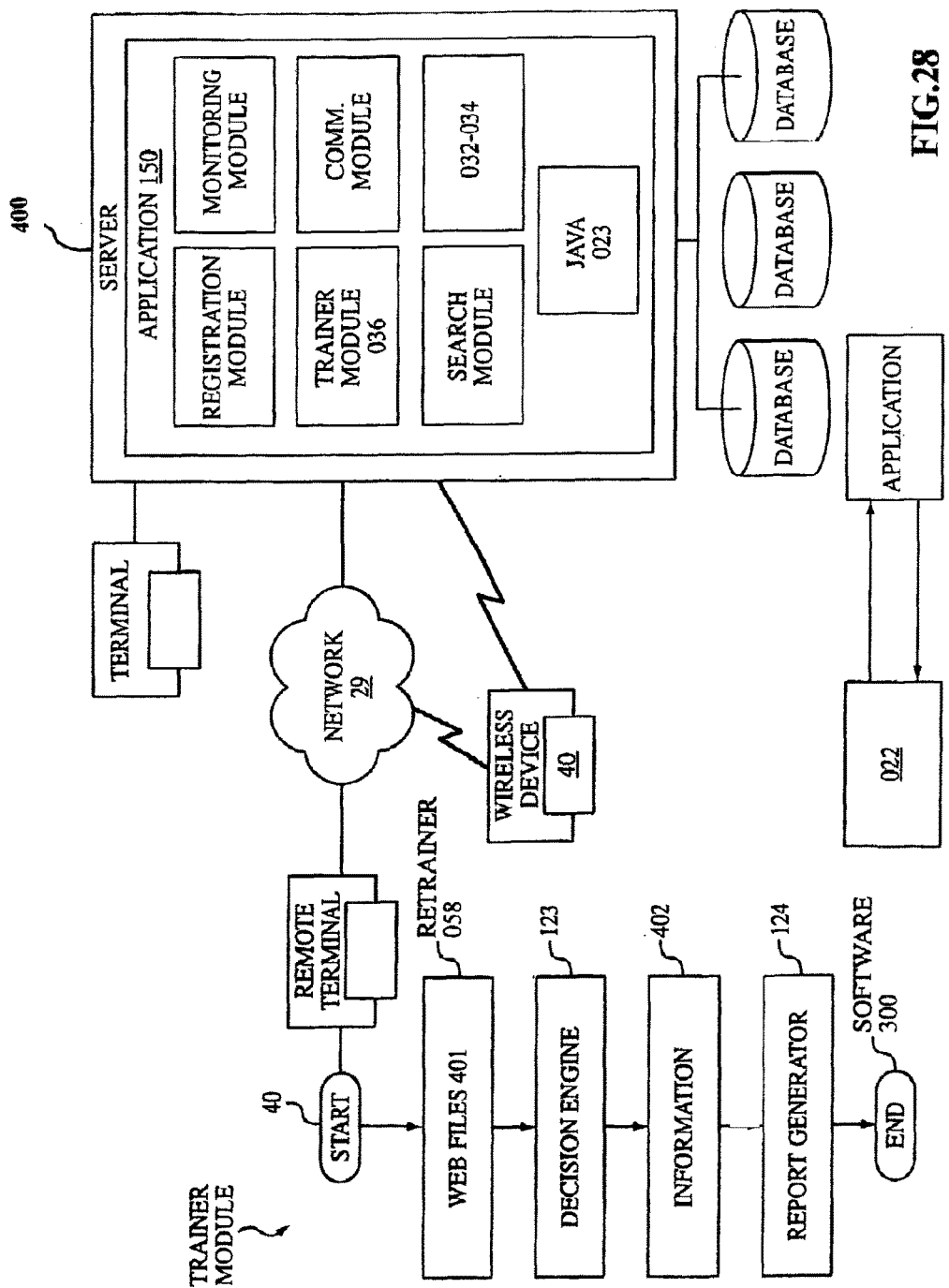
FIG. 28 Illustrates an exemplary embodiment of a system for the network environment, comprising web-enabled devices in communication with the centralized transportation vehicle.

Referring to FIG. 28 is a further illustration of the communication apparatus 400 in a network environment 29, comprising at least a server application 150. The server application 150 further includes at least one of: a registration module, a monitoring module, a trainer module, a communication module, a search module, and/or java application software 023. Certain embodiments provide the java application software 023 in communication with a database server. Disclosed embodiments provide the communication apparatus further comprises ports and/or terminals comprising a network terminal 022 in communication with at least an application. Certain embodiments provide the communication apparatus being turn on by at least a start button in communication with at least a control device 40. Other embodiments provide the control device 40 comprising a wireless device communicatively configured for communications with remote terminals. Disclosed embodiments further provide a communication apparatus comprising at least one of: report generator module 124, information module 402, retrainer module 058, web-files module 401, a clickn Vest Servlet class 032, and a Servletrunner application 034, and/or a decision engine.

Figure 29:
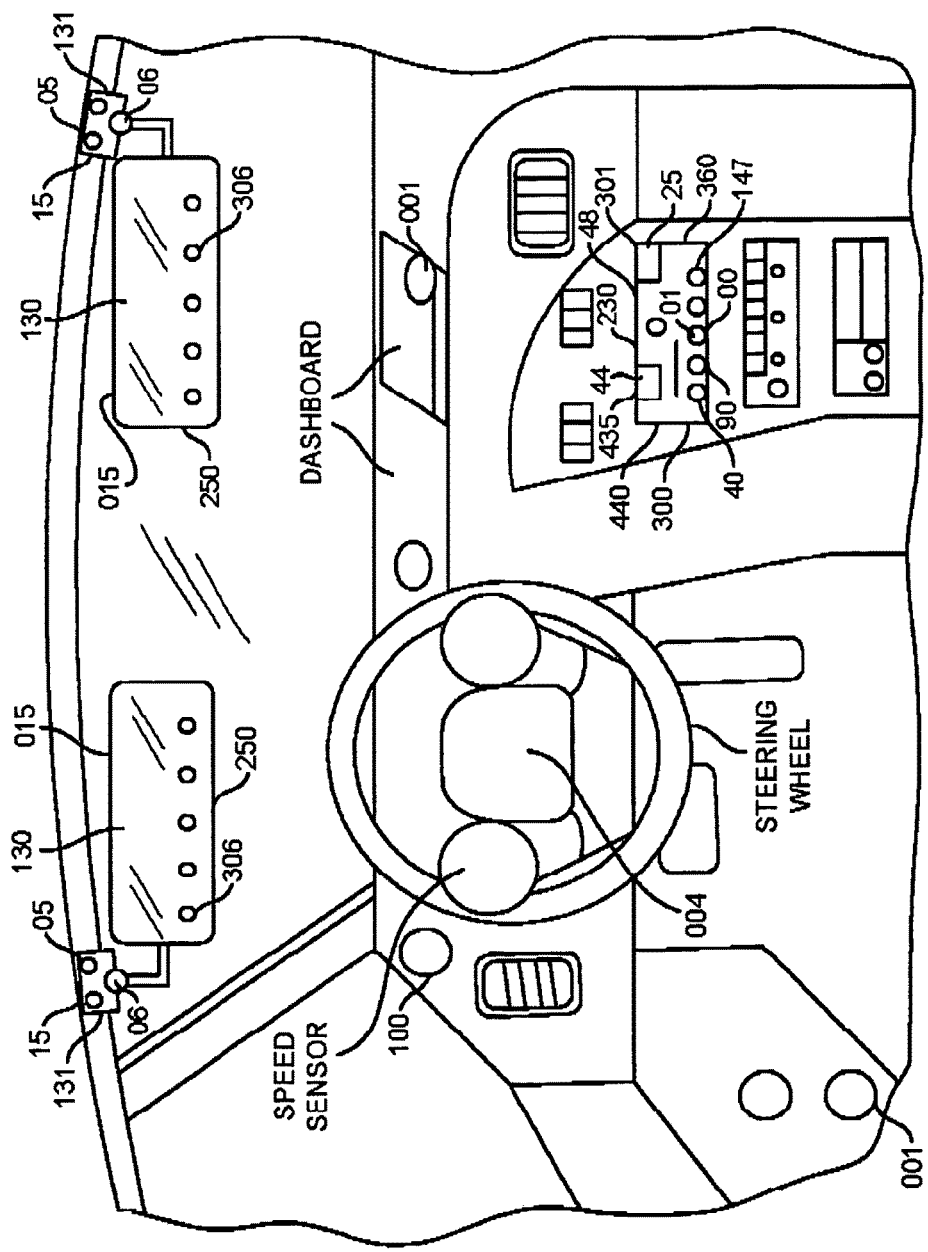
FIG. 29 is an exemplary embodiment of the megatel device, the monitor screen, the speaker means and the steering wheel, seen mounted in locations common to normal vehicle operations.

Referring to FIG. 29 is seen an exemplary embodiments of a communication apparatus comprising entertainment means, a radio means, a cell phone means, a paging means, an Internet means, a sun-visor monitor screen means. Embodiment transmits and receives signals in relation to responding to a wireless communication through the megatel device 300, further comprises a hand's free device being operable for safer cell phone communication through a media and radio device. Embodiment further provides a vehicle 700 being disposed with a media device 300 comprising a body 301 comprising at least one of: a cassette player 435, a CD player 440, an input device 230, and a phone slot 25. The media device being operatively configured with a control device 40 comprising at least one of: various mode buttons 90, Internet button 00, self-test button 44, a base sensor 360, a send button 48, an input/output terminal 01, and a signal booster 147. The signal booster 147 is operatively connected to antenna apparatus 100. Embodiment further provides a control device being operable on a sun-visor screen 130. The sun-visor screen 130 further comprises at least one of: a mirror case 15, a cover 015, a sun-visor base 131, a monitor 250 being interactively operable, a microphone 306, and a speaker 001. The sun-visor may be operable on a mounting base comprising at least a ball joint 06. The speakers 001 could also be disposed on a steering wheel 004. Certain embodiment provide a communication apparatus consisting of sensory platform on a screen apparatus comprising a display device configured with touch screen methods comprising graphical user interface operable for determining commands.

Figure 30:
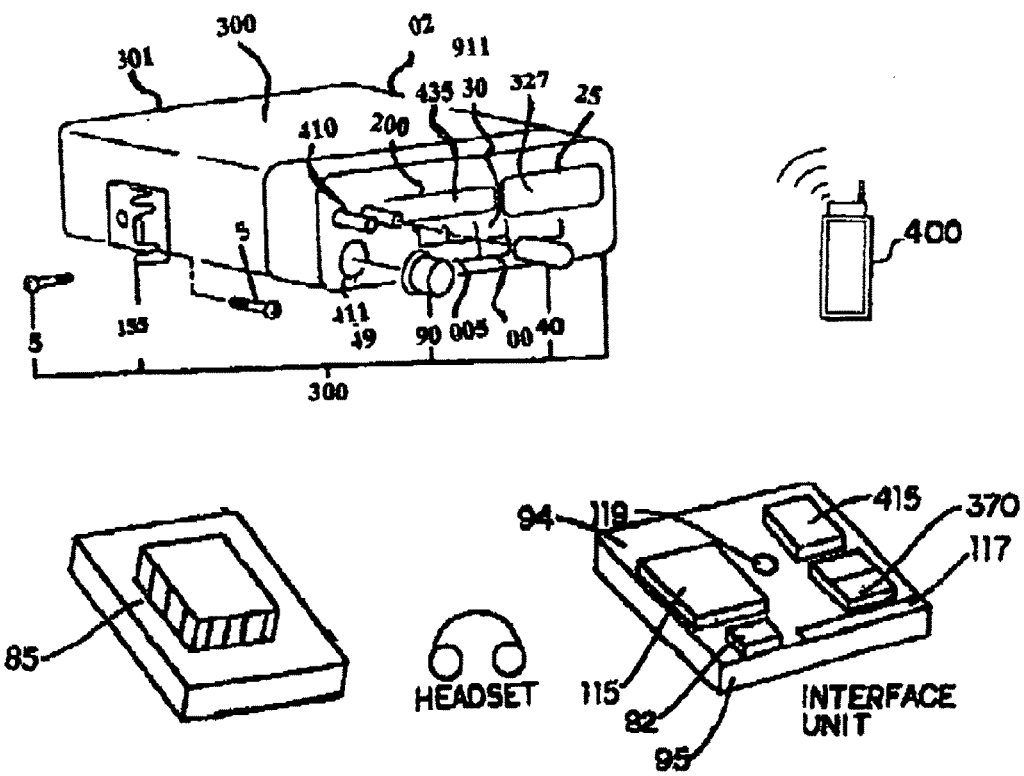
FIG. 30 is an exemplary embodiment of the interface unit for the media device and the cell phone device seen configured with the microprocessor, the megatel, the cell phone being configured with a metal base sensor.

Referring to FIG. 30 is seen an exemplary embodiments of the communication apparatus comprising a cell phone 400 in wireless communication with the media device 300. The media device 300 comprises a body 301 being supported by at least a mounting bracket 155 and secured by at least a fastener 5. The media device further comprises a radio device 410, input/output terminals 02, 911 emergency buttons 30, at least a 411 information button 49, various mode buttons 90, a push button for 005, Internet button 00 and at least a control device 40. The media device further comprises a player 435, a sensor 327, and a phone slot 25 being configured with the sensor 327. The cell phone is being operable on a circuit board 94 comprising a microprocessor 85, an interface unit 95, at least one of chip 119, 115, 117, and 370. At least a detector 82 is being operable with at least said one chip. A headset is operatively configured for communication with the cell phone 400 and/or the media device 300.

Figure 31:
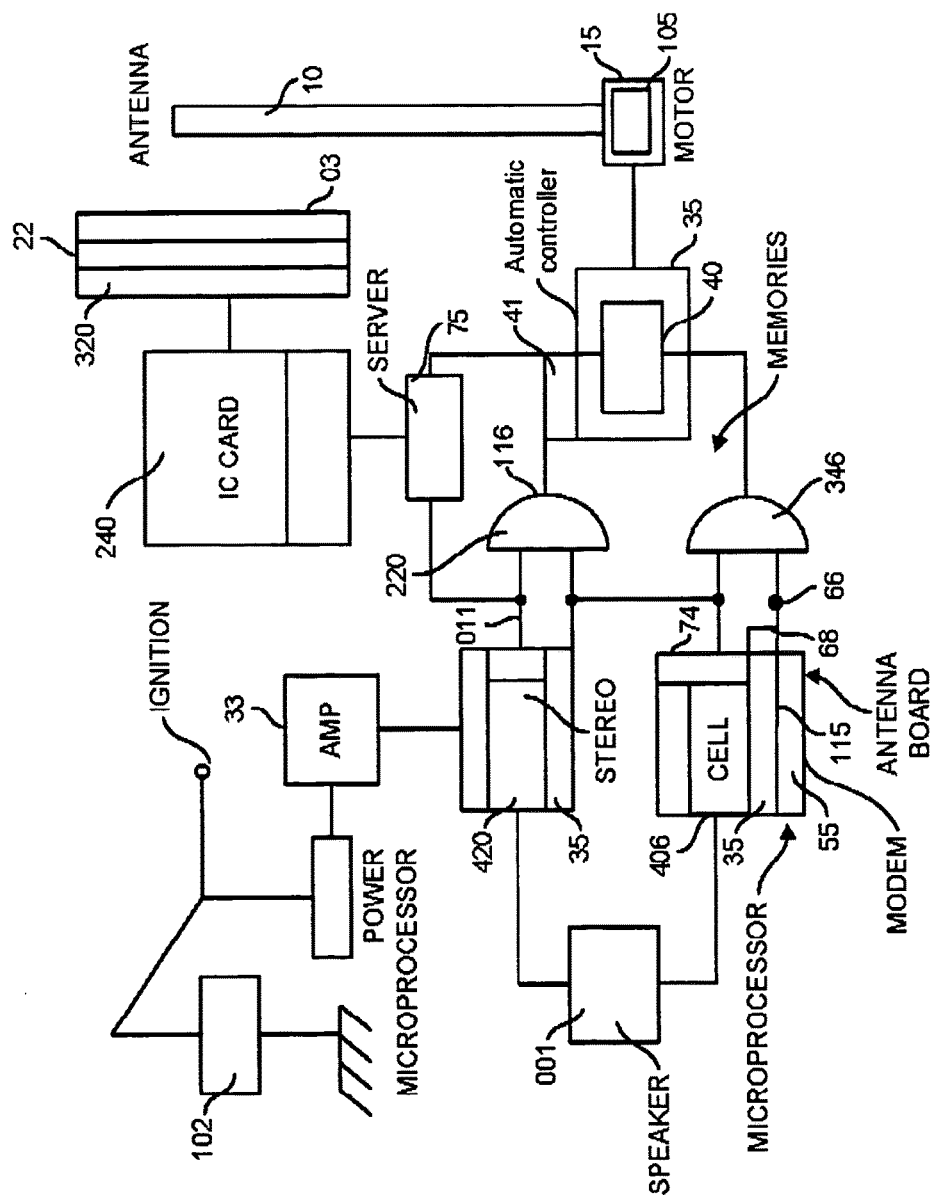
FIG. 31 is an exemplary embodiment of elements of the cell phone device circuit board being configured for the sequence of events which may occur during the operation of the communication apparatus.

Referring to FIG. 31 is seen an exemplary embodiments of a circuit board 94 comprising memories 220, input/output terminal 03 remove-able/exchangeable IC card 240, a control device 40, a chip 115 communicatively connected to a logic circuit 346, and in communication with the antenna apparatus 10. The antenna apparatus comprises antenna board in proximity with a cell 406. The antenna apparatus is communicatively connected to the chip 115 operable with the logic circuit communicatively connected to a software program 116. The communication apparatus is in communication with the chip 115 being operable for signal amplification. Embodiments further provide media device configured with a mixer 35 and signal booster 33 in communication with a microprocessor 420. The microprocessor is further configured with a reset voltage switch responsive to incoming and out going signal communications. At least a speaker device 001 is operable with the communication apparatus. The media device is further configured with a radio modem 55 being operable with a hook-up control device 41 in communication with the communication apparatus. The hook-up control device is operatively connected to a dialer 68 configured with a dialer 74 and operable with the I/O terminal 03. Some embodiments provide a read only memory "ROM" 320 in communication with the IC card and/or the signal oscillator 22. At least a line terminal 011 is provided operable with the server 75. Certain embodiments provide the antenna apparatus 10 being connected to an automatic signal controller being disposed with at least a motor comprising at least a mirror case 15 operable with a reflective circuit 105. At least an encoder is communicatively connected to the antenna board.

Figure 32:
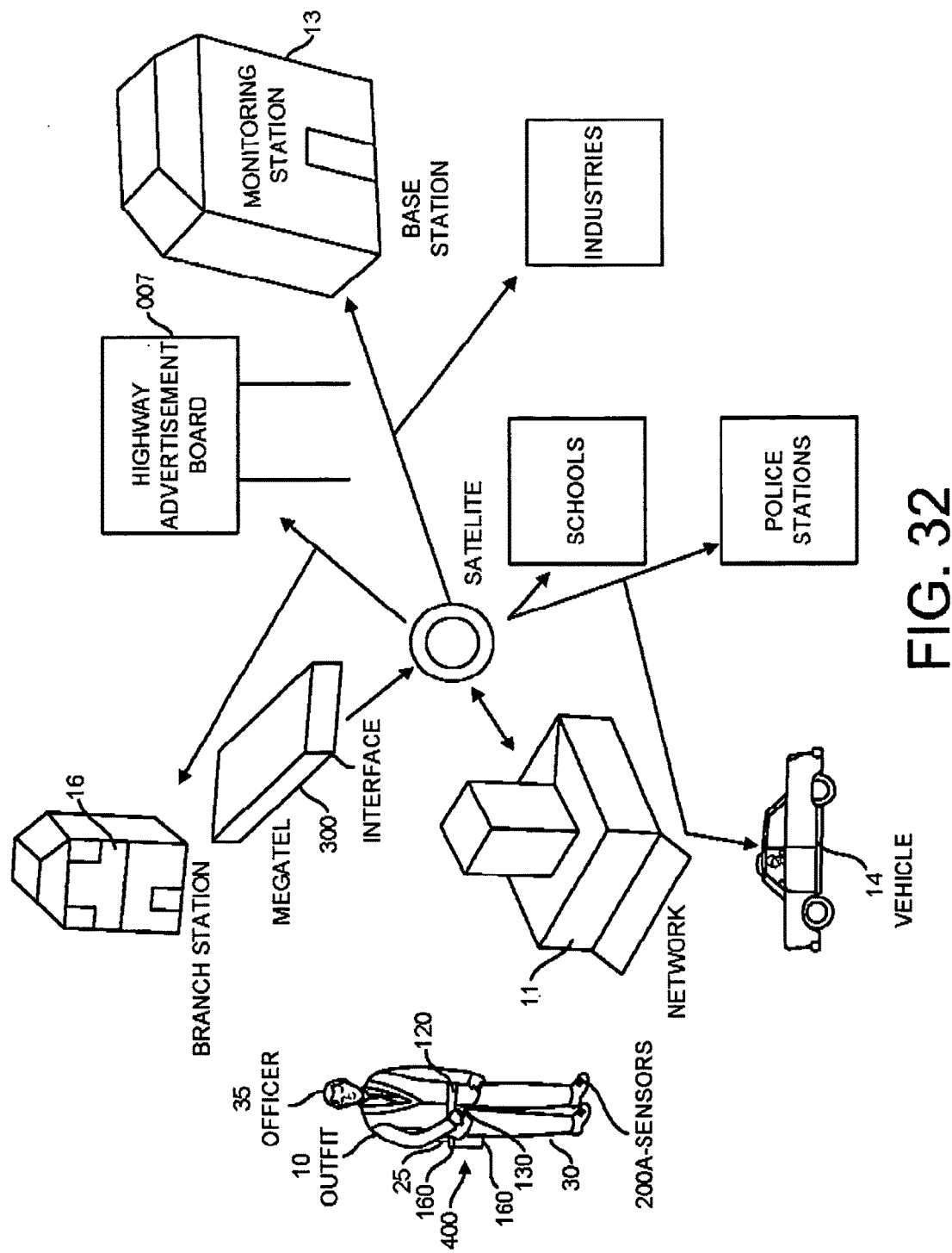
FIG. 32 is an exemplary embodiment of the device configured to communicate with various network interfaces.

Referring to FIG. 32 is seen an exemplary embodiments of a communication apparatus 400 in communication with a network environment. A person 35 is seen wearing a detection outfit 10 comprising of sensors embedded in silicon substrate and fused/etched in a microfiber material, the communication apparatus 400 is disposed in an outfit 160 comprising a housing being secured on the waist area 130 via a waist belt 120 by the person 35. The housing further comprises silicon substrate micro fiber being embedded with sensors and operatively configured for generating electrical energy. The communication apparatus 400 is communicatively configured with signal booster apparatus operable to prevent cancerous disease on the person 35. The communication apparatus 400 is further configured for network communications, including communicating with branch station 16 and/or the base station 13. The communication apparatus 400 comprises a detection platform being further configured with battery cells comprising power generator engine responsive to solar energy, vibration, sound, pressure force, and wind force. The detection platform is further configured with sensors embedded in silicon substrate nano/micro fiber to detect traveling cancerous cells and/or circulating tumor cells "CTC" in cell phone user's blood through valuable information from perspiration. Disclosed embodiments provide the respective person 35 wearing outfits 10, 20, 30, 120, 160 and 130, further operable for detecting weapons of mass destructions. The person 35 is seen communicating through communication apparatus 400, and a second communication apparatus 300 is disposed in a vehicle 14.

The communication apparatus 400 further comprises megatel 300 further comprising an interface device in communication with at least one of: a branch station 16, a highway sign 007, a base station 13, a satellite station, a school, a police station, a vehicle 14, and/or a network 11. The base station routes calls from communication apparatus 400 through a switching center, and the calls may be transferred to other cell phones, and other base station, including local land-line telephone system. With prior art devices the farther a cell phone is from the base station antenna, the higher the power level is needed to maintain the connection. This distance determines, in part, the amount of RF energy exposure to the user. Disclosed embodiment provide the detection platform comprising a cell-capture platform consisting of at least nano-structured substrates comprising silicon chip consist nano-tubs/nano-pillars being densely packed to provide effective sensory surface area to detect traveling CTC's. The cell capture platform further comprises at least a nano-chip device being configured to receive electric current to direct DNA probes from the detection platform to specific sites.

Referring to FIG. 33 is seen exemplary embodiments of the communication apparatus 400, further comprising a cell phone being configured with a numerical pad 392, a text pad 394, a dialer 69, and an encoder 66. Disclosed embodiments further provide communication apparatus 400 comprising methods and systems for generating and storing electrical energy. Certain embodiments comprise nano-materials 710 comprising microfiber material. Disclosed embodiments further provide sensors 327, 360 920 and 970 being embedded in silicon substrate 712 and fused/etched in the microfiber material 710 comprising materials with excellent electrical properties. The microfiber material 710 includes material components with nanometer dimensions in which at least one dimension is less than 100 nanometers. Some embodiments provide the microfiber materials being further configured with nano-wires/tubes 714. The nano-wires/tubes 714 being further embedded in the silicon substrate 712. Certain embodiments provide a communication apparatus 400 comprising the substrate 712, being configured with electrodes 716 in communication with the nano-wires/tubes 714. Embodiments provide the electrode comprising a temperature sensor. Other embodiments provide the nano-wires/tubes 714 comprising at least one component of: carbon char, carbon black, metal sulfides, metal oxides and other organic materials being alloyed with the microfiber material 712. The communication apparatus 400 further comprises a logic circuit in communication with at least one of: signal booster chip 403 in communication with antenna 201, display/input 404 comprising a touch screen 412, electronic switches 46, CPU 425, radio device 410, low voltage indicator, and/or a media device 420. The logic circuit is further connected to at least one of: a wireless Internet means 430, signal transmitting source 31, an encoder 47, at least an electro-optical-modulator 460, a demodulator 450, at least one module 16, 17, 21, 22, 23, 434, diodes 80 and/or a decoder 43.

Figure 34:
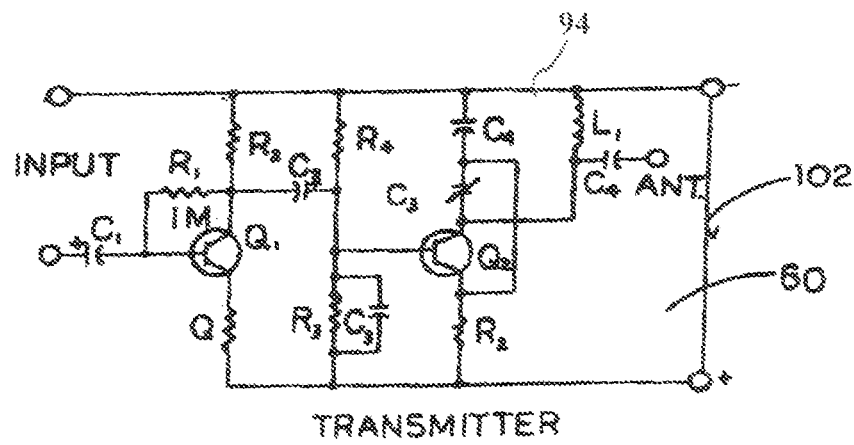
FIG. 34 is an exemplary embodiment seen to represent the circuit diagram of the receiver.

Referring to FIG. 34 is seen an exemplary embodiments of the circuit diagram for the receiver 70 being operable on low voltage 101. The receiver is operable for receiving communication signals.

Figure 35:
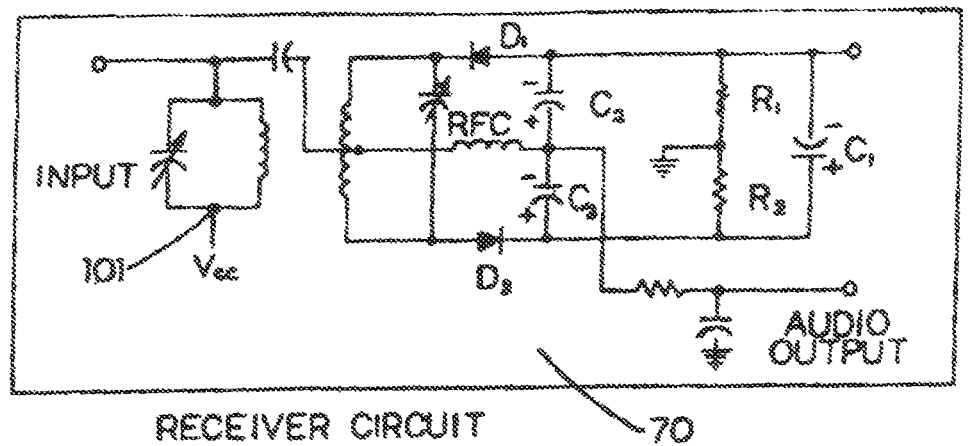
FIG. 35 is an exemplary embodiment seen to represent the circuit diagram of the transmitter.

Referring to FIG. 35 is seen an exemplary embodiments of the circuit diagram for the transmitter 60 being operatively configured with a preset voltage 102. The transmitter is operable for transmitting communication signals.

Figure 36:
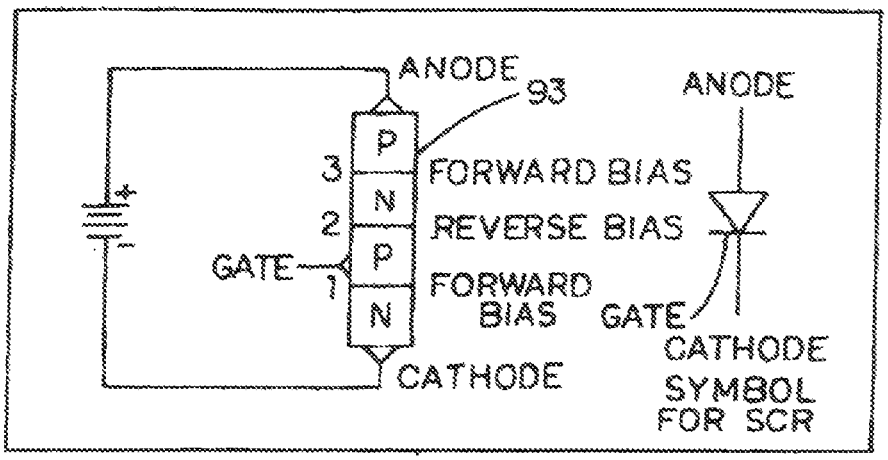
FIG. 36 is an exemplary embodiment seen to represent the block diagram of the control device switching circuit.

Referring to FIG. 36 is seen an exemplary embodiments of the communication control device comprising silicon controlled rectifier consisting of a p-type and n-type gates. The communication control device is further operable in forward and/or reverse bias mode 93. The silicon control rectifier is further operatively configured for signal amplification and/or communication signal booster. Disclosed embodiments further provide a chip comprising a CMOS operable on a digital circuitry. Certain embodiments provide integrated circuits (chips). The CMOS circuitry is operable to dissipate less power. Certain embodiments of the disclosure further provide a static logic configuration being operable on p-type and n-type metal-oxide-semiconductor field-effect-transistors "MOSFET's." for implementing logic gates. Embodiments provide a CMOS logic being implemented with discrete devices of transistors of both p-type and n-type on a silicon and or silicon substrate commonly called chips, dice, dies. Embodiments provide CMOS fabrication of solar cells on n-type CZ silicon substrates, including Polycrystalline thin-film cells, lightly boron-doped CZ, or gallium-, indium-, and aluminum-doped CZ. Disclosed embodiments further provide a thin-film comprising of thin layer of transparent conducting oxide, including tin oxide. Certain embodiments provide the oxides being highly transparent and configured to conduct electricity efficiently. Some embodiments provide antireflection coating. Other embodiments provide Polycrystalline thin-film cells comprising tiny crystalline grains of semiconductor materials.

Figure 37:
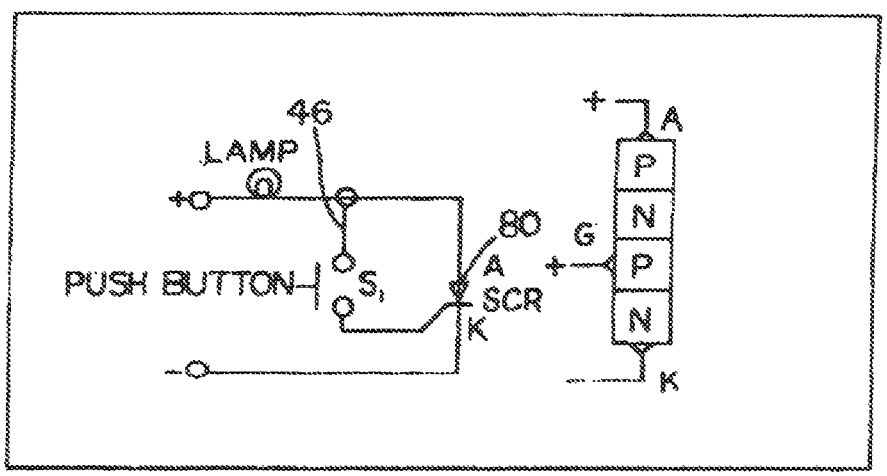
FIG. 37 is seen to represent a silicon control rectifier simple switching circuit for the control device.

Referring to FIG. 37 is seen an exemplary embodiments of the communication control device comprising silicon control rectifier being operable on a p-type and n-type gates. The silicon control rectifier is operatively configured with transistorized switches 46 in communication with a diode 80. The communication control device being further configured for interactive communications. Disclosed embodiments provide CMOS circuit that allows the implementation logic gates through p-type and n-type metal oxide semiconductor field effect transistors to create paths to the output from either the voltage source or ground. When a path to output is created from the voltage source, the circuit is pulled up. The other circuit state occurs when a path to output is created from ground and the output pulled down to the ground potential.

Disclosed embodiments provide CMOS circuits being constructed so that all PMOS transistors have either an input from the voltage source or from another PMOS transistor. The NMOS transistors have either an input from ground or from another NMOS transistor. Disclosed embodiments provide a PMOS transistor being operable to create low resistance between its source and the drain contacts when a low gate voltage is applied. Certain embodiments provide PMOS transistors for high resistance when a high gate voltage is applied. Some embodiments provide the composition of an NMOS transistor to create high resistance between a source and a drain when a low gate voltage is applied and low resistance when a high gate voltage is applied. Some embodiments provide communication methods using CMOS switch filter modules and switch duplexer modules for 3G smart phones, 4G smart phone, and camera/video device. Disclosed embodiments further provide polycrystalline thin-film cells operable with an interface between two different semiconductor materials to create electric field. Certain embodiments provide heterojunction consisting of two different materials. Some embodiments provide comprising homojunction consisting of silicon solar cell.

When the voltage of input A is low, the NMOS transistor's channel is in a high resistance state. This limits the current that can flow from Q to ground. The PMOS transistor's channel is in a low resistance state and much more current can flow from the supply to the output. Because the resistance between the supply voltage and Q is low, the voltage drop between the supply voltage and Q due to a current drawn from Q is small. The output therefore registers a high voltage. On the other hand, when the voltage of input A is high, the PMOS transistor is in an off (high resistance) state so it would limit the current flowing from the positive supply to the output, while the NMOS transistor is in an on (low resistance) state, allowing the output to drain to ground. Because the resistance between Q and ground is low, the voltage drop due to a current drawn into Q placing Q above ground is small. This low drop results in the output registering a low voltage. In short, the outputs of the PMOS and NMOS transistors are complementary such that when the input is low, the output is high, and when the input is high, the output is low. Because of this opposite behavior of input and output, the CMOS circuits' output is the inversion of the input. The logic functions further involving AND and OR gates for manipulating the paths between gates operable by logic on the logic circuit. Disclosed embodiments further provide a method consisting of two transistors in series and both transistors to have low resistance to the corresponding supply voltage, modeling an AND. Certain embodiments provide a method consisting of two transistors in parallel and either one or both transistors having low resistance to connect the supply voltage to the output, modeling an OR. Embodiments provide CMOS switching method using high-resistivity silicon substrates processed circuit for high-performance silicon switch-based communication apparatus comprising 3G and 4G smart phones, mobile broadband device, camera/webcam device, and video device. Certain embodiments provide the communication apparatus being configured with an operating system for enabling effective communications, interactive communications, software defined communications, virtual communications, multiple communications, desired communications, and sensory communications. The communication apparatus further comprises camera/video, cellular handset, wireless local area network (WLAN), CATV/broadband and aerospace and defense applications, wireless infrastructure.

Figure 38:
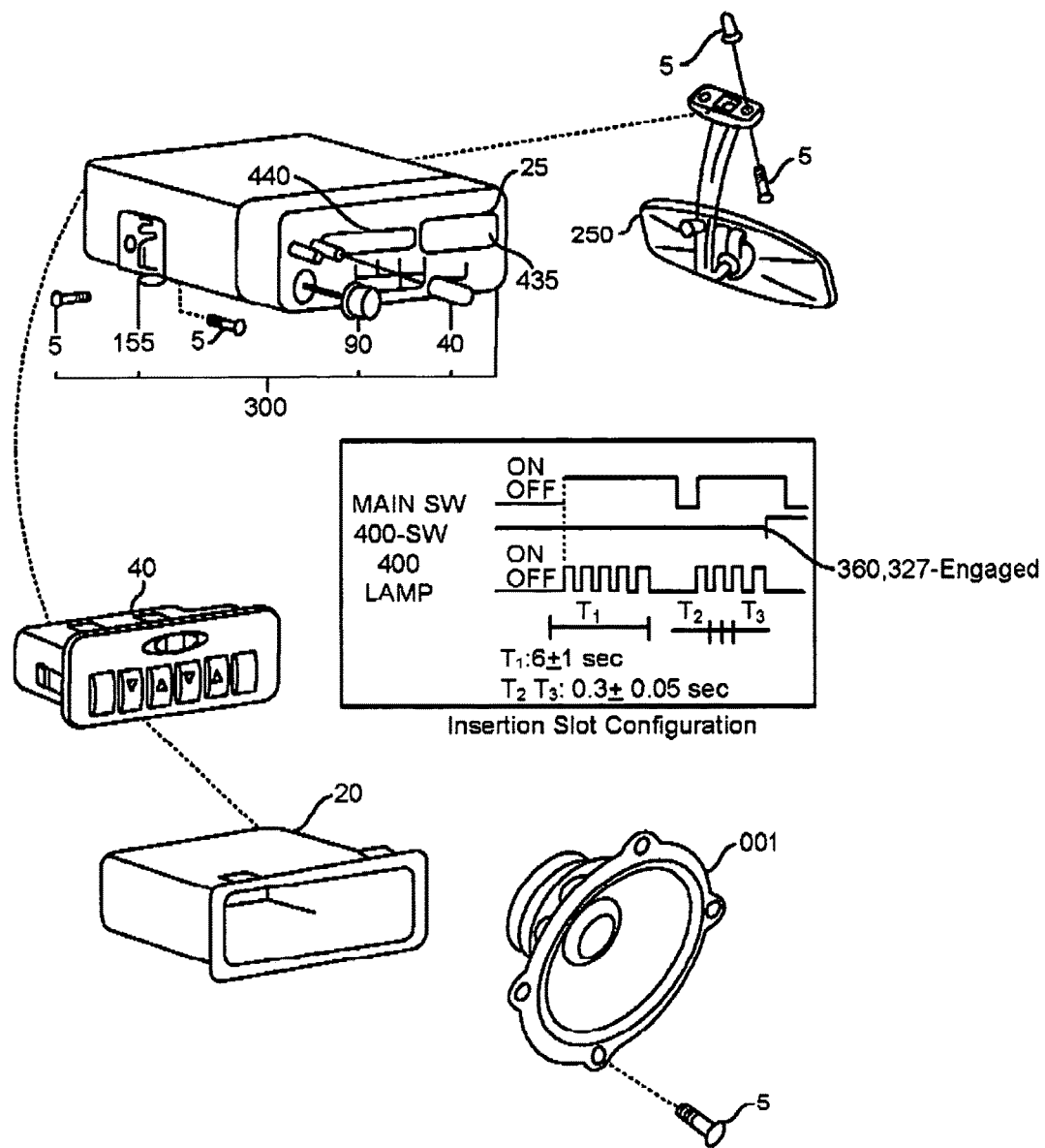
FIG. 38 is an exemplary embodiment of a diagrammatic view of the media device configured with a control device and a display.

Referring to FIG. 38 is seen an exemplary embodiments of the communication apparatus 300 being operable with a media device 440, 435, in communication with the communication control device 40. Embodiments provide the communication control device being secured on a housing 20 by at least a fastener 5. The communication apparatus further comprise the cell phone 400 operatively configured with sensors 360 in further communications with sensors 327 being disposed in side the media device. The media device is secured on at least a mounting bracket 90 by at least a fastener 5. The media device being further configured with at least a slot 25 communicatively connected to a sensor 327 in wireless communication with the cell phone 400. Certain embodiments provide the communication apparatus in communication with an enlarged monitor screen 250. Embodiments provide the communication apparatus operatively configured for communications through at least a speaker device 001.

Figure 39:
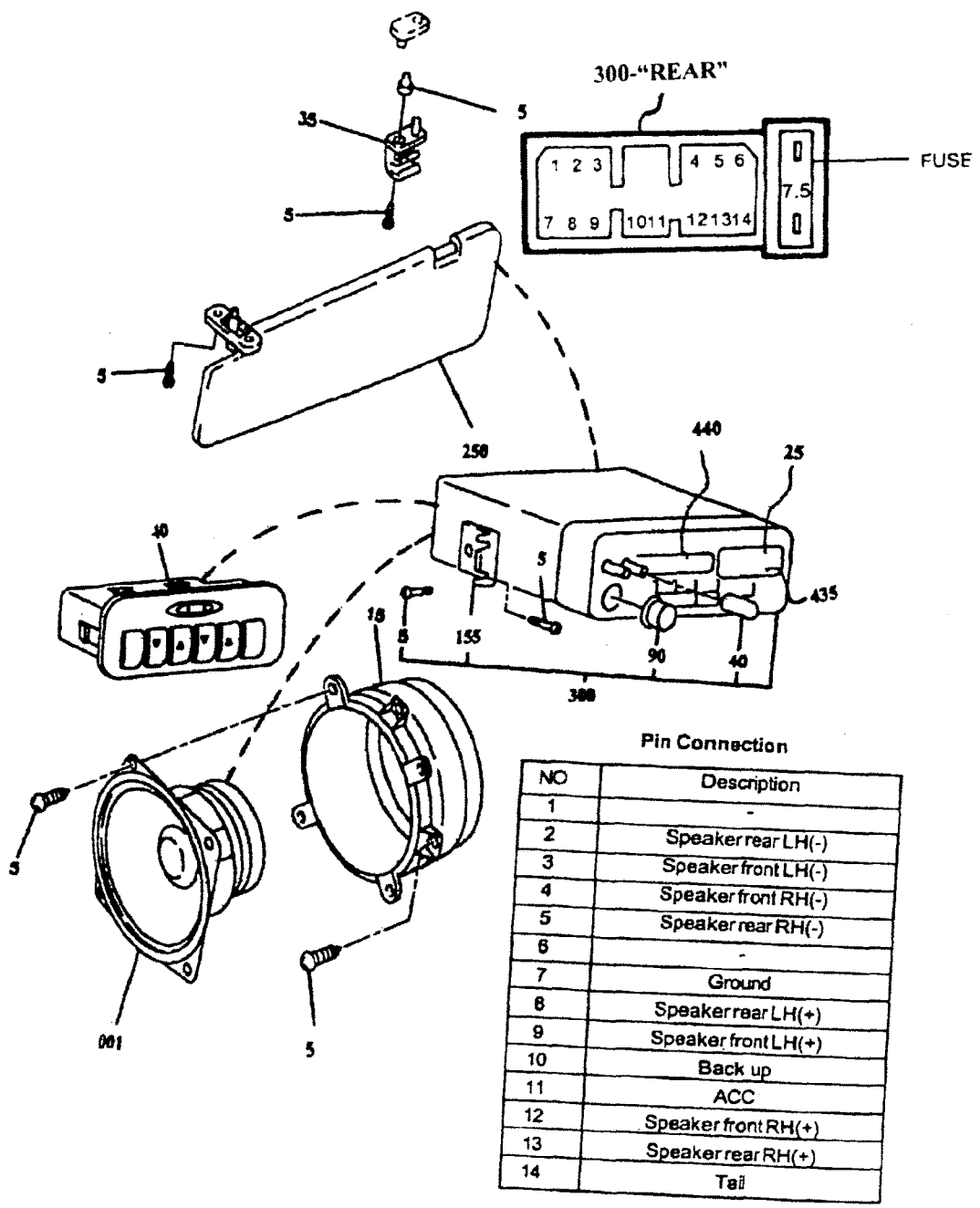
FIG. 39 is an exemplary embodiment of a diagrammatic view of the device configured with a speaker means, a control device, and a sun-visor monitor screen.

Referring to FIG. 39 is seen an exemplary embodiments of the communication apparatus 300 being operable with a media device 440, 435, in communication with the communication control device 40. Embodiments provide the communication control device being secured on a housing 20 by at least a fastener 5. The communication apparatus further comprise the cell phone 400 operatively configured with sensors 360 in further communications with sensors 327 being disposed in side the media device. The media device is secured on at least a mounting bracket 90 by at least a fastener 5. The media device being further configured with at least a slot 25 communicatively connected to a sensor 327 in wireless communication with the cell phone 400. Certain embodiments provide the communication apparatus in communication with an enlarged monitor screen 250. Embodiments provide the communication apparatus operatively configured for communications through at least a speaker device 001. The speaker device is secured in the housing by at least a fastener. Disclosed embodiments provide a protective fuse being operable to protect the device from transient pikes. In other embodiments, the monitor screen comprises at least one of: a mirror device, a visor device, each being firmly secured by at least a bracket 35.

Figure 40:
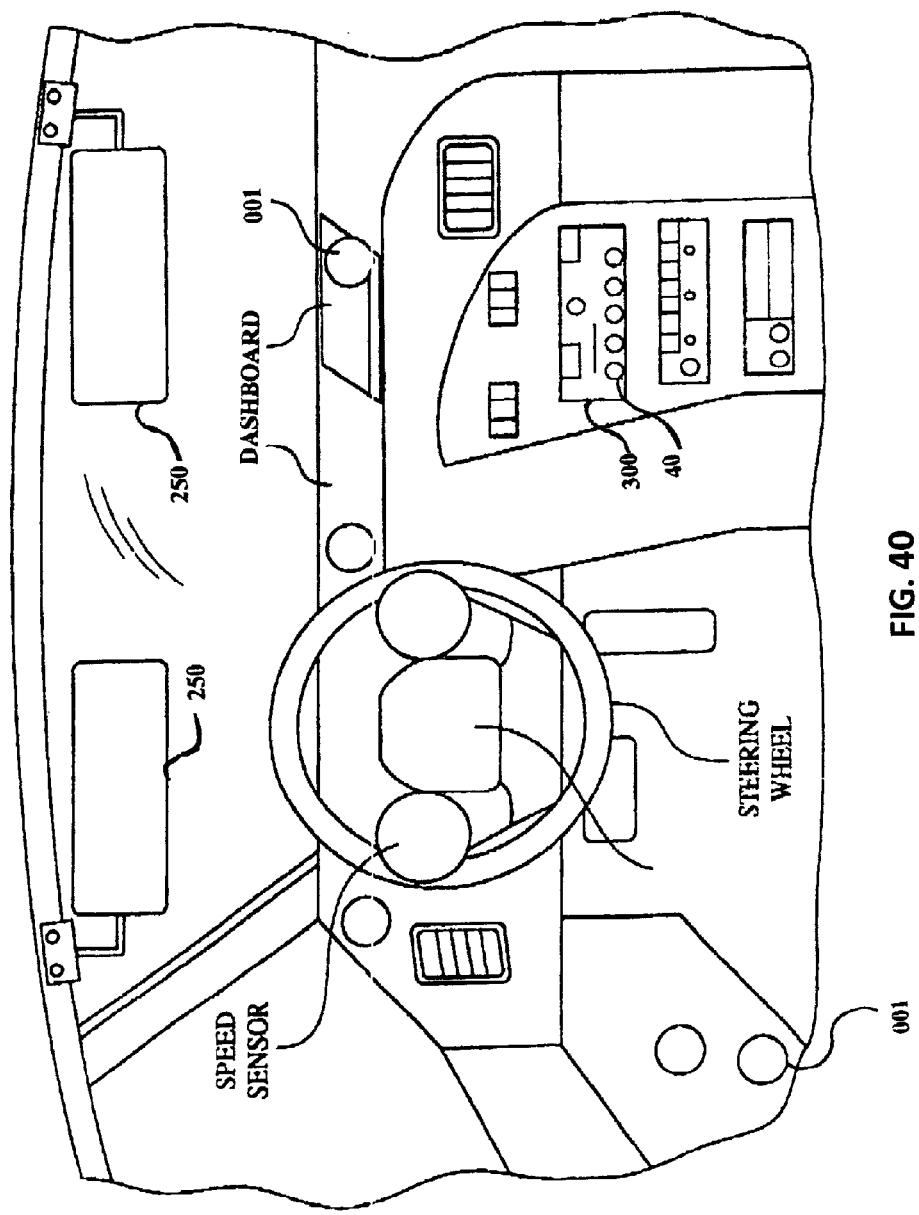
FIG. 40 is an exemplary embodiment seen to reflect sections of the interior part of a vehicle showing the dashboard, the megatel device configured with the control device, the speaker means and the sun-visor monitor screen.

Referring to FIG. 40 is seen an exemplary embodiments of the vehicle operatively configured with a dashboard, a steering wheel, and at least a speed sensor. The communication apparatus 300 is being safely secured on the dashboard. The Communication apparatus is operatively configured with the control device. The control device is further operable through the monitor screen 250. The monitor screen is operatively configured for interactive communications. At least a speed sensor is provided for monitoring when the vehicle is in motion and protect against any hands-on communications. The speaker 001 is communicatively connected to the communication apparatus and in communications with the monitor screen for providing audio/visual human voice auditory.

Figure 41:
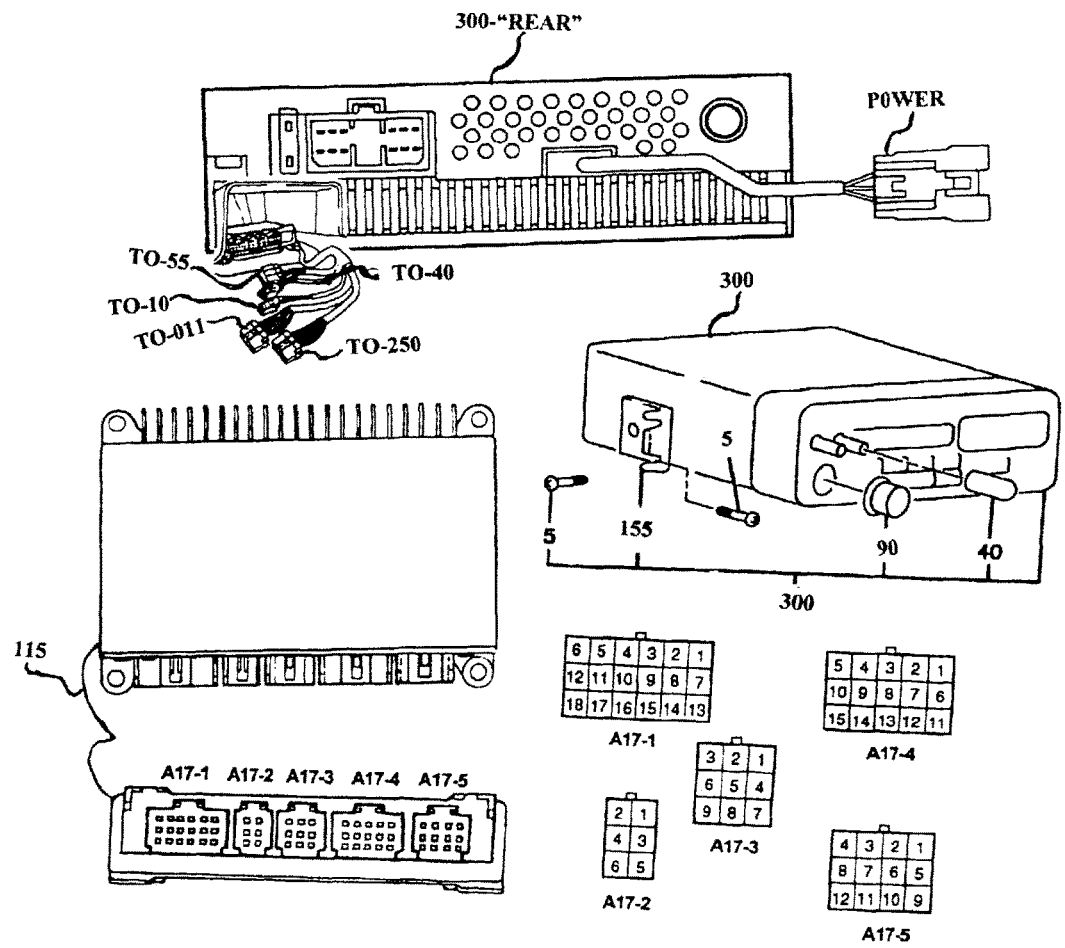
FIG. 41 is an exemplary embodiment of a chip operable with an antenna apparatus. The chip is communicatively connected to a communication apparatus.

Referring to FIG. 41 is seen further exemplary embodiments of the communication apparatus 300 which is being secured on a mounting bracket 155 by at least a fastener 5. The rear of the communication apparatus is provided with communication line to at least one of: line terminals 011, antenna apparatus 10, monitor screen 250, control device 40, and/or a radio modem 55. The control device is further configured with various mode buttons 90. Embodiments provide a communication apparatus 300, operatively configured with at least one chip 115, operable with antenna apparatus 10, operable with the communication apparatus 300. Certain embodiments provide plurality chips, A17-1, A17-2, A17-3, A17-4, and A17-5. Each said chip is operative configured for specific functions. At least one function comprises communication signal amplification. At least one function comprises logical operations. At least one function comprises signal analysis. At least one function comprises network connectivity. At least one function comprises voice enable applications comprising converting text data to human voice auditory. At least one function comprises voice enabled applications comprising converting human voice auditory into text data. At least one function comprises media communications. At least one function comprises. At least one function is mobile broadband. At least one function comprises entertainment applications. At least one function comprises wireless communications. At least one function comprises interactive communications, at least one function comprises graphic interface. At least one function comprises GPS communications. At least one function comprises traffic media.

Figure 42:
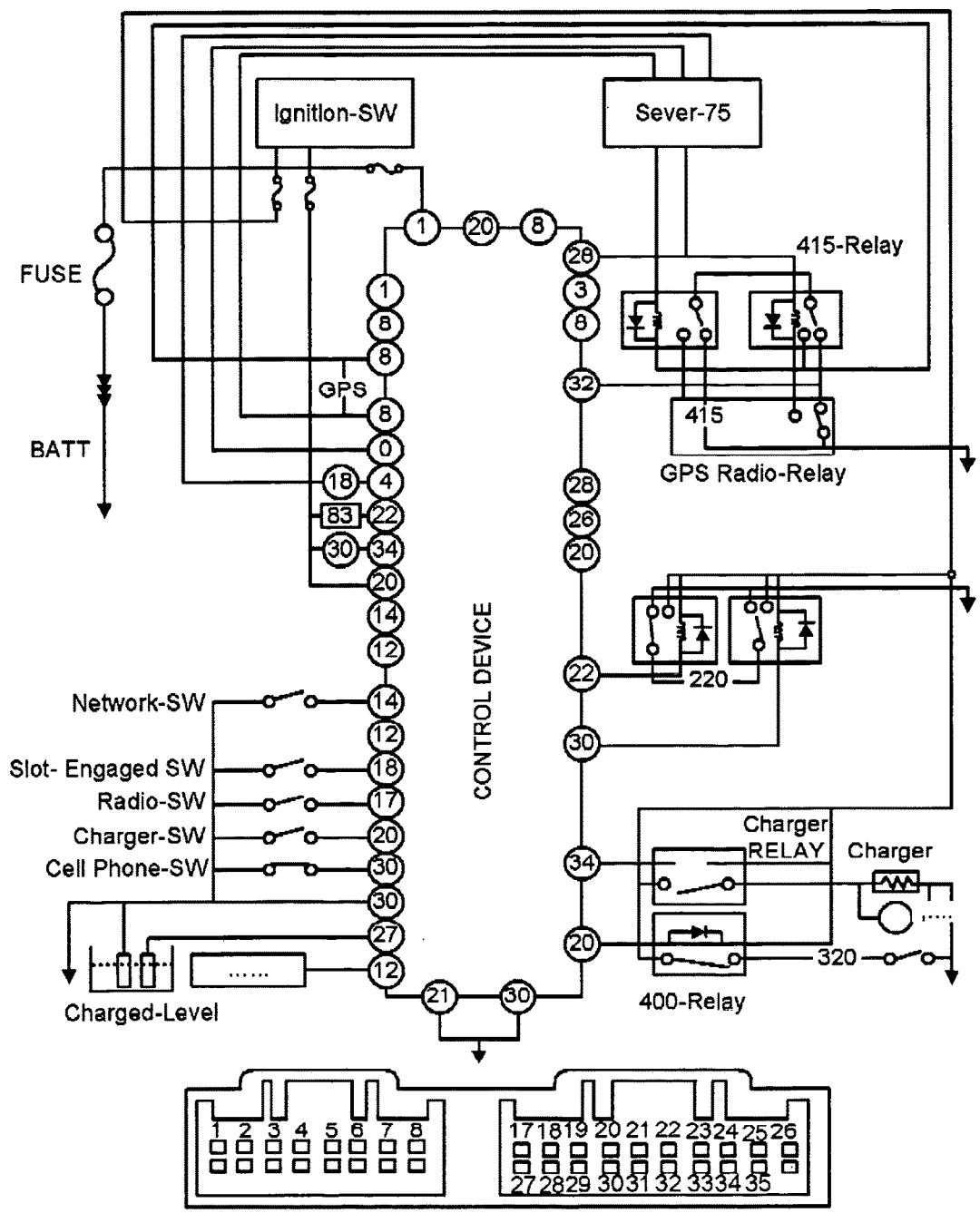
FIG. 42 is an exemplary embodiment of a circuit diagram comprising a platform array for the communication control device being communicatively connected to the communication apparatus being configured with a chip being operable for signal amplification.

Referring to FIG. 42 is seen exemplary embodiments of the communication apparatus 400 operatively configured with the communication control apparatus. The communication apparatus further comprises at least one of: a cell phone device, social network platform, a server device, a GPS device, a radio device, a charging device, TV applications, a gaming device, energy production platform, a mobile broadband device, a webcam, and a camera/video device. The communication apparatus is operatively configured with control device, further comprising transistorized switches in communication with at least a relay device, accelerometer, cell platform, and detection platform. Embodiments further provide at least one of: fault indicator, date signal, charged indicator, at least memory, at least an actuator, at least a chip, and at least a wireless communication device.

Turning to FIGS. 29 and 31 is seen a display unit being operatively configured for communications and for converting sound waves, vibration, wind force, pressure, and solar energy into electrical energy. The display unit comprises interactive screen being configured with nano-wires/tubes comprising at least one component of: carbon char, carbon black, metal sulfides, metal oxides and other organic materials being alloyed with the microfiber material. Disclosed embodiments further provide communication apparatus being disposed with alloyed material being configured for exhibiting unique electrical and electrochemical properties to provide efficient transportation of energy properties, faster data transmission speed, reduce exposure to signal radiation, reduce whistling effects, provide efficient touch sensitive screen, and better signal receptions. Certain embodiments provide sensors being embedded in a silicon substrate and fused/etched in a micro fiber material. The display unit further comprising a monitoring screen 250, being communicatively connected to I/O terminals 01. The IC card 240 comprises a second memory 320, in communication with the I/O terminal 03. Commands are processed in the main body 301 configured with the I/O terminal 01.

The modem 55 is communicatively connected to the communication control device 40, which is operable when power is applied to the megatel device 300. The media device is secured on the dashboard by at least a support bracket 155 and fastened by a fastener 5. The control device 40 is operatively configured to access and process all the commands and in communication with memory 220 being configured with the monitoring screen 250. The control device 40 comprises at least a silicon control rectifier "SCR" operatively configured for accessing and processing all commands in the command state as input. Embodiments provide the modem 55 communicatively connected to the software program 116 operable with the megatel device 300. The software program 116 is programmable for communications with the cell phone slot 25, the cell phones 400, radio 410, the media device 420, and the wireless Internet 430. The software is communicatively connected to the logic circuit shown in FIG. 5, to process input and output data. The software is in communication with memory 220 being operable with the monitoring screen 250. The software further comprises an operating system configured with the control device 40, in communication with the wireless radio fiber optic modem chip 115, which is communicatively connected modem 55. The wireless radio fiber optic modem chip 115 is configured with the IC card 240 being operable to permit exchange of input and output of data between devices. Disclosed embodiments further advance safe driving with improved communication. The cell phone 400 is wirelessly connected to the megatel device 300, and may be inserted into slot 25 in communication with cell phone 400. Embodiments provide input and output communications through the communication apparatus being operable with the IC card 240. The IC card memory or ROM 320 is where all programs for operational data processing are stored to allow the RAM 340 to access stored data through the line terminals 011. Processed data are stored in the ROM 320, including languages and software 116 in communication with RAM 340.

Turning to FIGS. 31 and 32 is seen communication apparatus being operable with the software program 116 and transferring communication data through the line terminal 011 to at least one of: the megatel device 300 and/or the IC card 240. The software programs and functional data are at least stored in the ROM 320 and the IC card 240 to allow interactive wireless electronic communication by exchanging information in the IC cards 240 that are uniquely operable within the communication medium. There is a second I/O terminal 02 at the megatel body 301 that allows data to be shared with other devices. The cell phone 400 employs an input device from a personal computer 11, a base station 13, and a branch station 16. The radio 410 enables communication with the base station 13 through the radio waves, allowing the receiver 70 to absorb the emitted signal from the base station 13 to the branch station 16, the antenna 10 absorbs or receives the signals from the communication stations, which is being communicated to the mixer 35 for filtration. The oscillator 22 is operable with the mixer 35 and in communication with the amplifier 33. The amplified signals are demodulated into digital signals by the demodulator 450.

The demodulated signals are then sent to the CPU 425 for operational processing. The CPU 425 process selection calls to allow other communication devices like road constructions, exit rams, advertisements, police communication activities through the branch stations 16 to the megatel device 300. The branch stations transmission medium permits calls made within localized range with the receiver 70 to be classified as a local calls. Embodiments provide a "TV system being viewed on a sun-visor and/or a screen monitor disposed on a sun-visor." Embodiments provide a decoder system operable for converting analog signal into digital data for display on a television set and/or a monitor. Embodiments provide a microprocessor 85 being configured for identifying numbers, letters, and in communication with the antenna apparatus operable for emitting radiant energies traveling through waves. Certain embodiments provide at least one chip comprising at least a microprocessor. The chip 115 is communicatively connected to the logic circuit and being operable with the antenna apparatus 10. Disclosed embodiments provide the communication apparatus in communication with the chip. The carrier detector 82 detects an open station. The oscillator 22 is communicatively connected to the Electro-optical modulator 460 through electronic switches 46, being operable with the transmitter 60. When the transmitter 60 is on the transmission mode, the modulator 460 is operable corresponding to the dialed tag number 14. At least one station comprises a satellite station in a network. The software operatively configured with the communication apparatus for communication with a network station.

Turning to FIGS. 31 and 5 is seen further embodiments of the communication apparatus being operable for transmitting and for receiving communication signals through the antenna 10, being operable with the antenna switch 15 responsive to the received signals, being amplified by the amplifier 33, in communication with the mixer 35. In one embodiment, the fiber optic modem chip 115 is embedded inside the wireless radio modem 55 in communications with the Internet button 00 being operable for at least one of: Internet transmission, radio waves transmissions, wireless Internet communications, land based mobile communications, air based mobile communications, and air and marine vehicles communication applications. Embodiments provide wireless Internet communication apparatus being configured for at least one of: vehicular communications, information system, vehicular Internet activities and electronic wireless communication without any interference with the steering wheel control. The wireless vehicular Internet communication includes microprocessors being configured for selecting and inserting advertisements which may be displayed to at least a user. Embodiments further provide vehicular information, entertainment, communication, and advertisement. Embodiments provide television programming viewed by at least a user and compiles the user profile for in-vehicle media or vehicular television programming.

Embodiments further provide method to eliminate automotive safety hazards through hands free communications. Disclosed embodiments further provide a method for pushing on the Internet button 00 operable for Internet connection, activation, and communication. The server 75 further comprises a workstation, in-vehicle computer, a computer device, or other network node being operable for providing the management of at least multiple vehicles and networking resources a single point of administration. The server 75 provides server functions via wireless local area network (LAN). The server 75 is operable on a media device being operatively configured with communications software that includes network operating system (NOS) software such as windows NT, Unix, Linux, or Novell Netware. The server 75 may include a login server application for initial configuration such as Novell Directory Services ("NDS) for managing access to computer networks. Embodiments further provide methods for a network administrator to set up and control a database of users and manage them using a directory with a graphical user interface. The server 75 may also comprise of file server, e-mail server, and Internet server applications to enable separation of data storage. Using NDS, or the server 75, users of the media devices and in-vehicle computers and other communication devices at remote locations can be added, updated, and managed centrally. The initial login operation to the network is typically controlled by a script, which is executed or interpreted. Other means of operation in addition to Novell Directory Services may include Microsoft's Active Directory to be utilized as a directory service.

The file server application allows files contained on the server 75 to be accessed by at least wireless devices. The email server may be utilized to manage and control email accounts on the wireless network and permit the sending and receiving of Internet email via Internet. The email server utilizes voice enabled applications to read mails to recipients. The Internet server allows access to the Internet and operable with at least a browser in communication with the World Wide Web to search contents specific to users needs and for file transfers using the File Transfer Protocol. The server 75 includes management and control applications for managing and controlling each of the devices connected to the server 75, including at least one of: a media device, the appliance and the environmental device. For example, the server 75 is operatively configured with software for automatically controlling a thermostat in a vehicle or for providing a uniform means of controlling each of the electronic devices on the wireless LAN 150. The Internet server is further configured for allowing the transmission and receipt of Internet electronic mail messages, including audio/visual messages and/or human voice auditory from suitable network nodes such as the mobile terminals of various networks. The office equipment of the LAN 150 is signified by the dashed circle in FIG. 29 and provides all of the functions of equipment that may be associated with a home or workplace office. Printers, the scanner, and the fax machine are provided with a wireless transceiver for communicating with the server 75 via respective antennas. In this regard, special server applications such as a print server may be provided on the server 75 to allow all terminals on the network to share the printers, and office equipment in general.

Turning to FIG. 31 is further seen the control device 40 being configured for signal detections in communications with the ring indicator 74 and the Internet server 75. The ring indicator 74 identifies calls and also allows the metal base sensors 360 of the cell phone 400 to decode calls permissible over the radio and the antenna apparatus. The control device 40 is configured for cell phones 400 communications operable with the hock-up control device 41 to connect all phone calls to the server 75. The control device 40 receives phone number from the tone encoder 66 and decodes the number to identify the destination country so that an appropriate receiver is enabled. The server 75 is configured with the control device 40 responsive to receiver 70 and/or to the Internet network.

Turning to FIGS. 34 and 35 are seen the receiver 70 and the transmitter 60 being operable to transmit and to receive voice and data communication signals through wireless means. The server is further responsive to communications to department of transportation. The ROM 320 stores all the tag numbers 14 for each state, and when the tag number is dialed, the decoder 43 compares the coded tag number to that of the ROM 320. If the matching signal is identical, the ROM 320 then send the tag data to the CPU 425 that will then process data and enable communications with the base station 13. The reflected signal is absorbed by the antenna 10 and received by the CPU 425. The CPU 425 controls the logic that allows wireless communications, data processing, and component interface. The computer program comprises programmed code being embedded in the computer storage medium. The memory of the server 75 includes data that are shared among traffickers when an emergency is eminent, providing easy means of communication in the highway. The stored data are used as identification numbers, which are assigned to individual vehicles and modified for use as regular phone numbers. Plurality of the tag numbers could be dialed by an officer during police chase or road emergency, by simply assigning a code to the direction of the route in question. The cell phone switch 002 allows the server 75 to allocate data that are coded and assigned as emergency numbers and phone numbers. Embodiments further provide a media device being configured with software being programmable for operation with the computing system. A computing system further comprises communication channels that allow communication with other systems and devices. The communication channels are examples of communications media which embodies computer-readable instructions, data structures, program modules, and/or other data in a modulated data signal such as a carrier wave or other transport mechanism, including any information-delivery media. By way of example, and not by limitation, communications media include wireless/wired media, such as wireless/wired networks and direct-wired connections. The wireless media comprises acoustic, radio, infrared, and other wireless media. The computing system comprises input components, including VOIP, keyboard, mouse, pen, a voice-input component, a touch-input device. Output components include screen displays, speakers, printer, at least a module such as adaptors for driving them. The computing system is also powered by a power supply, including cells and battery devices.

The fiber optic modem chip 115 and the microprocessor 85 are further operable to transmit and receive signals and also programmed to dial a 911 or a home phone number when a collision is detected. The communication apparatus comprises Internet applications and interactive screen 250 being interfaced for viewing and monitoring Internet accessed information and for providing output data. Embodiments further provide the cell phone device in communication with the transmitter 60 being operable to impact communication signals. The cell phone device is further operable through the radio speakers 001 operatively connected to a media device. The low voltage line signal 101 is the source voltage of the cell phone 400, which is configured with a controller that monitors the voltage count to the preset voltage 102. The voltage counts output signals to the CPU 425 to control strings of events in communications with the built in logic and the network. Embodiments provide low power consumption communication apparatus configured for processed data transmission through the wireless radio modem 55 to the server 75. The communication signals are outputted through the radio transmitter 60 through the antenna 10. All signals are reflected to the reflection circuit 105, in response to the processed data signals in communication with the demodulator 450 being operable to demodulate the received data or signals travelling through the antenna 10 to the communication apparatus. The transmitted messages are coded by the source 31 and decoded by the receiver 70 to initiate communications. The insertion slot configured with the IC card 240. The insertion slot is further configured with an indicator composed of a light-emitting diode. Loading the IC card into the insertion slot will illuminate the light-emitting diode (LED). The LED blinks when the IC card 240 is loaded. Signals are transmitted through electrical impulses that are changed into sound waves and used to transfer, emit, and absorb the coded information. The impulses are changed to sound waves to enable the megatel device logic mode to be operable with the accept button 47 to further advance the hands free communication to reduce accidents caused by the use of cell phones 400 while driving.

Embodiments further provide a 411 button 49 in communication with the microprocessor 85 operable with software 116 for communicating with the data base for the department of transportation and for providing network services between transportation highways, the police, and computers. The embedded chip 117, the fiber optic modem chips 115 and the Electro-optic modulator 460 provide translation of electrical signals to optical signals to enhance the wireless Internet services. The embedded chip 117, the RAM 340, and the CMOS 370 are in communication with the microprocessor 85, the fiber optic modem chips 115, and the Electro-optic modulator 460 operable to transmit and receive wireless Internet communication and wireless cell phone 400 communications. The self-test chip 119 is configured with the self-test button 44 to check the functionality of components of the communication apparatus. Embodiments further provide monitoring screen 250 being built in the sun-visor 130, with wires harnesses running through the sun-visor base 131 to the media device output terminal configured to allow data to be displayed through the screen 250.

Turning to FIG. 29 and FIG. 38, when the tag number 14 is dialed, the microprocessor 85 will power the megatel device 300 to pick the radio or microwave signals in other to ascertain communication. Embodiments further allows cell phones 400 to be electrically charged through contacts between the coded metal base sensor 360 of the cell phone 400 and the second sensor 327 inside the slot 25. The cell phone 400 is further connected to the slot 25 to allow the metal base sensor 360 of the cell phone 400 and the second sensor 327 of the slot 25 to initiate contacts so that communication through the media 420 and the speakers 001 are ascertained. The megatel device 300 is operable as hands free cell phone 400, when the cell phone 400 is inserted in the slot 25. When the cell phone 400 is in the slot 25, the metal base sensor 360 and the second sensor 327 of the megatel device 300 are communicatively connected to ascertain communication through the media system 420 and provide audible output responses through the speakers 001 and/or the display device. The speaker is disposed on the interior of the vehicle and the cell phone, and secured by a fastener. The control device 40 is disposed and/or snapped onto a housing 20 and connected to the media device by at least a cable means. The control device 40 is configured with a spring-like clip 35 that snaps securely into the housing 20. The megatel device further comprises a vehicular entertainment system comprising of a portable electronic apparatus configured with methods for receiving information from a transmitter and providing the information to vehicular occupant. At least one touch button is associated with the active area of the display device for enabling input data, data retrieval, and data transmission. At least a modem is responsive to data received/transmitted. At least a memory is provided for storing plurality data into a hierarchy level sequence of memory frames. Each memory frame is uniquely identifiable and includes information portions corresponding to images, active areas and links. A control device is provided for identifying information to be displayed upon query.

The microprocessor 85, the fiber optic modem chips 115 are the intelligence of the megatel device comprising a programmable means for contacting the corps through a one push button 005 being operable for communication between the corps and vehicles on the direction of the corps patrol. Together with the emergency 911 button 30, the megatel device 300 facilitates connections to the nearest police station or police car for immediate emergency rescue. In other to allow other networks and businesses to advertise nationwide along the highway, pluralities of microprocessor 85 are programmed to enable communication between the advertising board 007 on the highway and the megatel device 300. Near by restaurants and other businesses along the perimeters of the highway, the gas stations and other lucrative areas could be programmed to advertise and communicate with the megatel device 300 to inform commuters about the advertised businesses or products. The microprocessor 85 further enables the power antenna 10 to absorb or emit coded energies to initiate communication.

The fiber optics is used for the antenna 10 and components of the megatel device 300, the transmitter 60, and the receiver 70 to transmit and receive wave signals from radio waves and microwaves by determining the amount of light traveling down the fiber. The fiber optics measures the amount of light traveling down the fiber or from one fiber to another in optical radiation. The optical properties change each time the fiber optic is exposed to other electrical data sources. That is, the speed of the light remains constant when the voltage is removed from the modulator 460, and varies when the voltage is installed in the modulator 460, allowing the light wave to reinforce each other and create a 1 "bright". Disclosed embodiment provides a transparent substrate comprising an electro-chromic apparatus responsive to the applied voltage. Certain embodiment provides the electro-chromic apparatus being responsive to the applied voltage to change the color of the substrate. When the waves are out of phase, they cancel out each other, creating a 0 "dark." The modulation is laser-like being modulated with electrical signals or impulses. The lights are switched from dark to bright, representing OFF and ON, or 0's and 1's in digital information and communications. The fiber optic modem chip 115 allows Internet activities to be enabled. The sun-visor is adjustable to accommodate different drivers. The interface unit 95 is connected to the circuit board 94 being operable to allow the control functions and memories to intelligently control functions of the communication apparatus in communication with the network software 116.

Turning to FIG. 31, certain embodiments provide the fiber optic modem chip 115 in communication with automatic switch 200 for the wireless Internet, allowing corresponding pin interface in communication with other fiber optic modems 55 and server 75. Transmission to the modem 55 is synchronous, allowing the transmission time to be selected for internal and external or loop-back clock. Disclosed embodiments transmit and receive through the antenna 10. Carrier signal is modulated in response to the transmitted data by diode 80, reflecting radiated signals to the radio modem 415, through the antenna 10. The diode 80 detects the received signals and supplies the control device 40 with the detected signals in communication with the amplifier 33 being operable for signal amplification. In other embodiment, speaker 001 is disposed in a housing 015 and held in place by at least a fastener 5. Still in other embodiment, the sun-visor is secured on a bracket 035 disposed on the roof and secured by a fastener 5. The control device 40, upon receiving the signal, enables communication with the CPU 425 being operable to supply processing data to the carrier and also to receive transmitted data from the demodulator 450. The modulated signals are sent to the bias 93 in communication with decoder 43. Various mode buttons allow stored messages or emails to be received and transmitted to the monitoring screen 250. The monitoring screen 250 is configured for viewing wireless Internet related activities in vehicles and cell phones 400 through a view window 131. Disclosed embodiments provide power and input to the monitoring screen 250. Certain embodiments provide the cell phone being inserted into the slot 25 and providing communication/being operable through a media device. Other embodiments provide Internet communication being enabled through the server 75 being operable to receive the Internet information or data and communication output through monitoring screen 250. Certain embodiments provide the monitoring screen being communicatively configured to display all data or information when activated for viewing.

Turning to FIG. 29, the sun-visor 130 is pivoted at a supporting base 05 to absorb vibration and is connected to a ball joint 06 to further allow permissible screen angle adjustment and relocation. The sun-visor mounting base 05 and the monitoring screen 250 are pivotally moveable, and comprises of a cover 015, that covers the monitoring screen 250 when disabled. Embodiments provide the communication control apparatus being further operable to electronically enable the screen when Internet transmission is eminent. The mirror case 15 is an accessory for individual use. Embodiments further provide the communication apparatus being configured with semiconductor devices being operable for higher scale of signal integration and functional intelligence, providing improved cellular communications and vehicular wireless Internet services. The logical circuitry is further configured for determining the sequences. Numeric counts start from 0 to 9 while the character counts starts from 10 to 35. The arrangement of the count is not absolute, as it could further be arranged in different applications and settings.

NUNERIC TO DIGITAL DAILING SYSTEM
"DECIMAL TO BINARY"

| Decimal | 0 | 1 | 2  | 3  | 4   | 5   | 6   | 7   |
|---------|---|---|----|----|-----|-----|-----|-----|
| BINARY  | 0 | 1 | 10 | 11 | 100 | 101 | 110 | 111 |

| Decimal | TEXT CHARACTER | BINARY |
|---------|----------------|--------|
| 10 | A | 1010 |
| 11 | B | 1011 |
| 12 | C | 1100 |
| 13 | D | 1101 |
| 14 | E | 1110 |
| 15 | F | 1111 |
| 16 | G | 10000 |
| 17 | H | 10001 |
| 18 | I | 10010 |
| 19 | J | 10011 |
| 20 | K | 10100 |
| 21 | L | 10101 |
| 22 | M | 10110 |
| 23 | N | 10111 |
| 24 | O | 11000 |
| 25 | P | 11001 |
| 26 | Q | 11010 |
| 27 | R | 11011 |
| 28 | S | 11100 |
| 29 | T | 11101 |
| 30 | U | 11110 |
| 31 | V | 11111 |
| 32 | W | 100000 |
| 33 | X | 100001 |
| 34 | Y | 100010 |
| 35 | Z | 100011 |

When the numeric and text character dialing system is used for assigning cell phone 400 numbers, the numbers will be digitized and coded to turn on series of switches representing 0s and 1s in digital counting. The 0s and 1s are the number of bright light and dark, a representation of the change of optical properties when exposed to electrical data source. Numeric numbers and text characters are converted to binaries and coded to speed up the counting processes. The following components are further explained.

1C1=CPU

1C2=RFID Chip reader

L1+L2=LED

S1=ASPDT "Automatic momentary single pole double throw" switch, for transmitting and receiving signals.

CI=Electrolytic capacitor

C2=imf capacitor

C3=imf capacitor

Q1=Infrared or general purpose silicon transistor

Q2=Phototransistor detector

L1=Infrared LED emitter

M1=speaker/microphone

R1 through R10=Resistors

Figure 43:
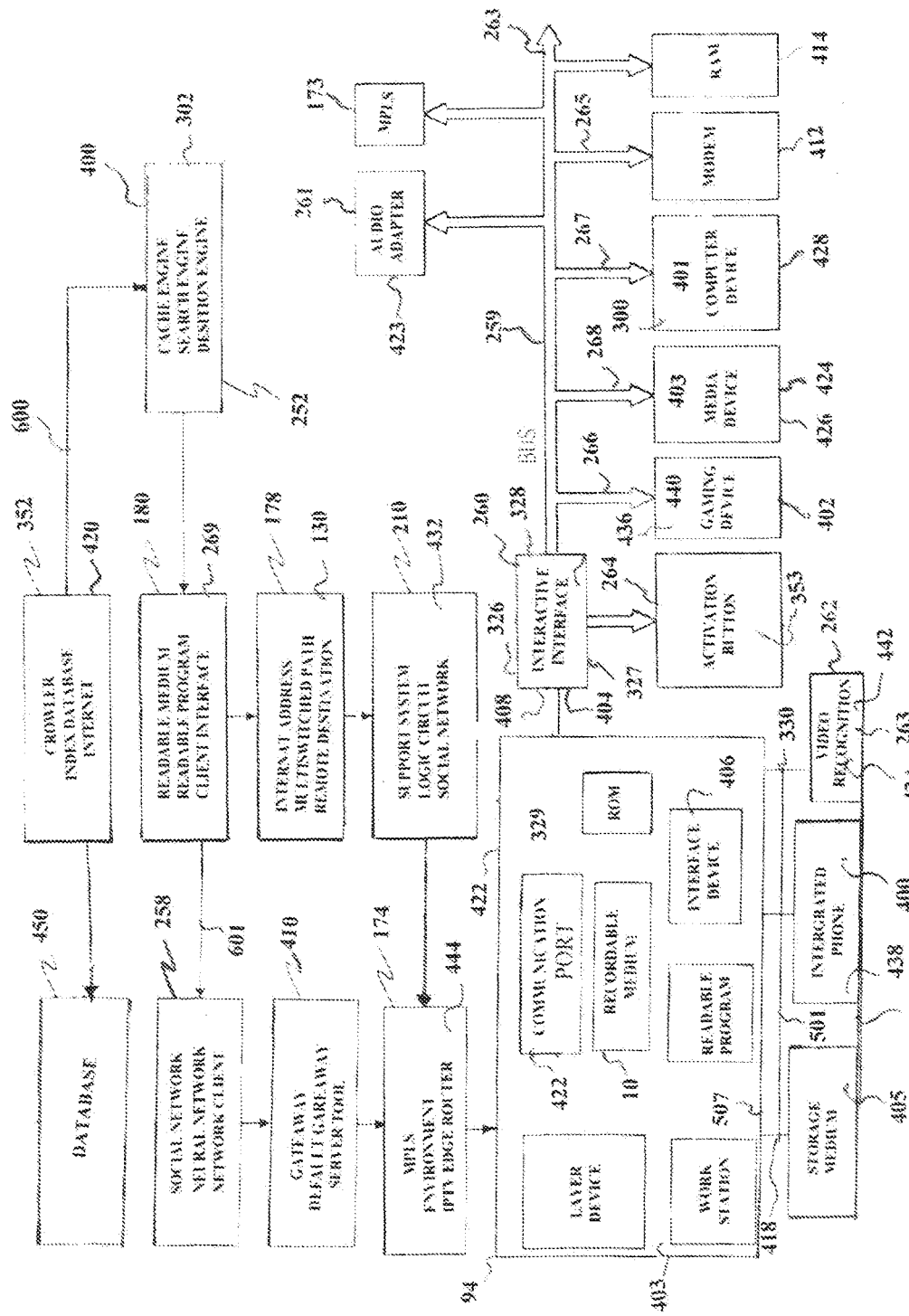
FIG. 43 is seen an exemplary embodiments of the communication apparatus in a network environment.

Referring to FIG. 43 is an exemplary embodiment of the communication apparatus 400 in communication with a virtual private network 178, further comprises a centralized transportation search engine topics data processing system 180 operable on a social platform 258. The social platform 258 is operatively configured for communication via multicast virtual private network 258 operable for advancing transportation media and engineering knowledge. The social platform 258 comprises a social network application in communication with processor 420. Disclosed embodiments further provide the communication apparatus further comprising keyboard 269 disposed on an LCD display screen 260 being configured with sensors 327 operable for object recognition. Certain embodiments provide the sensors 327 being configured for video recognition 262. Some embodiments provide the communication apparatus 400 configured with the display device 260 in communication with at least an activation button 264 configured to activate at least one of: phonebook 266, calendar 268, dictionary 267, calculator 265, voice recognition 261 and camera 263. Disclosed embodiments further provide the communication apparatus further comprising at least one of: a mobile communication device 400, a gaming device 402, a media device 403, an interface device 404, and a content store 405. The communication apparatus further comprises a computer apparatus 400 comprising a computer recordable medium 10 being operable on a computer readable program 300 being recorded to cause at least one computer device 401 to receive at least a media reference documents 130.

The media reference documents 130 further comprise database comprising topics of information relating to transportation topics, television media topics and/or communication data topics. The communication apparatus is further operable for storing at least a frequency through which a module generates content when queried and is further operable for determining keyword compatibility based on the frequency. Disclosed embodiments provide the interface device 404 comprising at least an integrated phone/PDA 400 being configured with integrated connectivity apparatus 406 comprising a CMOS multiple 201 antennas on at least a chip 329 operable with the CMOS multiple antennas 201 to realize at least 60 GHz frequency for faster data transmissions, and to provide global roaming for communications and for accessing transportation media topics of information, television media topics of information, communication media topics of information, educational media topics of information, and entertainment media topics of information. At least a communication port 422 is provided with the communication apparatus 400. Certain embodiments of the disclosure provide the communication apparatus comprising a GSM phone 400 being operable with at least a microprocessor 420. Some embodiments provide the communication apparatus being operable to allow multiple inputs/outputs 252. Other embodiments provide the communication apparatus comprising a touch interface 404 operable on a touch screen 260 configured for at least one of: interactive communication, interactive gaming, interactive music download, interactive television, video, social network, and phone book.

Yet other embodiments provide the communication apparatus being configured with at least a slider 352 operable to access multimedia buttons 353 and/or numeric keypads being configured with multi layer piezoelectric sensors 327. The multi layer piezoelectric sensors 327 further comprise crystals 328 configured with silicon-substrate-microfiber chip 329 configured to further provide voice operations and/or voice over text applications. Disclosed embodiments provide the communication apparatus being configured with voice over text technology operable to provide hands free texting applications while driving. Still, other embodiments provide the communication apparatus comprising of sensors 327 embedded in carbon fiber 408 and/or silicon substrate microfiber 330 to provide a resistive touch screen 260 and/or character recognition 269 and/or a communication board 301, in communication with at least one of: the chip 329, the multiple antennas 201, and the readable program 300. Certain embodiments provide housing 302 for the communication apparatus 400 comprising a carbon fiber 408 and/or a silicon substrate microfiber 329. Disclosed embodiments further provide the communication apparatus 400 being configured with at least a WAP browser 410 and/or an integrated GPS device 412 and/or an MP3 music device 414 and/or a camera apparatus 263 in communication with an interactive interface apparatus 172. The interactive interface apparatus 172 is operatively configured with at least a multi-protocol label switching 173 comprising at least a label switched path 174 operable on at least a support system 210. The support system 210 is operatively configured for mapping desired communications and to execute at least a process to at least one reference document 130. Disclosed embodiments further provide the communication apparatus 400 further configured with another CMOS antenna apparatus 418 being configured with a controller 421 in communication with a predictive text messaging applications 423. The controller 421 further comprises at least a logic circuit 422 in communication with the chip 329 in further communication with antenna apparatus 201 and 418. Certain embodiments provide the logic circuit 422 further comprises a computer readable program 300. The computer readable program further comprises a software program. At least the CMOS antennas 201 and 418 are coupled in parallel and shorted at a metal plate 501 to provide parallel plate transmission 507.

Disclosed embodiments further provide the support system 210 communicatively connected to at least a dedicated processing element 432 being operable for providing carrier based multicasting virtual private networks 178. Certain embodiments provide the communication apparatus 400 being configured with at least one of: infrared sensor 326, calendar 268, FM radio 424, Bluetooth technology 426, and GPRS Internet services 428. Disclosed embodiments further provide the communication apparatus 400 comprising a video poker machine 434 and/or a slot machine 436, and/or a handheld device 438 and/or a gaming device 4440 and/or a play station 442, and/or a television handset 444, in communication with communication port 422. Preferred embodiments provide the communication apparatus 400 comprising at least a client 450, at least a search engine for entertainment media, television media, wireless communication media, and for routing transportation media topics of information. In the disclosed embodiments, the communication apparatus 400 is configured with the CMOS antennas 201 and 418 being coupled to a chip 329 in communication with a logic circuit for signal amplification. Certain embodiments provide the CMOS antennas 201 and 418 further configured to provide a massive available bandwidth operable on high bit rates consisting of several Gbits per second. Some embodiments provide the multiple antenna apparatus 201 and 418 comprising of phase antenna array configured with a programmable phase shift to accommodate variable incoming signals on the same chip 329 and/or separate chip 403 and 329. Other embodiments provide the antenna apparatus 201 and 418 comprising CMOS based phased array transceiver operable on at least 60 GHz wireless network 600 for providing fast kiosk downloading and wireless high definition multimedia interface applications on at least a low power communication link 601. Embodiments further provide the antenna apparatus further comprising adaptive beam-forming multiple antenna apparatus being aligned on the communication circuit board 94 in communication with at least the logic circuit 407 and/or the software 300.

The antenna 201 can couple with a router 179 to provide antenna functionality to the router 179, for example where the router is a wireless router 179. For example, the router 179 can include at least one antenna 201. The antenna 201 can include a first reflective circuit 108 and a second lead 154 to couple to a radio-frequency (RF) transceiver 724 and/or to a radio-frequency (RF) transceiver 158. The RF transceiver 724 is coupled to a processor 420, which in one or more embodiments can operate as a baseband processor to process baseband signals. The processor 420 in one or more embodiments can operate as a broadband processor to process broadband signals. The processor 420 can couple to dedicated processing memory 432 that can store one or more instructions, including programs and data that can be utilized by processor 420. The processor 420 can couple to an interface module 172 to couple router 179 to network 20 and 21. Alternatively, router 179 wirelessly couples to the network 20 and 21. In one embodiment, the network 20 and 21 can include the internet or similar type of distributed network. Certain embodiments provide the network 20 and 21 comprises various network such as a local area network (LAN), wide area network (WAN), metropolitan area network (MAN), WPAN, WWAN, WLAN, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wideband CDMA (WCDMA), CDMA-2000, and the like. In one or more embodiments, the network 20 and 21 can comprise a cellular telephone network, a virtual private network, and a public switched telephone network.

Figure 44:
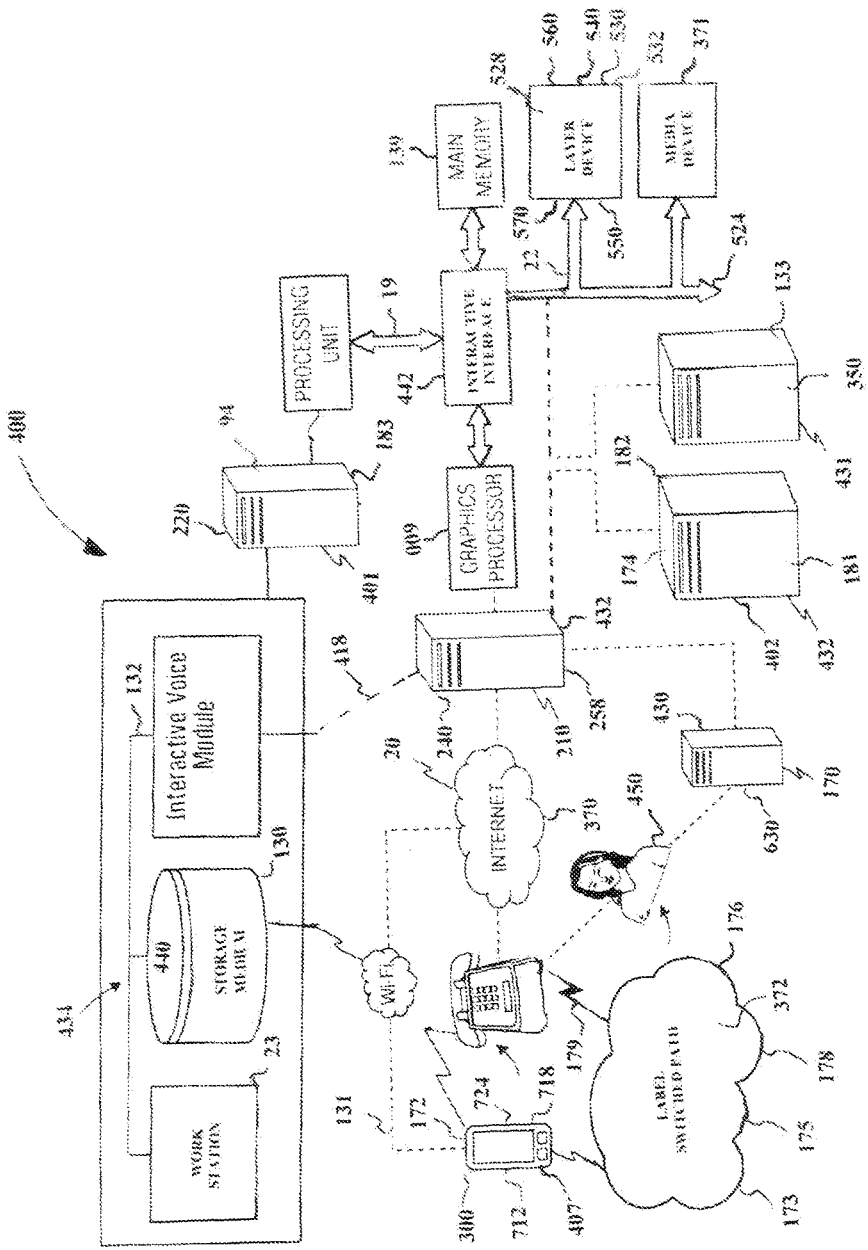
FIG. 44 is seen further exemplary embodiments of the communication apparatus in a structured environment.

Referring to FIG. 44 is seen exemplary embodiments of the communication network. Some embodiments provide a network 20 comprising distributed collection of nodes 22, interconnected by communication links 131 and segmented for transporting reference document data 130 between end nodes 22. Other embodiments provide at least one end notes 22 comprising computer devices and workstations 23. Disclosed embodiments provide the network 20 comprising local area networks (LANs); wide area networks (WANs). The communication apparatus 400 further comprises circuit board 94 comprising electronic system's applications, including embedded network and CMOS multiple antennas 201 and 418 in a network for at least one of: a wired communications device, a wireless communications device, a cell phone, a handheld communication device, laptop computer, desktop computer, telemetry device, a switching device, MP3 player, a router, a repeater, a codec, a LAN, a WLAN, a Bluetooth enabled device, a digital camera, a digital audio player and/or recorder, a digital video player and/or recorder, a computer, a monitor, a television set, a satellite set top box, a cable modem, a digital automotive control system, a control module, a communication module, a digitally-controlled home appliance, a printer, a copier, a digital audio or video receiver, an RF transceiver, a personal digital assistant (PDA), a digital game playing device, a digital testing and/or measuring device, a digital avionics device, a media device, a medical device, an entertainment device, and a digitally-controlled medical equipment.

Disclosed embodiments further provide the communication apparatus 400 disposed in a housing 301 consisting of silicon substrate microfiber 714. Certain embodiments provide the silicon substrate microfiber comprising a sensory platform operable to convert at least one of: temperature variations, pressure, force, vibration, solar energy, and motion into modulating frequencies and operating electrical energy. In further embodiments, the integrated circuit"1C" further comprises multiple antenna apparatus 201 and 418 embedded on at least a complementary metal oxide semiconductor integrated circuit 724, operable for communications with each other to form an intra-chip comprising of on chip multiple antennas communication network environment 718. Certain embodiments provide the on chip antennas 201 operable for wireless interconnections. Some embodiments provide the on chip antennas 201 and 418, operable for metal interconnections. Other embodiments provide the on chip antennas 201 and 418 comprising multiple CMOS antenna apparatus 724. The multiple antenna apparatus 201 and 418 further comprising on chip signal communication network 718 for wireless communications. The network 718 further comprises nano wires 714 configured for multicast protocol label switching network 173 on a contemporary chip layer 403 comprising a network platform. The contemporary chip layer 403 is in communication with a logic circuit 407. Disclosed embodiments provide the logic circuit 407 further comprises a software program 300.

The support system 210 further comprises a social network platform 240 comprising a social network environment operatively configured for multicast virtual private network 178. Disclosed embodiments provide the virtual private network 178 comprising apparatus operable for transmitting same data to multiple receivers in a network. Certain embodiments provide the multicast virtual private network 178 comprising at least a multicast packet 176 configured for replication with at least a router 179. The multicast private network 178 further configured with the network interface 170 for advancing transportation media knowledge, entertainment media, advertisement media, and television media. The network interface 170 further comprises: at least a computer device 401 comprising a computer recordable medium 10 being operable on a computer readable program 300. The computer readable program 300 is configured to cause at least one computer device to receive plurality of media reference documents in communication with client interactive interface module 172. The client interactive module 172 is further operatively configured with at least a multi-protocol label switching 173 operable with at least the support system 210. The support system 210 is further configured for mapping desired communications. Disclosed embodiments further provide the multicast-protocol label switching 173 further comprising apparatus being configured to direct data from network note 22 to network 20 and 21 in communication with the virtual link 131. Certain embodiments provide the multi-protocol label switching further comprising apparatus configured for carrying data from network note 19 to network note 22 in communication with the virtual link 131. At least one support system 210 is configured with the social platform 240 and communicatively connected to at least a dedicated processing element 432.

The multi-protocol label switching 173 is further configured to speed up network traffic flow to effectively mange structured reference documents comprising transportation media topics of information. Other embodiments provide the virtual private network 178 further comprising the router 179 in communication with the multiprotocol label switching network 173. The router 179 is configured for the distribution of reference documents and media topics of information across a shared multiprotocol label switching network 173. Disclosed embodiments provide the router further includes Internet protocol addresses 181 for establishing multiple switched paths 182 with the multiprotocol label switching network 173. Other embodiments provide the multiple switched paths comprising plurality point to point paths assignments for the reference documents, transportation media documents, and for social network. Some embodiments provide the router 179 further configured for maintaining communications with at least the database 130 containing reference documents and transportation media reference documents, including transportation topics of information. Other embodiments provide the database further comprising prefix of the topics of information that matches addresses in the packet's network address fields, comprising transportation media topics addresses, communication media topics address, television media topics address, advertisement media topics addresses, and entertainment media topics address. Disclosed embodiments further provide the communication apparatus 400 comprising Internet protocol configured to determine at least a direction for the packet transmission from the router 179 to at least a remote computer device 401. In the disclosure, the packets further include Internet protocol data-gram comprising network addresses for remote destinations 431.

Certain embodiments provide the dedicated processing element 432 further operable for providing carrier based multicast virtual private networks environment 178. Some embodiments provide multi-protocol label switching 173 consisting of labels 175 comprising packets 176 to forward decisions made on the contents of the labels. Disclosed embodiments further provide the communication apparatus 400 further operable for categorizing files for at least one of: transportation media topics; communication media topics; television media topics; advertisement media topics; and entertainment media topics referenced by initial search results; comprising implementing at least a method for receiving at least a query that maps to objects identifier for transportation media topics addresses, communication media topics address, television media topics address, educational media topics addresses, advertisement media topics addresses, and entertainment media topics address. The virtual private network further comprises interactive collaboration within the media topics reference documents. The communication apparatus 400 in communication with the virtual private network 178, further comprises a server-based social network platform 258 operable for community distribution of knowledge, including transportation media topics, educational media topics, communication media topics, television media topics, advertisement media topics, and entertainment media topics. The virtual private network 178 is further configured with document management system 183 comprising a server database that includes at least a professional functionality and a plurality of interactive functionalities. Disclosed embodiments provide the interactive functionality further comprising transportation media topics personnel, communication media topics personnel, television media topics personnel, educational media topics personnel, advertisement media topics personnel, entertainment media topics personnel, and other personnel who may assemble into the networks through the social platform 258.

The interactive functionalities further include allowing networks of transportation media topics personnel, communication media topics personnel, educational media topics personnel, television media topics personnel, advertisement media topics personnel, entertainment media topics personnel, and other personnel, including scientists, engineers, students, universities, transportation personnel to share knowledge and documents in a remote secured environment. Disclosed embodiments provide the communication apparatus 400 further configured with software applications 300, further operable to remotely create, delete, edit and manage transportation media documents, television media documents, educational media documents, communication media documents, advertisement media documents, educational media documents, and other media documents, and view information about these documents in a plurality of customized locations.

Certain embodiments provide the communication apparatus 400 further comprising at least a neural network 220 in communications with at least a cache engine 350 operable for responding to at least a topic request comprising at least one of: transportation media documents, television media topics, entertainment media topics, communication media topics, advertisement media topics, educational media topics, and other media topics, using a server response data that is cached at the networks 20 and 21, being operable with at least a programmable architecture 524. Disclosed embodiments provide the programmable architecture 524 being configured with at least one dedicated processing elements 432. Certain embodiments further provide the cache engine 350 in communication with cache database 133. Some embodiments provide the communication apparatus 400 further comprising a search engine 402 in communication with the cache engine 350 being configured for applications that include internet 370. Other embodiments provide the search engine 402 in communication with at least a crawler 174 and an index database 132. The communication apparatus 400 further comprising virtual private networks 178 configured to deliver/broadcasting communications data via Internet Protocol Television edge routers 371 operable on the multi-protocol label switching environment 372. Disclosed embodiments provide the multi-protocol label switching environment 372 operable for sharing multicast state media data through a delivery tree comprising at least a server tool 009 in communication with other electronic devices via at least one of: Internet 370; broadcast channels; media communication channel; entertainment channel; educational channel; network channel. The computer device 401 is further configured with software program 300 comprising at least computer instructions in communication with at least an application tool comprising a module 630 operatively configured for delivering broadcast channels via Internet Protocol Television edge routers 371, in communication with the multicast virtual private networks 178. Certain embodiments provide the virtual private network 178 operable for sharing and/or permitting at least a network client 450 to access a database 130 and 133 comprising structured media topics of information contained within at least one of: transportation media topics addresses, communication media topics address, educational media topic addresses, television media topics address, advertisement media topics addresses, and entertainment media topics address.

Some embodiments provide the communication apparatus comprising computer readable storage medium 440. The computer readable storage medium 440 further comprises computer instruction being further operable for sharing the same multicast state and multicast delivering tree through a centralized communication environment 370. The centralized communication environment further comprises the search engine 402 operable for centralizing at least one remote computer apparatus 401 through at least a cable and/or wireless connections. The communication apparatus 400 is further configured for providing at least a physical connection for at least a network infrastructure operable for managing at least one computer device at a remote location. Disclosed embodiments provide at least one interface module 170 operatively configured for network connectivity in communication with network infrastructures 20 and 21. At least one network connectivity further comprises communications with at least a remote computer apparatus 401, and the network infrastructure 20 and 21 further operable for disposing at least one of: network management, remote network operation, network client authentication, security, network communications, identifications, permissions and/or rights, and for locating at least a physical address of at least one remote computer within the networks 20, 21 and 178. Disclosed embodiments further provide the communication apparatus 400 is configured with interactive voice module. The communication apparatus further comprising at least a layer device 528.

The layer device 528 further comprising at least one of: a model Layer 532 comprising computer instructions operable in multicast virtual private network for providing structured network communications consisting of at least one of: transportation media topics of information, television media topics of information, communication media topics of information, education media topics of information, advertisement media topics of information, and entertainment media topics of information; an application layer 530 comprising computer instructions operable in at least a multicast domain tree for providing structured application services for at least one of: consisting of at least one of: transportation media topics of information, television media topics of information, communication media topics of information, advertisement media topics of information, education media topics of information, and entertainment media topics of information; a presentation layer 540 comprising private edge router operable for providing coding to structured data for at least one of: transportation media topics of information, television media topics of information, communication media topics of information, education media topics of information, advertisement media topics of information, and entertainment media topics of information; a session layer 550 comprising at least one module operatively configured with at least one interface module 170 operable for broadcasting/channeling at least a single communication signal for delivering structured data from at least one of: transportation media topics of information, television media topics of information, communication media topics of information, education media topics of information, advertisement media topics of information, and entertainment media topics of information, to at least an end client; a network layer 570 comprising at least a call signal transmission processing module operable for providing structured communications consisting of at least one of: transportation media topics of information, television media topics of information, communication media topics of information, education media topics of information, advertisement media topics of information, and entertainment media topics of information, via at least an Internet protocol 370; and a transport layer 560 comprising apparatus operable for providing structured topics of information for at least one of: transportation media documents, television media documents, entertainment media documents, communication media documents, advertisement media documents, educational media documents, and other media documents, for communication between at least a computer apparatus 401 and at least a gateway/default gateway 442. Certain embodiments provide the communication apparatus 400 further comprising apparatus for updating connectivity and/or for providing/receiving structured technical support.

In one or more embodiments, router 179 is configured for utilizing antenna 201 to communicate using one or more wireless transmission standards. For example, at least one of RF transceiver 724 in communication with router 179 which can be arranged to communicate using a wireless local area network transmission standard. Disclosed embodiments provide the router 179 operable for multiple-input, multiple output (MIMO) communications. In a MIMO type embodiment, the router 179 can utilize one of antenna 201 for MIMO type and/or smart antenna type communication, for example where RF transceiver 724 and RF transceiver 418 are arranged to operate in a MIMO type mode. In one particular embodiment, router 179 can be a MIMO Wireless Router. Certain embodiments provide the router 179 comprising at least one of: a spatial division multiple access (SDMA) system, smart antenna system, and/or a multiple input, multiple output (MIMO) system in communication with the network 20 and 21. The network 20 and 21 can include a public network such as a telephone network, the internet, and virtual private network. The processor 420 can operate to provide baseband and/or media access control (MAC) processing functions. The processor 420 further comprises at least one of: a single processor, a baseband processor, and an applications processor. The processor 420 can couple to dedicated processing memory 432 which can comprise volatile memory such as DRAM, non-volatile memory such as flash memory, including storage. Some portion or all of dedicated processing memory 432 can be included on the same integrated circuit as processor 420. Disclosed embodiments provide the dedicated processing memory 432 disposed on an integrated circuit and/or other medium, for example a hard disk drive that is external to the integrated circuit of processor 420. Disclosed embodiments provide a CMOS multiple antennas comprising a shorted end further comprises reactive loading portion of the antenna configured with means to lengthen the current path, thereby reducing the overall resonant. The antenna shorted end comprises nano wires consisting of a coaxial feed configured to receive electromagnetic waves and to transmit the energy through the nano wires for conversion into electrical energy. Certain embodiments provide the shorted end comprising a wireless communication framework for communication with networks and other remote electronic devices. The dedicated memory further comprises a memory bus comprising of bus architectures, including read-only memory (ROM), random access memory (RAM), basic input/output system (BIOS) memory, EPROM, and EEPROM.

Figure 45:
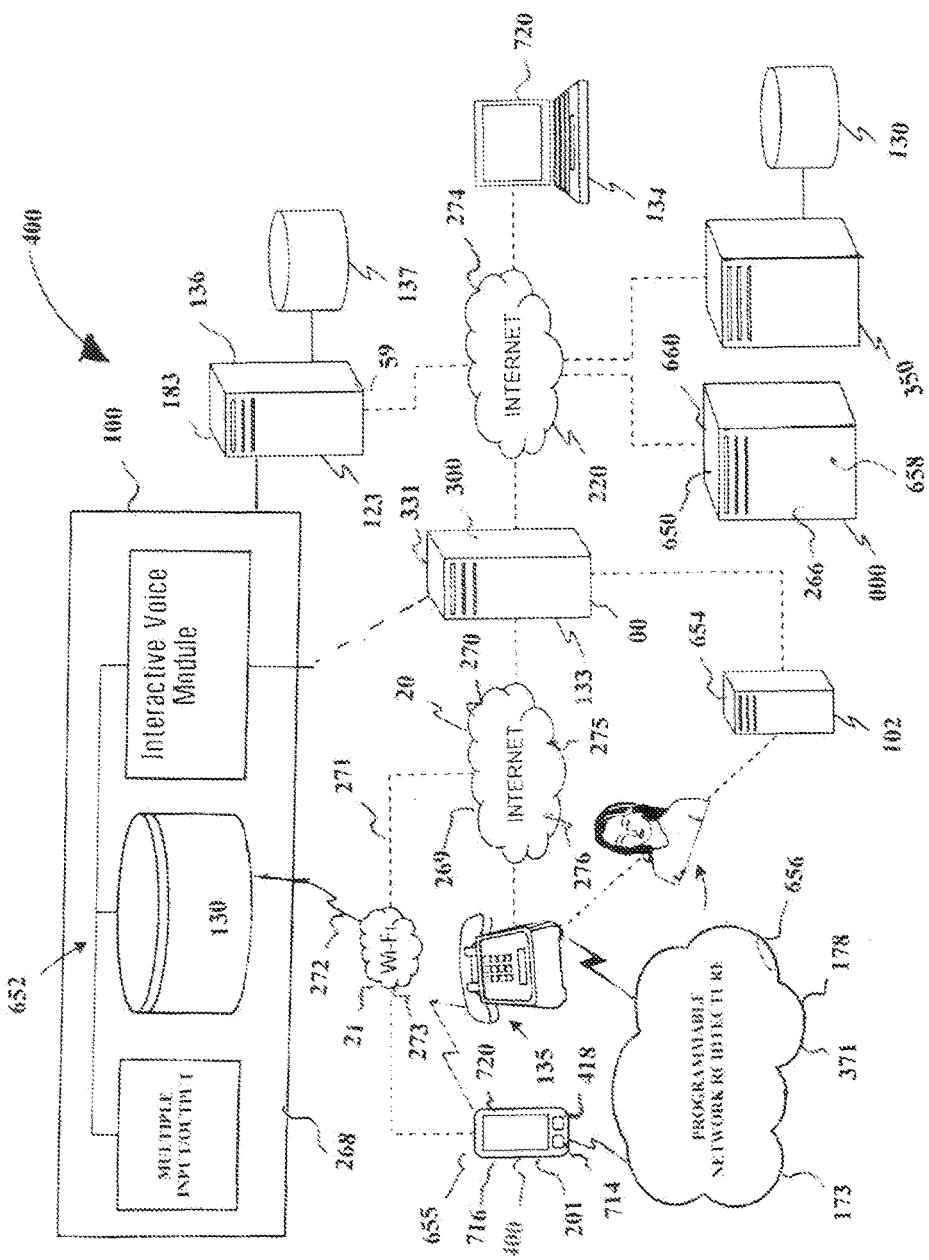
FIG. 45 is seen further exemplary embodiment of the communication apparatus in a network environment.

Referring to FIG. 45 is seen further exemplary embodiments of the communication apparatus 00 in communication with interactive voice module. The communication apparatus is seen operable in a network environment 20 and 21. Disclosed embodiments provide a neural network 220 configured with the data modeling tool 100 operable for deleting and/or updating at least a structured database 130 and 133, comprising at least one of: transportation media documents, television media documents, entertainment media documents, communication media documents, advertisement media documents, educational media documents, and other media documents. At least one data modeling tool is communicatively connected to at least an array 102 operable for Web browsing. At least one neural network 220 further configured with a decision engine 123 responsive to the topics of information. Disclosed embodiments provide the neural network 220 further configured with at least one cache engine 350, further responsive to at least a downloadable context 130, comprising at least one of: transportation media documents, television media documents, entertainment media documents, communication media documents, advertisement media documents, educational media documents, and other media documents. Certain embodiments provide the computer readable program 434 in communication with the neutral networks 220. The at least one computer readable program 434 further comprising at least software 300 operable with computer instructions programmed for at least one of: delivering broadcast channel through Internet Protocol Television edge routers 371, using multicast virtual private networks 178 for at least a broadcast channels, applying at least a multicast protocol label switching 173 to at least one virtual private networks 178, sharing the same multicast state and providing at least one broadcast channels in communication with each virtual private networks 178, training each neural network 220 for adjusting at least a correlation of at least one media topics as a function of at least an activity consisting of at least a topic and/or a product of content consisting of at least one of: transportation media documents, television media documents, entertainment media documents, communication media documents, advertisement media documents, educational media documents, and other media documents or topics of information.

Servers 00 and 000 are configured with at least a key to the database 130 and 133 to encode a particular location in a hierarchical grid comprising the media topics. The topics are distributed among the constituent database servers on the basis of the location regions of the database that each server manages. The database servers are partitioned for the media topics for communications among the constituent servers. Each server is configured to mange different media topics partitions for distribution efficiency. At least larger clusters 134 are broken down into smaller clusters 135 comprising smaller key groups of the media topics of information for logical representation of splitting process through binary tree 136. Disclosed embodiments further provide the servers 00 and 000 configured for receiving a topic request specifying a particular key group combination that determines if a query should be processed. Certain embodiments provide logical steps needed to respond to the query in case the server 00 and 000 determines that the key group combination is incorrect, or that the query should be communicated to an alternate server. The communication apparatus 400 is further disposed for detailing the steps a client is seeking to determine the appropriate server for a particular key group.

The communication apparatus is further configured for applying adaptive load distribution technique based on the representation of the media topics on a distributed hash table 137. The communication apparatus further comprises document management tool 183 comprising information processing apparatus communicatively connected to memory device 59 for storing digital broadcast content of the reference document for which a number of copies can be made, and include a writing device 650 for writing the content on external recording medium 652, in communication with an IC medium reader/writer 654 and 655 operable for reading an IC medium 656 and for recording the number of copies that can be made of the content on the IC medium in association with the document identifier 658. The communication apparatus is further configured for determining whether an identifier of the content is recorded on the IC medium 656 when the content is copied to the external recording medium 652 and, when it is determined that the identifier is recorded, the hash table 137 controls the writing device to write the content on the external recording medium and updates the number of copies that can be made of the content and a hash value is recorded in the memory 660. In the disclosed embodiments, key groups of the media topics are associated with a variable depth of topics of information based on virtual private network 178. The virtual private network 178 further directs identifiers 266 containing queried media topics 268 to a particular key group server comprising target servers 00 and 000. The servers 00 and 000 are distributive, operable to exchange local signaling messages to determine the particular topics of information that is being queried in relation to the media topics 268.

The communication apparatus 400 is further operable on various networks 20, 21, and 178, including CDMA 269, TDMB 270, DIGITAL 271, ANALOG 272, GSM 273, local area network "LAN" 274, WPAN 275, and WLAN 276. Disclosed embodiments provide the chip 329 disposed with amplifier apparatus 331. Certain embodiments provide the chip 329 disposed with CMOS multiple antenna apparatus 201 and 418, operable on a logic circuit 407 for analyzing signal strength and for providing faster data transmission speed. Some embodiments provide the chip 329 comprising CMOS antennas 201 and 418 disposed with at least an opened end 716, and at least a shorted end 720. The opened end is further disposed with temperature sensor and/or electrode 716. The shorted end 720 is further configured with nano wires 714 for antenna network and for communication with energy platform 730. The platform further comprises silicon substrate microfiber consisting coupled to CMOS antenna circuit 724. The CMOS circuit 724 comprises a logic gate consisting of p-type and n-type metal oxide semiconductor comprising field effect transistors operable on multiple state paths consisting of: 1. at least a path to the output from the voltage "pulled up;" 2. at least a path from the ground "pulled down."

Figure 46A:
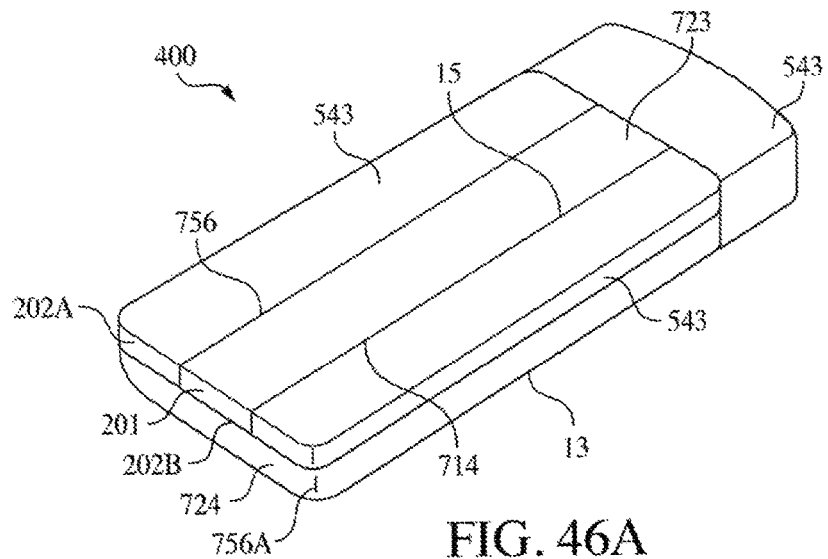
FIG. 46A is an exemplary embodiment a communication avaratus that includes a phone case and a housing comurisin a solar cell platform.

Referring to FIG. 46A is seen further exemplary embodiment of the disclosure, comprising a communication apparatus 400. The communication apparatus is further configured with a housing 014, comprising a solar cell platform 756. At least a communication circuit board 013 is disposed in the housing 014. The communication circuit board further comprises a solar cell platform 756 disposed with a CMOS multiple antenna on chip 201. The CMOS multiple antenna 201 is further configured with a nano-wire 714 in communication with a rectifier 015 operable for converting electromagnetic radiation into electrical energy. Embodiment provides the cell platform 756 further comprises a thick oxide 202A, a thin oxide 202B, a semiconductor silicon substrate nano-fiber/microfiber 723, a substrate 724, in association with the CMOS multiple antenna on chip 201. The nano-wire 714 further comprises metal gold 543, in association with the antenna 201. Certain embodiment provides the housing 014, further comprising a cell phone case 756A. The housing made of silicon substrate microfiber comprising a solar cell platform. The housing could be a combination of both solar cell material and piezoelectric element. The reason is to increase the energy efficiency since solar cell is band gap limitation. The CMOS multiple antennas on chip is embedded on the communication circuit board. The antennas may be opened on one end, and shorted on the other end. The shorted end is configured with nano-wires in association with a rectifying circuit. Disclosed embodiment provides a platform for an E-PHONE, capable of harvesting microwave and infrared power, and converting the powers/electromagnetic radiation into electrical energy. The communication circuit board further comprise a platform for converting solar energy into DC power and for converting electromagnetic radiation into DC power. A rectifying circuit is further disposed, comprises of a thin oxide layer for measuring the voltage, in communication with the platform for converting electromagnetic radiation and solar energy into DC power. Because photovoltaic cells are only 35-40 percent efficient, disclosed embodiment provides means for converting electromagnetic radiation into usable power, which is required since the rectifying circuit is not band gap limitation and would harvest energy based on the wave behavior of light. Certain embodiment provides nano-wires with good electrical properties, such as gold. Some embodiment provide apparatus for converting a forms of energy into DC power.

Figure 46B:
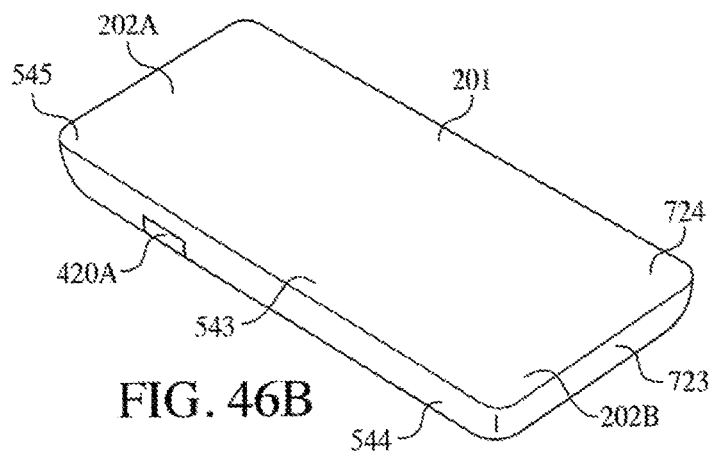
FIG. 46B ig an exemplary embodiment the communication apparatus disposed with a female USB port associated with an oxide substrate.

Referring to FIG. 46B is seen further exemplary embodiment of the disclosure, further comprising the housing 014 being disposed with a female USB port 420A, a thick oxide substrate 202A, a thin oxide substrate 202B, a metal gold 543, a substrate 724, in communication with a CMOS multiple antenna on chip 201, a semiconductor silicon substrate nano-fiber/micro-fiber 723. The semiconductor substrate further comprises a meta material structure cavity 544 in association with an electro-chromic element 545.

Figure 46C:
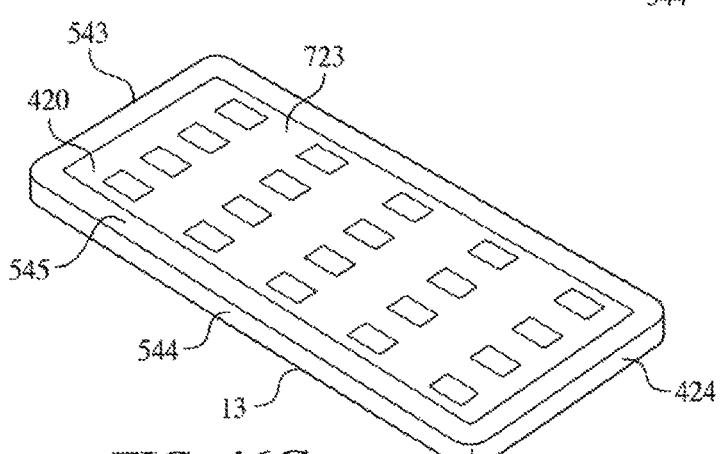
FIG. 46C is an exemlarv embodiment the communication avaratus disposed with a conununication circuit board.

Referring to FIG. 46C is seen further exemplary embodiment of the disclosure, comprising the housing 014, further disposed with a communication circuit board 013, in association with a display device 424. The display device 424 is further configured with piezoelectric element 420 operable for converting pressure force and vibration into electrical energy. Certain embodiment provides the semiconductor silicon substrate further comprises a silicon germanium material in association with an electrical conductive element. Some embodiment provides the electrical conductive element further comprises at least a meta material structure cavity 544. Other embodiment provides the silicon substrate further comprises clear silicon consisting of electro-chromic element 545. Embodiment provides the semiconductor element in association with at least a metal gold 543.

Figure 47A:
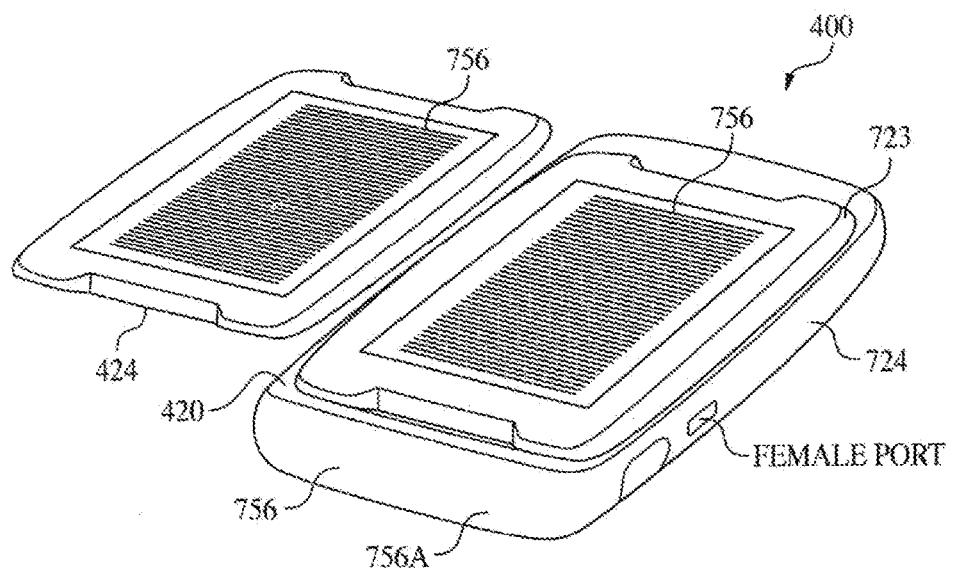
FIG. 47A is an exemplary embodiment of the solar cell case with embedded CMOS antennas and a female USB port.
Figure 47B:
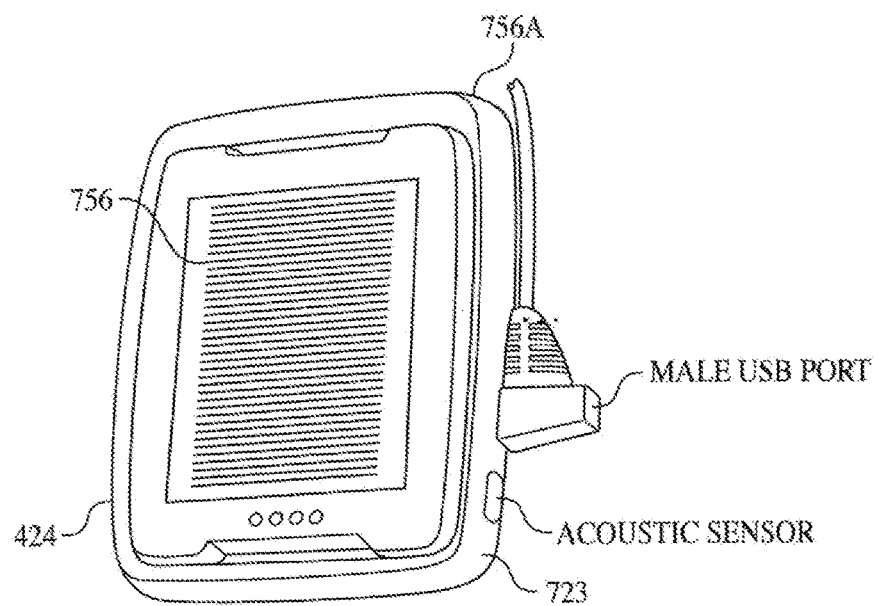
FIG. 47B is an exemplary embodiment of the solar cell case with embedded CMOS antennas and a male USB port.

Referring to FIG. 47 is seen further exemplary embodiment of the disclosure, further comprising the case 756A, comprising a solar cell platform 756. The case 756A, is further disposed with a piezoelectric element 420, a substrate 724 in association with a CMOS multiple antenna on chip 201. Embodiment further provides the case 756A comprising a semiconductor silicon substrate nano-fiber/microfiber 723, comprising an energy harvesting platform 756. Certain embodiment provides the case 756A comprising energy harvesting platform. Some embodiment provides the case 756A, further comprising a device operable for boosting communication signal to improve signal reception. Other embodiment provides the case comprising a portable signal boosting apparatus. Disclosed embodiment provides the communication apparatus 400 being inserted in the case. At least a female USB port is provided. At least a substrate 724 is provided. At least a display device 424 is provided. At least a male USB port is configured to be inserted into the female USB port. At least the insertion of the male USB port into the female USB port further provides means for supplying energy to at least the communication apparatus 400. Certain embodiment provides the communication apparatus 400 further configured with acoustic sensor for converting sound wave into electrical energy. The preceding acoustic sensor further comprises an optional configuration, providing other source of energy harvesting within the environment where the phone is being used. The acoustic sensor is in association with the CMOS multiple antennas to harvest energy from two fronts. 2A.) The acoustic sensor would convert sound waves "Voice communication" into usable energy. 2B.) The CMOS multiple antenna would convert electromagnetic radiation and solar energy into usable energy.

Figure 48A:
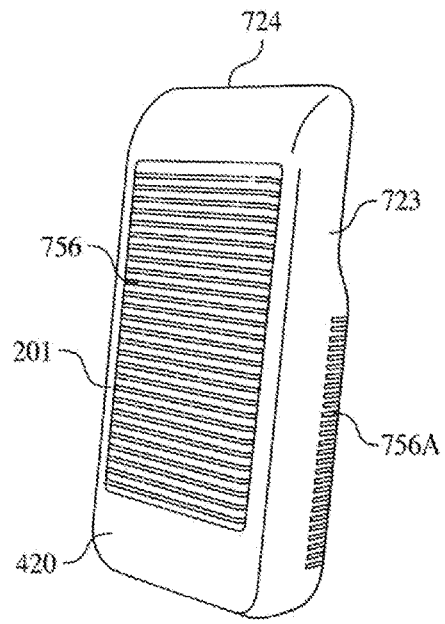
FIG. 48A is further seen an exemplary embodiment of the solar cell case with embedded CMOS.

Referring to FIG. 48A is seen further exemplary embodiment of the disclosure, further comprising the case 756A, comprising a solar cell platform 756. The case 756A, is further disposed with a piezoelectric element 420, a substrate 724 in association with a CMOS multiple antenna on chip 201. Embodiment further provides the case 756A comprising a semiconductor silicon substrate nano-fiber/microfiber 723, comprising an energy harvesting platform 756. Certain embodiment provides the case 756A comprising energy harvesting platform. Some embodiment provides the case 756A, further comprising a device operable for boosting communication signal to improve signal reception. Other embodiment provides the case comprising a portable signal boosting apparatus.

Figure 48B:
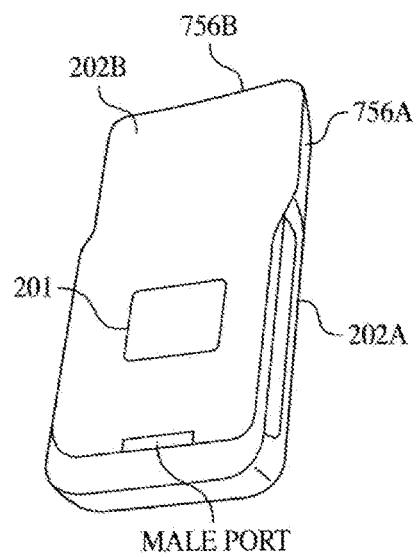
FIG. 48B is further seen an exemplary embodiment of the solar cell case with embedded CMOS.

Referring to FIG. 48B is seen further exemplary embodiment of the case 756A, comprising a cell phone case. Certain embodiment provides the case 756A, comprising an inside 756B, being configured with a USB male port and an antenna apparatus 201. Some embodiment provides the case 756A, further comprising at least a thick oxide 202A, at least a thin oxide 202B, operable for energy harvesting.

Figure 48C:
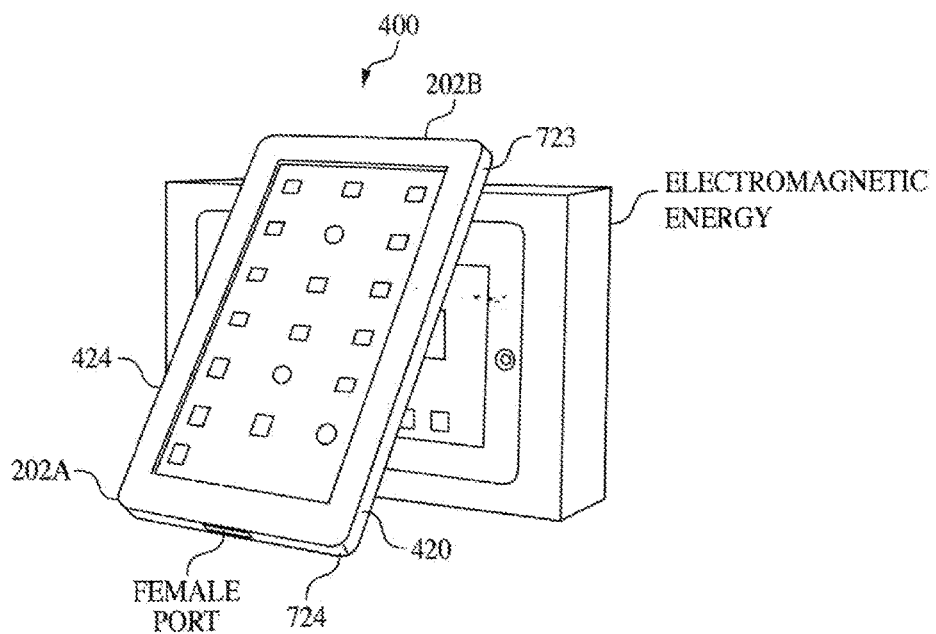
FIG. 48C is further seen an exemplary embodiment of an energy harvesting case further configured for electromagnetic energy harvesting.

Referring to FIG. 48C is seen further exemplary embodiment of the disclosure, comprising the communication apparatus 400, being disposed in an environment where there exists electromagnetic energy. The communication apparatus 400 further comprises a display device 424, being configured with piezoelectric element 420. Certain embodiment provides the communication apparatus 400, further comprising a female USB port, a thick oxide 202A, a thin oxide 202B, a substrate 724, and a semiconductor silicon substrate nano-fiber/microfiber 723. Some embodiment provides the communication apparatus further comprises a platform for harvesting electrical energy.

Figure 49:
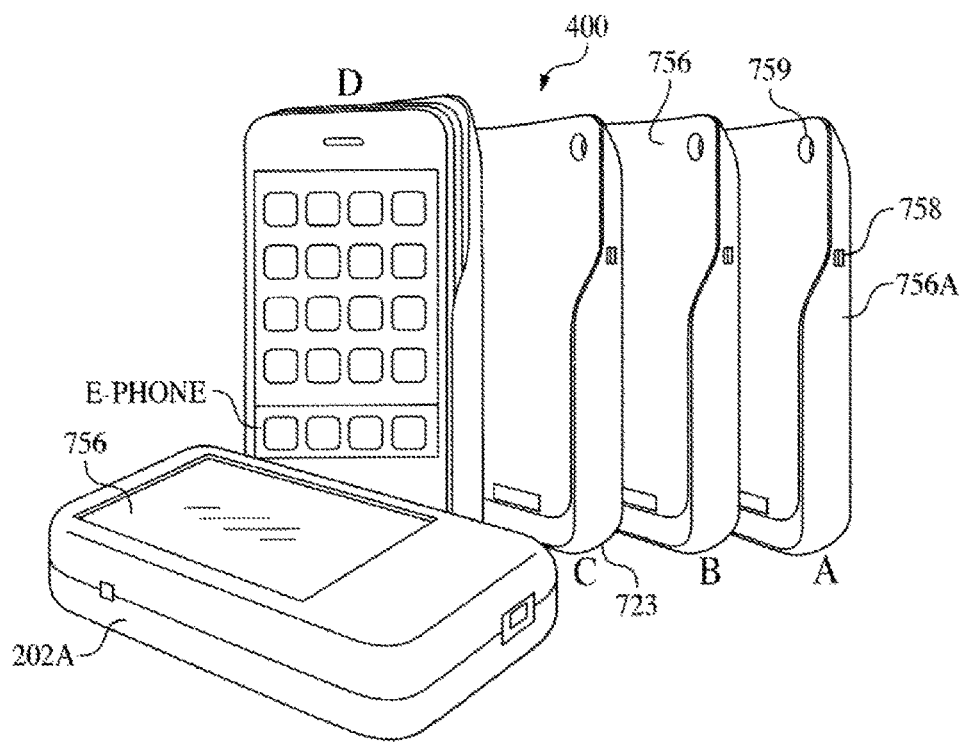
FIG. 49 is further seen an exemlarv embodiment of an energy harvesting case "E-CASE" in association with an energy harvesting phone "EPHONE" further configured for electromagnetic energy harvesting.

Referring to FIG. 49 is seen further exemplary embodiment of the case 756A, being configured for harvesting energy from various means as seen in case A, B, C, and D, further comprises semiconductor silicon nano-fiber/microfiber 723 comprising a cell platform 756. Embodiment further provides the case 756A, comprising a case configured with thick oxide 202A and/or booster apparatus for the communication apparatus 400. Certain embodiment provides the communication apparatus further comprises an E-PHONE.

Figure 50:
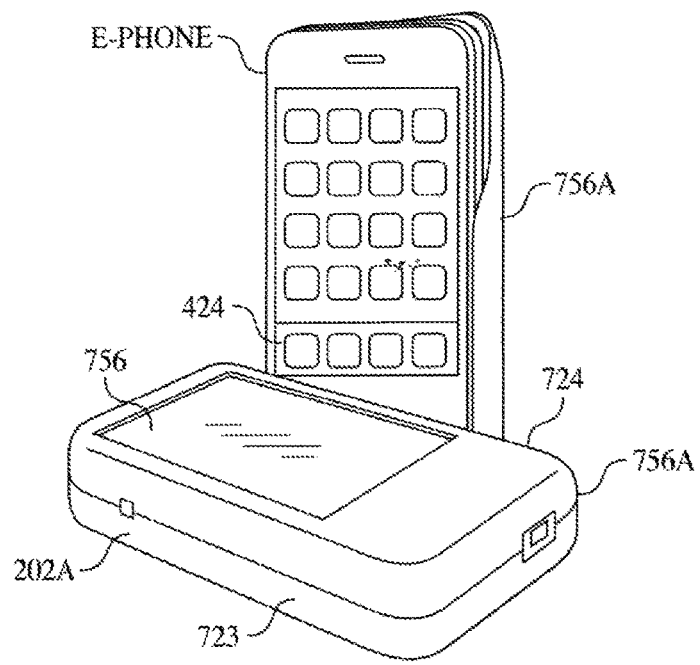
FIG. 50 is further seen an exemplary embodiment of the energy harvesting case "ECASE" and the energy harvesting phone "EPHONE."

Referring to FIG. 50 is seen further exemplary embodiment of the disclosure, comprising an E-PHONE being configured with a display device 424. The E-PHONE is further inserted into a case 756A, further comprising an energy harvesting apparatus 756. The case 756A is further configured with semiconductor silicon nano-fiber/microfiber 723, and a substrate 724. The E-PHONE is an energy harvesting phone, and each day we do not account for the areas of energy that are being used. When we dial a number using our phones, we are actually applying pressure on the surface of the phone, which is another form of energy. Some people go jogging with their phones attached to their bodies. The incorporation of the piezoelectric element on the display or in association with the phone housing provides a sensory platform for converting force/vibration into electrical energy. Disclosed embodiment provides an E-PHONE for energy harvesting. The touch screen could be part of the E-PHONE because any amount of pressure on the surface could be converted into electrical energy. The touch screen device is also configured with acoustic sensor in association with the communication circuit board.

Cell phone case further comprises silicon substrate microfiber comprising a solar cell platform. The platform is configured with a rectifier for converting energy within the environment, solar and "microwave, infrared etc. collectively called electromagnetic wave," into DC power. Because conventional smart phones are not self-ready for energy harvesting, this case provides means for current smart phones without energy harvesting capabilities to harvest energy using the case to extend communications and also to prolong battery life. The solar cell platform is further configured with nano-sensors and alloyed with meta material structure cavity embedded to provide a platform for energy harvesting that include electromagnetic radiation. The rectifier is further affixed on a male USB port, similar to the conventional charger inserts for smart phones, and is connected to the case by a flexible structure "An elastic ribbon-like structure with conductive nano-wires." The power is directed to the conventional female charge port for smart phones through the male USB port to keep the battery charged "Battery circuit." The incorporation of meta material structure cavity and nano sensors embedded in the solar cell material would be required moving forward to provide an electromagnetic wave transport stream for electromagnetic wave absorption. In this endeavor, the electromagnetic energy would be converted into DC power to compensate for the band gap limitation of solar cell and to increase the efficiency of the energy harvesting case.

Figure 51:
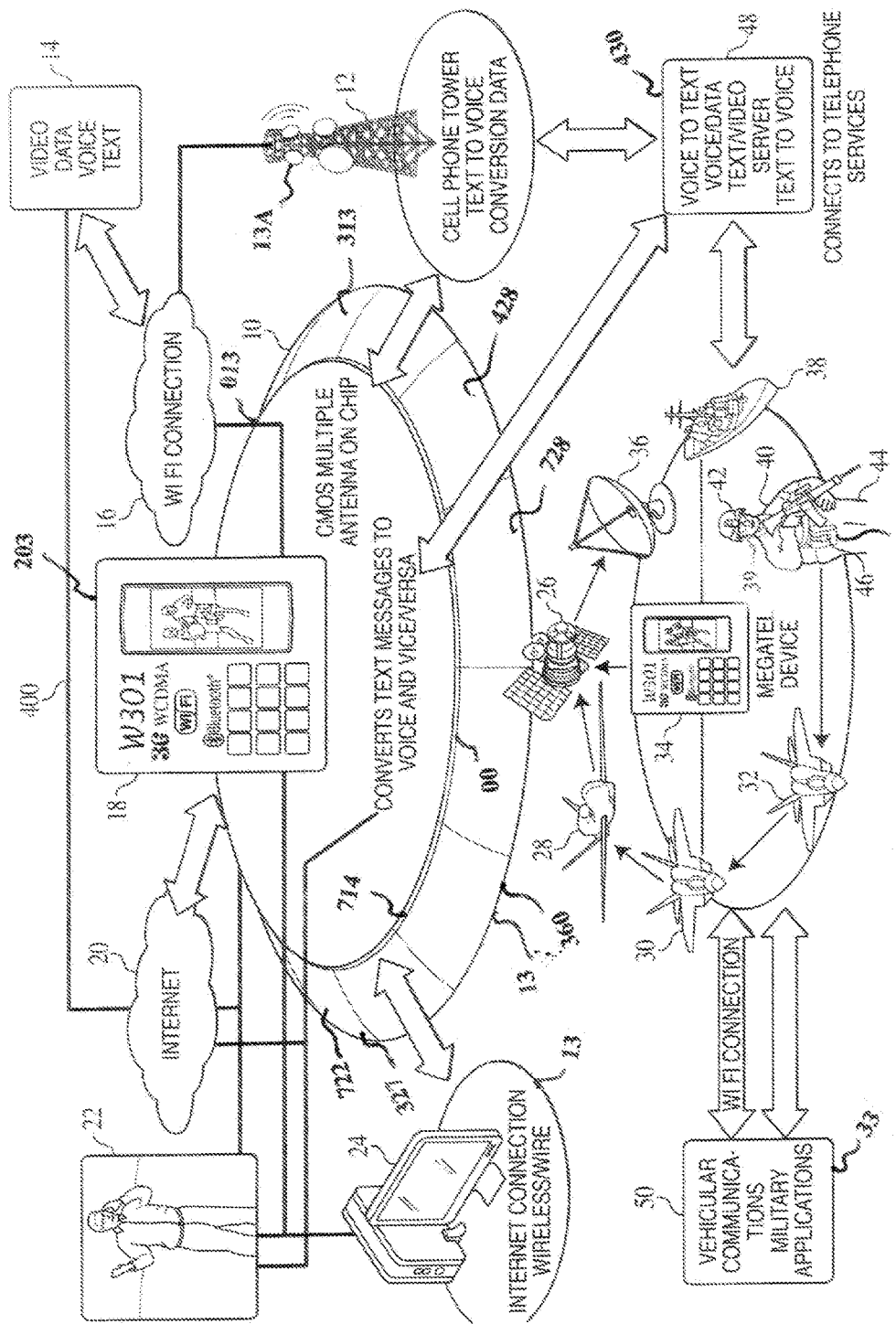
FIG. 51 is an exemplary embodiment the communication apparatus comprising a 50 energy harvesting communication network "E-NETWORK."

Referring to FIG. 51 is seen exemplary embodiment of the disclosure, comprising a communication apparatus 400 in communication with CMOS multiple antennas on chip 10. The CMOS multiple antennas on chip is configured with silicon substrate microfiber/nano-fiber. Disclosed embodiments provide the CMOS multiple antennas on chip configured for communications and for converting text messages to voice auditory messages and for converting voice messages to text messages. The CMOS multiple antennas on chip is configured for installation on cell phone towers 12, further operable for converting electromagnetic radiation into electrical energy. Certain embodiments provide the CMOS multiple antennas on chip comprising a video data/voice text device 14. Some embodiments provide the CMOS multiple antennas on chip operable for Wi-Fi connections 16. Other embodiments provide the CMOS multiple antennas on chip comprising at least a receiver apparatus and/or a transmitter apparatus for communication device 18. The communication device may comprise at least a 4G and/or at least a 5 G communication device operable on at least a millimeter wave spectrum. The communication device may comprise a 4G and/or 5G operable on a WCDMA and/or a Wi-Fi network. Some embodiment provides the communication device comprising an energy harvesting smart phone "E-PHONE."

The E-PHONE comprises a smart phone disposed with a housing made of silicon substrate microfiber comprising a solar cell platform. The housing could be a combination of both solar cell material and piezoelectric element. The reason is to increase the energy efficiency since solar cell is band gap limitation. Certain embodiment provides the communication apparatus comprising a CMOS multiple antennas on chip, being embedded on a communication circuit board 13. The shorted end is configured with nano-wires in association with a rectifying circuit capable of harvesting microwave and infrared power, and converting these powers/electromagnetic radiation into electrical energy. The communication circuit board further comprise a platform for converting solar energy into DC power and for converting electromagnetic radiation into DC power. The rectifying circuit may comprise of a thin oxide layer for measuring the voltage, providing a platform for converting electromagnetic radiation and solar energy into DC power. Because photovoltaic cells are only 35-40 percent efficient, converting electromagnetic radiation into usable power is required since the rectifying circuit is not band gap limitation and would harvest energy based on the wave behavior of light. The nano-wires provide good electrical properties, and may consist of gold. Disclosed embodiments further provide the communication device comprising at least a Bluetooth. Certain embodiments provide the CMOS multiple antennas on chip further comprising Internet device 20, operable for communications and for providing faster data transmission and communication clarity. The Internet device further comprises at least a handheld device 22. Some embodiments provide the Internet device further comprises a computer apparatus 24 configured for wired/wireless Internet connectivity in association with the millimeter wave spectrum. Other embodiments provide the Internet device comprising apparatus operable for Intranet communications. Disclosed embodiments further provide the CMOS multiple antennas on chip device comprising at least a transceiver apparatus 26. Certain embodiments provide the transceiver apparatus further comprising at least aircraft 28. Some embodiments provide the transceiver apparatus further comprises at least airplane 30. Other embodiments provide the transceiver apparatus further comprises military craft 32, at least a vehicle 33 comprising a mobile backhaul link. Disclosed embodiment further provides the backhaul link comprising multiple antennas being opened on one end and shorted on the other end. At least the shorted end is disposed with nano-wires/tubes 714 operable for converting electromagnetic radiation into DC power. At least an acoustic sensor 203 is configured with the circuit board 13 for providing other source of energy harvesting platform within the environment where the phone may be used. The acoustic sensor 203 is in association with the CMOS multiple antennas 201 to harvest energy from two fronts. 2A.) The acoustic sensor would convert sound waves "Voice communication" into usable energy. 2B.) The CMOS multiple antennas is further disposed on a circuit board 13, which is further made of solar cell platform to convert electromagnetic radiation and solar energy into usable energy. Because the energy from the acoustic sensor depends on the sound level, the acoustic sensor is not a stand alone alternative to energy harvesting.

The E-PHONE is an energy harvesting phone, and each day we do not account for the areas of energy that are being used. When we dial a number using our phones, we are actually applying pressure on the surface of the phone, which is another phone of energy. Some people go jogging with their phones attached to their bodies. The incorporation of the piezoelectric element on the display or in association with the phone housing provides a sensory platform for converting force/vibration into electrical energy. This is an optional configuration for energy harvesting. The touch screen, in other embodiment, is part of the E-PHONE because any amount of pressure on the surface could be converted into electrical energy. The touch screen device is also configured with the communication circuit board. However, the touch screen could be a stand alone device.

Disclosed embodiment further provide a cell phone case disposed with a converter affixed on a male USB port, similar to the conventional charger inserts for smart phones. The converter is configured to convert one form of energy into DC power and is connected to the case by a flexible elastic structure. The flexible elastic structure may comprise of an elastic ribbon-like structure with conductive nano-wires." The DC power is further directed to the conventional female charge port for smart phones through the male USB port to keep the battery charged "Battery circuit." Some embodiment provide a meta material structure cavity 722 and nano-sensors 327 and 360 are further embedded in the solar cell material to provide an electromagnetic wave transport stream for electromagnetic wave absorption. In this endeavor, the electromagnetic energy would be converted into DC power to compensate for the band gap limitation of solar cell and to increase the efficiency of the energy harvesting cell phone case 715 and the E-PHONE.

Disclosed embodiments further provide the transceiver apparatus 313 and 428 further comprising at least a portable communication device 34. In the disclosure, the transceiver apparatus may comprise at least a stationary communication apparatus 36. Certain embodiments provide the transceiver apparatus further disposed on at least a vessel apparatus 38. Some embodiments provide at least military personnel 39, being outfitted with the transceiver apparatus, comprising at least a battlefield gear consisting of at least one of: a camouflage 40 and 44; a head gear 42; a communication apparatus 46. Other embodiments provide the transceiver apparatus further comprising communication apparatus 48 configured to connect to at least a telephone service. The telephone service may comprise at least voice to text monitoring/transmission, voice data monitoring/transmission, text data monitoring/transmission, video data monitoring/transmission, text to voice, and server data monitoring/transmission. The transceiver apparatus further comprises vehicular communication apparatus 50. Disclosed embodiments further provide the vehicular communication apparatus further operable for military applications. Some embodiments provide the vehicular apparatus further comprises at least a mega telecommunication apparatus "MEGATEL." Certain embodiments provide a communication apparatus 400 comprising at least of: a transmitter apparatus; a receiver apparatus; a transceiver apparatus.

Disclosed embodiment further provides a base station 13 comprising a cellular communication system for providing wireless communication among wireless users 22. The base stations 13 may include a stationary and at least a mobile base station disposed with low and high speed wireless transceivers, a connecting station comprising a millimeter wave spectrum 00, a wireless transceiver 313 is configured to communicate at millimeter wave frequencies higher than or between 30-300 GHz with a fiber optic or high-speed cable communication network 12. The base stations are constructed with CMOS multiple antennas on chip and disposed with nano-wires for harvesting energy from electromagnetic wave. The chip is further embedded on a solar cell platform for energy harvesting. The antennas are opened at one end and shorted on the other end and serve as a separate communication cell. The shorted ends are further configured with the nano-wires disposed for harvesting the heat due to electromagnetic radiation, converting the heat into electrical energy. Embodiment further provide multiple base station 13 equipped with low frequency wireless transceiver 313 for communicating with the wireless users within the communication cell at a radio frequency lower than 6 GHz and with a millimeter wave wireless transceiver 428 operating at a millimeter wave frequency higher than 60 GHz. Some embodiments provide the wireless transceiver operable for communicating with another millimeter wave transceiver 728 at another base station or a millimeter wave transceiver 428 at the connecting station. The connecting station may comprise a backhaul link 13A. At least a data transfer device 430 in association with a database is operable for transferring data communicated through the low frequency wireless transceiver 313 to the millimeter wave wireless transceiver 428, 728. The data transfer device is operable to transfer data communicated through the millimeter wave wireless transceiver 428, 728 to the low frequency wireless transceiver 313. The low frequency wireless transceiver may comprise one cellular base stations or a mobile base station.

The E-PHONE device comprises of nanotechnology application comprising sensors embedded in silicon substrate microfiber. The E-PHONE comprises a fully integrated CMOS multiple antennas from RF to millimeter wave frequencies using a scalable Orthogonal Frequency Division Multiplexing with Multiple Access (OFDMA). Embodiment further provides the E-PHONE, further configured to utilize WiMAX for "wireless" broadband. WiMAX (Worldwide Interoperability for Microwave Access), an evolving standard for point-to-multipoint wireless networking, and works for the "last mile" in the same way that Wi-Fi "hotspots" work for the last one hundred feet of networking within a building or a home. In addition to "last mile" broadband connections, WiMAX has a number of other applications in hotspots, cellular backhaul and in high speed enterprise connectivity.

Certain embodiment provides the CMOS multi-antenna comprising a receiver front-end capable of accommodating various multi-antenna schemes including spatial multiplexing (SM), spatial diversity (SD), and beam forming (BF). The use of orthogonal code-modulation at the RF stage of multi-antenna signal paths enables linear combination of all mutually orthogonal code-modulated RF received signals. The combined signal is fed to a single RF/baseband/ADC chain 13. The primary advantages of this architecture include a significant reduction in area and power consumption. Some embodiments provide a path-sharing of multiple RF signals to mitigate the issues of LO routing/distribution and cross-talk between receive chains. The system is operable to exhibit system-level analyses of variable gain/dynamic range, bandwidth/area/power trade-off, and minimize interference. The millimeter wave network is further operable at frequency band of 8-38 GHz, 71-76 GHz, 81-86 GHz, and 92-95 GHz, and at data delivery/wireless connectivity at gigabits per second. The network comprises of network processors, baseband modules, and radio frequency frontend.

The communication apparatus 400 further comprises a 5G-BETTER Wi-Fi. The 5G-BETTER Wi-Fi encompasses the 3G/4G, and comprise a solar cell technology platform that includes energy harvesting for electronic devices, including cell phone devices "E-PHONES" and wireless communication network applications. The E-PHONE would operate on networks such as Wi-Fi, CDMA, WAN, LAN, MAN, WPAN, WWAN, WLAN, GSM, NADC, TDMA, E-TDMA, WCDMA, and CDMA-2000, providing solar cell platform for phone devices, delivery, marketing and maintenance of secure wireless communications for individuals, businesses & entire communities. Wi-Fi is quickly becoming the standard in the delivery of Internet connectivity throughout many organizations, government agencies and businesses. But 5G-BETTER Wi-Fi is configured to deliver better and secure Wi-Fi services to commercial and residential property owners as well as traditional Internet service providers that are looking to improve the service offerings. Embodiments provide a 5G-BETTER Wi-Fi comprising full service wireless networks for businesses, individual building owners and municipalities. Certain embodiment provides 5G-BETTER Wi-Fi comprising great solution for upgrading conventional Wi-Fi network. As connectivity to the Internet has become a necessary utility, just like water, phone and electrical hookups, so has the trend of providing a central Internet connection, and 5 g-BETTER Wi-Fi further provide better data transmission speed. In this regards, truck Stops would receive accelerated Wi-Fi services throughout any region quickly and efficiently. Embodiment further provides 5G-BETTER ISP Wi-Fi-Internet Service Providers (ISPs), providing network connectivity at much better speeds. This connectivity can be distributed throughout an entire area without the need to re-wire any current wired connections. Not only is this faster than older wired networks, but it's also easier to scale up and upgrade the technology, providing further applications. 5G-BETTER Wi-Fi provides the ability to distribute large amounts of bandwidth up to 30 miles between Wi-Fi base stations.

Figure 52:
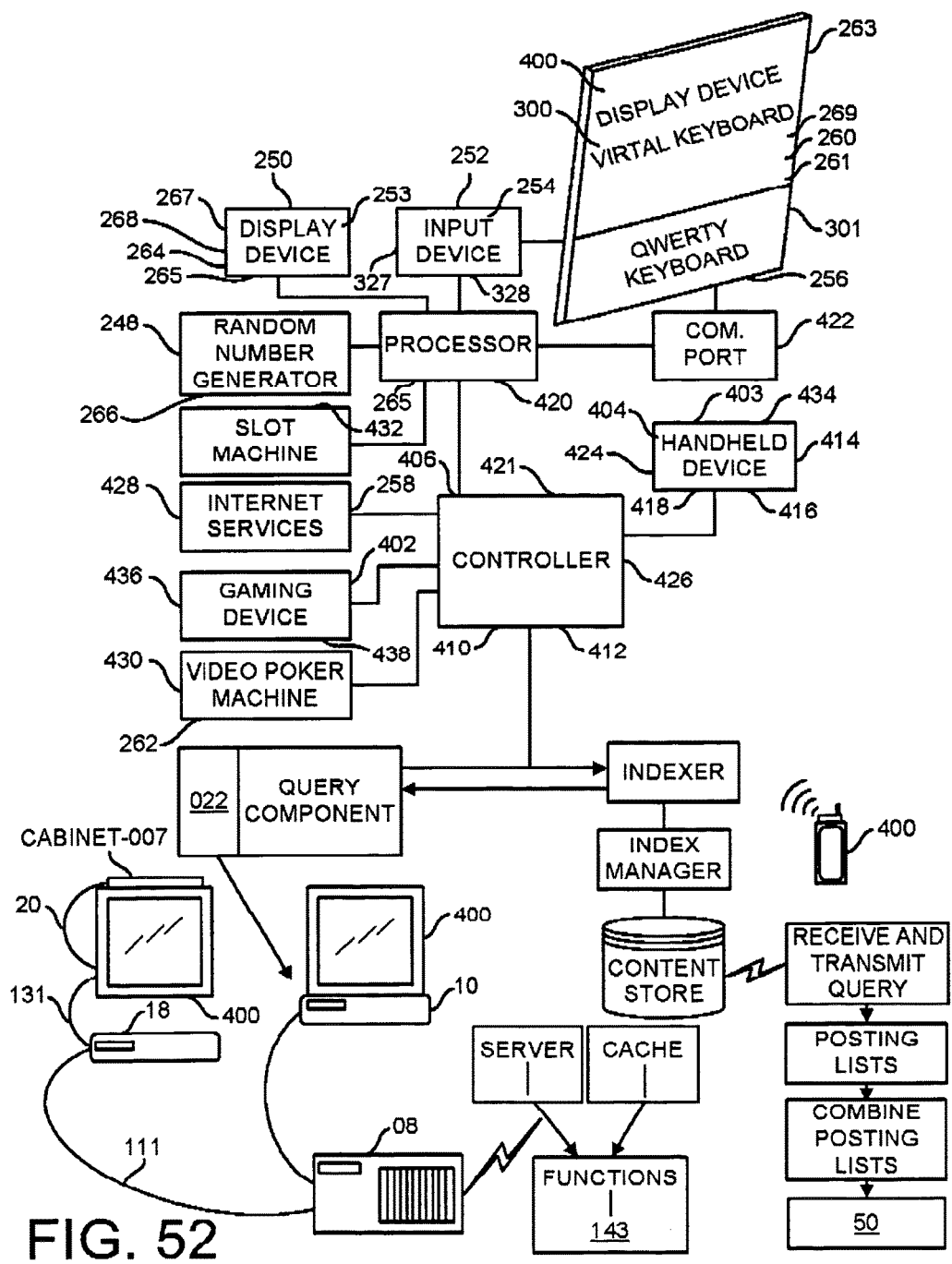
FIG. 52 is an exemplary embodiment a communication apparatus that includes a search engine platform.

Referring to FIG. 52 is seen an exemplary embodiment of the search engine comprising a communication apparatus. The communication apparatus further includes a cell phone 400. The communication apparatus further comprises at least an input device 252, including a keyboard 254. The keyboard 254 may consist of a virtual keyboard 255 and/or QWERTY keyboard 256 in further communication with a random number generator 248. The communication apparatus further comprises a centralized transportation search engine comprising battlefield topics data processing system operable on a social platform 258 operatively configured for multicast virtual private network for advancing battlefield knowledge. The social platform 258 comprises a social network application in communication with the processor 420. Disclosed embodiments further provide the keyboard disposed on an LCD display screen 260 being configured with sensors 327 operable for object recognition. Certain embodiments provide the sensors 327 being configured for video recognition 262. Some embodiments provide the communication apparatus configured with a display device 260 operable with at least an activation button 264 configured for at least one of: phonebook 266, calendar 268, dictionary 267, calculator 265, and camera 263. Disclosed embodiments further provide the communication apparatus further comprising at least one of: a mobile communication device 400, a gaming device 402, a media device 403, and an interface device 404. The communication apparatus further comprises a computer apparatus 400 comprising a computer recordable medium 10 being operable on a computer readable program being recorded to cause at least one computer device to receive plurality of battlefield reference documents. The computer apparatus further comprises database comprising topics of information relating to battlefield topics and medical topics. The computer apparatus is further operable for storing a frequency through which a module generates content when queried and is further operable for determining keyword compatibility based on the frequency. Disclosed embodiments provide the interface device comprising at least an integrated phone/PDA 400 being configured with integrated connectivity apparatus 406 operable to provide global roaming for communications and for accessing battlefield topics of information. At least a communication port 422 is provided with the communication apparatus 400. Certain embodiments of the disclosure provide the communication apparatus comprising a GSM phone 400 being operable on plurality microprocessors 420. Certain embodiments provide the communication apparatus being operable to allow multiple inputs/outputs 252. Some embodiments provide the communication apparatus comprising a touch interface 261 operable on a touch screen 260 configured for at least one of: interactive communication, interactive gaming, music, video, social network, and phone book.

Yet other embodiments provide the communication apparatus being configured with at least a slider 253 operable to access multimedia buttons and/or numeric keypads being configured with piezoelectric sensors 327. The piezoelectric sensors 327 further comprise crystals 328 configured to provide voice operations and/or voice over text applications. Disclosed embodiments provide the communication apparatus being configured with voice over text technology operable to provide hands free texting applications while driving. Still, other embodiments provide a communication apparatus comprising of carbon fiber 408 and/or silicon substrate microfiber/nano-fiber consisting of resistive touch screen 260 and/or character recognition 269 and/or a communication board 300. Certain embodiments provide housing 301 for the communication apparatus 400 comprising a carbon fiber 408 and/or a silicon microfiber and/or silicon substrate nano-fiber. Disclosed embodiments further provide a communication apparatus being configured with at least a WAP browser 410 and/or an integrated GPS device 412 and/or an MP3 music device 414 and/or a camera apparatus 416 in communication with an interactive interface apparatus. The interactive interface apparatus operatively configured with at least a multi-protocol label switching comprising a label switched path operable on at least a support system operatively configured for mapping desired communications and to execute at least a process to at least a reference document. Disclosed embodiments further provide a communication apparatus further configured with an internal antenna apparatus 418 being configured with a controller 421 in communication with a predictive text messaging applications 423. Disclosed embodiments further provide the support system communicatively connected to at least a dedicated processing element being operable for providing carrier based multicasting virtual private networks. Certain embodiments provide the communication apparatus 400 being configured with at least one of: infrared sensor 326, calendar 268, FM radio 424, Bluetooth technology 426, and GPRS Internet services 428. Disclosed embodiments further provide the communication apparatus 400 comprising a video poker machine 430 and/or a slot machine 432, and/or a handheld device 434 and/or a gaming device 436 and/or a play station 438 in communication with communication port 422. Preferred embodiments provide the communication apparatus 400 comprising a search engine for routing battlefield topics of information.

Some embodiments provide the network 20 comprising distributed collection of nodes interconnected by communication links 131 and segments for transporting reference document data between end nodes. Other embodiments provide the end notes comprising computer devices and workstations. Disclosed embodiments provide the network comprising local area networks (LANs); wide area networks (WANs). The communication apparatus 400 further comprises circuit board comprising electronic system's applications being configured for embedded network for at least one of: a wired communications device, a wireless communications device, a cell phone, a handheld communication device, laptop computer, desktop computer, telemetry device, a switching device, MP3 player, a router, a repeater, a codec, a LAN, a WLAN, a Bluetooth enabled device, a digital camera, a digital audio player and/or recorder, a digital video player and/or recorder, a computer, a monitor, a television set, a satellite set top box, a cable modem, a digital automotive control system, a control module, a communication module, a digitally-controlled home appliance, a printer, a copier, a digital audio or video receiver, an RF transceiver, a personal digital assistant (PDA), a digital game playing device, a digital testing and/or measuring device, a digital avionics device, a media device, a medical device, and a digitally-controlled medical equipment.

Figure 53:
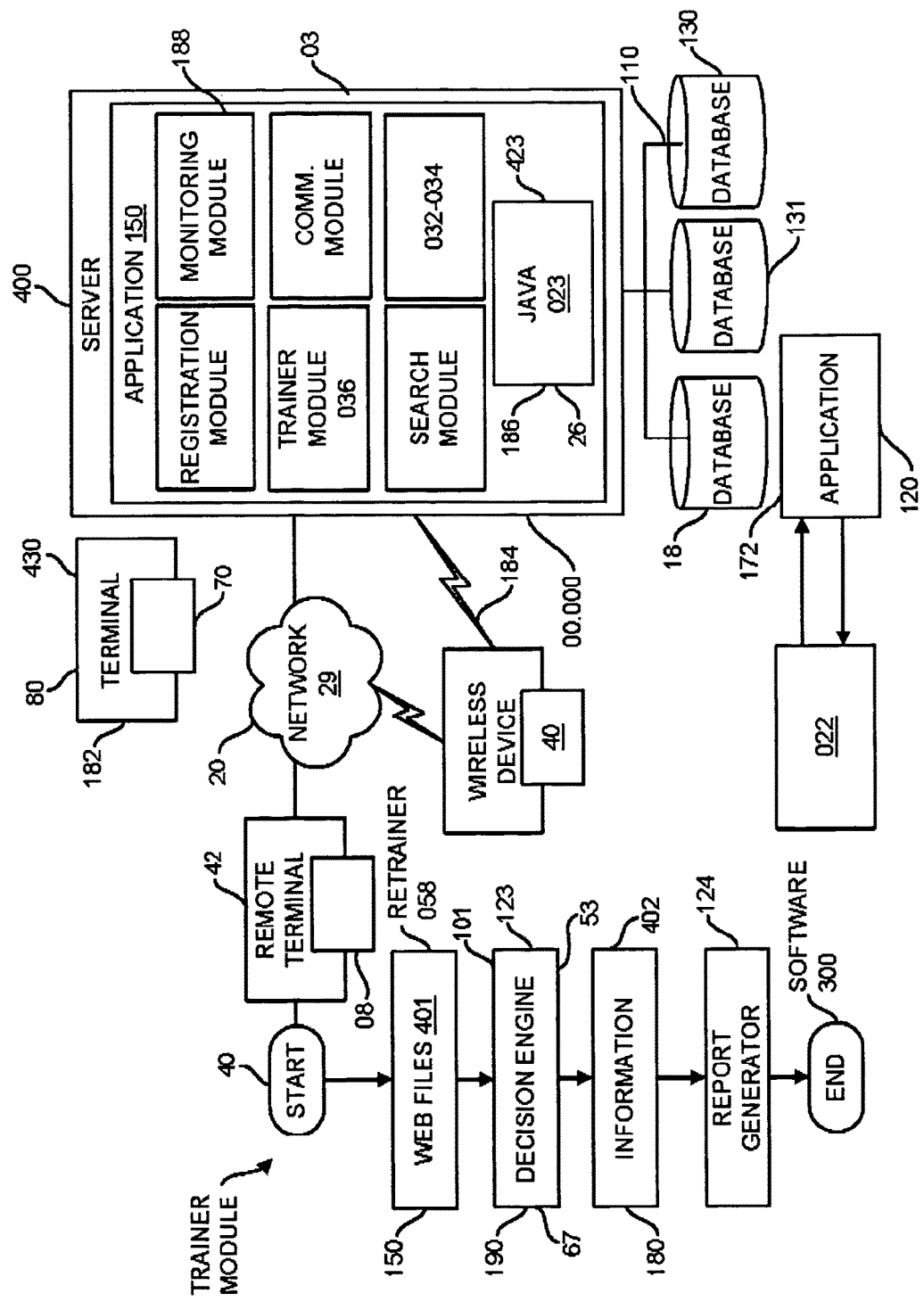
FIG. 53 is an exemplary embodiment a communication apparatus that includes a network environment.

Referring to FIG. 53 is seen an exemplary embodiment of a network environment, comprising a communication apparatus 400 in communication with an output device 70 operable for outputting battlefield topics of information and medical topics of information. Disclosed embodiments further provide the communication apparatus 400 further comprising at least a computer apparatus 430 configured with software 300 further comprises an operating system. Certain embodiments provide the computer apparatus 430 comprising at least a server 00, 000 in communication with a client module 120 for determining that at least a key word maps to battlefield object identifier. The communication apparatus 400 is communicatively connected to the client interactive interface module 172 in communication with network 20 comprising a link to a profile being configured for providing network services for battlefield topics. The communication apparatus 400 further comprising at least a software program 300, wherein at least one software program is configured with at least a memory device 180 in communication with search module 190 comprising values being accessible to the dedicated processing elements 423. The communication apparatus further comprising at least a hardware means comprising the dedicated processing elements being configured with an input array 182, an output array 184, and/or a query array 186. The computer apparatus 430 further comprising at least a database comprising an application module 130 configured for providing information relating to battlefield topics and/or topics of information. Certain embodiments provide a monitoring module 188 operable for monitoring and storing the frequency through which each module generates content when queried. Some embodiments provide a communication module 192 in communication with registration module 194 operable for determining keyword compatibility based on the frequency.

The client interactive interface module 172 is communicatively connected to at least one computer apparatus 430, further comprising at least a decision engine 123 disposed with a data bus comprising a platform for writing input into at least a data memory for at least one array. Other embodiments further provide the decision engine 123 operatively configured with a report generator 124 in communications with network connection keys. The network connection keys in communication with files, forms, documents, and/or industrial files 18, network files 110, graphic user interface 101, sensors 104, web files 401, and system memory 53. Certain embodiments provide the communication apparatus being further configured with system bus architecture 67 in communication with an input device 80. Disclosed embodiments provide report generator 124 in communication with an instruction program 26. Certain embodiments provide the instruction program 26 configured with trainer module 036 and retrainer module 058. The trainer module 036 and retrainer module 058 are configured with CPU 03. The CPU 03 is in communication with a java class 023, a clickn Vest Servlet class 032, and a Servletrunner application 034. Disclosed embodiments further provide the files, forms, and documents further comprising data relating to battlefield topics of information. The communication apparatus further comprises a wireless device 40 comprising applications operable for optimizing and/or for sharing transportation and/or engineering topics of information. Certain embodiments provide the communication apparatus comprising a remote terminal and/or a network terminal 022. The communication apparatus further configured with a readout tool 08 in communication with an address book 131 communicatively connected to content store. Disclosed embodiments further provide the computer apparatus 430 further comprising at least a module for determining that at least a key word maps to an object identifier for battlefield topics of information. The network terminal 022 is provided in communication with a query component. Certain embodiments provide the communication apparatus 400 in a network environment 29 comprising at least a server application 150. The server application 150 further includes at least one of: a registration module 194, a monitoring module 188, a trainer module 036, a communication module 192, a search module 190, and/or java application software 023. Certain embodiments provide the java application software 023 in communication with a database server 000. Disclosed embodiments provide the communication apparatus 400 further comprises ports and/or terminals comprising a network terminal 022 in communication with the application module 130. Certain embodiments provide the communication apparatus being turn on by at least a start button in communication with at least a control device. Other embodiments provide the control device comprising a wireless device 40 communicatively configured for communications with remote terminals 42. Disclosed embodiments further provide a communication apparatus comprising at least one of: report generator module 124, information module 402, retrainer module 058, web-files module 401, a clickn Vest Servlet class 032, and a Servletrunner application 034, and/or a decision engine.

Figure 54:
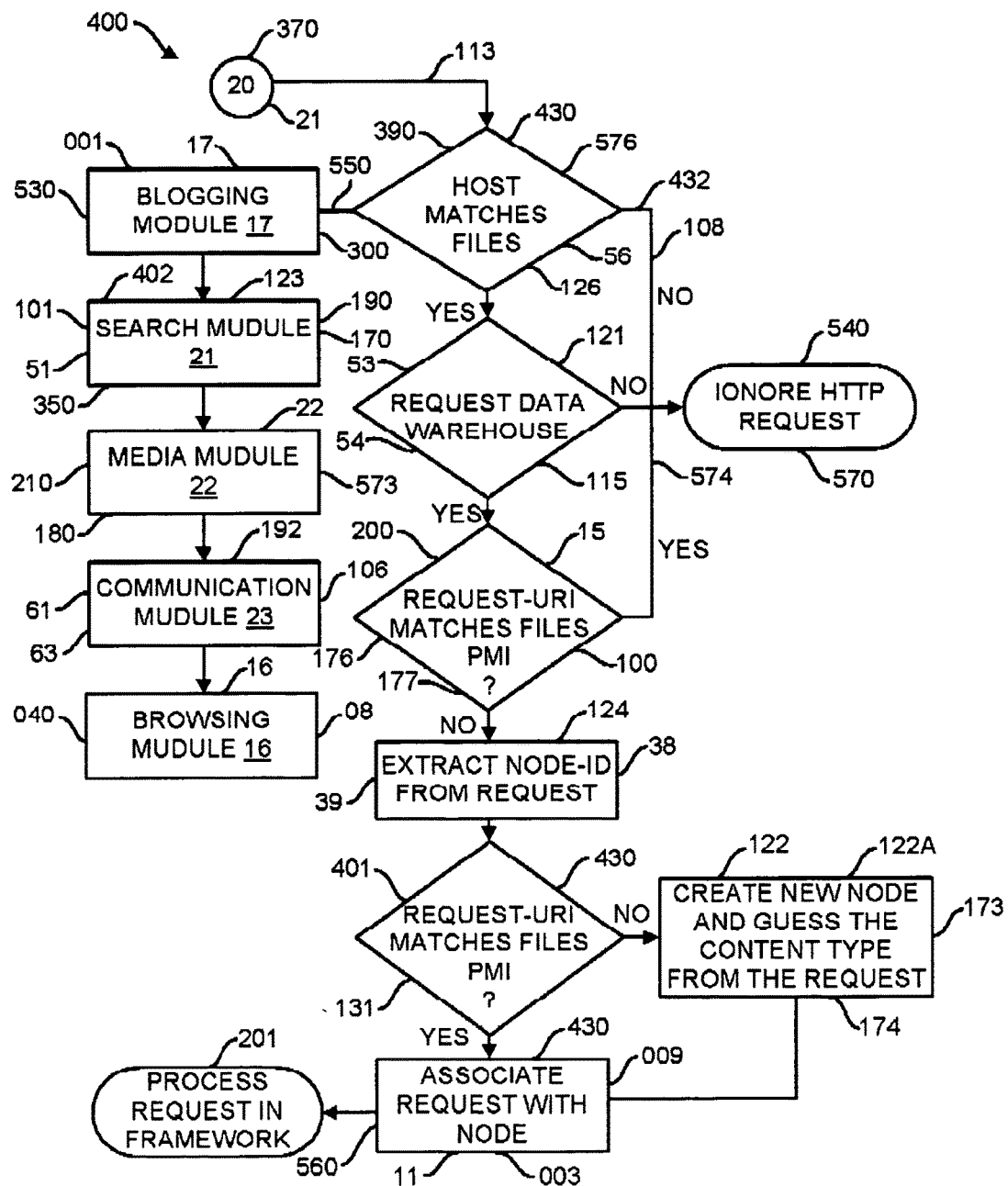
FIG. 54 is an exemplary embodiment of a flowchart diagram for the communication apparatus that includes a software program.

Referring to FIG. 54 is an exemplary illustration of a flowchart comprising intelligence logic for the communication apparatus 400. The communication apparatus comprises a blogging module 17 configured with application session layer 550 and software 300, a search module 190 in communication with network interface 170, a media module 22 configured with signal booster chip 573, a communication module 192 in communication with signal booster chip 573 and antenna circuit 106, and a browser module 16 in communication with a readout tool 08. At least a file memory device 53 is provided in communication with the software 300. Disclosed embodiments provide the communication apparatus 400 further comprising a data warehouse 121 communicatively connected to the search module 190 configured with a primary memory interface "PMI" 54. The PMI is further in communication with primary programs 15. Certain embodiments provide the communication apparatus configured with a personnel identification node "ID NODE" in communication with affinity analyzer 122 and data analyzer 122A. The media module 22 is communicatively connected to the media device 201, and the search module is communicatively connected to HTTP report generator 124 in communication with presentation layer 540. Some embodiments provide a computer apparatus 430 configured with a default gateway 432 in communication with a transport layer 560. Certain embodiments provide the communication apparatus operable on a platform 576 for processing mileage, fuel consumptions, host files, and personnel conditions/information. The PMI 54 further comprises at least a content file in communication with at least a subscription identifier 56, which is programmable for providing at least a hash table network 176. Disclosed embodiments provide the hash table network 176 further comprising a decentralized distribution of a structured reference documents consisting of battlefield topics of information. The distribution hash table 177 is operable for providing a lookup network service, providing connections and records, including a peer to peer network communications for battlefield personnel. At least one cache engine 350 is provided, operatively configured with at least one array operable for implementing steps for intercepting battlefield topics at network element. The network element comprises one or more battlefield data packets that at least a military personnel application addresses to a server application.

The search engine further comprises at least a markup language configured with at least one array for determining at least an application layer message that is contained in at least one portion of at least one data packets for specifying a particular request necessary for entering the searchable battlefield topics of information. The search engine 402 further comprises at least one of: a spider 173, a crawler 174, at least one is operable for disseminating battlefield topics of information. Embodiments further provide network environment 20 comprising a communication apparatus 400 configured for processing request in framework, in communication with remote computer systems configured for providing mileage readings and fuel consumptions. The communication apparatus 400 is further configured with search columns 21 and file columns 22. Certain embodiments provide the communication apparatus 400 configured with column 23 comprising forms 16, preventive maintenance programs "PMI" 15, and personnel files. Some embodiments provide the communication apparatus 400 configured with an indexer 108 in communication with at least a centralized data warehouse 121, social platform layer 574, and report generator 124. Other embodiments provide the communication apparatus 400 operable for data warehouse request. The communication apparatus is further configured to associate request with notes and to create new notes if a queried note with associated name does not exist, such as a falling personnel.

In the disclosure, request to URI is compared for matches to files and ignoring HTTP request is enabled. Embodiments provide apparatus operable for extracting notes that contains Identifications from request. The network environment comprises the communication apparatus 400 in communication with a computer system comprising a display device 003, a sound card 61, speakers 63, a cache engine 350, a network interface 170, a display adapter 59, intelligence logic, a media device 201, and a central processor 51. The communication apparatus further include an input device comprising at least a keyboard 009 and a mouse 11. The communication apparatus further include an IC card, SIM card, and interface. The CPU is operable with the intelligence logic to process commands and applications, in communication with memory 53, decision engine 123 and web-enabled devices. The network 21 may be responsive to communications through the Internet. Certain embodiments provide a communication apparatus configured with a browser, a server search report 39, and client search programs 38. Disclosed embodiments further provide a communication apparatus configured with graphic user interface 101 comprising interactive interface apparatus, a search program manager 126, a browser 040, an ICON 001, and storage medium comprising at least a meta-data and/or a database server 115. At least a web-page manager is provided comprising addresses 131, military base 200, available equipments 100, equipment ware houses 121 and a workbench 113 containing military topics of information. The computer system further comprises an affinity analyzer 122, a data analyzer 122A, a readout tool 08, a web-page 390, a report generator 124, files 401, and client interface operable with the software application 300.

At least one application layer 530 message is a java message consisting of battlefield topics of information configured for Web based applications. The search engine 402 further comprises structured military network environment 20 communicatively connected to at least one support system 210 comprising a social platform 573 configured with at least an index and/or a catalog comprising battlefield/personnel data. The data further includes at least one of; parts request, standard maintenance solution, preventive maintenance scheduling, preventive maintenance forms, fuel consumption log, mileage log, solutions to failed components, equipment request, parts graphics, name search, sounds, text content file, terrorist name monitoring, video, Internet protocol television 180 comprising a communication system, battlefield materials and/or tools, and at least global positioning system "GPS." Disclosed embodiments further provide the communication apparatus 400 comprising at least one software program 300 further configured for communications with at least one support system 210 responsive to structured directory of battlefield topics and providing communications relating to at least battlefield topics of information in a network infrastructure. At least one support system 210 is further responsive to global communication via Intranet/Internet 370 for routing the occurrences of battlefield topics of information. Certain embodiments provide the computer apparatus 430 operatively configured with the software program 300. Some embodiments provide the software program 300 further comprises at least a protocol being programmed for providing directory approaches to routing battlefield topics of information and for analyzing at least an occurrence of the information. Other embodiments provide the information further comprises of keywords that are communicable to prioritize keywords in the list that frequently occur in a set of battlefield topics documents. Disclosed embodiments further provide the Internet protocol television 180 comprising apparatus for delivering Internet television services consisting of structured battlefield topics of information.

At least one protocol is operable for accessing and/or for delivering structured data containing battlefield topics of information over the Intranet/Internet 370. At least one computer apparatus 430 is configured to cause a computer device in communication with the cache engine 350, operable to apply integral reference content rate for each battlefield topics in at least a set of annotation type. The cache engine 350 is further operable for caching data operations being requested from at least one computer apparatus 430. The computer apparatus 430 is further operatively configured with at least one network data storage medium in communication with at least a network client. The network storage medium further comprising a cache memory for caching structural functions and further operable for requesting data structures comprising battlefield topics of information by personnel through the network environment 20. At least one software program is operatively configured with at least one support system 210, further comprising at least a mapping circuit comprising a lookup table which is indexed by a pattern ID value for providing at least one battlefield topics of information using at least a pattern responsive to at least a potential query of the topics. Disclosed embodiments further provide the communication apparatus 400 comprising a support system 210 configured with at least a chat function for topics of information comprising at least one of; personnel social network, battlefield project sharing and/or project development, transportation preventive maintenance, transportation services, transportation failure analysis, transportation solution to failed components, transportation fuel consumption, transportation mileage classifications, and transportation classifications and/or information, transportation equipment request, parts graphics, personnel physiological conditions, at least a name search, sounds, text, content file, video, Internet protocol television communication system, engineering/battlefield tools, and at least enemy information.

Figure 55:
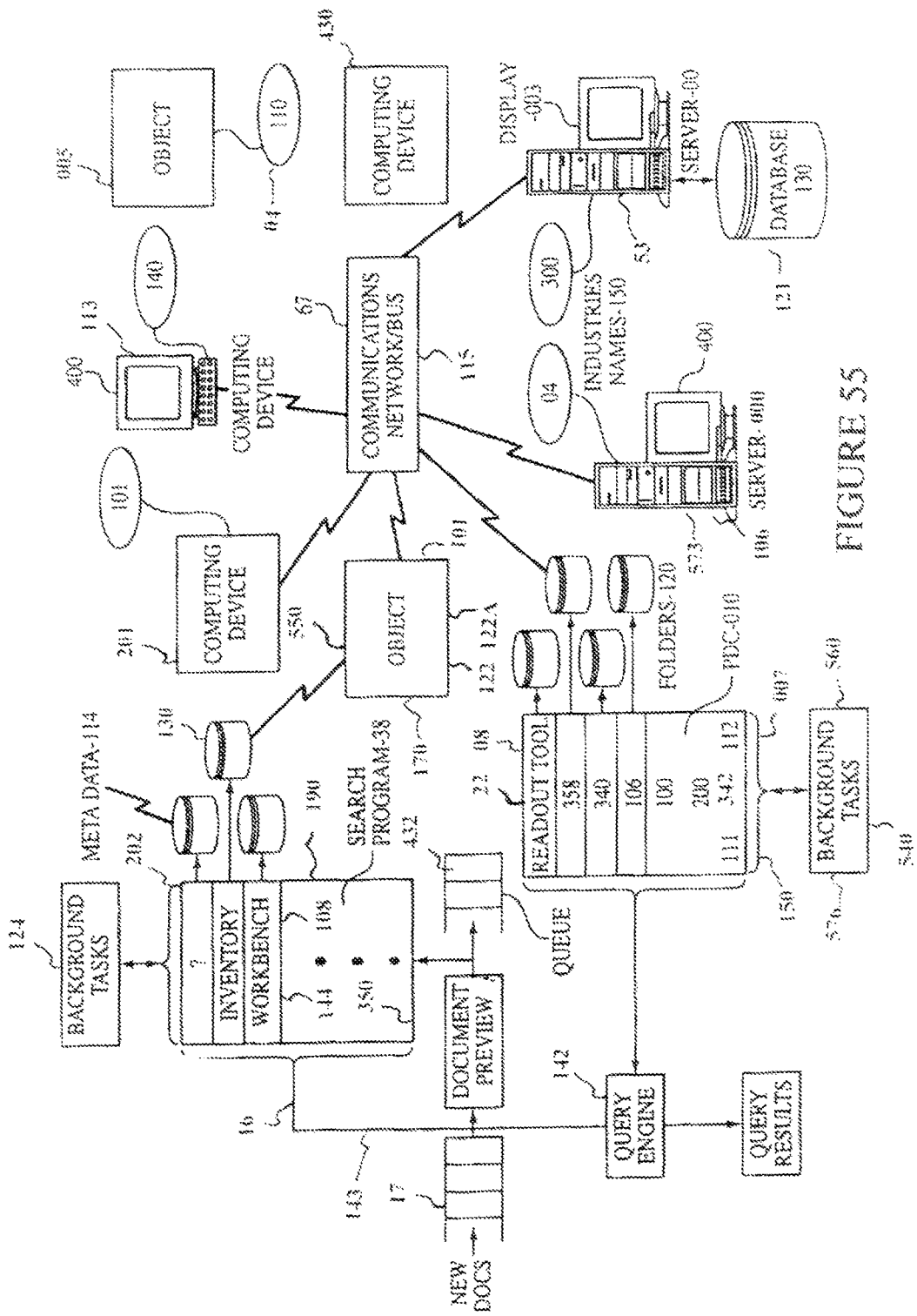
FIG. 55 is an exemplary embodiment a communication apparatus that includes search engine software in communication with a database.

Referring to FIG. 55 is seen exemplary embodiments of the communication apparatus 400 comprising a query component configured with an indexer 108 in communication with an index manager 202. Embodiments further provide a network environment comprising a server 000, 000 and a cache engine 350 in communication with functions 143 configured for operations with software 300. The functions 143 further include social platform 573 comprising social network environment operable to receive and transmit communications to at least one of: personnel information in a memory 53, enemy information in a memory/cabinet 007, further comprising a content store for battlefield topics of information. Disclosed embodiments further provide a centralized engine in a network system configured with server 00 and 000 comprising adaptors to maximize battlefield productivity and personnel longevity. Certain embodiments provide the server adaptor configured to allow personnel to personnel communication through the centralized search engine. Certain embodiments provide a centralized communication network system comprising a bus 67. The bus is further configured to periodically provide maintenance information for battlefield equipments, in communication with the URL. The URL may be modified at random times by at least a web master. The communication network bus 67 is further configured to produce a single link that either point to terrorist web site or their modified web site/enemy information by continuously finding, indexing, and cataloging the web pages. Some embodiments provide password module 140 in communication with the server adaptor software configured to automatically reroute traffic signals when any of the server port experiences a failure or is disconnected/interrupted. Other embodiments provide a query engine 142 in communications with files and forms modules being monitored by military personnel to allow access to multiple server files containing personnel data to enable prevention of any loss of information when the hardware experiences a failure.

Disclosed embodiments further provide the query engine 142 configured for communications with multiple file storage system being centralized for maximum protection and for providing real time query results. Certain embodiments provide the query engine 142 in communication with communication apparatus 400. The communication apparatus further comprising computer apparatus 430 configured with user interface 101 operable to centralized battlefield network system. Some embodiments provide the communication apparatus further comprises a PDC 010 configured with a switch to connect personnel system and servers together to create personnel server network within the system and a social environment for battlefield communications. Other embodiments provide the communication apparatus comprising application module 130 in communication with data warehouse 121, folders 120, readout tool 08, search program 38, and document parser 144. The document parser further includes new documents and battlefield/terrorist findings.

Disclosed embodiments provide the search program 38 further comprising background tasks. The background tasks further include types of battlefield activities, transportation 340, failed components 342, stations 100, personnel base 200, station names 150, government agencies 111, and bunker 112. Some embodiments further provide the backup storage software operable for providing backup file scheduling such as tape backups and server file storage backups. The backup storage further allows the centralized battlefield system access to remotely recover any lost file. Other embodiments provide the communication network bus 67 operable to eliminate single point failure. In the disclosed embodiments, indexer 108 is provided for storing of links pointing to information resources including some or all of the data associated with the information resource, including workbench 113, inventory 114, and term center 115. The query engine 142 further provides objects 110 stored in graphical hardware 04. The objects are displayable on display devices 003. Certain embodiments provide the communication apparatus comprising a memory consisting of the content store in communication with input devices. Some embodiments provide the content store comprising database containing topics of information for advancing science, engineering, and transportation knowledge in battlefield operations. The input device is further operable to receive and transmit query, and in communication with listings and/or combine posting relating to battlefield topics of information. At least a display adaptor is communicatively connected to the posting and/or the listings.

Certain embodiments provide the network environment comprising the communication apparatus 400 being configured with intelligence logic comprising a blogging module 17 in association with the session layer 550 and software 300. Disclosed embodiments provide the communication apparatus 400 further comprising a search module 190 in communication with network interface 170, a media module 22 configured with signal booster chip 573, a communication module 23 in communication with signal booster chip 573 and antenna circuit 106, and a browser module 16 in communication with a readout tool 08. At least a file memory is provided in communication with the software 300. The data warehouse 121 further comprises database server communicatively connected to the search module 190. The search module 190 is configured with a primary memory interface "PMI" in communication with primary programs 15. Disclosed embodiments further provide a communication apparatus configured with at least personnel identification node "ID NODE" in communication with affinity analyzer 122 and data analyzer 122A. The media module is communicatively connected to the media device 201, and the search module is communicatively connected to HTTP report generator 124 in communication with presentation layer 540. Some embodiments provide a communication apparatus configured with a default gateway 432 in communication with a transport layer 560.

Certain embodiments provide the communication apparatus operable with means 576 for categorizing science, transportation and engineering files for battlefield operations referenced by initial search results. Certain embodiments provide the means for categorizing files further comprising implementing at least a method for receiving at least a query that maps to objects identifier for battlefield topics of information. Some embodiments further provide the means 576 configured with at least a neural network in communications with at least a cache engine operable for responding to battlefield topic requests using a server response data that is cached at a network. Disclosed embodiments further provide the network comprising network element operable with at least a programmable architecture configured with at least a dedicated processing elements. Certain embodiments provide the communication apparatus communicatively connected to the interactive interface apparatus in communication with at least a link to at least a profile configured for providing network services relating to battlefield topics of information.

Figure 56:
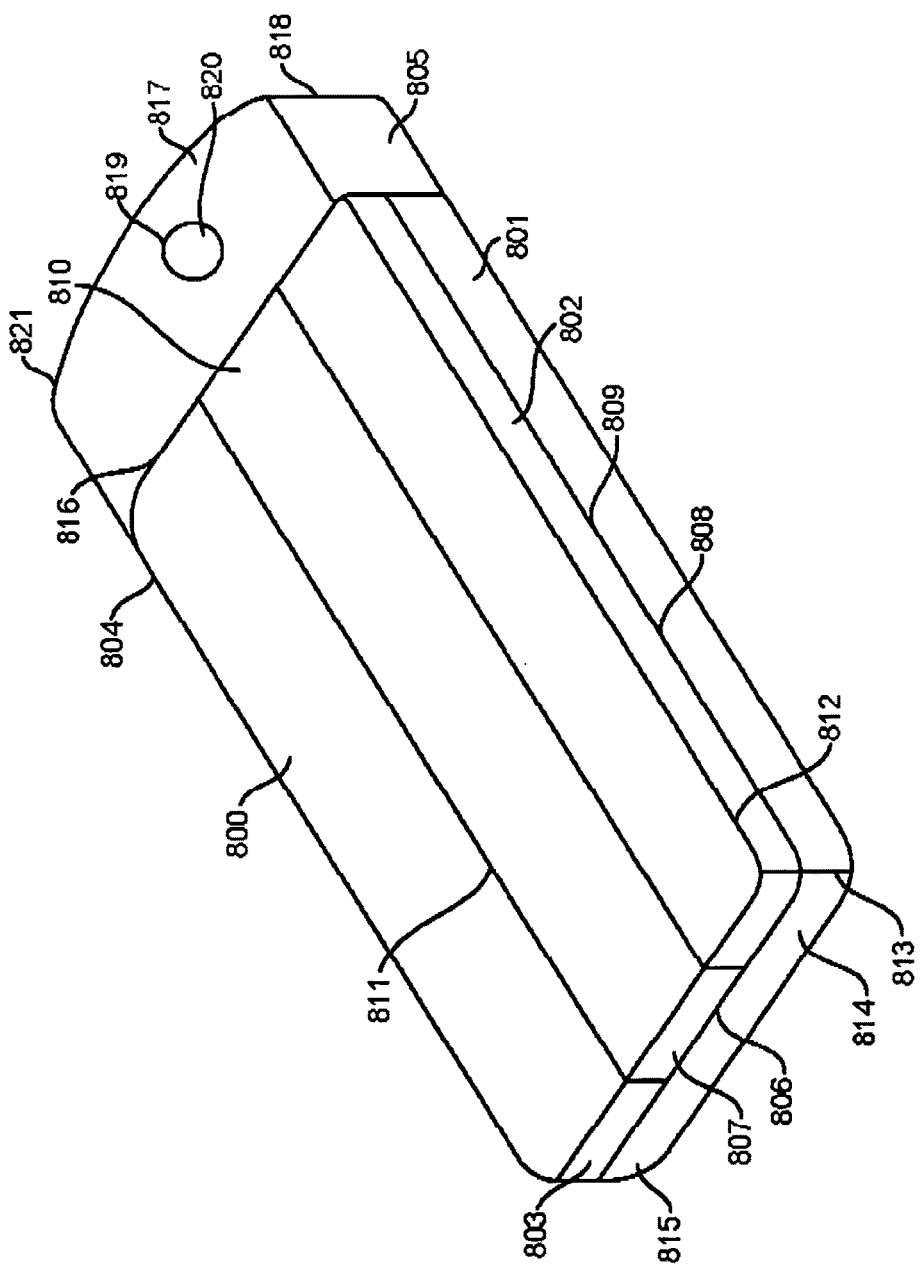
FIG. 56 is seen further exemplary embodiment of an energy harvesting communiation apparatus.

Referring to FIG. 56 is seen further exemplary embodiment of the energy device. Embodiment further provides Plasmon solar cell (PSC) 800 operable for converting light into electricity through Plasmon. Certain embodiment provides thin film 802 comprising of substrates consisting of glass 803, plastic 804, and/or miniaturized steel 805. Some embodiment provides the thin film 802 being configured with nano-particles 806, which are being excited at their surface Plasmon resonance 807 for scattering light 808. Other embodiment provides the light being absorbed directly without any further additional layer. Some embodiment provides the nano-particles 806 further comprises at least a metal nano-particle 809 being deposited on the top surface of the thin film SC 802, so that light 808 can be scattered in many different directions when the light hits the metal nano-particles 809 at their surface Plasmon resonance 807, enabling the light to travel along the SC and bounce between the substrate and the nano-particles for absorption.

Disclosed embodiment further provides a waveguide structure 810 operable to guide electromagnetic waves and sound waves. The waveguide further comprise a conductive metal structure 811 being disposed for carry high frequency radio waves, millimeter waves, microwaves, and infrared waves. Certain embodiment provides the waveguides 810 further configured to carry energy in one dimension so that power would not be lost during propagation under ideal conditions. Some embodiment provides the waveguide 810 being configured to carry energy in two dimensions, further comprising fiber and channel waveguides 812, 813. Other embodiment provides an optical fiber waveguide 814 operable for guiding different frequencies, such as light 808 with high frequency. Embodiment further provides the width of the waveguide having the same order of magnitude as the wavelength of the guided wave, which are confined in the waveguides 810 due to the total reflection. Certain embodiment provides energy harvesting apparatus 800 that transmit power and absorb power between radios, radars, and optical electronic devices through at least an antenna apparatus 815. Some embodiment provides a waveguide 810 being printed on a circuit board 816. Other embodiment provides at least a Plasmonic Solar Cell "PSC" consisting of a housing 801 comprising a photovoltaic device 817 operable for converting light 808 into electrical energy through Plasmon. At least a photon 818 is excited in the substrate 803, 804 to separate an electron 819 and hole 820 having opposite charge. At least thin conductive metal clusters 821 are disposed for collecting the electron 819 to enable an efficient solar cell device. The incorporation of nano-particles is to enable effective scattering and efficient light absorption.

Figure 57:
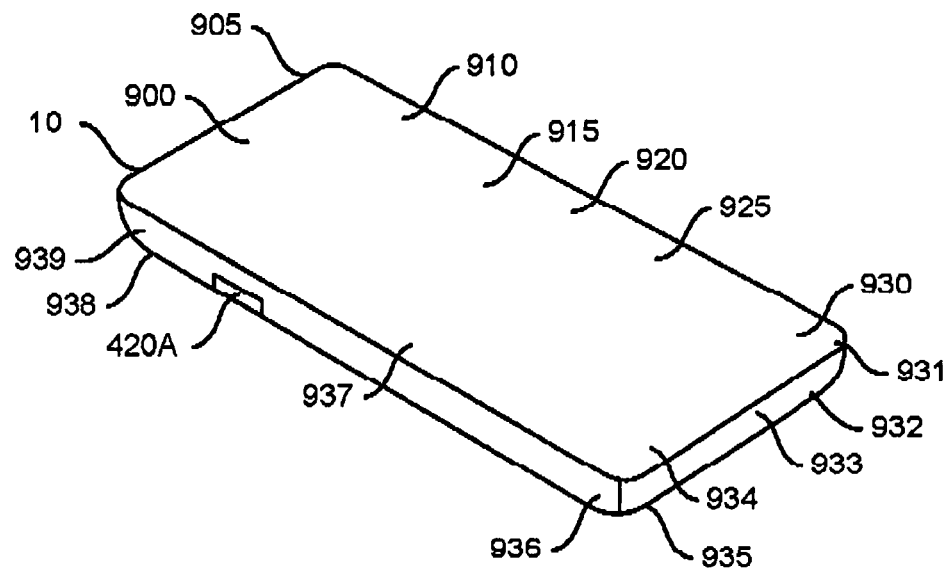
FIG. 57 is seen further exemplary embodiment of an energy harvesting a communication apparatus.

Referring to FIG. 57 is seen further exemplary embodiments of the disclosure, comprising ultra-capacitor-storage medium 900 for consumer electronics 10. The ultra-capacitor 900 further comprises ferroelectric polymer 905 to enable more rapid power delivery, and is much lighter than conventional batteries. The ultra-capacitor 900 further comprises power density tunable polymers 910 and polymer ceramic nano-composites 915 comprising electric storage materials. In some embodiments, the ceramics and/or glasses are structurally disposed to exhibit higher permittivity. In certain embodiments, the disclosure provides polymers with materials that have high breakdown strength such as glass 920 or ceramics of high permittivity. Some embodiments provide the combinations glass and ceramics, which are further disposed to produce a composite material with a large energy storage capacity for the consumer electronics 10. In the disclosed embodiments, the higher the breakdown strength, the better the material would enable the ultra-capacitor 900 to exhibit efficient energy output. In other embodiments, a dielectric silicon dioxide layer 925 is disposed with the capacitor 900, comprising of dielectric polymers 930. Certain embodiment further provides a charging port 420, in communication with a secondary storage medium for the consumer electronics 10.

Embodiments provide the capacitor 900 further comprising electrode materials 931 to provide high surface area and chemical stability. In other to gain much higher voltages, the cells 931 for the ultra-capacitor 900 may be stacked in series and may include multiple capacitor cells. Disclosed embodiments provide an ultra-capacitor technology operable in some applications as backup energy storage medium 932 configured to exhibit the following advantages:

Ultra-capacitor that is safe and environmentally friendly;

Ultra-capacitor that contains no toxic chemical;

Ultra-capacitor that contains no material that make charging and disposal hazardous;

Asymmetrical nickel/carbon ultra-capacitor that is recyclable and reclaimable;

Ultra capacitor that is excellent in high power capabilities and that would excels in high power supply;

Ultra-capacitor that has wider operating temperature range and stores energy through electrostatic means;

Ultra-capacitor that supplies energy even at lower temperature and is easily recharged; and Ultra-capacitor is further used for consumer electronics and other smaller implantable medical devices as storage means.

Applications for disclosed embodiments further include Hybrid consumer electronics. The ultra-capacitor further comprise of ferroelectric polymer 933 disposed to enable more rapid power delivery and to provide a much lighter storage device than conventional batteries. The ultra-capacitor may include power density tunable polymers 934 and polymer ceramic nano-composites 935 comprising electric storage materials. Because ceramics or glass often has higher permittivity than the other polymers, combining polymers with materials that have high breakdown strength such as glass or ceramics of high permittivity would produce a composite material with a large energy storage capacity. The higher the breakdown strength, the better the material for enabling the ultra-capacitor to exhibits efficient energy output. In other embodiment, at least dielectric polymers 930 are substituted for the dielectric silicon dioxide layer 925.

The dielectric polymer 930 is further configured with glass 936 to provide a material with high-energy capabilities for the ultra-capacitor 900. Certain embodiments provide the ultra-capacitor 900 comprising electrochemical cell 936 disposed in a housing 937 comprising of at least a cell chamber 938. At least one chamber further comprises a protogenous ion-conducting liquid 939 in association with a density electrode.

Figure 58:
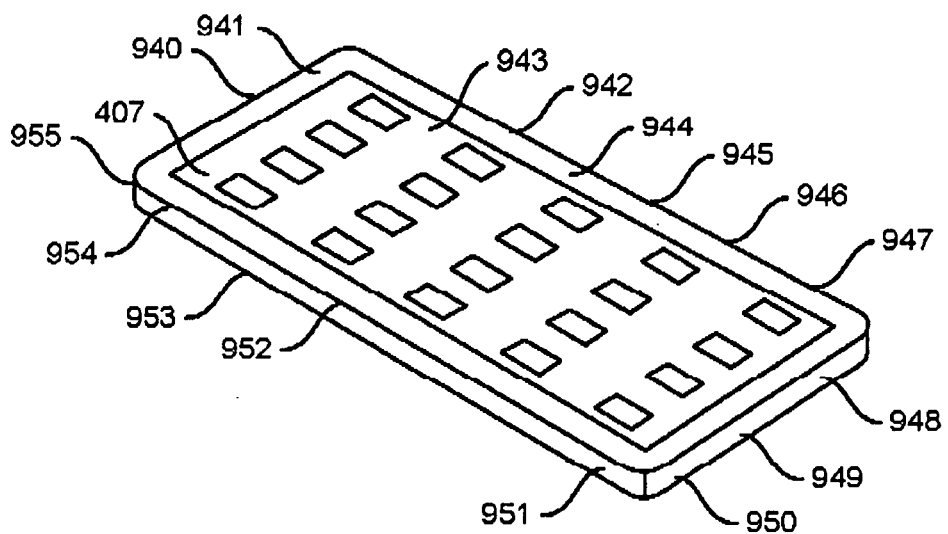
FIG. 58 is seen further exemplary embodiment of an energy harvesting a communication apparatus.

Referring to FIG. 58 is seen further exemplary embodiment of the embodiment a communication apparatus, comprising energy storage medium configured with a positive high density electrode 940, in communication with a first active material and a porous binder 941, which may be surrounded by a surface in which the porosity level increases towards the surface. The porosity level of the polymer membrane may range between 0 to 30% greater than the porosity level at the surface of the positive and negative high density electrodes 940.

The ultra-capacitor further comprises electrochemical (EC) cell 942 operatively configured with a high porosity polymer composition comprising sub-micron pore sizes consisting of excellent mechanical strength. The proposed ultra-capacitor may contain electrode at 20% electrode porosity level with separator void levels at >40% to obtain higher porosity level in the separator than the electrode. Alternate efficient electrochemical cell may comprise the electrode voids at 40% and separator at 80% or 60% (50% higher) or even only 50% (25% higher than the electrode). The project may combine improved ion availability which may result from the highly densified electrodes. Embodiments further provide unimpeded flow of ions through the symmetric, strong, highly porous, micro porous polymer film. The electrodes are further configured to provide electrochemical cell of greater capacity and efficiency in the ultra-capacitor energy storage medium. The ultra-capacitor electrode, the conductive binder, and the separator are made from the porous binder material. The electrochemical cell for the ultra-capacitors are constructed to produce characteristics that enhance performance over existing electrochemical cells by using centrifugal forces to densify at least an electrode or electrode material.

Certain embodiments provide the electrolyte configured to contact and react with a larger surface area of active material to optimize the electrochemical cell which contains a symmetric, strong, highly porous, micro porous polymer membrane which divides the housing into multiple chambers. In the optimized electrochemical cell, the porosity of the polymer membrane would be at least 25% greater than the porosity at the surface of the positive and negative high density electrodes 940.

Some embodiments provide the ultra capacitor further comprising a strong highly porous, micro-porous, nano-porous polymer membrane that forms a layer of a polymer solution 943 on a substrate 944. The polymer solution further comprises two miscible liquids 945 and a dissolved polymer material 946. The two miscible liquids are composed of, (1) at least a principal liquid that has a surface tension of at least 5% lower than the surface energy of the polymer and (2) at least a second liquid that has a surface tension at least 5% greater than the surface energy of the polymer, (3) producing a film of gelled polymer from the layer of polymer solution under conditions sufficient to provide a non-wetting, high surface tension solution within the layer of polymer solution, and (4) rapidly removing the liquid from the film of gelled polymer by unidirectional mass transfer without dissolving the gelled polymer to produce the strong, highly porous, micro-porous polymer film.

Other embodiments provide the polymer membrane comprising at least two dissimilar but miscible liquids forming the polymer solution from which a polymer film is cast. The first "principal" liquid is a better solvent for the polymer than the second liquid and has a surface tension at least 5%, preferably at least 10%, lower than the surface energy of the polymer involved. The principal liquid has a greater solvent strength for the polymer than the second liquid. Embodiment provides the principal liquid comprising of surface tension at least about 5%, preferably at least about 10%, lower than the surface energy of the polymer.

Certain embodiment provides the membranes being etched in the chambers to enable signal separation for specific energy network. Some embodiments provide the ultra-capacitor comprising at least a micro-machined single crystal nano/micro-cantilever 947, being configured with multiple resistors 948. The resistors comprise nano-sensors and/or MEMS, which are fabricated in the membrane for determining the capacitor stresses, heat, and charge. Some embodiments provide the nano-sensors in a network resulting from stress films deposition. The ultra-capacitor further comprises a substrate operatively configured for enabling pulled-in voltage (Vp) to be operational as a function of the modulus and stress state of the electrochemical cell. The stress deflection signals are transformed into information specific to the ultra-capacitor, resulting in analytical useful signal from the reaction of the analyte or the physical properties of the cells.

Disclosed embodiments further provide the highly porous membrane comprising a unique liquid medium for the polymer solution. The liquids that form the liquid medium further consist of relatively low boiling point materials, preferably about 100.degree. The film-forming temperature is preferably lower than the solution-forming temperature. The substrate onto which the solution is deposited further consists of a surface energy higher than the surface energy of the polymer.

Disclosed embodiment further provide the polymer membranes further entails producing a film of gelled polymer from the layer of polymer solution under conditions sufficient to provide a non-wetting, high surface tension solution within the layer of polymer solution. In this regards, the liquid materials preferably would evaporate at moderate temperatures, i.e. at a temperature lower than that used for the polymer dissolution to prepare the polymer solution. Certain embodiments provide organic polymers that entail producing a film of gelled polymer from the layer of polymer solution under conditions sufficient to provide a non-wetting, high surface tension solution within the layer of polymer solution to achieve a higher capacity and higher energy density.

Disclosed embodiment further provides the polymer membranes comprising the process of cooling and drying to prevent coiling of the polymer chains. This is because rapid solidification of the spread polymer solution would facilitate retention of the partially uncoiled orientation of the polymer molecules. This process comprises producing a film of gelled polymer from the layer of polymer solution under conditions is sufficient to provide a non-wetting, high surface tension solution within multiple layer of polymer solution consisting of a capacitor with higher capacity and higher energy density.

Certain embodiment provide the ultra-capacitor in association with a logic circuit 407 configured for controlling energy such as voltages that would be stored for communication to a battery pack 949. The circuit is configured to exhibit frequency-dependent behavior, which is required to amplify certain selective frequencies. Some embodiments provide the ultra-capacitor further comprising multiple terminal electrical elements consisting of two conductors 950. At list a conduction plate 951 is provided and being separated by an insulator comprising a dielectric element 952. The dielectric element is configured with connection wires that may comprise nano-wires 953 being connected to at least the two conducting plates. Other embodiments provide the ultra-capacitor comprising an energy storage device operable to elevate the performance gap between a battery and a traditional capacitor. Disclosed embodiment further provide the ultra-capacitor comprising an energy storage device being configured for repeated fully discharged and charged in periods ranging from 0 to 60 seconds. The discharging and charging is enabled at high efficiency. The ultra capacitor would have market wide variances over standard batteries that generally discharge over many minutes/hours. The ultra-capacitor is differentiated by its performance over standard capacitors that typically discharge over a fraction of a second and have low energy storage.

Disclosed embodiment further provide ultra capacitor comprising of a combining a highly densified electrode with a symmetric, strong, highly porous, micro porous polymer film that functions as a separator between the positive and negative electrodes within the electrochemical cell 936. The high strength and uniform porosity of the polymer film would allow a more efficient travel of ions, resulting in maximum current flow within the electrochemical cells 936. Certain embodiments provide the ultra capacitor further comprising the process of combining improved ion availability resulting from the highly densified electrodes with unimpeded flow of ions through the symmetric, strong, highly porous, micro porous polymer film to exhibit electrochemical cell of improved capacity and efficiency for the ultra-capacitor energy storage medium.

Since voltage balancing is the key to electrochemical capacitors, voltage applied to the terminals of the ultra-capacitor would be distributed among the cells that make up the capacitor. Disclosed embodiment further provides the ultra capacitor comprising an integrated circuit "IC" comprising at least one of: a storage device; a processing device; a passive voltage balancing. The IC may further comprise microprocessors configured with nanotechnology applications operable for actively keeping the voltage balanced to prevent unmatched impedances or uneven splits between cells. Certain embodiments provide a passive voltage balancing device consisting of at least resistors 954 and/or inductors 955 operable for keeping voltages equal across each cell.

Disclosed embodiments provide ultra capacity that is similar to that of electrochemical capacitor because it is less expensive and is not affected by shocks or vibrations. Vibration may have a profound effect on the dielectrics. The effect of equivalent series resistance for the individual cells is compensated by the presence of pulse discharge to prevent the cells from adding together as they may be stacked in series to reach the required application voltage level. This would eliminate any sluggish responses and enable the quick efficient release of energy.

The ultra-capacitor technology is for hybrid consumer electronics and could be used in some applications as a backup energy storage device. The benefits are:

The cost to maintain and replace batteries is much higher and labor intensive.

There is no system maintenance for ultra-capacitor and it improves breakaway torques.

Ultra-capacitor is safe and environmentally friendly

Ultra-capacitor contains no toxic chemical.

Ultra-capacitor contains no material that makes charging and disposal hazardous.

Asymmetrical nickel/carbon design ultra-capacitor is recyclable and reclaimable.

Excellent in high power capabilities and excels in high power supply.

Ultra-capacitor has wider operating temperature range and stores energy through electrostatic means.

Ultra-capacitor supplies energy even at lower temperature and is easily recharged.

Ultra-capacitor has unlimited cycle life, occupies less space, and weighs less.

Embodiments further provide energy storage medium comprising microfiber material which can be configured with silicon substrate. Embodiments further provide substrate-nano-fibers/microfiber comprising miniaturized non ferrous materials which can be embedded in the silicon substrate. Embodiments further provide substrate-nano-fiber/microfiber comprising energy transport platform consisting of at least glass.

In one embodiment of the ultra-capacitor, at least an electrochemical cell is formed using centrifugal forces to densify an electrode or electrode material. In some embodiments, a binding agent may be used to mechanically bind active material for processing and normal operation. The binding agent may be a dispersed solid material as well as a pore forming material. The electrode is configured to enhance efficiency and power capability as more active material are provided per unit volume to react with the surrounding electrolyte. Furthermore, the centrifugation process of the ultra-capacitor provides higher density active material that could become increasingly porous near its surface, allowing the electrolyte to contact and react with a larger surface area of the active material. In other embodiments, multiple layers of the ultra-capacitor cells are constructed using single or plural centrifugal processing steps.

Figure 59:
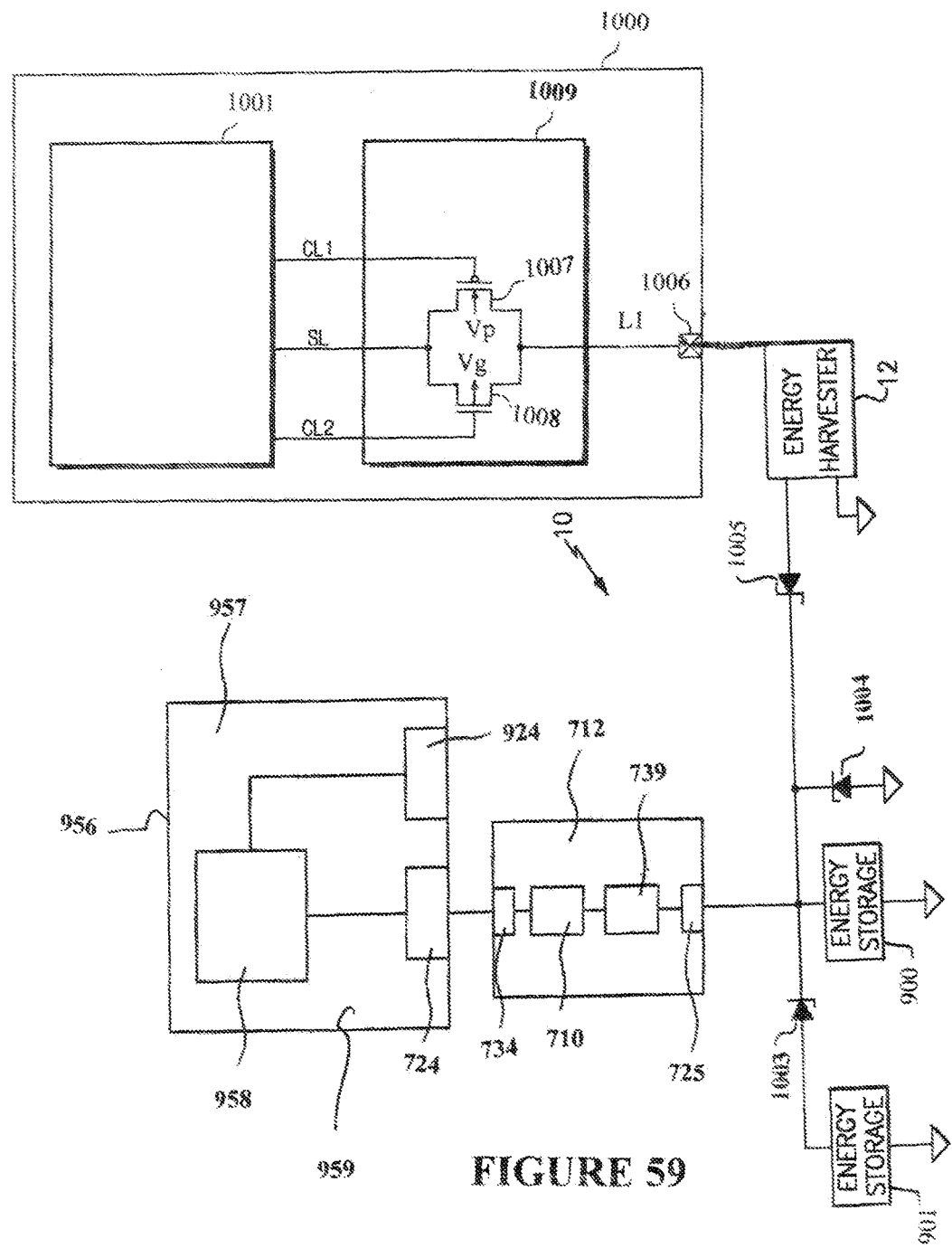
FIG. 59 is seen an exemplary embodiment of the charging circuit for the energy harvesting communication apparatus.

Referring to FIG. 59 is seen further exemplary embodiment of an energy harvesting communication apparatus 400 in electrical communication with a capacitive storage medium 900 and/or a battery storage medium 901. Embodiment provides an energy management apparatus comprising a integrated charging circuit 1000, having an internal circuit 1001 configured with control lines CL1, CL2, and signal lines SL1 in communication with power voltage Vp, and a ground voltage Vg. The input/output line is in communication with the power voltage and in communication with energy harvester 1002 a link 1006. Certain embodiment further provides transistorized switches consisting of at least a PMOS transistor 1007 and an NMOS transistor 1008 being disposed in a chip 1009. Embodiment further provides switches 1003, 1004, and 1005, being configured for turning On and Off the storage medium through an input/output line L1, when desired charge is needed. Electrical energy storage is very important for all electrical and electronic systems and even renewable energy systems like solar cells need somewhere to store excess energy to be used at later time. Embodiment provides electrochemical cell that comprised of a housing 956, being divided into two chambers, a first chamber 957 and a second chamber 958. The first chamber is operatively configured with a protogenous, ion-conducting liquid 959 and a positive high density electrode 924 including a first active material and a porous binder, surrounded by a surface in which the porosity increases towards the surface. The second chamber is communicatively configured with an paretic, ion conducting liquid and a negative high density electrode including a second active material and a porous binder, surrounded by a surface in which the porosity increases towards the surface. The ultra-capacitor optimizes the electrochemical cell which contains a symmetric, strong, highly porous, nano/micro porous polymer membrane which divides the housing into the first and second chamber. In the optimized electrochemical cell, the porosity of the polymer membrane is at least 25% greater than the porosity at the surface of the positive and negative high density electrodes.

The electrode has a current conductor with an active material held in a matrix of porous or conductive binder. A separator is applied to the electrode. The electrode is an active material that may be densified or compacted using a centrifuge. The matrix of a binder may hold the active material in place for stability during manufacturing and enhanced durability in a finished device. The binder may be a porous binder with pores sized smaller than the smallest nominal size of the active material.

Embodiment further provides nanotechnology application comprising substrate-nano-fiber/microfiber 724. Disclosed embodiments provide methods and systems for generating electrical energy, comprising nano-fiber/microfiber material 710 being configured with sensors on silicon substrate 712. Certain embodiments of the substrate-microfiber 724 comprise miniaturized non ferrous materials 734 being embedded in the silicon substrate 712. Some embodiments of the substrate-microfiber 724 comprise energy transport platform 725. Certain embodiments of the silicon substrate 712 comprise at least glass 739

Figure 60:
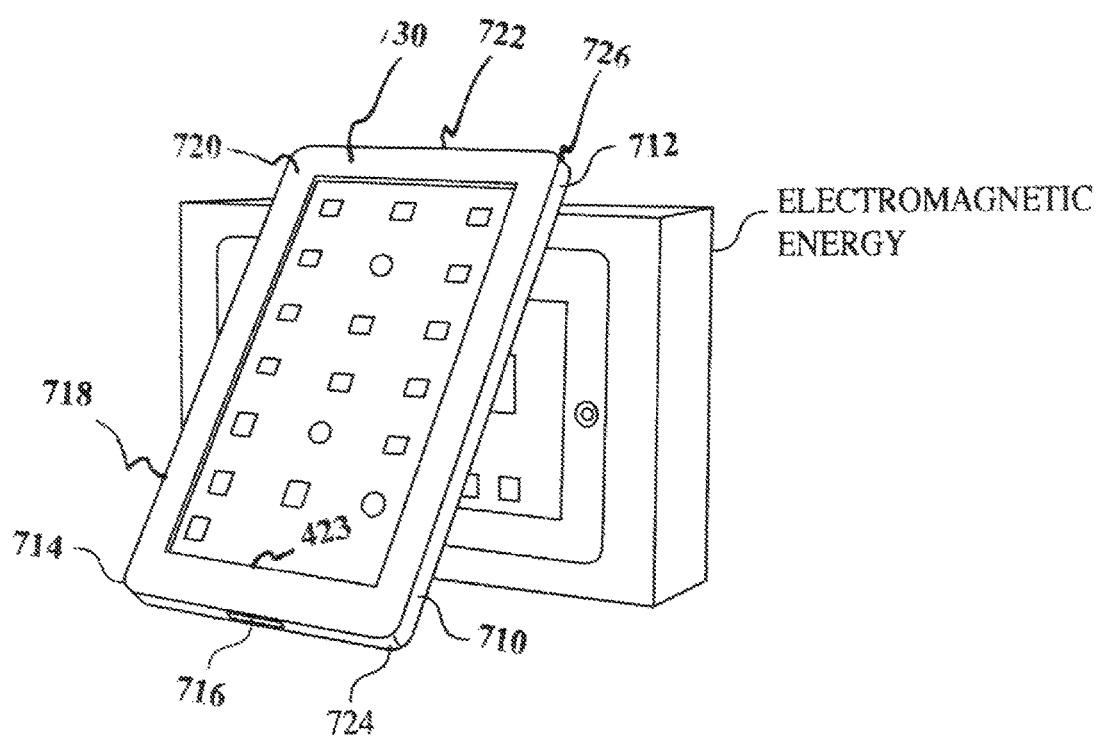
FIG. 60 is further seen an exemplary embodiment of the energy harvesting communication apparatus further configured for electromagnetic energy harvesting.

Referring to FIG. 60 is seen an exemplary embodiment of the communication device comprising an energy medium that includes electromagnetic energy. Disclosed embodiments provide methods and systems for generating and storing electrical energy. Certain embodiments of the disclosure comprise nano-materials 710 comprising nano-fiber/microfiber material. Embodiments further provide the nano-fiber/microfiber material 710 comprising material with excellent electrical properties disposed with substrate 712. The nano-fiber/microfiber material 710 includes material components with nanometer dimensions in which at least one dimension is less than 100 nanometers. Some embodiments provide the microfiber materials further configured with nano-wires/tubes 714, being embedded in the silicon substrate 712. Certain embodiments of the disclosure comprise the substrate 712, being configured with electrodes 716 in communication with the nano-wires/tubes 714. Other embodiments provide the nano-tubes 714 comprising at least one component of carbon char, carbon black, metal sulfides, metal oxides and other organic materials being alloyed with the microfiber material 712. Disclosed embodiments further provide the alloyed microfiber material 712 comprising apparatus 718 configured for exhibiting unique electrical and electrochemical properties to enable efficient transportation of energy properties.

Disclosed embodiments provide methods and systems to produce energy properties from the presence of high surface areas and charge transport mechanism. Certain embodiments provide the charge transport mechanism further derived from the flow of pressured fluid 423. Disclosed embodiments further provide apparatus for thermal expansion in communication with the nano-tubes 714. Certain embodiments of the thermal expansion of the fluid comprise water and/or material pyrolysis. Some embodiments provide energy medium, including apparatus 720 comprising means through which electron transfer occurs at the electrode 716, through the release of chemical energy to create a voltage through oxidation/reduction reactions 722. The oxidation and reduction reactions 722, is being separated through the electron 716. The electrode 716 is being configured with substrate-nano-fiber/microfiber 724 comprising re-enforcement to external electric circuits. Certain embodiments provide at least a storage medium, comprising internal voltages at electrodes configured for providing useful energy for battery means 724 and capacitor means 726.

Figure 61:
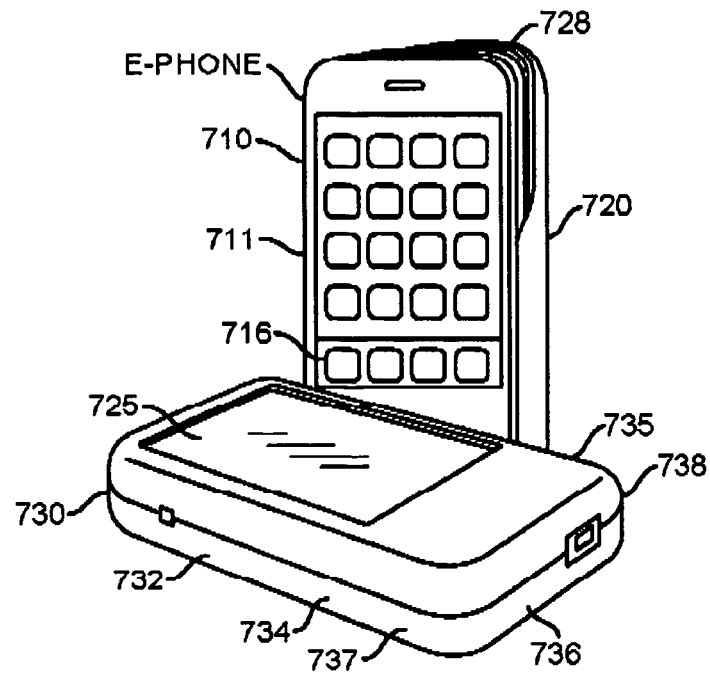
FIG. 61 is seen further exemplary embodiment of the energy harvesting a communication apparatus.

Referring to FIG. 61 is seen further exemplary embodiments of the energy medium comprising energy storage apparatus 720. Disclosed embodiments provide methods and systems for generating electrical energy. Certain embodiments of the disclosure comprise electric current 728 being generated from the energy released by at least a reaction. Certain embodiments of the disclosure comprise nano-fiber/microfiber material 710 being configured with thin film and/or zinc oxide for generating electrical energy and/or for converting pressure force into electrical energy. Some embodiments of the energy being generated comprise electrical energy 730. Other embodiments of the energy being generated comprise thermal energy 732. The microfiber material 710 further comprises plurality textile fibers 711, being alloyed with zinc oxide (ZnO) nano-wires 734.

Disclosed embodiments provide the zinc oxide nano-wire 734 being configured with piezoelectric crystals consisting of elements for generating electrical current 728. Certain embodiments of the disclosure include current flow 730 from plurality fiber pairs 736. Other embodiments provide the fiber pairs being configured for converting at least one of: vibration, pressure, blood flow, sound, waves, force, and other electrical properties into electrical energy 730. Some embodiments provide apparatus for generating pressure and force and converting the pressure and force into electrical energy. Disclosed embodiments provide methods and systems for converting the generated fluidic pressure into electrical energy. The fluidic pressure stream is communicatively connected to the nano-fiber/microfiber material 710 being configured for converting pressure and force into electrical energy 730. Some embodiments of the nano-fiber/microfiber material 710 comprise nanotechnology applications.

Other embodiments provide methods and systems of generating renewable electrical energy through nanotechnology applications. The nanotechnology applications comprise at least plurality layer nano-fiber/microfiber 736. Other embodiments of the nano-fiber/microfiber 710 further comprise miniaturized material arrays comprising nano-wire 734 being configured for hybrid generator assembly 738. Certain embodiments provide the generator assembly 738 comprising of at least semiconductor properties consisting of non ferrous material arrays. The non ferrous material array comprises vertically-aligned zinc oxide (ZnO) nano-wires 734. The zinc oxide wino-wire 734 is being configured to exhibit flexible electrode 716. Some embodiments provide the flexible electrode further comprising conductive platinum tips 735. Other embodiments provide the nano-fiber/micro fiber material 710 further comprising plurality fibers with excellent electrical properties, and being coated with polymer and/or with zinc oxide layer 734 to provide energy transport platform 725. Certain embodiments provide the nano-wires 734 being coated with gold 737, and fused or etched on the transport platform 725. Some embodiments provide the nano-wire being configured for harnessing energy from a medium, comprising at least one of: vibration, pressure, blood flow, sound, waves, and, Force, solar, electromagnetic radiation. Other embodiments provide apparatus comprising zinc oxide (ZnO) 734 being embedded in a silicon substrate, which is being configured with at least polymer.

Figure 62:
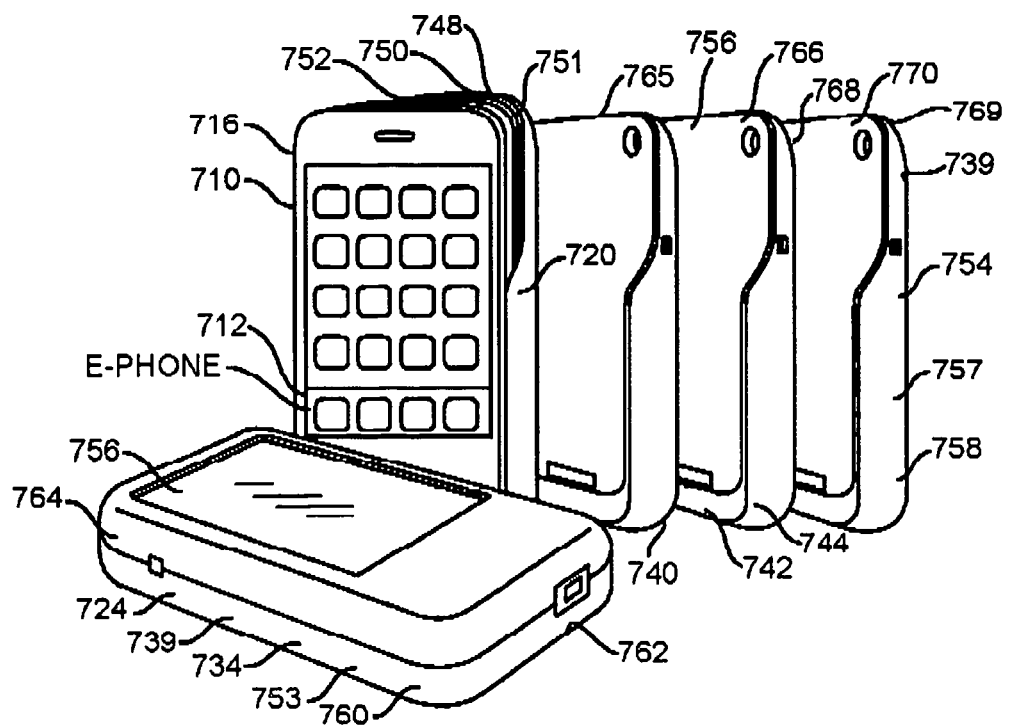
FIG. 62 is further seen an exemplary embodiment of an energy harvesting case "E-CASE" in association with an energy harvesting phone "EPHONE" further configured with energy harvesting display.

Referring to FIG. 62 is seen further exemplary embodiments of the energy medium comprising harvesting energy from a natural energy source. Embodiments herein provide silicon-substrate-microfiber comprising energy transmission storage apparatus 720. Certain embodiments provide data being converted into electrical energy. The data may be derived from at least one of: nature occurrence within an environment, electromagnetic radiation, vibration, pressure, blood flow, sound, waves, force, and electrical properties from other man made materials. Disclosed embodiments further provide the silicon-substrate-nano-fiber/microfiber comprising charged coupled apparatus 740 being configured with miniaturized conduit particles 734. Certain embodiments of the conduit particles 734 comprise of at least glass 739. Other embodiments of the conduit particle comprise of at least Zinc Oxide (ZnO) and/or gold. Some embodiments of the disclosed particles comprise of at least non-ferrous material being alloyed with at least a substrate-nano-fiber/microfiber 724. Disclosed embodiments further provide conduit properties comprising of at least glass fiber 739 being responsive to light data transmission. Further embodiments of the charge particle apparatus 740 comprise electron-silicon substrate-oxide 742 configured with material with good optical properties for exhibiting efficient/effective sensitivity to electron range. Disclosed embodiments provide the electron-silicon substrate-oxide 742 comprising coating to prevent glass-glass interface 744. Certain embodiments of the disclosure comprise the silicon substrate 712, being at least the constituent of glass 739. Other embodiments provide the silicon substrate 712 being layered with fibers 710 to exhibit durability and better charged properties.

The electrodes 716 are further connected to battery cells 748. Other embodiments of the battery cells 748 further include electrolyte 750 comprising of cathodes 751 and anodes 752. The cathodes 751 comprising the oxidized form of the electrode metal and the oxidizations and reductions are controlled by the electrochemical potential being responsive to the thermal expansion, pressure, composition and concentration of the electrolyte 750. The electrical potential differenced being produced is the sum of the electrochemical potential at the electrode 716. Embodiments further comprise of Zinc batteries and/or zinc fuel cells 754 being configured for electrochemical power applications through the oxidation of zinc with oxygen from the air for exhibiting high energy density. Certain embodiments comprise nanomaterials 734 being embedded in the substrate 712 and etched/fused in the microfiber material 710 to provide advanced cell platform 756. Some embodiments of the cell platform 756 comprising energy apparatus communicatively connected to the electrodes 716. Other embodiments of the cell platform 756 comprise a battery cell 753. Yet, other embodiments of the cell platform 756 comprise fuel cell 754. Disclosed embodiments provide the cell platform 756 further configured for medical devices applications 757. Other embodiments of the cell platform 756 comprise consumer electronics applications 758. Disclosed embodiments further provide the cell platform 736, further comprising lithium/nickel-cadmium batteries (NiCd) 738 configured with nickel oxide hydroxide and metallic cadmium 760. Embodiments provide the nickel oxide and metallic cadmium 760 further consisting electrodes 716 being configured for deep discharge applications. Other embodiments provide methods and systems for storing electrical energy, comprising the cell platform 756. The cell platform 756 includes battery configuration for exhibiting higher number of charge/discharge cycles and faster charge and discharge rates.

Certain embodiments of the cell platform 756 further comprise an electrode device 762 comprising at least electrically conductive nano-wires/nano tubes 764 being coated with at least one electrically isolating layer 765. Embodiments further provide the nano wire or the nano-tubes 764 comprising at least a substrate 712 being coated with at least one metallic layer 760 having a nano-metric pattern thereon, and being at least partially exposed at a tip of at least the electrically conductive core 760. The cell platform 754 further comprises at least plurality nano-tubes 764, each being configured with flexible electrode devices 762 disposed in a guided re-enforced silicon substrate 712. Other embodiments further provide each electrode device 764 being configured with plurality of nano-wires/micro-wires 734 being connected to at least one nano-tube. The nano-tubes 764 further comprise flexible electrode devices 762 being configured to provide electrical communications.

Disclosed embodiments further provide the cell platform 756 further comprising particles of zinc mixed with an electrolyte consisting of at least potassium hydroxide solution: water, and oxygen from the air to enable reaction at the cathode 751. The reactions can form hydroxyls, which is being migrated into zinc paste and form zinc oxide hydroxide 734 configured for releasing electrons to the cathode 751. Disclosed embodiments further provide reactions comprising zinc decaying into zinc oxide 734 to provide the releasing of water back into the cell platform 756. The cell platform 756 is further configured so that the water and hydroxyls from the anode 752 are being recycled at the cathode 751. The recycling of the water and the hydroxyls enables the water 766 to serve only as a catalyst to produce maximum voltage. The disclosure of the substrate 712 and microfiber material 710 for the cell platform 756 further comprises electro-active material to enable better charge transport.

The cell platform 756 further comprise of plurality nano-components consisting of nano-particles 767 forming conductive carbon-based nano-clusters 768 bound together by a conductive carbon-based cluster binder having high densities of mobile charge carriers such as electrons, electronic acceptors, ionic species. The cell platform 756 further comprises at least a terminal 769, being electrically coupled to the nano-particles 768 for enabling a charge transport and for supplying electrons and electron acceptor sites. Other embodiments of the cell platform 756 further comprise charge transport 740, occurring by means of the electron traveling through the highly conductive and shorted path of the binders 770. Disclosed embodiments provide the binders in close proximity with the nano-clusters 768 for enhancing the energy and power densities.

Figure 63:
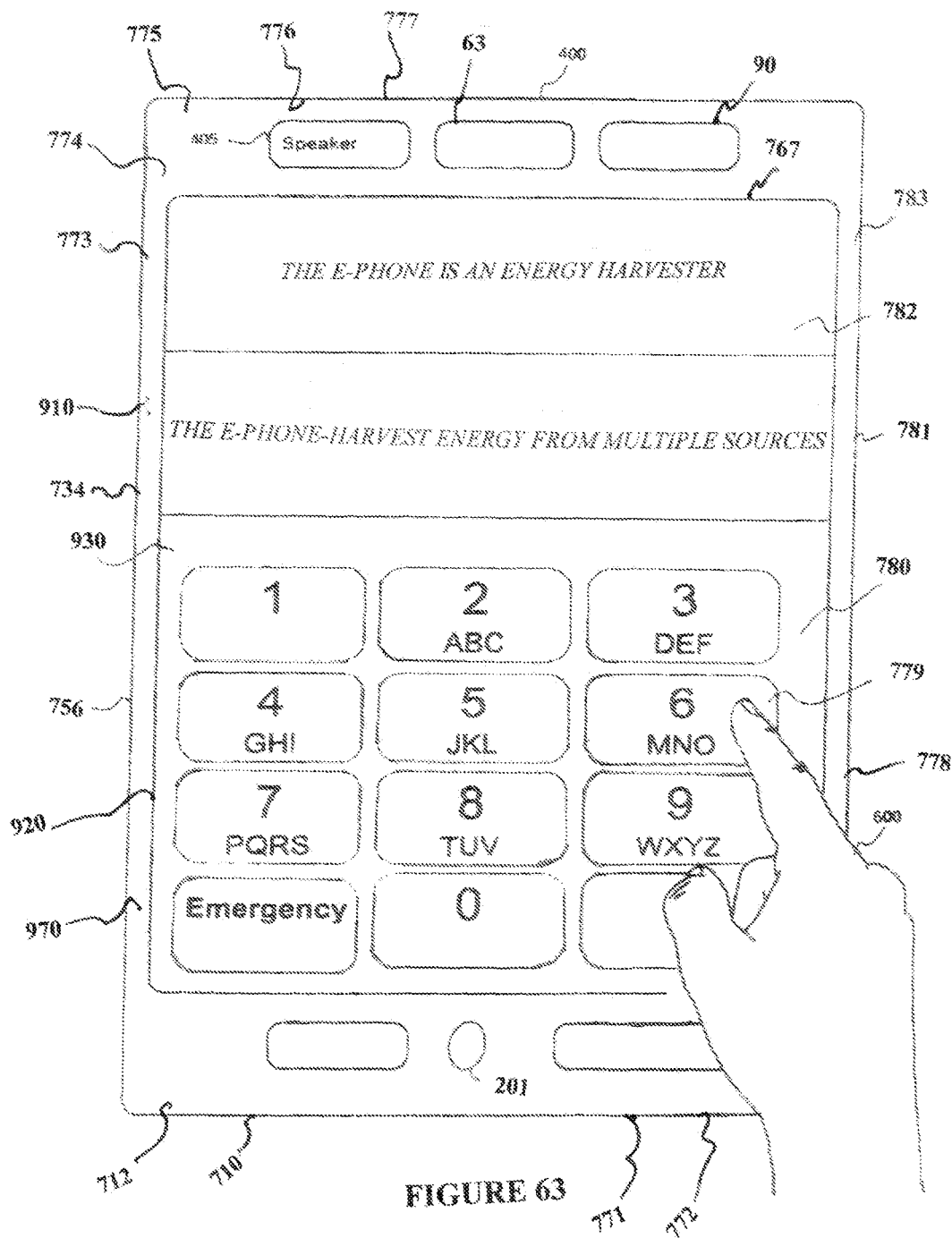
FIG. 63 is seen exemplary embodiments of the communication apparatus disposed with a charge transport consistint of microfiber material and silicon substrate.

Referring to FIG. 63 is seen exemplary embodiments of a communication apparatus 400, comprising a charge transport consisting of microfiber material 710 being configured with silicon substrate 712. The silicon microfiber comprises cell platform 756. The cell platform 756 comprises nonferrous material 930 embedded in the silicon substrate 712.

Multifunctional sensors 970 and MEMS 920 are embedded in the silicon substrate for enabling detection of charge characteristics. The cell platform 756 further comprises nano particles 767 being configured with membranes 782. Disclosed embodiments provide methods and systems for generating electrical energy and for transporting the energy. Some embodiments provide zinc oxide 734. Certain embodiments comprise an analyte 910. Other embodiments provide an investigative agent. Disclosed embodiment further provides an electronic device that includes an E-PHONE consisting of a detection platform comprising silicon nano-fiber/micro-fibered material, which may be etched on second materials, including a non woven material. The incorporation of fiber would enable electromagnetic interference and provide advantages of fiber-optic sensors due to their geometrical flexibility, providing a sufficiently sensitive detection environment to encompass other energy bodies.

Certain embodiment provides a silicon to silicon bonding 771 or silicon to ceramic wafer bonding 772 for generating electrical energy to power the electronic device. The silicon to ceramic wafer 772 is responsive to solar energy and may include glass bonding 773 to form single crystal silicon 774 to improve the micro-acoustics and micro optics using nanotechnology applications. Some embodiments provide sensors 775, being embedded in the silicon to provide multifunctional sensor array, including a transducer 776, a cantilever sensor 777, accelerometer 778, an acoustic wave resonator 779, antennas 201, metal clusters 780, and metal films 781, being embedded in the silicon substrate responsive to frequency shift which may be influenced by mechanical, chemical, and electrical perturbation within a boundary environment. The electrical perturbations may occur in the metal films 781. The metal films 781 may have different conductive values deposited on the resonator 779, responsive to loading effects for generating electrical energy.

At least catalytic properties consisting of metal oxides 783 are further disposed for converting pressure force into electrical energy. Certain embodiment provide the metal clusters 780 comprising of semiconductor oxide substrate being configured with chemical sensitization for enabling metal particles to act as centers, providing surface gas absorption environment. The silicon-substrate-metal oxide further comprises antimicrobial metal consisting of at least silver being laminated to at least a liquid absorbing nonwoven material, which is fused/etched in microfiber/nano-fiber material to provide a pathogen detection environment The nonwoven material comprises a polyethylene mesh forming an antimicrobial composites comprising antimicrobial metal coating being disposed on the detection platform via vapor deposition. The detection platform may comprise the antimicrobial composite comprising liquid permeable material or liquid absorbing material operable for pathogen detection.

Certain aspects and embodiments of the disclosure have been described. These have been presented by way of example only, and are not intended to limit the scope of the disclosure. Indeed, the novel of the apparatus described herein may be embodied in a variety of other forms without departing from the spirit thereof. The accompanying claims and their equivalents are intended to cover such forms or modifications as would fall within the scope and spirit of the disclosure. The goal is to harvest energy to power an electronic device, a communication device, and to achieve high density electrodes by increasing ion flow within the ultra-capacitor components. Further objective of the ultra-capacitor is to eliminate restrictions to the ion flow and the detrimental interfacial discontinuities between components in the electrochemical cells. Overcoming low porosity in the polymer membrane for the ultra-capacitor would be achieved by increasing the density in the electrodes which would increase the charge of the capacitor over extended cycling. The ultra-capacitor relates to energy storage medium comprising of electrochemical (EC) cell construction. The ultra-capacitor is not limited to electrode at 20% electrode porosity level and to be configured with separator void levels at >40% to obtain a 100% higher porosity level in the separator than the electrode. The process consist of producing micro-porous polymer membranes by producing a film of gelled polymer from a layer of polymer solution under conditions sufficient to provide a non-wetting, high surface tension solution within the layer of polymer solution.

The method of producing a strong and highly porous, micro-porous polymer membrane may be processed by forming a layer of polymer solution on a substrate. The polymer solution may comprise dissolving two miscible liquids and a polymer material. The two miscible liquids may be composed of, (1) a principal liquid that has a surface tension at least 5% lower than the surface energy of the polymer and (2) a second liquid that has a surface tension at least 5% greater than the surface energy of the polymer, (3) producing a film of gelled polymer from the layer of polymer solution under conditions sufficient to provide a non-wetting, high surface tension solution within the layer of polymer solution, and (4) rapidly removing the liquid from the film of gelled polymer by unidirectional mass transfer without dissolving the gelled polymer to produce the strong, highly porous, micro porous polymer film. The substrate onto which the solution is deposited may have a surface energy higher than the surface energy of the polymer. Disclosed embodiment further provides a communication apparatus 400 that is responsive to pressure such as pressure from human hand 600, converting the pressure force into electrical energy. Embodiment further provides the MEMS 920, further configured with speakers 405, video camera 63, and camera 90.

Figure 64:
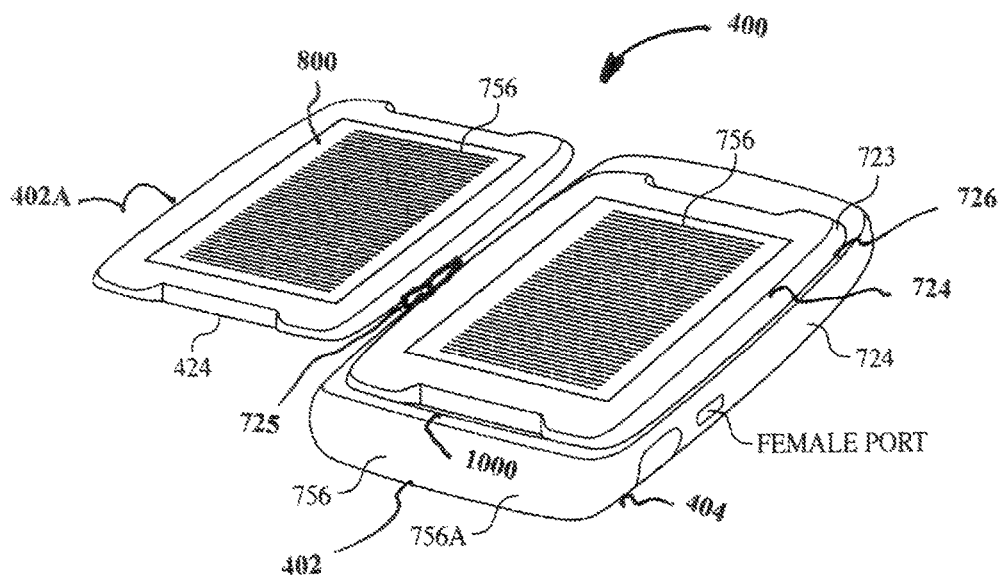

Referring to FIG. 64 is seen further exemplary embodiment of the disclosure, further comprising a communication apparatus 400 comprising of a cover case 402A consisting of a cell platform 756, in electrical communication with a housing 402, through at least an energy transport stream 725. The housing further comprises a charging circuit 1000 in electrical communication with the solar cell platform 756. The cover case 402A and the housing 402, are further disposed with solar cell 800 and/or piezoelectric element 420, a substrate 724 in association with a CMOS multiple antenna on chip 201. Embodiment further provides the case 756A comprising a semiconductor silicon substrate nanofiber/microfiber 723, comprising an energy harvesting platform 756. Certain embodiment provides the case 756A comprising energy harvesting platform. Some embodiment provides the case 756A, further comprising a device operable for boosting communication signal to improve signal reception. Other embodiment provides the case comprising a portable signal boosting apparatus. Disclosed embodiment provides the communication apparatus 400 being inserted in the case. At least a female USB port is provided. At least a substrate 724 is provided. At least a display device 424 is provided. At least a male USB port is configured to be inserted into the female USB port. At least the insertion of the male USB port into the female USB port further provides means for supplying energy to at least the communication apparatus 400. Certain embodiment provides the communication apparatus 400 further configured with acoustic sensor for converting sound wave into electrical energy. The preceding acoustic sensor further comprises an optional configuration, providing other source of energy harvesting within the environment where the phone is being used. The acoustic sensor is in association with the CMOS multiple antennas to harvest energy from two fronts. 2A.) The acoustic sensor would convert sound waves "Voice communication" into usable energy. 2B.) The CMOS multiple antenna would convert electromagnetic radiation and solar energy into usable energy. Certain embodiment provides the charging circuit 1000 in electrical communication with at least an energy storage medium comprising of at least a battery means 724, and at least a capacitive means 726. Some embodiment provides the capacitive means in electrical communication with the battery means 724 when a charge is requested for the battery means. At least a display device 404 is disposed with the communication apparatus 400. In other embodiment, the cover case 402A is detachable. Yet, in certain embodiment, the housing and the cover case are jointly disposed. Still in some embodiment, the housing and the cover case comprise at least housing when closed and jointly operable. The housing and the cover case are electrically connected to provide energy being harvested from the surrounding environment.

Referring to FIG. 65 is an illustration of the communication apparatus 400, comprising at least a network environment 21 consisting of computer systems comprising a display device 003, a sound card 61, speakers 63, a cache engine 350, a network interface 170, a display adapter 59, intelligence logic 352, a media device 201, and a central processor 51. The communication apparatus further include an input device 009 comprising at least a keyboard 11 and a mouse 12. The communication apparatus further include an IC card and a SIM card in communication with network interface 170. The CPU 03 is operable with the intelligence logic 352 to process commands and applications, in communication with memory 53, decision engine 123 and web-enabled devices. Disclosed embodiments further provide the web enabled devices comprising a browser 040. The network 21 is responsive to communications through the Internet. Certain embodiments provide a communication apparatus being configured with the browser 040, a server search report 39, and client search programs 38. Disclosed embodiments further provide a communication apparatus configured with graphic user interface 101, a search program manager 126, a browser 040, an ICON 001, and a storage medium comprising at least a meta-data 114. At least a web-page manager 392 is provided comprising addresses 131, corporations 200, battlefield transportation department 100, ware houses 121 and a workbench 113. The computer system further comprises an affinity analyzer 122, a data analyzer 122A, a readout tool 08, a web-page 390, a report generator 124, web file module 401, and client interface being operable with software application 300.

The communication apparatus 400 comprises battlefield topics of information. Disclosed embodiments provide the communication apparatus 400 further comprising a data processing system 410 operable on a social platform 420. The social platform 420 comprises a social network environment operatively configured for multicast virtual private network. Disclosed embodiments provide the virtual private network 178 comprising apparatus operable for transmitting same data to multiple receivers in a network. Certain embodiments provide the multicast virtual private network 178 comprising at least a multicast packet 176 configured for replication with at least a router 179. The multicast private network comprises a network interface 170 for advancing battlefield knowledge. The network interface 170 further comprises: at least a computer apparatus 430 comprising a computer recordable medium 432 being operable on a computer readable program 434. The computer readable program 434 is configured to cause at least one computer device to receive plurality of battlefield reference documents in communication with client interactive interface module 172 operatively configured with at least a multi-protocol label switching 173 being operable on at least a support system 210 operatively configured for mapping desired communications.

Disclosed embodiments further provide the multicast-protocol label switching 173 comprising apparatus configured to direct data from network note 20 to network note 21 in communication with a virtual link. Certain embodiments provide the multi-protocol label switching comprising apparatus configured for carrying data from network note 20 to network note 21 in communication with a virtual link. At least one support system 210 is configured with the social platform 420 and communicatively connected to at least a dedicated processing element 423. The multi-protocol label switching 173 is further configured to speed up network traffic flow to effectively manage structured reference documents comprising battlefield topics of information.

Other embodiments provide the virtual private network 178 further comprising the router 179 in communication with the multiprotocol label switching network 173. The router 179 configured for the distribution of battlefield medical topics of information across a shared multiprotocol label switching network. Disclosed embodiments provide the router further includes Internet protocol addresses for establishing multiple switched paths with the multiprotocol label switching network. Other embodiments provide the multiple switched paths comprising plurality point to point paths assignments for military personnel/battlefield social network. Some embodiments provide the router 179 further configured for maintaining communications with the database 130 containing battlefield reference documents for the topics of information. Other embodiments provide the database further comprising prefix of the topics of information that matches battlefield/medical topics addresses in the packet's network destinations address field. Disclosed embodiments further provide the Internet protocol configured to determine at least a direction for the packet transmission from the router to at least a remote computer system. In the disclosure, the packets further include Internet protocol data-gram comprising network addresses for remote destinations.

The dedicated processing elements 423 being operable for providing carrier based multicast virtual private networks 178. Some embodiments provide multi-protocol label switching 173 consisting of labels 175 comprising packets 176 to forward decisions made on the contents of the labels. Disclosed embodiments further provide the communication apparatus 400 further operable for categorizing transportation and engineering files referenced by initial search results, comprising implementing at least a method for receiving at least a query that maps to objects identifier for transportation and engineering topics. The virtual network further comprises interactive collaboration within a secured battlefield reference document. The virtual network further comprises a server-based social network operable for community distribution of knowledge. The network is configured with document management system comprising a server database that includes at least a professional functionality and a plurality of interactive functionalities. Scientists, engineers, and transportation personnel may assemble into the network through the social platform. Interactive functionalities include allowing networks of scientists, engineers, students, universities, transportation personnel to share knowledge and documents in a remote secured environment. Disclosed embodiments provide the communication apparatus 400 being configured with software applications 300, further operable to remotely create, delete, edit and manage battlefield/medical documents and view information about the documents in a plurality of customized locations.

Certain embodiments provide the communication apparatus 400 comprising a neural network 220 in communications with at least a cache engine 350 being operable for responding to at least a transportation and engineering topic request using a server response data that is cached at a network operable with at least a programmable architecture 424. Disclosed embodiments provide the programmable architecture 424 being configured with at least one dedicated processing elements 423. Certain embodiments further provide the cache engine 350 in communication with cache database 133. Some embodiments provide the search engine 402 in communication with the cache engine 350 configured for applications that include internet 370. Other embodiments provide the search engine 402 in communication with at least a crawler 174 and an index database 132. Disclosed embodiments further provide the communication apparatus 400 comprising a display adaptor 59 operable for communications with corporations 200, battlefield transportation department 100, and web file modules 401, and personnel interface 172. Certain embodiment further provides the SIM CARD and/or the IC CARD further comprises an energy storage device. Some embodiment provides the SIM CARD and/or the IC CARD further comprises a portable/transportable energy storage device. Other embodiment provides the SIM CARD and/or the IC CARD further comprises an energy harvester being disposed to harvest energy within a network environment and/or from an environment with natural occurrence of energy.

Referring to FIG. 66 is seen further exemplary embodiments of the disclosure, comprising the communication apparatus 400 in a network. The further include a CDMA network 20, a GSM network 21, a wireless network 22, a local area network 23, an Internet network 24, a Wi-Fi network 25, an LTE network 26, a WIMAX network 27, a millimeter wave network 28, a backhaul link 29, a base station 30, a mobile communication device 31, a vehicular communication device 32, and a satellite network 66. Embodiment provides antenna apparatus 201, being disposed with at least an electric vehicle 300 being disposed with at least a motor means 301. The electric vehicle 300 is further disposed with at least a wheel 302 being disposed with a valve stem 304. Certain embodiment provide the antenna apparatus 201 comprising a CMOS multiple antennas on chip and being configured with nano-wires for converting electromagnetic wave into electrical energy for communications with a storage medium 304. At least one storage medium comprises a battery means 308. At least another storage medium comprises a capacitive means 310. Some embodiment provide the electric vehicle 300 being disposed with means for converting electromagnetic eave into electrical energy to power the electric vehicle. Other embodiment provides the electric vehicle further comprises a backhaul link. Yet, disclosed embodiment further comprises a mobile backhaul link.

Still, disclosed embodiment further comprises a mobile millimeter wave station. Embodiment further provides a mobile base station network. Still, embodiment further provides a network apparatus comprising a vehicular electrification device 312. Disclosed embodiment further provides a communication apparatus 400 being configured for energy harvesting and for providing communications and/or network connectivity. Certain embodiment provides the electric vehicle 300 further include at least one of: a hybrid vehicle 314, an internal combustion engine 316, each being disposed with at least a wheel 302 having a valve stem 304 disposed within a tire environment 318. Disclosed embodiments provide the valve stem 304 further configured for communications with the electronic control module 320. Certain embodiments provide the electronic control module 320 further comprises an energy harvester being responsive to the energy due to wheel rotation, in communication with at least one storage medium 306. Some embodiment provides the antenna apparatus 201 and/or the electronic control module being disposed within the dashboard 322. Some embodiments provide the electronic control module 320 further configured with at least an audiovisual devices 130 and 140 comprise a speaker 130 operable for broadcasting voice auditory responses responsive to detection signals. Other embodiments provide the audiovisual devices comprise an integrated interactive device comprising at least a visual interface operable for displaying detected data. Disclosed embodiment further provides the antenna apparatus further disposed with at least one opened end and at least one shorted end. The shorted end of the antenna apparatus further comprises the nano-wires.

While certain aspects and embodiments of the disclosure have been described, these have been presented by way of example only, and are not intended to limit the scope of the disclosure. Indeed, the novelty of the apparatus described herein may be embodied in a variety of other forms without departing from the spirit thereof. Each embodiment and form include their equivalents. The accompanying claims and their equivalents are intended to cover such forms or modifications as would fall within the scope and spirit of the disclosure. It is to be understood that the scope of the present invention is not limited to the above description, but encompasses the following claims.

What is claimed:

1. An energy harvesting communication device configured with means for boosting signal reception, the communication device comprising: a. at least a cell platform; b. at least a charging circuit apparatus; c. at least a control apparatus; d. at least a communication apparatus communicatively coupled to said charging circuit apparatus and in association with the control apparatus; and e. said cell platform further disposed with sensors embedded in silicon substrate to provide at least one of a communication medium, a detection platform, a communication clarity, a detection selectivity, and a detection sensitivity.

2. The energy harvesting communication device of claim 1, wherein said cell platform further configured for harvesting energy, wherein said cell platform further comprises at least one or: a solar cell; an antenna apparatus operable for harvesting electrical energy from electromagnetic radiation; a plasmonic platform; a photonic platform; a display apparatus; a housing being affixed with a display apparatus; a housing further disposed with antenna apparatus for harvesting energy and for boosting signal reception; an electronic computing device; a display device in association with a camera device; a plasmonic chip; a metal nanoparticle array waveguide; a photonic chip; a layered oxide; an optical waveguide configured with means to absorb and emit light, a case for association with a communication device, a case being embedded with antennas, a case being embedded with sensors.

3. The energy harvesting communication device of claim 1, wherein said cell platform further configured for harvesting energy, further comprises at least one of; thin film oxides; charging apparatus; transparent substrates; piezoelectric elements; MEMS; nanotechnology applications; nano-wires; nano-tubes; nano-fibers; microfibers; silicon; substrates; thick film oxides; meta material structure cavities; meta gold; photovoltaic cells; printed thin films; illuminance sensors; acoustic sensors; Plasmon; metal clusters; silicon-substrate-nano-fiber plasmonic being embedded with miniaturized ferrous material structure; a plasmonic high bandwidth chip; means for reflecting plasmonic energy; means for reflecting photonic energy; a plasmonic metaparticles associated with optical properties of electromagnetic waves; a plasmonic crystal chip having transparent conducting nanomaterial structures; a photonic transparent conducting nanomaterial structure.

4. The energy harvesting communication device of claim 1, wherein said cell platform configured for harvesting energy, further comprises at least one of: a housing for said communication apparatus; a communication circuit board for said communication apparatus; a case for said communication apparatus; a transparent substrate comprising at least an electro-chromic apparatus responsive to applied voltage for changing at least an element color; a display device; a silicon substrate nano-fiber plasmonic carrying miniaturized ferrous structure on chip; a plasmonic crystal chip; an electronic computing device in communication with an energy harvesting display device; at least a LED in association with a display device disposed with an electro-chromic element associated with miniaturized ferrous structures, wherein the display device further disposed with at least one of metal, glass, nano-fibers, ceramics, nano-polymer structures, at least a plastic fiber composite; a display device having a transparent element; a housing configured with light emitting structure.

5. The energy harvesting communication device of claim 1, wherein said charging circuit apparatus further comprising at least one of: a communication circuit board; means for charging a battery; means for managing energy; means for controlling energy to a storage medium; means for loading energy to a storage medium; and wherein said charging circuit apparatus in communication with at least one of said cell platform; said control apparatus; a cell associated with a housing member being affixed with a shapeable miniaturized ferrous structure; a shapeable light reflective plate; a display device configured with at least a supporting structure; an energy harvesting case, an energy harvesting case being disposed with embedded sensors; an energy harvesting case in association with embedded multiple antennas on chip; an energy harvesting case configured for at least one of communication, signal booster, data content display.

6. The energy harvesting communication device of claim 1, wherein said control apparatus further comprises a microprocessor configured for communications with at least one of: said cell platform; said charging circuit apparatus; said communication apparatus; said sensor; wherein said control apparatus further responsive to at least a request to perform at least one of: charging a battery; harvesting energy from an external environment; harvesting energy from an internal environment; harvesting energy from the communication circuit board environment; harvesting energy from a pressure sensitive environment; harvesting energy from a light exposure environment; changing at least a color of a substrate by responding to at least an applied voltage; controlling energy transport to at least a remote electronic device; controlling energy transport from at least an external device; controlling energy transport from a case to a communication device.

7. The energy harvesting communication device of claim 1, wherein said cell platform further comprises a structured layer comprising at least one of: a thin film, a coated film; a piezoelectric element; an acoustic sensor; an illuminance sensor; an electro-chromic apparatus comprising at least an element; a transparent substrate; a substrate; an insulating layer; a woven fabric layer; a film layer; an oxide layer; a thin film layer; a reflective layer; a conductive layer; wherein said cell platform in communication with said control apparatus, and wherein said control apparatus further responsive to a request for providing at least one of: a transparent surface color; charging a battery; controlling signal reception; applying voltage to at least the electro-chromic element; inputting energy to the charging circuit apparatus; controlling light energy to at least a cell means; controlling a display operation to generate electrical energy.

8. The energy harvesting communication device of claim 1, wherein said cell platform further comprises means for inputting energy into at least one of: said charging circuit apparatus; at least a primary storage medium; at least a secondary storage medium; at least a remote electronic device; at least a cell means; and wherein said primary and said secondary storage medium further comprising at least one of: a battery means; a capacitive means; at least a communication means.

9. The energy harvesting communication device of claim 1, wherein said cell platform configured for energy harvesting further comprises at least one of a case disposed with at least a signal booster apparatus, a charging circuitry apparatus in association with said communication apparatus, an optical waveguide in association with a cell apparatus, means for facilitating network communications, a communication network, sensor network, antennas network, means for boosting signal reception, a metamaterial structured substrate fiber optic waveguide, a metamaterial structured substrate layered network, a metamaterial substrate fiber optic layered structure, a metamaterial substrate associated with flexible polymer, a transmission platform, a cell platform having photonic conduction properties, a cell platform having plasmonic conduction properties, a light scattering solar energy harvester, a plasmonic nanostructured cell configured with miniaturized metal structures, means for boosting communication signals.

10. The energy harvesting communication device of claim 1, wherein said cell platform further responsive to at least one of environmental illuminance, thermal energy from sunlight, plasmonic energy, electromagnetic energy, and photonic energy for generating electrical energy.

11. The energy harvesting communication device of claim 1, wherein said cell platform further responsive to electromagnetic radiation for generating electrical energy.

12. The energy harvesting communication device of claim 1, wherein said charging circuit apparatus further responsive to at least one of: energy from said cell platform; energy level for at least a storage medium; energy level for said communication apparatus.

13. The energy harvesting communication device of claim 1, wherein said communication apparatus further comprises at least one of: an input/output module; a computer apparatus; apparatus for providing data processing; apparatus for providing character processing, each said input/output module further comprising graphic user interface configured with at least one of: a display apparatus; at least a keyboard; at least a force/pressure responsive apparatus, at least a vibration responsive apparatus; wherein said force/vibration responsive apparatus further comprising means for generating electrical energy; and wherein said at least one input/output module further comprises a media device comprising at least one of a receiving device; a transmitting device, wherein said media device operatively configured for broadcasting media content over the Internet, and said computer apparatus further comprises at least one of a network device; a mobile device, and wherein the (a) mobile device further operable for at least one of: communications; receiving character; transmitting data; harvesting energy from an environment, and downloading media content, at least an electronic device, at least a wearable electronic; a smart phone; an E-PHONE; apparatus configured for connecting wirelessly to multi-networks; means for processing information with speed of light.

14. The energy harvesting communication device of claim 1, wherein said communication apparatus further configured with a chip in communication with at least an antenna apparatus, wherein said chip further comprises signal booster apparatus, said signal booster apparatus further comprises a device selected from the group consisting of a signal booster that increases signal reception capabilities for the receiver, said communication apparatus further comprises at least one of a peer-to-peer wireless network management; means to obtain and/or abstract data from a media device; means for transmitting data via at least a light emitting source; a software sensory network; a peer-to-peer network device operating software; an energy harvesting cover attachment comprising a flexible display; an energy harvesting cover attachment, and an amplifier operable for amplifying signals received by the receiver an amplifier for amplifying signals received by at least one of a case, a cover, a housing.

15. The energy harvesting communication device of claim 1, wherein said control apparatus further comprises a logic circuit in communication with at least a detection platform, wherein said detection platform generating detection signals responsive to movements of at least one of: character; objects; keypads; energy; electrical signals; vibration energy; force energy; pressure energy, and wherein said logic circuit operable for controlling an application responsive to said at least one detection signal for generating electrical energy.

16. The energy harvesting communication device of claim 1, wherein said communication apparatus further comprises at least one of: a switchable network channels for at least one of video, television, voice and text data transmission/communications; platform for multimedia communication; platform for multimedia services; a cell switching virtual circuit network; distributed multimedia application network; a platform comprising multimedia data communication network; a mobile phone case; a mobile phone housing; a mobile phone circuitry; at least a housing for an electronic device; at least a case for an electronic device; at least a housing for said communication apparatus; at least a circuit board for said communication apparatus; an optical data transmission apparatus; an electronic data transmission apparatus; a network for transmission of data at optical frequencies; platform for providing voice, data, and multimedia services over wireless networks; a synchronized multimedia streaming platform; layered platform for providing end-to-end networking and communications; communication network for multimedia traffic; a multimedia platform configured for time and event driven synchronization; a multi-antenna on a display device; a multi-antenna on chip; an LED camera; each further operable for generating electrical energy.

17. The energy harvesting communication device of claim 1, wherein said cell platform further comprises a power source, comprising at least one of: insulating layer, conducting layer, a woven fabric, a film layer, carbon char, carbon black, metal sulfides, metal oxides, organic materials, textile fibers, zinc oxide (ZnO), nano-wires, piezoelectric crystals, piezoelectric elements, sensory layer, wet etching, dry etching, electron-silicon substrate-oxide, metal oxide semiconductor, optical properties, glass fiber, substrate micro fiber, substrate nano-fiber, FPGA meta material structure, solar cell, nickel-cadmium batteries (NiCd), nickel oxide hydroxide, metallic cadmium, wafer module, a capacitor module operatively configured to withstand higher number of charge/discharge cycles and faster charge and discharge rates, and wherein said communication apparatus further comprises sensor network comprising sensors embedded in silicon substrate and etched/fused in nano-fiber/microfiber material to provide at least one of: energy harvester apparatus; energy conversion device, sensory display/input device, interactive communication device, intelligence detection device, radiation prevention device, non cancerous communication device, secondary energy platform, primary energy platform, accelerated data processing device, solar energy to electrical energy conversion device, objects movement detection device, electronic document translation device, touch screen display device, metal cluster, Plasmon solar cell, means for converting activities into electrical energy.

18. The energy harvesting communication device of claim 1, wherein said communication apparatus further comprises at least one of: a network; a wireless multimedia network; a multimedia network for mobile web services; a multimedia sensor network; distributed multimedia network; platform for interactive collaboration; signal amplifier comprising at least a variable gain module, social network platform; video recognition platform; voice over text platform; text to voice enabled/conversion platform; TDMA platform; WCDMA platform; CDMA platform; TDMB platform; digital/analog/GSM platform; GPS platform; GPRS platform; TIHW platform; MFSCD platform; frequency authentication platform; multiple input/output platform; EDGSM platform; EDMA platform; OFDM platform; OFDMA platform; Wi-Fi platform; a mobile network; Wi-Max platform; wireless library platform; educational module; touch screen sensory platform; phone book; electronic book; electronic reader; dictionary; calendar; calculator; Internet service applications; energy generating apparatus; gaming apparatus; and/or Internet service connectivity operable for global roaming; apparatus for converting light photons into a photo generating electrical energy, optical elements; a light shield film; a UV curing resin; at least a transparent support substrate; at least a plate; at least an electric power generating system; at least energy management apparatus; a heating and/or cooling module; photovoltaic array; solar module; solar cell; mono-crystalline silicon wafer; fuel cell, metal-ceramic membranes, film composite metal-ceramic materials, thin film; polymer; amplified signal transmitter/receiver; power generator engine; nanotechnology; photovoltaic module; at least an energy harvester; at least a nano-rectifier; a light scattering apparatus; a light absorbing apparatus; a resonator; apparatus for guiding electromagnetic/sound wave; an optical fiber; a display device affixed with a backlight comprising a reflective layer; a touch sensor in association a at least a display device.

19. The energy harvesting communication device of claim 1, wherein said communication apparatus further comprises at least a wireless communication spectrum operable for at least one of: multi-stream data channels; an integrated network; at least a display device having at least a light guide layer in association with at least a laminated layer; at least an LED backlight; for receiving one or more wireless signals associated with at least a frequency within the wireless communication spectrum; for determining at least a signal strength for the received wireless signals; for determining at least a signal strength for at least a cell within the frequency; for allocating the at least one cell for enabling wireless transmission based on at least a predetermined threshold value; means for exchanging control information between at least a transmitting device and at least a receiving device; means for maintaining a charge in at least an energy cell means to sustain operation of the sensing module, wherein said energy cell means further comprises at least one of: at least a photovoltaic panel; at least photovoltaic cells; at least a piezoelectric element; et least means for converting a form of energy into electrical energy; at least an AC to DC converter operable to convert an AC voltage from an AC power source to a DC voltage; at least means for providing a notification in response to the energy storage device full charge; at least a wearable case for said communication apparatus for harvesting energy.

20. The energy harvesting communication device of claim 1, wherein said communication apparatus further comprises at least one of: a packet management network; a network packet support system; an integrated radio frequency device; a nano-electronic system; means for eliminating drop calls; means for extending battery life; at least an RF-MEMS device; an energy harvesting smart phone comprising an E-PHONE; at least an array of digitized capacitors disposed on a die; means for capturing stray radiations; means for radiating communication signals; at least a software defined radio device; at least a turn-able RF device; at least a turn-able RF-MEMS front end; at least a software defined radio on chip device; at least a turn-able capacitor array; at least an antenna apparatus comprising or a signal booster; at least a dual band signal booster antenna on nip; a communication circuit board comprising solar cell platform; a CMOS multiple antenna on chip in communication with means for converting electromagnetic radiation into electrical power; at least an antenna comprising nano-wire antenna In association with the means for converting electromagnetic radiation; at least a nano-wire comprising a material for exhibiting good electrical properties operable for transmitting and for receiving electromagnetic signals; further comprises at least a gold material for receiving and for transmitting electromagnetic signals at higher frequencies for energy harvesting; at least a touch screen comprising a sensory platform configured with at least one of: piezoelectric elements, MEMS, load cell, strain gauge, acoustic sensor, for converting pressure force and/or sound waves into electrical energy; at least a case comprising solar cell platform in association with means for converting solar energy into electrical power; at least a case comprising nano sensors embedded in silicon substrate and alloyed with meta-material structure cavity and fused/etched in nano-fiber/microfiber material to exhibit a sensory platform for converting at least a form of energy within an environment Into electrical energy; apparatus for converting light into electrical energy; means for collecting electrons to provide electrical energy.

21. The energy harvesting communication device of claim 1, wherein said charging circuit further comprises at least one of: at least an energy storage and management circuit; an integrated circuit chip in association with said antenna apparatus; an energy harvesting apparatus; a CMOS multiple antenna on chip comprising a network circuitry; an energy supply apparatus; a substrate means in association with an integrated circuit; a housing comprising a light guide plate; a housing disposed with means for emitting light into a light guide plate; apparatus for processing electrical speed signal; a housing having electrical components.

22. The energy harvesting communication device of claim 1, wherein said charging circuit in communication with said cell platform for managing electrical energy, further comprising at least one of: a router; a repeater; a transmitter; a transceiver; a receiver; a modem; an antenna apparatus.

23. The energy harvesting communication device of claim 1, wherein said charging circuit further configured with sensors responsive to energy storage and energy management.

24. The energy harvesting communication device of claim 1, wherein said cell platform further comprises energy harvesting apparatus responsive to natural energy and wherein said cell apparatus is further configured for converting at least a form of energy into electrical energy.

25. The energy harvesting communication device of claim 1, wherein said cell platform further comprises an energy harvesting device comprising at least one of: a Plasmon solar cell, an electro-chromic apparatus, an oxide material, a metal cluster, a thin film, a glass substrate, nano-particles, miniaturized steels, Plasmon resonance, light scattering device, light absorbing device, apparatus for guiding electromagnetic wave, apparatus for guiding sound, an optical fiber, a nano-fiber, a microfiber, apparatus for transmitting and absorbing power between at least one of: radio; radar; optical electronics, a printed waveguide, a housing for an electronic device comprising photovoltaic apparatus, a thin conductive metal cluster, means for collecting electrons to generate electrical energy; a chip comprising carbon nanotubes In association with photonic crystals for converting thermal energy Into electrical energy.

26. An energy harvesting device for generating electrical energy and for managing the energy to power a communication device; the device comprising: a. at least a storage medium; b. at least a communication apparatus communicatively coupled to a charging circuit apparatus and in association with a control apparatus; and c. said charging circuit apparatus further comprises sensors embedded in silicon substrate and in association with the storage medium to provide at least one of a communication medium, a detection platform, a communication clarity, a detection selectivity, energy harvesting, and a detection sensitivity.

27. The energy harvesting communication device of claim 26, wherein said storage apparatus further comprises at least one of: an IC card; a SIM card; a memory apparatus; a chip; a capacitive apparatus; a battery apparatus; a case; a cover; a housing; a cell platform; an integrated storage and management circuit; an integrated energy storage and management circuit; a chip comprising carbon nanotubes in association with photonic crystals; means for converting thermal energy into electrical energy; a plasmonic crystal chip; a photonic crystal chip; a silicon substrate nano-fiber plasmonic embedded with ferrous material structure; a chip having a reflective layer; a transparent conducting nanomaterial structure.

28. The energy harvesting communication device of claim 26, wherein said storage medium further comprises a charging circuit comprising et least one of: a capacitive storage medium, an ultra capacitor, a ferroelectric polymer, a power density tunable polymers, polymer ceramic nano-composites, polymers with materials that have high breakdown strength, a composite material with a large energy storage capacity, at least dielectric polymers, at least multiple capacitor cells, at least a rapid power delivery apparatus, at least a material configured to exhibits higher permeability, at least a capacitor with electrochemical cells, at least a protogenous ion-conducting liquid, at least a high porosity polymer composition, at least a micro-machined single crystal nano/micro-cantilever, at least a resistor.

29. The energy harvesting communication device of claim 1, wherein said communication apparatus further comprises at least one of: a network management system; a signal booster apparatus; means for accelerating signal reception; means for increasing data transmission speed; signal multiplexer; digital signal network; multiplex communications; optical communications; wireless signal distribution network; a client management service provided by the network; a system for supporting network clients mobility between network devices; a cache management system; a cache lookup support system; a cache update service system; a data processing system operable on at least a social platform operatively configured for multicast virtual private network; at least a computer apparatus comprising a computer recordable medium operable on a computer readable program being recorded to cause at least a computer device to receive at least a reference document; at least an interactive interface apparatus operatively configured with at least a multiprotocol label switching operable on at least a support system operatively configured for mapping desired communications; a support system communicatively connected to at least a carrier based dedicated processing element in communication with the multicasting virtual private networks; means for categorizing desired communications referenced by initial search results; and at least an interactive interface apparatus in communication with at least a link to at least a profile for at least a reference document.

30. The energy harvesting communication device of claim 1, wherein said cell platform further comprises at least one of: a printed film; an electro-chromic apparatus; a photovoltaic cell; an optical fiber; a nano-fiber metal substrate; a nano-fiber silicon substrate; a nano-fiber film substrate; a router, a LED; a diode; a rectifier; a repeater; a circuit apparatus configured for communications with at least a wireless communication apparatus; at least a nano-rectifier; an antenna apparatus.

31. The energy harvesting communication device of claim 1, wherein said communication apparatus In communication with at least one of; said cell platform; a capacitive apparatus; a battery apparatus; a router; a repeater; an integrated circuit; a switch means in communication with said cell platform; an energy management circuit; an energy storage circuit; at least a LED; at least a diode; at least a rectifier; at least a nano-rectifier; an antenna apparatus; a circuit chip; at least an antenna in association with a chip.

32. The energy harvesting communication device of claim 1, wherein said cell platform further comprises at least one of means for controlling wireless feeder network, means for indexing at least a communication spectrum, means for controlling wireless network, means for establishing communication between networks, a spectrum for supporting communications, means for routing data, a distributed computing network, a broadband service network, a data collection network.

33. The energy harvesting communication device of claim 1, wherein said cell platform further comprises means for transferring data to at least a communication means, and wherein said communication apparatus further comprises at least one of a cell, a communication device, a wireless network, a telecommunication network, a processor, a broadband network, a distributed network, a data collection network, a memory, a chip, a mobile communication network, a layer device, a gateway device, a transportable communication network, means for forwarding data packets along networks, means for joining multiple networks together, means for creating an overlay internetwork, an electronic device, a television network, a distributed multimedia network, a multimedia system, a cache management system, a cloud network.

34. The energy harvesting communication device of claim 1, wherein said cell platform further comprises at least one of means for transmitting signaling information from a central communication network to a subscriber terminal of a communication system, means for controlling at least a network for connecting users to at least the communication network, at least a wireless network controller, at least a transportable wireless network controller, an energy harvesting IC, an energy harvesting CMOS.

35. The energy harvesting communication device of claim 1, wherein said cell platform further comprises a communication network comprising means for scavenging energy to power at least one of electronic devices, wearable electronics, mobile electronic devices, wireless electronic devices, automotive vehicles, electrical power stations, grids associated with at least a city, grid associated with at least a state, grid associated with at least a county, grid associated with at least a remote community, energy storage medium, communication network devices, a chip comprising nanotubes In association with photonic crystals for converting thermal energy Into electrical energy.

36. The energy harvesting communication device of claim 1, wherein said cell platform further comprises means for harvesting energy from at least one of a communication network, an entertainment network, a television network, a multimedia network, a broadcasting network, a remote community network, a sensor network, environmental activities, communication activities, environmental means, mechanical means, radio wave, microwave, electromagnetic waves, Giga wave activities, thermal activities, sporting activities, optoelectronic activities, infrared activities, nature occurring activities, mechanical waves, visible light, infrared radiation, ultraviolet radiation, light wave, millimeter wave.

37. The energy harvesting communication device of claim 1, wherein said cell platform further comprises at least one of means for maximizing power for a D.C power source, means for managing power devices applications, a conductive circuitry in association with a capacitive circuitry, a capacitive circuitry in association with a DC power source, an energy switching circuitry, a radio frequency energy harvester, an energy charging device, an energy storage device, an energy conversion device, a power harvester configured to transfer power associated with DC voltage to at least a power regulator circuitry, a power harvester configured to transfer power associated with the DC voltage to a power storage device, a power harvester configured to transfer power associated with the DC voltage to an integrated circuit.

38. The energy harvesting communication device of claim 1, wherein said cell platform further comprises one of a photovoltaic cell, a cell having a band-gap energy, a substrate-nano-fiber having an emitter layer, a substrate-nano-fiber having a base layer, a substrate-nano-fiber having a semiconductor layer, a substrate-nano-fiber having a phase array, a substrate emitter layer, a substrate base layer, a substrate semiconductor layer, a substrate phase layer, a substrate-nano-fiber having a nano-plate layer, a substrate nano-fiber having a glass layer, a conductive layer, a multilayered cantilever, a multilayered piezoelectric elements, a multilayered piezoelectric crystal, at least a piezoelectric layer in communication with the multilayered cantilever, at least a transparent substrate in association with a reflective layer, at least a reflective glass substrate.

39. The energy harvesting communication device of claim 1, wherein said cell platform further comprises energy management platform for converting at least one of kinetic energy, vibration energy, sound energy, solar energy, mechanical energy, electromagnetic energy into electrical energy, and wherein said control apparatus further comprises at least an antenna configured to generate an electromagnetic field to wirelessly transfer power to at least a receiving antenna, said control apparatus further associated with an amplifier device configured to output electric power to said antenna for generating the electromagnetic field, said communication device further comprises a detector means configured to detect the presence of a receiver device to generate at least a signal responsive to the detection of the receiver device, controlling a power output of the antenna and the amplifier via a time delay responsive system.

40. The energy harvesting communication device of claim 1, wherein said cell platform further comprises at least one of an accelerometer in association with a software algorithm for communication with at least a piezoelectric, a MEMS device, a MEMS device in association with an accelerometer, at least a multi-thin film polymer layer, at least a substrate fiber chip being disposed with at least a thin film polymer layer, at least a transparent substrate in association with miniaturized reflective layers being embedded with software, a photovoltaic cell having at least a reflective surface, a photovoltaic cell having nano-structures, a photovoltaic cell comprising silicon substrate nano-fibers, a photovoltaic cell of nano-fiber applications, at least a photovoltaic cell of infrared polymer sensory structure, at least a photovoltaic touch screen being disposed with nano-fiber transparent substrate, at least a flexible electrode in association with a touch screen, at least a flexible substrate nano-fiber in association with piezoelectric zinc oxide in communication with conductive graphene electrodes, at least a nanotechnology application.

41. The energy harvesting communication device of claim 1, wherein said cell platform further comprises one of a photovoltaic polarization screen comprising an energy harvesting platform, an illuminance sensor associated to at least a glass surface operable for reflecting sufficient defused/undiffused light to form an image of an object placed in front of a display apparatus, an illuminance sensory module, an electrochromic sensory module disposed with an electrochromic substrate, an RF tag module, a video transmission platform, a frequency analyzer, a photovoltaic polarization screen comprising a mirror platform, an illuminance sensory environment associated with voltage for changing a screen into a mirror environment, an electromagnetic wave resonator in association with at least a reflective element.

42. The energy harvesting communication device of claim 1, wherein said communication apparatus further comprises at least one of: an energy harvesting smart network comprising an E-NETWORK; an FPGA dedicated memory; an FPGA dedicated multiplier; an FPGA silicon circuitry; an FPGA high speed input/output device; an FPGA silicon nano-wire; at least a non-linear switch circuitry for energy harvesting; at least a fiber nano-generator; at least a piezoelectric semiconducting electronic device; means for harvesting energy locally and for transmitting information to and from the means wirelessly; at least a piezoelectric energy harvesting device; at least a transducer energy harvesting device; means for creating a free charge/voltage field across at least a capacitive element; a video compression device.

43. The energy harvesting communication device of claim 1, wherein said cell platform further comprising a sensor apparatus in association with said communication apparatus, comprising at least one of: an antenna apparatus; a nano-wire antennas; means for enabling rectification at least at high frequencies to prevent losses caused by at least quantum effects; a high speed rectifier; a chip; a microprocessor; a nano-processor; a detection platform; a backhaul link; an apparatus operable substantially without band gap limitations; a communication node; a communication switched path; means for converting infrared/THz electromagnetic radiation into DC power; means for rectifying at least an induced voltage to at least terahertz frequency; an integrated rectifier; a communication switch; at least an energy harvesting means; an energy storage means; a communication platform; an electromagnetic path; a photovoltaic cell; a nano-wire antenna array; a radio wave signal path; a microwave signal path; a millimeter wave signal path; means for harnessing an infrared spectrum; an electromagnetic wave energy converter; communication land line signal path; a receiving nano-antenna in association with a rectifying circuit; a wireless communication signal path; a media communication platform; a nano-rectenna platform; a broadband rectifying antennas; an array of nano-wires comprising at least insulated electromagnetic absorber elements; means for enabling at least a remote communication device to communicate with another remote communication device and see each user of the said remote communication device in real time and/or near real time; a plasmonic solar cell, an electro-chromic apparatus, an oxide material; a metal cluster, a thin film; a glass substrate, nano-particles; miniaturized steels; Plasmon resonance; light scattering device; light absorbing device; apparatus for guiding electromagnetic wave; apparatus for guiding sound; an optical fiber; a nano-fiber; a microfiber; at least an electro-chromic apparatus; apparatus for transmitting and absorbing power between at least one of: radio, radar, optical electronics, a printed waveguide.

44. The energy harvesting communication device of claim 26, wherein said charging circuit apparatus further comprises an energy harvester, the energy harvester further comprises at least one of: a solar cell; an antenna apparatus operable for harvesting electrical energy from electromagnetic radiation; a plasmonic platform; a photonic platform; a display apparatus; a housing being affixed with a display apparatus; a housing further disposed with antenna apparatus for harvesting energy and for boosting signal reception; an integrated circuit board; an electronic computing device; a case configured with a display device; means for harvesting energy from vibration; means for harvesting energy via electromechanical operation; a display device in association with a camera device; a plasmonic chip; a metal nanoparticle array waveguide; a photonic chip; a layered oxide; an optical waveguide configured with means to absorb and emit light; a communication device associated with means for harvesting energy via its surroundings; a cell switching virtual circuit network; a multimedia synchronization platform; a multimedia data synchronization platform; multimedia network synchronization; a synchronized multimedia streaming platform.

45. A mobile network terminal for performing communications and for harvesting energy, the network terminal is further configured for vehicular electrification; comprising: at least a cell platform configured for energy storage medium, the platform further associated with at least one of a cell having photonic conduction properties, a cell having plasmonic conduction properties, a light scattering solar energy harvester, a plasmonic nanostructured cell configured with miniaturized metal structures, a synchronized multimedia streaming cell, a multimedia network synchronization medium; at least a vehicle in communication with said energy storage medium; at least a communication apparatus configured for controlling communications, for identifying mobile subscribers, and for associating the mobile subscribers with at least a network; at least a multiple antennas on chip apparatus in association with said cell platform and said communication apparatus for harvesting electrical energy from at least one of electromagnetic energy, mechanical enemy, environmental energy, and natural occurring energy.

46. The mobile network terminal of claim 45, wherein said multiple antennas on chip apparatus further configured for at least one of network communication; faster data transmission, voice communications, and for boosting communication signals.

47. The mobile energy network terminal of claim 45, wherein said vehicle further includes a vehicular apparatus, further comprises at least one of: a mobile network; a stationary network; at least a backhaul link; at least a millimeter wave network; at least a motor apparatus; at least a mechanical apparatus; at least an electrical/electronic apparatus; at least an electromechanical apparatus; at least a communication means; at least e transportable network; at least a system for supporting network clients mobility between network devices; a mobile network management system; a client management service provided by the mobile network system, and wherein said communication apparatus further comprises at least one of a cell platform having photonic conduction properties; a cell platform roving plasmonic conduction properties; a light scattering solar energy harvester; a plasmonic nanostructured cell configured with miniaturized metal structures; means for boosting communication signals; said multiple antennas on chip apparatus further comprises a waveguide for receiving electromagnetic wave energy for conversion Into useful energy.

48. The mobile network terminal of claim 45, wherein said vehicle further comprises vehicular apparatus, the vehicular apparatus further comprises at least one of a vehicle disposed with at least a wheel, a detection apparatus, a safety apparatus, means for communicating transportation occurrence of events, means for communicating events associated with driving conditions, means for communicating events associated with road conditions, means for communicating events associated with transportation communications, a GPS device, an entertainment device, a WiFi device, a broadband device, a wireless connectable device, a wireless network, a multimedia synchronization platform, a cell switching virtual circuit network, and wherein said multiple antennas on chip apparatus further comprises an electromagnetic wave carrier in thermal communication with said communication apparatus for receiving the electromagnetic wave energy and for generating electrical signals and/or electrical energy therefrom.

49. The mobile network terminal of claim 45, wherein said vehicle further comprises at least one of: a motor means; a building structure; network apparatus; a network station; a backhaul link; a millimeter wave network; a broadcast service apparatus; a communication service station; vehicular accessories, and wherein said energy storage medium further responsive to energy being generated to provide power to at least one of: said vehicle; the vehicular apparatus; a grid; a communication device; an electronic device; a wearable electronic device; a hand held electronic device; a hand held communication device.

50. The mobile network terminal of claim 45, wherein said vehicle further disposed with vehicular apparatus, at least one vehicular apparatus further comprises an energy harvesting apparatus configured for responding to mechanical operations to generate electrical energy, wherein at least one vehicular apparatus further configured for converting mechanical energy into electrical energy, and wherein at least one energy harvesting apparatus further comprises a piezoelectric element coupled to at least one of a mechanical surface, a mechanical device, an oscillating device, a FPGA in association with a metamaterial substrate structure having a waveguide input and output for guiding electromagnetic wave energy fed into electrical energy output.

51. The mobile network terminal of claim 45, wherein said vehicle further comprises a mechanical apparatus in association with at least an energy harvesting apparatus for converting mechanical energy into electrical energy, and wherein at least one energy harvesting apparatus further comprises a cantilever coupled to at least one of a mechanical surface, nanostructured substrate, metamaterial substrate, thin film substrate, plasmonic substrate, photonic substrate, electrochromic substrate, a mechanical device each In association with an electrical contact surface.

* * * * *